Aug. 10, 1965 R. J. KALTHOFF ETAL 3,199,674

DATA RETRIEVAL APPARATUS AND METHOD

Filed Aug. 15, 1961 46 Sheets-Sheet 1

INVENTORS.
Robert J. Kalthoff.
BY Paul H. Ornstein.
Wood, Herron & Evans.
ATTORNEYS.

Aug. 10, 1965 R. J. KALTHOFF ETAL 3,199,674

DATA RETRIEVAL APPARATUS AND METHOD

Filed Aug. 15, 1961 46 Sheets-Sheet 2

INVENTORS.
Robert J. Kalthoff.
BY Paul H. Ornstein
Wood, Herron & Evans
ATTORNEYS.

Aug. 10, 1965 R. J. KALTHOFF ETAL 3,199,674

DATA RETRIEVAL APPARATUS AND METHOD

Filed Aug. 15, 1961 46 Sheets-Sheet 3

INVENTORS.
Robert J. Kalthoff.
BY Paul A. Ornstein.
Wood, Herron & Evans.
ATTORNEYS.

INVENTORS.
Robert J. Kalthoff.
BY Paul H. Ornstein.
Wood, Herron & Evans.
ATTORNEYS.

INVENTORS.
Robert J. Kalthoff.
BY Paul H. Ornstein
Wood, Herron & Evans.
ATTORNEYS.

Aug. 10, 1965 R. J. KALTHOFF ETAL 3,199,674

DATA RETRIEVAL APPARATUS AND METHOD

Filed Aug. 15, 1961 46 Sheets-Sheet 6

INVENTORS.
Robert J. Kalthoff.
Paul H. Ornstein.
BY Wood, Herron & Evans.
ATTORNEYS.

DATA RETRIEVAL APPARATUS AND METHOD

INVENTORS.
Robert J. Kalthoff,
BY Paul H. Ornstein.
Wood, Herron & Evans.
ATTORNEYS.

Aug. 10, 1965 R. J. KALTHOFF ETAL 3,199,674

DATA RETRIEVAL APPARATUS AND METHOD

Filed Aug. 15, 1961 46 Sheets-Sheet 8

INVENTORS.
Robert J. Kalthoff.
BY Paul H. Ornstein.
Wood, Herron & Evans.
ATTORNEYS.

INVENTORS.
Robert J. Kalthoff.
BY Paul H. Ornstein
Wood, Herron & Evans.
ATTORNEYS.

INVENTORS.
Robert J. Kalthoff.
BY Paul H. Ornstein.
Wood, Herron & Evans.
ATTORNEYS.

DATA RETRIEVAL APPARATUS AND METHOD

Filed Aug. 15, 1961 46 Sheets-Sheet 11

INVENTORS.
Robert J. Kalthoff.
BY Paul H. Ornstein.
Wood, Herron & Evans.
ATTORNEYS.

DATA RETRIEVAL APPARATUS AND METHOD

Filed Aug. 15, 1961 46 Sheets-Sheet 12

INVENTORS.
Robert J. Kalthoff.
BY Paul A. Ornstein.
Wood, Herron & Evans.
ATTORNEYS.

DATA RETRIEVAL APPARATUS AND METHOD

Filed Aug. 15, 1961 46 Sheets-Sheet 13

INVENTORS.
Robert J. Kalthoff.
BY Paul H. Ornstein.
Wood, Herron & Evans.
ATTORNEYS.

DATA RETRIEVAL APPARATUS AND METHOD

Filed Aug. 15, 1961 46 Sheets-Sheet 14

INVENTORS.
Robert J. Kalthoff
BY Paul H. Ornstein
Wood, Herron & Evans
ATTORNEYS.

Aug. 10, 1965 R. J. KALTHOFF ETAL 3,199,674

DATA RETRIEVAL APPARATUS AND METHOD

Filed Aug. 15, 1961 46 Sheets-Sheet 15

INVENTORS.
Robert J. Kalthoff.
Paul H. Ornstein.
BY Wood, Herron & Evans.
ATTORNEYS.

DATA RETRIEVAL APPARATUS AND METHOD

Filed Aug. 15, 1961

INVENTORS.
Robert J. Kalthoff.
BY Paul H. Ornstein.
Wood, Herron & Evans.
ATTORNEYS.

DATA RETRIEVAL APPARATUS AND METHOD

INVENTORS.
Robert J. Kalthoff.
BY Paul H. Ornstein.
Wood, Herron & Evans.
ATTORNEYS.

DATA RETRIEVAL APPARATUS AND METHOD

Filed Aug. 15, 1961 46 Sheets-Sheet 18

INVENTORS.
Robert J. Kalthoff.
BY Paul H. Ornstein.
Wood, Herron & Evans.
ATTORNEYS.

INVENTORS.
Robert J. Kalthoff
BY Paul H. Ornstein
Wood, Herron & Evans
ATTORNEYS.

INVENTORS.
Robert J. Kalthoff
Paul H. Ornstein
BY Wood, Herron & Evans
ATTORNEYS.

INVENTORS.
Robert J. Kalthoff.
BY Paul H. Ornstein
Wood, Herron & Evans.
ATTORNEYS.

INVENTORS.
Robert J. Kalthoff.
BY Paul H. Ornstein.
Wood, Herron & Evans.
ATTORNEYS.

DATA RETRIEVAL APPARATUS AND METHOD

Filed Aug. 15, 1961 46 Sheets-Sheet 23

INVENTORS.
Robert J. Kalthoff.
BY Paul H. Ornstein.
Wood, Herron & Evans.
ATTORNEYS.

INVENTORS,
Robert J. Kalthoff,
Paul H. Ornstein.
BY Wood, Herron & Evans.
ATTORNEYS,

DATA RETRIEVAL APPARATUS AND METHOD

INVENTORS.
Robert J. Kalthoff.
BY Paul H. Ornstein.
Wood, Herron & Evans.
ATTORNEYS.

DATA RETRIEVAL APPARATUS AND METHOD

INVENTORS.
Robert J. Kalthoff.
BY Paul H. Ornstein.
Wood, Herron & Evans.
ATTORNEYS.

INVENTORS.
Robert J. Kalthoff.
BY Paul H. Ornstein.
Wood, Herron & Evans
ATTORNEYS.

DATA RETRIEVAL APPARATUS AND METHOD

Filed Aug. 15, 1961 46 Sheets-Sheet 28

INVENTORS,
Robert J. Kalthoff.
BY Paul H. Ornstein.
Wood, Herron & Evans.
ATTORNEYS.

INVENTORS.
Robert J. Kalthoff
BY Paul A. Ornstein.
Wood, Herron & Evans.
ATTORNEYS.

INVENTORS.
Robert J. Kalthoff.
BY Paul H. Ornstein.
Wood, Herron & Evans.
ATTORNEYS.

DATA RETRIEVAL APPARATUS AND METHOD

Filed Aug. 15, 1961 46 Sheets-Sheet 31

INVENTORS.
Robert J. Kalthoff.
BY Paul H. Ornstein.
Wood, Herron & Evans.
ATTORNEYS.

INVENTORS.
Robert J. Kalthoff.
BY Paul H. Ornstein.
Wood, Herron & Evans.
ATTORNEYS.

DATA RETRIEVAL APPARATUS AND METHOD

Filed Aug. 15, 1961

INVENTORS.
Robert J. Kalthoff.
BY Paul H. Ornstein.
Wood, Herron & Evans.
ATTORNEYS.

INVENTORS.
Robert J. Kalthoff.
BY Paul H. Ornstein.
Wood, Herron & Evans
ATTORNEYS.

INVENTORS.
Robert J. Kalthoff.
BY Paul H. Ornstein.
Wood, Herron & Evans.
ATTORNEYS.

DATA RETRIEVAL APPARATUS AND METHOD

INVENTORS.
Robert J. Kalthoff.
BY Paul H. Ornstein.
Wood, Herron & Evans.
ATTORNEYS.

DATA RETRIEVAL APPARATUS AND METHOD

Filed Aug. 15, 1961 46 Sheets-Sheet 37

INVENTORS.
Robert J. Kalthoff.
BY Paul H. Ornstein.
Wood, Herron & Evans.
ATTORNEYS.

INVENTORS,
Robert J. Kalthoff
BY Paul G. Ornstein
Wood, Herron & Evans
ATTORNEYS.

Aug. 10, 1965 R. J. KALTHOFF ETAL 3,199,674

DATA RETRIEVAL APPARATUS AND METHOD

Filed Aug. 15, 1961 46 Sheets-Sheet 39

INVENTORS.
Robert J. Kalthoff,
BY Paul H. Ornstein.
Wood, Herron & Evans.
ATTORNEYS.

INVENTORS,
Robert J. Kalthoff,
BY Paul H. Ornstein,
Wood, Herron & Evans
ATTORNEYS.

TO FIG. 74

INVENTORS.
Robert J. Kalthoff,
BY Paul H. Ornstein.
Wood, Herron & Evans
ATTORNEYS.

DATA RETRIEVAL APPARATUS AND METHOD

Filed Aug. 15, 1961

INVENTORS.
Robert J. Kalthoff.
BY Paul H. Orustein.
Wood, Herron & Evans.
ATTORNEYS.

Robert J. Kalthoff,
Paul H. Ornstein,
INVENTORS.
BY Wood, Herron & Evans,
ATTORNEYS.

INVENTORS.
Robert J. Kalthoff.
BY Paul H. Ornstein.
Wood, Herron & Evans.
ATTORNEYS.

INVENTORS.
Robert J. Kalthoff
Paul H. Ornstein
BY Wood, Herron & Evans
ATTORNEYS.

INVENTORS.
Robert J. Kalthoff.
BY Paul H. Ornstein.
Wood, Herron & Evans,
ATTORNEYS.

United States Patent Office 3,199,674

Patented Aug. 10, 1965

3,199,674

DATA RETRIEVAL APPARATUS AND METHOD

Robert J. Kalthoff and Paul H. Ornstein, Cincinnati, Ohio, assignors to O.K. Partnership, Wyoming, Ohio, a limited partnership of Ohio Filed Aug. 15, 1961, Ser. No. 131,646
56 Claims. (Cl. 209—110)

This invention, in its broadest aspects, relates to a data retrieval system in which information is coded upon novel edge notched cards which are stored in random order in a drawer or similar compartment. The present invention further comprehends a novel method and apparatus for automatically separating from a group of randomly arranged cards those cards notched, or coded, in a predetermined manner to indicate that they carry the information desired.

At the present time, there is a substantial void in available mechanical processing equipment in that there is no automatic retrieval system adapted to rapidly sort large numbers of coded documents in order to locate those documents bearing the desired information. As is well known, it has previously been proposed to provide cards having a plurality of coding notches or openings adjacent to the periphery of the cards, the notches or openings providing means whereby cards bearing a predetermined coding can be manually, or in some cases mechanically, separated from the remaining cards. However, these previously developed systems are unsatisfactory for modern data retrieval needs.

In the first place, the prior art systems are limited to handling exceedingly small classes of coded data, i.e., previously suggested notched card systems having been designed to separate cards having any of from only a few to, at most, several thousand possible coded entries. Obviously, this maximum number available is totally inadequate for many data retrieval needs in which many millions or even billions of classifications are utilized.

In the second place, many of the prior art sorting systems utilizing notched, or peripherally punched cards, rely completely upon manual handling of the cards in order to effect a separation of the selected cards from the remainder of the stack. This time consuming manual separation of the cards again makes their use impractical for systems having any substantial number of documents. Even those prior art systems which have provided some means for mechanically separating cards bearing the desired coding have, at best, effected only a partial physical separation. Consequently, the user is still required to manually pick out cards which are at most only slightly offset from the remaining cards in order to remove the selected cards from the stack. Again, this manual operation is slow and coupled with other defects in the available equipment, makes it totally impractical for all but a few limited uses.

In addition to the simple systems which have previously been suggested using edge notched cards there have been a large number of machines developed for automatically handling tabulating type punched cards, as for example those of the IBM type. As is well recognized, these machines and cards are adapted to handle large amounts of stored information and are highly satisfactory for many computing and statistical uses. However tabulating type punch cards and the machines for processing them are not generally satisfactory for use in a data retrieval system. In the first place, these machines are inherently large and expensive. Moreover, the attrition of the cards is quite high so that the entire stack of cards must be duplicated and replaced at frequent intervals. These considerations alone render this type of apparatus impractical for many installations, such as those in doctor's offices and other similar offices, small libraries, small companies and the like.

Another serious disadvantage to the use of tabulating type punched cards as an information storage medium in a data retrieval system is that these cards must be searched serially, i.e., to complete a search through a given group of cards to find a certain card, each of the group of cards must be examined in turn. As a result, this type of equipment requires an inordinately large amount of time to locate the desired data. For example, a typical machine of this general type would require twenty-five minutes to examine a total of ten thousand cards.

The principal object of the present invention is to provide a data retrieval system in which one or more of an exceedingly large number of possible coded entries can be stored upon a card and in which a large number of coded cards can simultaneously be sorted and completely separated to segregate those cards bearing the desired entry.

It is another, and equally important, object of the present invention to provide data retrieval apparatus which is relatively compact and inexpensive to produce so that the system is practicable for use by doctors, and other professional people, as well as by small libraries, hospitals and other institutions having limited research facilities.

By way of example, one contemplated use of the present data retrieval system involves the central coding of abstracts of all published medical literature. It is widely recognized at the present time that there is a great deficiency in the dissemination of information concerning the most up-to-date medical developments. The average doctor may receive several magazines a month, yet when he is confronted with a particular problem he must rely upon his memory as to what pertinent articles he may have read or alternatively must rely upon some home-made filing arrangement.

There are innumerable cases where great benefit would have resulted to the patient had a physician been able to immediately locate one or more recent articles relating to a specific problem. The present system makes it practical for the first time for abstracts of all medical articles to be placed on cards, the cards coded, and subsequently mechanically sorted to facilitate immediate location of pertinent articles. In order to utilize the present system, a physician would have in his office, study or the like, a retrieval unit which, as explained below, is of a size not unlike that of a large filing cabinet. The physician would periodically receive from a central publisher pre-coded cards bearing abstracts or even micro-images of articles published in his field. These cards would be inserted in random order in drawers in the retrieval unit. Subsequently, when confronted with a particular problem, the physician would refer to an index containing the code information relating to the subject matter in which he was interested. He would then actuate keys, buttons or the like, to program this code into the retrieval apparatus which would in a matter of seconds automatically separate from the randomly stored cards those cards corresponding to the selected coding.

More particularly, the present invention contemplates the use of a novel data storage card of generally rectangular configuration. This card may contain printed information, such as the name of an article appearing in a periodical, together with data identifying the date and periodical and an abstract of the article. Alternatively, the card may contain an aperture in which is inserted a microfilm bearing material that can be projected or photographically reproduced. As a further alternative, the card may contain a micro-xerographic image of a publication, drawings or the like. This micro-image can also be projected or reproduced using conventional equipment available for this purpose. In still other instances the card may contain written or typed material relating to the particular activities of the user, such as patient case histories, customer records and the like.

One edge of the data storage card functions as a sorting edge and carries a ferro-magnetic strip or the like. This edge of the card also provides a plurality of notch sites upon which is coded a classification deignator or descriptive information concerning the material stored on the card. The card is coded, as is explained in detail below, by notching the various notch sites to different depths, for example from a shallowest or unit incremental depth to a depth ten times as great. The notches on the card may correspond to either a generic, or hierarchical, coding or alternatively the notches can represent a descriptor or uniterm coordinate coding. In a typical card using a generic or hierarchical coding, upwards of several thousand billion possible classifications can be coded upon the card. When a descriptor type system or uniterm coordinate system is employed, a typical card provides for over a billion combination of three descriptors.

A preferred form of record card also includes an upwardly extending projection which may be in the form of an integral tab or alternatively may be a separate metal piece secured to the card in any suitable manner. This projection is of a width less than the unit incremental notch depth. In one preferred embodiment, the projection is in the form of an integral tab, the front end of which forms a continuation of the sorting edge of the card. The function of this tab and the highly important part it plays in making it feasible to provide large numbers of possible sorts is explained in detail below.

Another structural feature of the card is the provision of one or more elongated slots which extend parallel to the extent of the notch sites and at right angles to the extent of the sorting edge. These elongated guide notches function to provide accurate alignment of the cards relative to the sorting elements of the retrieval apparatus. These elongated guide notches also tend to maintain the cards in a vertical position by resisting any tendency of the cards to cant or rotate under the force imposed during the sorting operation. In a preferred embodiment, one of these elongated slots is formed in the ferro-magnetic element while a second slot is provided in the rear edge of the card. Providing a slot in the ferro-magnetic element of the preferred embodiment provides another unique advantage since the slot increases the effectiveness of the ferro-magnetic element as is explained below.

The present invention is predicated in part upon the concept of providing a novel method of separating these edge notched cards. More particularly, in accordance with the present invention, a stack of cards is first brought into a sorting position with the sorting edge of each of the cards in alignment. The cards are releasably held in this aligned, or sorting, position by means of a magnetic force which attracts the ferro-magnetic portions of each of the cards. In the next step of the sorting method, rejectors are projected outwardly by varying amounts in accordance with the selected code. These rejectors are aligned with the various notch sites of the cards and are effective to push cards not notched in conformity with the positions of the rejectors against the magnetic force. However, the cards which are notched in exact conformity with the configuration of the extended rejectors remain in position since the rejectors enter the slots of these cards and do not encounter any abutting surface by means of which the cards would be pushed away.

In the next step of the method, the selected cards which bear the desired coding are withdrawn under the influence of the magnetic force in a direction 180° from the direction in which the rejected cards were shifted. At the same time, the rejected cards are mechanically blocked and thus prevented from movement under the influence of the magnetic force. The selected cards are removed completely free of any engagement with the remaining cards of the stack and are subsequently gathered by mechanical means, such as a pusher which drops the cards into a tray. Consequently, the entire sorting operation is performed without the need for any manual handling of the cards whatsoever.

One of the important concepts embodied in this method which makes possible the exceedingly large number of possible sorts is the concept of positively holding the rejected cards from movement while the selected cards are withdrawn. By positively holding the rejected cards during withdrawal of the selected cards under the influence of the magnetic force, only a minimum initial separation need be effected between the selected and rejected cards. This minimum initial separation thus makes it feasible to provide notches having a large number of different depths, for example ten different depths, while still utilizing only a small fraction of the total card surface for the coding notches. In other words, the present method makes it possible to utilize a maximum portion of the card for recording the stored information and yet at the same time provide for an exceedingly large number of possible sorts.

In accordance with the present invention, one preferred way of restraining the rejected cards involves the use of the upwardly extending projection provided on each of the cards. This tab, as explained above, is of a width less than the depth of the shallowest notch provided on the cards. Thus, when the rejected cards are separated from the selected cards by the rejectors, the rejected cards are always shifted at least a distance greater than the width of the projections. Accordingly, after the initial separation of the cards has been completed, an abutment member can be positioned behind the projections of the selected cards and in front of the projections of the rejected cards. When the selected cards are withdrawn by means of the applied magnetic force, this abutment engages the projections on the rejected cards and prevents these cards from also being withdrawn outwardly under the influence of the magnetic force.

The present invention is further predicated in part upon the concept of providing novel apparatus for sorting cards in accordance with the present method. More particularly, the basic sorting apparatus of the present invention includes a receptacle for receiving a stack of cards. In a preferred form, this receptacle is in the form of an elongated drawer having one side wall removed and of a size to accommodate of the order of two to three thousand cards. The apparatus further comprises a sorting platen which is movable toward and away from the cards disposed in the receptacle. The sorting platen carries a plurality of horizontal rejectors in the form of thin bars. These bars are vertically spaced from one another a distance equal to the spacing of the notch sites on the cards. Means are provided for extending these bars outwardly from the platen face at incremental distances corresponding to the various possible depths of the notch sites. In one preferred form, the sorting apparatus is provided with a keyboard, or the like, on which the desired code is punched. The keyboard actuates a suitable mechanism to automatically extend the rejector bars outwardly at varying depths in conformity with the coding.

The present sorting platen also carries a magnet assembly including a thin elongated non-magnetic member adapted to enter the slots in the ferro-magnetic portions of the cards, and a magnet effective to engage and attract the ferro-magnetic portions of the various cards. In addition to these elements, the platen has associated therewith a vertically shiftable abutment member, or blade, which is adapted to be shifted to a position between the projections of the selected and rejected cards.

In utilizing the basic sorting apparatus of the present invention, the cards are placed in random order in the drawer or receptacle. The platen is initially advanced and forced against the cards which are restrained against further rearward movement by the rear wall of the receptacle so that the cards are brought into alignment with each other and into engagement with the magnetic portion of the platen. The platen is then retracted for a distance at least greater than the distance of the deepest notch made in any of the cards.

Thereafter, the rejector bars of the platen are advanced in conformity with the desired code. These rejector bars force cards not cleft in exact conformity with the extensions of the rejector bars away from the platen against the magnetic force which is effective to hold the remaining cards in contact with the platen. Thus, an initial separation is made between the selected cards, which bear the desired code, and the remainder of the cards not bearing the code. Following this initial separation, the abutment blade is lowered into a position behind the tabs of the selected cards and ahead of the tabs of the rejected cards. Thereafter, the platen is withdrawn pulling the selected cards with it. These selected cards can either be completely withdrawn at this point or can be completely withdrawn after an intermediate restacking as is explained below. In any event, when the selected cards are completely disengaged from the stack of rejected cards, they are engaged by a pusher member which forces the selected cards from contact with the platen magnet and drops them into a suitable gathering receptacle, such as a basket, tray or the like.

One advantage of this apparatus is that the cards can be placed in the storage receptacle in random order, so that as new cards are made available for the system they can quickly be inserted by even the most inexperienced personnel. Another advantage is that during the sorting operation all of the cards in the receptacle are sorted simultaneously. A third advantage is that the cards are completely separated from the stack without any manual intervention. A fourth advantage is that the sorting separation is extremely rapid requiring only a few seconds to completely sort a drawer which may contain upwards of two thousand cards.

Another exceedingly important advantage of the present apparatus is that it is relatively compact. Thus, a four drawer unit effective to store upwards of ten thousand cards and the associated sorting platen occupies a space only slightly greater than that of a standard file cabinet. Moreover, the apparatus is of relatively simple construction and can be manufactured and sold at a very reasonable cost. Consequently, the present sorting apparatus is highly practical for use in small offices and similar installations where low cost and small size are important considerations.

In order to fully comprehend certain other unique aspects of the present invention, it will be necessary to briefly outline the coding methods utilized to notch the present cards. More particularly, as was explained above, the present card is adapted to be coded using either a hierarchical system or a descriptor system.

Considering first the hierarchical system; in this system the body of information is classified and each classification entry is assigned a code number. For example, a classification entry might comprise an eight digit number utilizing any of the ten digits, 0, 1, 2, 3, . . . 9. In the present cards one notch site is provided for each digit. The depth to which a notch site is notched indicates the position of the digit in the code number. Thus, for example, in the code number 19574362, the notch corresponding to the digit "1" would be notched to the deepest, or eighth, depth. This indicates that "1" is the first digit of the number. The notch site corresponding to "9" would be notched to the seventh depth, while the notch site corresponding to "5" would be notched to the sixth depth, the "7" notch site would be notched to the fifth depth; the "4" notch site would be notched to the fourth depth; the "8" notch site would be notched to the third depth; the "6" notch site would be notched to the second depth; and the "2" notch site would be notched to the first depth.

When utilizing this coding system, provision is made for the possibility that the same digit would be repeated in the code number. For example, consider the number 19914932. It is obvious that the "1" notch site cannot be notched to both the eighth and fifth depth, nor can the "9" notch site be simultaneously notched to the seventh, sixth and fourth depth as would be required in accordance with the procedure described above. Accordingly, in addition to the digital notch sites described above, the present cards are provided with transfer digit notch sites which, for purposes of explanation, will be labeled consecutively "A, B . . . I." These transfer digit notch sites extend inwardly from the edge of the card in the same manner as the primary digit notch sites.

The "A" digit notch site is utilized upon the first repetition of the digit occurring in the first position. Similarly, the "B" notch site is notched at the first repetition of the digit appearing in the second position. The "C–I" notch sites are likewise punched at the first repetition of digits occurring in the third to eighth digit positions respectively. Thus, to code the number 19914932 the "1" notch site is notched to the eighth depth to indicate that "1" is the first digit. The "9" notch site is then notched to the seventh depth to indicate that "9" is the second digit. However, "9" is repeated as the third digit. To represent this second "9," the "B" notch site is notched to the sixth depth. This indicates that the digit recorded above in the second position (i.e., the digit notched to the seventh depth) is to be repeated in the third position (as indicated by the fact that the notch is made to the sixth depth). The fourth digit in the code number is "1" which is a repeat of the "1" in the first digital position. Thus, to indicate the second "1," the "A" notch site (which indicates a repetition of the first digit) is notched to the fifth depth to indicate that the digit is repeated in the fourth digital position. The next number in the desired code is a "4" which is notched to the fourth position. The sixth digit is a "9." This is the second repetition of the digit "9," the last previous occurrence of that digit being in the third position. To indicate this "9," the "C" transfer notch site is notched to the third depth to indicate that the third digit is repeated in the sixth digital position. To complete the coding the "3" notch site is notched to the second depth and the "2" notch site is notched to the first depth.

One of the objects of this invention is to provide an apparatus which is provided with a first set of rejector bars, the bars of this set respectively disposed to enter the primary number notch sites of the cards and a second set of repector bars respectively adapted to enter the transfer notch sites. The apparatus further includes a series of buttons, keys, or the like, identified with the digital values 0, 1 . . . 9. Means are provided for automatically advancing the rejector bar having associated therewith a digital value corresponding to the digital value of the key depressed. The apparatus further comprises means for automatically advancing the various rejector bars in progressively decreasing incremental amounts so that the first bar actuated (irrespective of its digit value) is advanced a maximum number of incremental distances, the second bar actuated is advanced one less incremental distance, the third bar actuated is advanced two less incremental distances and so forth.

Another object of the present invention is to provide sorting apparatus in which when a digit key is depressed for a second or successive time (indicating a repeated digit), one of the transfer rejector bars is automatically actuated in accordance with the last digit place in which that particular digit occurred. That is one transfer bar is associated with each digit position; and when a digit is repeated, the transfer bar corresponding to that digit position is actuated irrespective of the digit value which occurs in that position. The actuated transfer rejector bar is advanced a distance in accordance with the digital position of the repeated digit.

Another important object of the present invention is to provide means whereby the cards can be coded in any of several fields, and the same rejector or selector bars can be utilized to sort cards in accordance with the coded information stored in any field.

More particularly, the set of notch sites described in detail above comprises a single field. Thus, the field includes in the example given above ten primary digit notch sites and seven transfer digit sites. However, it is frequently desirable to provide more coded information upon a card than can possibly be placed upon the card in a single field. Thus, for example, in coding the abstract of a technical article in a hierarchical coding system, the article may be indexed under a main class such as "thermodynamics" and an indented subclass such as "irreversible processes." On the other hand, an article having some overlapping material but dealing primarily with "irreversible processess" may be classified under that heading in an indented subclass relating to "thermodynamics."

In accordance with the principles of the present invention, cards indexed in any of several fields, can be inserted randomly in a drawer and the same retrieval apparatus used to sort through each of the fields. More specifically, it is one important concept of the present invention to provide cards coded with interspersed fields. Thus, the notch sites of the first field are vertically spaced from one another a sufficient distance to permit the interposition between the notch sites of the first field, corresponding notch sites of one or more additional fields. Thus, the "1" notch sites of both of the added fields are disposed below the "1" notch site of the first field and hence between the "1" notch site and the "2" notch site of the first field. Similarly, the "2" notch sites of the additional fields are disposed between the "2" notch site and "3" notch site of the first field.

To sort cards having two or more fields, the present apparatus is provided with means for vertically shifting the rejector bars in unison by an amount equal to the distance between the notch sites of the fields. Thus, when the sorting platen is positioned to sort through the "A" field, the "1" rejector bar is disposed to enter the "1" notch site of the "A" field, the "5" bar is disposed to enter the "5" notch site of the "A" field, etc. In order to search the "B" field, each of the bars of the sorting platen is shifted downwardly a distance equal to the spacing between corresponding notches of the "A" and "B" fields. Consequently, the "1" rejector bar is now disposed to enter the "1" notch site of the "B" field, the "2" rejector bar is disposed to enter the "2" notch site of the "B" field and so forth. It will readily be appreciated that depending upon the spacing between the notch sites and the width of the notches therein, a large plurality of sorting fields can be disposed in interposed relationship along the sorting edge of a card.

The second major type of coding which can be employed in conjunction with the present sorting methods and apparatus is the descriptor or uniterm coordinate system. In this descriptor system a specific code number is assigned to each indexing term applicable to the information being classified. Each card in the collection is coded to indicate each of the descriptors applicable to that card. Thus, for example, a card relating to an article on the shear characteristics of corrugated plastic contains one coding corresponding to "shear," a second coding corresponding to "corrugated" and a third coding corresponding to "plastic." It will readily be appreciated that other cards dealing with completely diverse subjects may have one or two descriptors in common with the specific cards searched. For example a card on corrugated paper would contain the same "corrugated" code or an article on plastic football helmets would contain the same "plastic" coding. Only articles on the desired subject, however, have the entire combination of descriptors of that subject.

One of the principal objects of the present invention is to provide a method of coding descriptors on a card and apparatus for retrieving cards so that only those cards are retrieved which have each of a plurality of descriptors. The function of this apparatus can perhaps best be explained through the use of a Venn diagram.

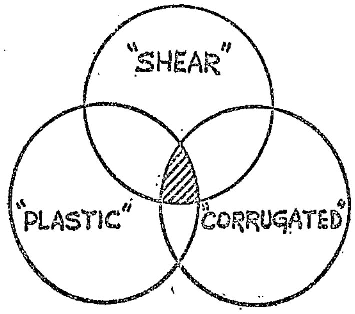

In this diagram one circle represents all of the cards in the collection bearing the code "plastic," the second circle represents all of the cards coded with the word "corrugated" and the third circle represents all of the cards coded with the word "shear." The present apparatus is effective to reject all of the cards except those lying in the small shaded area common to all three circles, i.e., those cards which contain each of the three desired descriptors.

More particularly, the present invention is predicated in part upon the concept of providing a card with a plurality of interspersed fields as described above with one descriptor being coded in each of these fields. As was explained above, each field comprises a plurality of notch sites and the fields are interposed so that the adjacent notch sites of diverse fields correspond to the same digital value.

One of the principal objects of the present invention is to provide a method and apparatus for sorting cards indexed in this manner to retrieve cards concomitantly coded in the desired manner in each of the fields searched. Specifically the present method contemplates initially rejecting cards not having the desired characteristic ("shear" in present example) in the first field, while holding the non-rejected cards in the sorting position. Then a second sort is made of the cards previously selected to reject from those cards the cards not having the second desired characteristic ("plastic" in this example). The nonrejected cards are still retained in the sorting position. Subsequently these remaining cards are again sorted to reject all cards not having in addition to the first two characteristics, the third characteristic "plastic." To complete the sort the selected cards are withdrawn from contact with the rejected cards by pulling the selected cards outwardly under the influence of a magnetic force.

The present apparatus for sorting cards indexed in the coordinate system comprises a plurality of sorting bars which are mounted upon a movable platen in vertically spaced relationship in the manner described above. This apparatus further comprises an elongated magnet effective to attract magnetic portions on the cards. Additionally, the present apparatus comprises means for adjusting the height of the sorting members relative to the cards so that the sorting members can be aligned with the notch sites of any of the plurality of fields utilized in coding the cards.

In sorting coordinate indexed cards by means of the present apparatus, the cards are placed in random order in a drawer or other receptacle. At the beginning of the sorting operation, the platen is forced against the cards to align the sorting edges of the cards and bring each of the cards under the influence of the magnet carried by the platen. The sorting bars are initially disposed in alignment with the notch sites of the first field.

In the example above, the sorting bars are first projected in accordance with the code number corresponding to "shear" since this code appears in the first field. When these bars are extended they are effective to force away from the sorting platen all cards not coded with the "shear" coding. The remaining cards are retained in the sorting position by the magnet of the sorting platen. Next, the sorting bars are retracted and shifted vertically to bring the bars into alignment with the sorting notches of the second field. These bars are then extended in conformity with the coding of "corrugated." In this operation the sorting bars thus reject, or push away, from the platen all of the previously selected cards not coded with the word "corrugated." The cards now remaining in the sorting position in contact with the platen thus contain both the "corrugated" coding and the "shear" coding. The sorting bars are again retracted and are shifted vertically into alignment with the notch sites of the third field. In the third sorting operation the bars are extended in conformily with the code number of the word "plastic." Again, when the bars are advanced all cards are rejected or shifted away from the platen which do not contain the "plastic" coding. The only cards then remaining in contact with the platen are cards containing all three descriptors, i.e., "shear," "corrugated" and "plastic." To complete the sorting operation, the platen is retracted to completely disengage these remaining cards by pulling them outwardly under the influence of the magnetic force. A stop bar is projected in front of the tabs of the rejected cards to prevent their outward movement in the manner described above.

Another aspect of the present invention is the provision of a slightly different coding method from that previously explained, which coding method is of particular utility in connection with a coordinate index system. This modified coding system retains many of the basic coding concepts described above, e.g., the use of a plurality of notch sites, each of which corresponds to a given digital value and a plurality of notch depths, corresponding to digital position. However, in order to provide a maximum number of fields on a card, a factorial coding system is employed which eliminates the possibility of repeat digits and hence eliminates the need of the transfer selector bars described above.

In the factorial coding system each of the code words is assigned a multi-digit number, for example, a seven digit code number such as 6423157. The other descriptors in this code system are constructed by various permutations of these seven digits so that a total of 5,040 different code entries can be constructed from these digits without repeating any single digit. Since in this example only seven notch sites are utilized to code each field, it is feasible to provide a large number, for example, nine or ten fields on a card.

Still another object of the present invention is to provide a method of coding in which a maximum amount of information can be coded upon a single card even in the case where a single card may contain information concerning two or more species within the same genus. By way of example, assume that three fields of sort are utilized, for the purposes of this example these sorts will be referred to as the "A" field, the "B" field and the "C" field. Again, assume for the purposes of the example that the genus "drugs" is coded in the A field, the genus "disease" is coded in the B field and the genus "symptoms" is coded in the C field.

Again assume that a given literature reference discusses the treatment of a certain virus ("disease") having certain symptoms by the use of both penicillin and Chloromycetin. A physician interested in treating a disease with these symptoms might well be interested in comparing the treatment by penicillin and Chloromycetin; for example, in terms of efficacy, side effects and the like. In such a case he would be desirous of retrieving all cards relating to the virus, the symptoms and both penicillin and Chloromycetin.

If the physician searched the B field and C field initially, he would then reject all cards not related to the particular virus and symptoms in which he was interested. Since penicillin and Chloromycetin are both drugs and hence normally coded in the A field, there would normally be no way of differentiating those cards containing information regarding both drugs from cards describing the use of only one or the other.

However, in accordance with the novel coding method forming part of the present invention, only a portion of the available numbers of each field are utilized for the genera assigned to that field. Thus, for example, assume that there are 600,000 available numbers in each of the A, B and C fields. Only the first one-third of the available numbers, i.e., 1 to 200,000, are utilized to characterize the genera assigned to the first field. Similarly, the second third of the available numbers 200,001 to 400,000 are utilized to code the genera of the second field; while the remaining fraction of the available numbers, i.e., the numbers 400,001 to 600,000 are employed to code the genera normally assigned to the third field. The normally unused portion of each of the fields is used to code species not normally found in that field whenever one of those species occurs in conjunction with a second species on a card normally coded in the genera of another field.

Thus, for example, in the specfic combination of drugs referred to above, both Chloromycetin and penicillin would be assigned a number within the range 0–200,000 in the A field. However, on a card comparing both Chloromycetin and penicillin, only one of the drugs, e.g., Chloromycetin would be coded with its normal number in the A field. The other drug, penicillin, would be coded with its normal number in the B field. Similarly, a card having two species normally coded in the B field would have one of its species coded in the B field and the other species coded in an otherwise unused portion of the C field. A similar shifting of fields on which a compared species is coded occurs for data normally classified in any of the other fields.

To return to the specific example given above, after the physician in making his sort to locate cards comparing Chloromycetin and penicillin has sorted the B and C fields to eliminate cards not relating to the desired disease and symptoms, he then continues to sort in the A field to reject all cards not also relating to Chloromycetin. At this point, he then has sorted all cards relating to the desired symptoms, the desired virus and Choloromycetin, but many of the cards retained would not be limited to the particular comparison in which he was interested, i.e., the comparison of treatments using Chloromycetin and penicillin. Accordingly, the physician would then program in the apparatus the code number for penicillin in the normal A field. However, the present apparatus includes means whereby when the second species is coded in the same field in which a species has previously been coded, the sorting bars are automatically shifted to search the same number in the next adjacent, or substitute field. Consequently when the physician programmed the device to sort "penicillin," the previously retained cards would be searched for penicillin in the B transfer field. At the conclusion of this search only the desired cards would be remaining, i.e., those cards relating to the desired virus, and disease and comparing the use of Chloromycetin and penicillin. These cards are then withdrawn in the manner explained above.

These and other objects and advantages of the present invention will be more readily apparent from a consideration of the following detailed description of the drawings illustrating two preferred embodiments of the invention.

*General description of apparatus*

Figure 1:
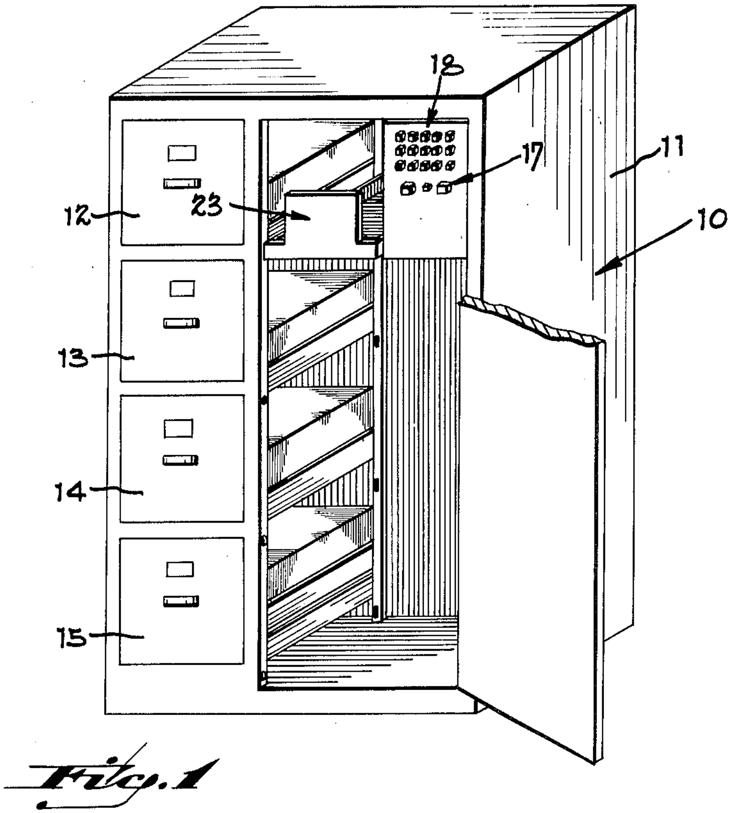
FIGURE 1 is a perspective view of one preferred form of a file unit constructed in accordance with the principles of the present invention.
Figure 11:
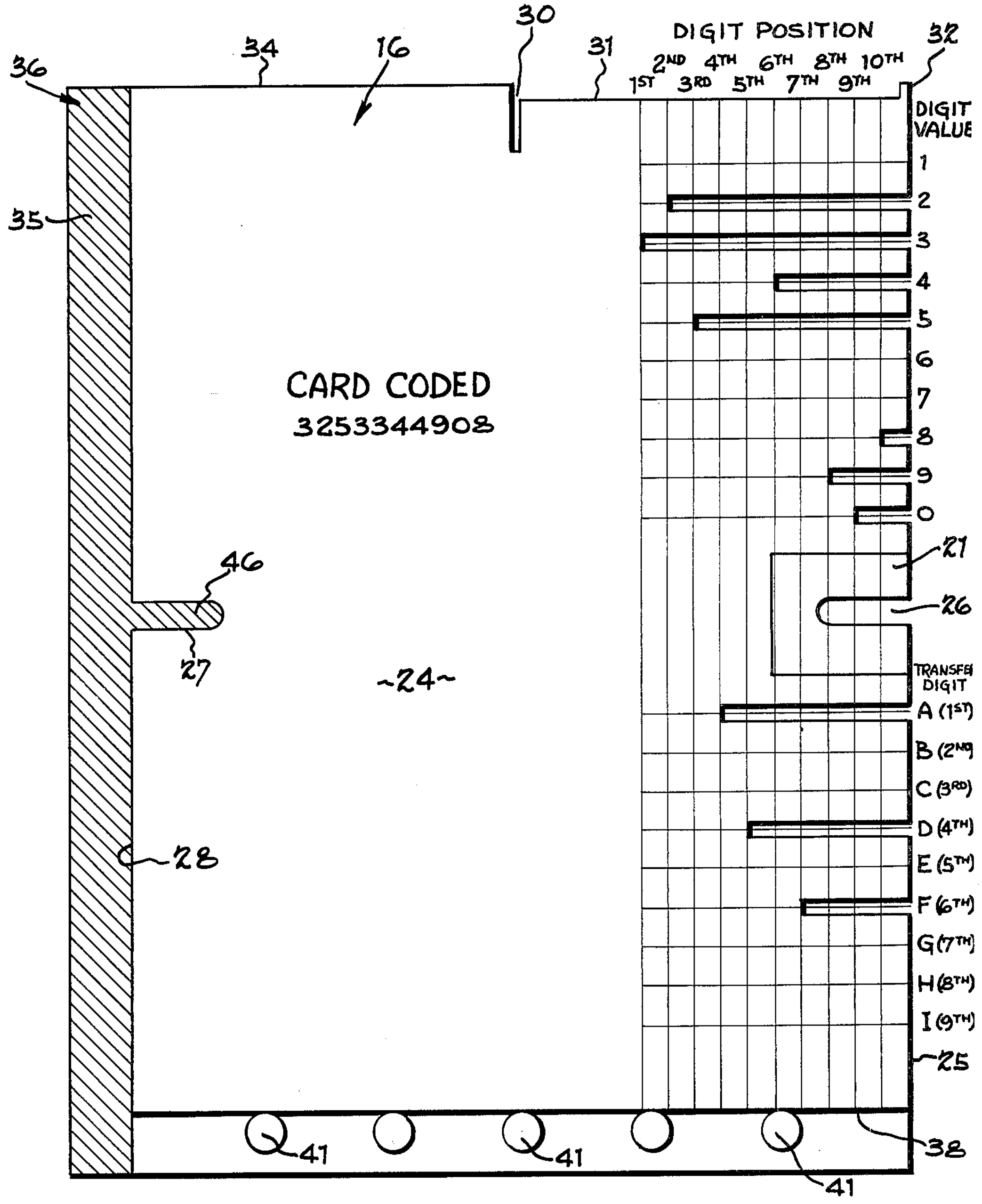
FIGURE 11 is a diagrammatic view showing a coded card in the storage compartment, the card being coded in a generic system.

One preferred form of retrieval apparatus 10 is shown in FIGURE 1. As there shown, the apparatus comprises a cabinet 11 adapted to hold a plurality of drawers 12, 13, 14 and 15. It is to be understood that this embodiment is merely exemplary and that the present apparatus can include any number of drawers from a single drawer to as many as are desired. In the specific embodiment shown, each of the drawers is mounted for in and out sliding movement relative to the cabinet in the same manner as a conventional file drawer. Each of the drawers 12–15 carries a plurality e.g. two to three thousand record cards, such as record cards 16 shown in FIGURE 2. These record cards are filed in random order within the drawers and are notched along one edge in accordance with a predetermined coding, such as for example a generic or hierarchial coding system, the principles of which are illustrated in FIGURE 11, or a coordinate or descriptor system as exemplified in FIGURE 47. The notched edge portion of each record card also carries a ferromagnetic strip 21.

An elevator 17 is mounted for vertical movement so that the elevator can be brought into horizontal alignment with each of the drawers. Elevator 17 carries a plurality of push buttons, or keys, 18 by means of which an operator can control operation of the sorting apparatus. It will, of course, be readily understood that these push buttons, or keys, may be mounted upon housing 11 if desired.

Elevator 17 carries a sorting platen 20 which is shiftable in and out along the elevator relative to drawers 12–15 and the cards 16 carried therein. Each of the drawers 12–15 has a side wall removed adjacent to the elevator so that platen 20 is free to engage the cards 16 stored in the drawers. Platen 20 carries a longitudinal magnetic element 22 positioned to engage and attract the ferromagnetic strips on cards 16 when the platen is advanced into contact with the cards.

Platen 20 also carries a plurality of sorting bars adapted to enter the notches of the cards releasably retained against the platen by the magnet and to force those cards not notched in conformity with the position of the bars away from the platen. The sorting bars are automatically positioned by a mechanism controlled by actuation of buttons 18. After a selection of the conformingly notched cards is made, these cards are withdrawn by the platen magnet upon retractive movement of the platen to a position in which the selected cards are completely disengaged from the rejected cards remaining in drawers 12–15. After the cards have been withdrawn by the platen, a card collector machanism 23 is effective to shift a plate parallel to the extent of the drawers and force cards from contact with the platen magnet into a tray or other receptacle 23 from which they can readily be removed by the user.

*Generically coded record card*

Figure 2:
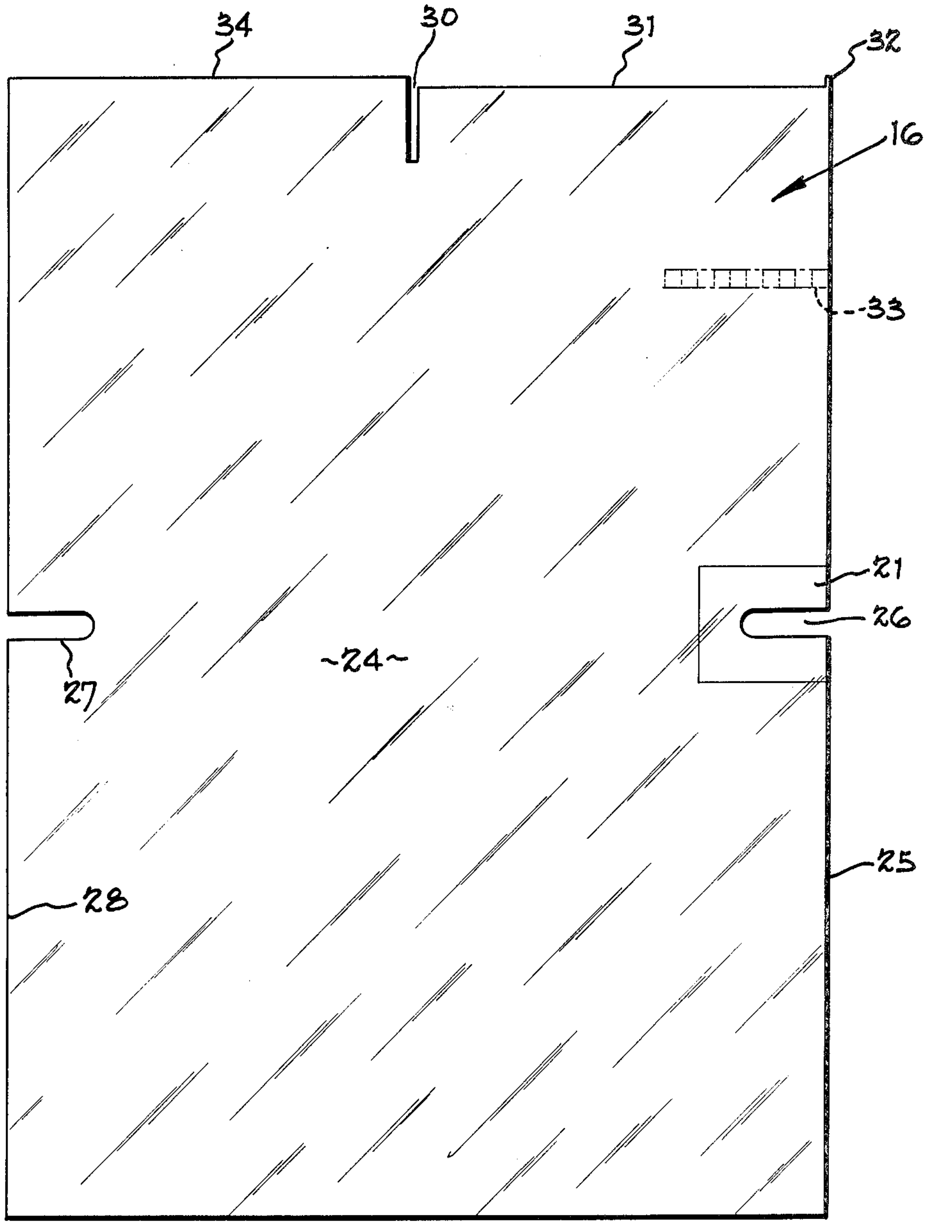
FIGURE 2 is a plan view of a preferred form of card.

One preferred form of record card 16 is shown in FIGURE 2 and the principles by which this card is coded in a generic or hierarchial coding system is shown in FIGURE 11. More particularly, card 16 is of general rectangular outline configuration. This card may be formed of a heavy paper stock of the type presently utilized for other edge sorted cards, or the card may be formed of a suitable rigid plastic material, such as a vinyl acetate. The thickness of the card is related to the strength of the card material so that the card has sufficient rigidity that it can be pushed by the selector bars in the manner explained below. One preferred form of card is of the order of .012 inch thick and is approximately 5 x 7 or 6 x 8 inches. It will, of course, be appreciated that the present cards can be made in any desired size.

Record card 16 includes two information storage surfaces 24, one being disposed on each side of the card. One or both of these surfaces may have imprinted thereon suitable data, such as an abstract of a technical article appearing in a periodical. Either alternatively or in addition to an abstract, the card may have imprinted on surface 24 micro-xerographic images of the article or of documents, drawings or the like. These micro-xerographic images can be projected or reproduced from the card utilizing conventional apparatus available for the purpose. Alternatively, card 16 may be provided with a rectangular aperture in which is mounted a section of microfilm carrying a photographic image of a document, or the like. This microfilm is also adapted to be projected or reproduced utilizing conventional equipment.

In one typical use of a card 16, a central abstracting service abstracts all of the periodicals in a given field, and imprints the abstracts on the cards. The abstracting service also codes the cards and then disseminates them to individuals, laboratories, research institutions, and the like, interested in being kept up-to-date with developments in the field. These individuals users store the cards in random order in the apparatus described below and subsequently mechanically sort the cards to obtain any cards pertinent to a specific subject in which the user is interested.

Another utility for cards 16 is to place upon the cards small images of shop drawings which are coded by job number, part number, or the like. These drawings can be stored in a very compact form and can readily be reproduced from the card in a large form when needed.

As a still further example of the use of cards 16, the cards can be used to carry patient case histories and other hospital records in micro-image size. These records can be reproduced from the cards and made available in only a minute fraction of the time presently required to obtain copies of patient case histories in large hospitals at the present time.

As another example of the utility of record cards 16, they may contain accounting information, inventory data or other business records. Of course, it will be appreciated that any individual user can insert upon blank cards any hand written or typed information which he desires to store in a form in which it can be readily retrieved.

One edge of card 16, preferably but not necessarily one of the longer edges, functions as a sorting edge 25. This edge has mounted adjacent to the center portion thereof a ferro-magnetic strip or implant 21. In one preferred embodiment, the cards are laminated from multiple plies of vinyl acetate, the plies being adhered together utilizing conventional adhesives. A thin ferro-magnetic rectangular implant 21 is inserted between the laminates and is bonded thereto during the lamination process. The ferro-magnetic implant 21 is provided with an elongated groove 26. This groove extends perpendicular to sorting edge 25. A similar aligning groove 27 extends inwardly from the rear edge 28 of the card .

A third slot 30 extends downwardly from the upper edge of the card. Slot 30 is referred to as the restack slot since as is explained below the function of that slot is to receive a restack bar during the sorting operation. The uppermost edge 31 of card 16 is provided with an upwardly extending projection 32. In the specific embodiment shown in FIGURE 2 this projection is a tab formed integral with the main body of card 16 and forms a continuation of the sorting edge 25 of the card. However, the projection may be spaced rearwardly from the sorting edge if desired. In any case though, the width of the projection is less than the depth of the shallowest notch site 33 provided along sorting edge 25 of the card. In the specific embodiment shown in FIGURE 2, the portion of upper edge 31 between the tab 32 and restack slot 30 is offset downwardly a fraction of an inch above the remaining portion of upper edge 31 and to the rear of restack slot 30. As a consequence, the uppermost portion of the rear edge 34 of the restack slot forms an upwardly extending abutment, which as is explained below, is adapted to engage the restack bar upon outward movement of the selected cards.

The manner in which cards 16 are coded in a generic or hierarchical coding system can best be understood by reference to FIGURE 11 which shows in semi-diagrammatic form a coded card in abutement with the rear wall 35 of a card receptacle or drawer. As is shown in FIGURE 11, sorting edge 25 provides space for a plurality of parallel inwardly extending superposed notch sites. The specific coding arrangement shown is for coding a card with a ten digit number utilizing any combination of ten digits.

In the present coding system ten primary digit notch sites are disposed in order above magnetic implant 21. These digit notch sites correspond to the digit values 1, 2, 3, 4, 5, 6, 7, 8, 9, and 0. Each of the notch sites is adapted to be notched to any of ten depths. Each of the ten depths represents the digital position of the integer within the code. More specifically, the deepest notch corresponds to the first, or left-hand, digit position. The second deepest notch corresponds to the second digit from the left and so on until the shallowest notch corresponds to the last, or right-hand, digit.

In addition to the primary digit notch sites, sorting edge 25 of card 16 further provides a plurality of superposed transfer digit notch sites. These are labeled "A," "B," "C," "D," "E," "F," "G," "H," and "I" in the present example. These transfer digit notch sites are utilized in the event that a digit is repeated in the code number. Specifically, each of the notch sites "A"–"I" respectively corresponds to one of the digit positions 1–9. There is no transfer notch site for the last digit since inherently this digit cannot be repeated.

In accordance with the present coding system, the A transfer notch site is notched when the first, or left-hand, digit of the number is first repeated. The depth to which the A transfer notch is notched indicates the digital position in which the first digit is repeated. Similarly, the B transfer notch site is notched when the second digit is repeated and the C transfer notch site is notched when the third digit is repeated, and so on.

A full understanding of the coding method will be facilitated by a consideration of the specific coding of a card shown in FIGURE 11. This card is coded with a ten digit number—3253344908. In practice, this code number would refer to the classification of the subject matter or data recorded on the card. The code number would be obtained by reference to a master code.

In the specific code number referred to, the first digit is "3." Consequently, the "3" notch site is notched out to the deepest depth (this physical notching can be performed utilizing any suitable form of apparatus). The fact that the "3" notch site is notched to the first digit position indicates that the first digit of the code number is "3." The second digit of the code is "2." Consequently, the "2" notch site is notched to the second deepest position indicating that "2" is the second digit. The third digit is "5." Thus, the "5" notch site is notched to the third depth.

The fourth digit is "3." However, this is a repeat digit since "3" has already occurred in the first digit position. Thus, the second "3" is transferred to the transfer notch site "A." Any notch in this notch site indicates that the first digit, whatever that digit may be (a "3" in the present case), is repeated. Since the repetition occurs in the fourth digit place, the "A" transfer notch is notched to the fourth depth. The fifth digit is again a "3." In this case, however, the fifth digit is a repeat of the fourth digit since "3" also occurred in the fourth digit place. Thus, the "D" transfer notch site, which corresponds to a repetition from the fourth digit place, is notched. Since the repetition occurs in the fifth digit place, the "D" notch site is notched to the fifth depth. The sixth digit is a "4." This digit is notched to the sixth digit place. The seventh digit is also a "4" and hence represents a repeat of the digit in the sixth position. Thus, the repeated "4" is indicated by notching the "F" transfer site to show a repetition of the sixth digit. This "F" transfer site is notched to the seventh depth to show that the repetition occurs in the seventh digit position. The eighth digit is a "9." Consequently, the "9" notch site is notched to the eighth depth. Similarly, the ninth digit which is a zero is indicated by notching the zero site to the ninth depth while the last digit "8" is indicated by notching the eight notch site to the shallowest or tenth depth.

It is readily apparent that the shallowest notch in the card in the "8" notch site is still appreciably deeper than the width of projection 32. The relationship of these notch depths to the card is also shown in FIGURE 2 by the light lines showing the ten possible depths of one notch site. It is to be understood that the length of the notches is slightly exaggerated in FIGURES 10 and 11 and that in actual practice it is contemplated that each incremental notch depth will be approximately 1/16" in length so that 80 or 90 percent of the card surface is free of notches and hence can be utilized for data storage.

In the terminology employed in the present application, the primary digit notch sites 1, 2 . . . 0 and the transfer digit notch sites A, B . . . I constitute a "field." The present invention contemplates that more than one field can be coded upon the same sorting edge of a card. More specifically, in the card shown in FIGURE 11, a second field can be coded by utilizing the spaces interspersed between the notch sites of the first field. Thus, the "1" notch site of a second field would be disposed intermediate the "1" and "2" notch sites of the first field. Similarly, the "2" notch site of the second field would be disposed intermediate the "2" and "3" notch sites of the first field and so on. The A, B . . . I transfer notches of the second field are similarly disposed relative to the corresponding notch sites of the first field. When two such fields are coded in this relationship, the two fields have their notch sites of the same digital value adjacent to one another. Thus, in the example given above, each digital notch site of the second field is disposed adjacent to and below the corresponding notch site of the first field.

*Method of retrieval*

The method by which cards of the type shown in FIGURES 2 and 11 are sorted to separate and retrieve those cards bearing a preselected coding is best shown in FIGURES 3–10. As is there shown, a plurality of edge notched cards 16 are disposed in random order in a sorting compartment 36 comprising a rear wall, or abutment 35 and a bottom support surface 38 which may be provided with a plurality of elongated rollers 41, or the like, to facilitate sliding movement of the cards. Each of the cards 16 includes a plurality of notches disposed along the sorting edges 25 of the cards.

For purposes of the diagrammatic showing the FIGURES 3–10, let it be assumed that it is desired to retrieve all cards from a stack of cards disposed in random order in compartment 36, those cards coded with the code number 14147. For purposes of illustration, one card 40 bearing this code number is shown as being the front card in the stack. It is to be understood, however, that the present method is effective to separate any cards so coded irrespective of where they are disposed within the compartment.

In accordance with the generic coding system described above, card 40 has the "1" notch site notched to the fifth, or deepest, depth; the "4" notch site notched to the fourth, or second deepest, depth and the "A" notch site (indicating a repeated "1") notches to the third deepest notch depth. The "B" notch site (indicating the repeated "4") is notched to the second shallowest depth, while the "7" notch site is notched to the shallowest depth. Card 40, as well as the other cards in the compartment, are provided with a slotted ferro-magnetic strip 21.

Cooperating with card compartment 37 is a movable framework, or platen, 42. This platen carries an elongated magnetic element 22 of generally U shaped cross section and a thin non-magnetic card aligning member adapted to engage notched ferro-magnetic implants 21 in the manner shown in FIGURE 4. The sorting platen also carries a plurality of extendable sorting bars disposed to enter the various notch sites of the cards 16.

Figures 3, 4, 5, 6:
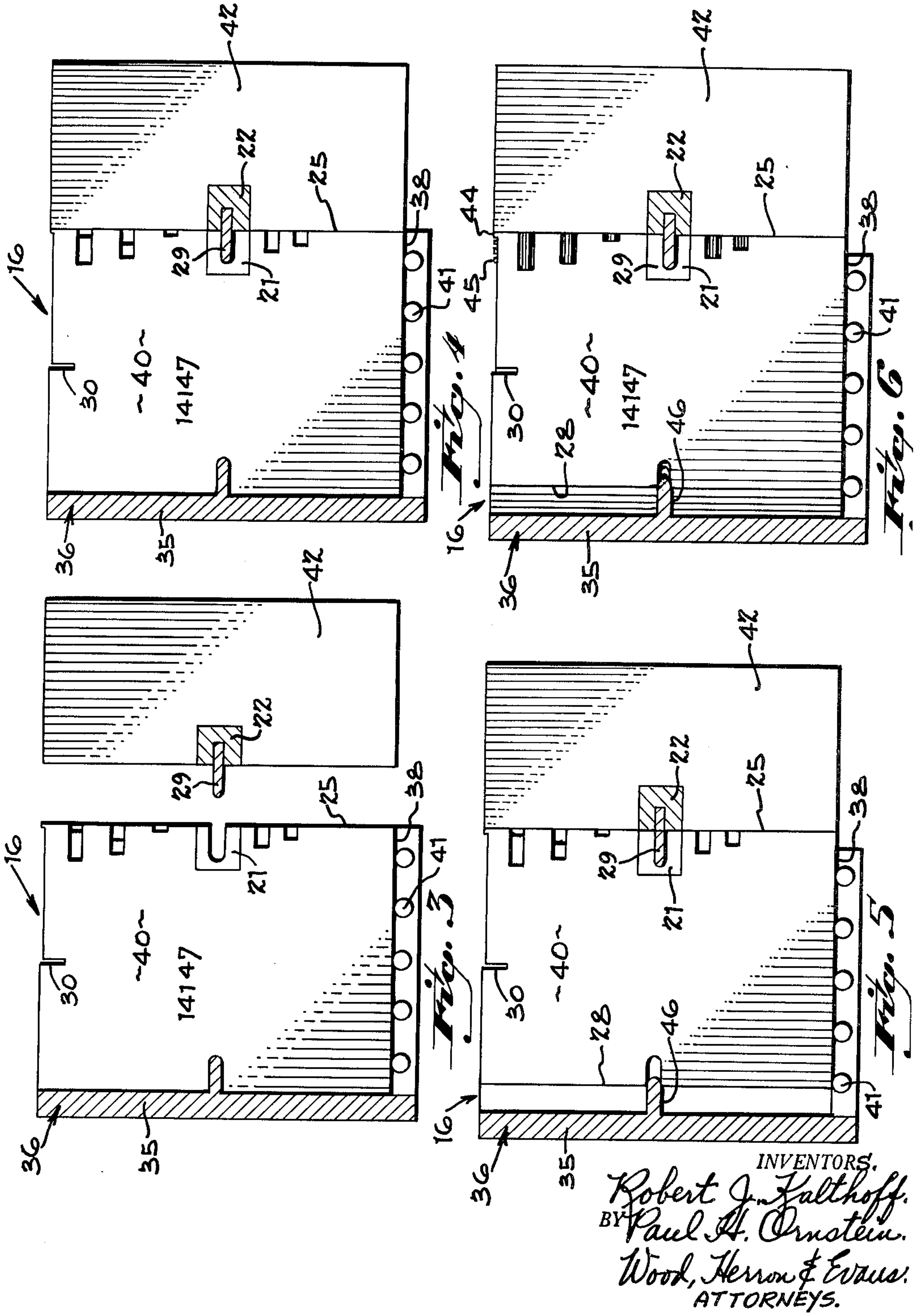
FIGURE 3 is a diagrammatic view showing a drawer of cards and sorting platen at the commencement of a sorting cycle.
FIGURE 4 is a diagrammatic view showing the platen in its advanced position.
FIGURE 5 is a diagrammatic view showing the platen in its sorting position.
FIGURE 6 is a diagrammatic view showing the platen with the sorting bars extended to reject all but the selected cards.

At the start of the sorting operation as is shown in FIGURE 3, the sorting platen is spaced from the cards, the cards preferably being disposed in engagement with the rear wall 35 of the compartment. In the first step of the sorting operation, as is shown in FIGURE 4, the platen is advanced against the cards to bring the cards into alignment and to effect a magnetic attraction between magnet 22 and the ferro-magnetic implants 21.

In the second step of the method, all of the cards are withdrawn outwardly away from rear wall 35 under the influence of magnet 22. This step is shown in FIGURE 5.

In the third step, as is shown in FIGURE 6, selector bars are advanced from the platen in accordance with the coding of the cards to be selected. (It is to be understood that the time sequence herein described is for purposes of clarity and explanation and it will readily be appreciated that the selector bars can be extended simultaneously with the retracting movement of the platen if desired.) In order to establish the code 14147, the "1" sort bar is advanced five increments (corresponding to the deepest notch in card 40). Similarly, the "4" selector bar is advanced four increments, the "A" selector bar is advanced three increments, the "B" selector bar is advanced two increments and the "7" selector bar is advanced one increment. When this occurs, as is shown in FIGURE 6, all cards, such as card 40, bearing the selected code remain in their original, or sorting, position under the influence of a magnetic force. All cards which have a different coding and which hence have notches not conforming to the extension of the selector bars are pushed away from their sorting position by the selector bars.

Figures 7, 8, 9:
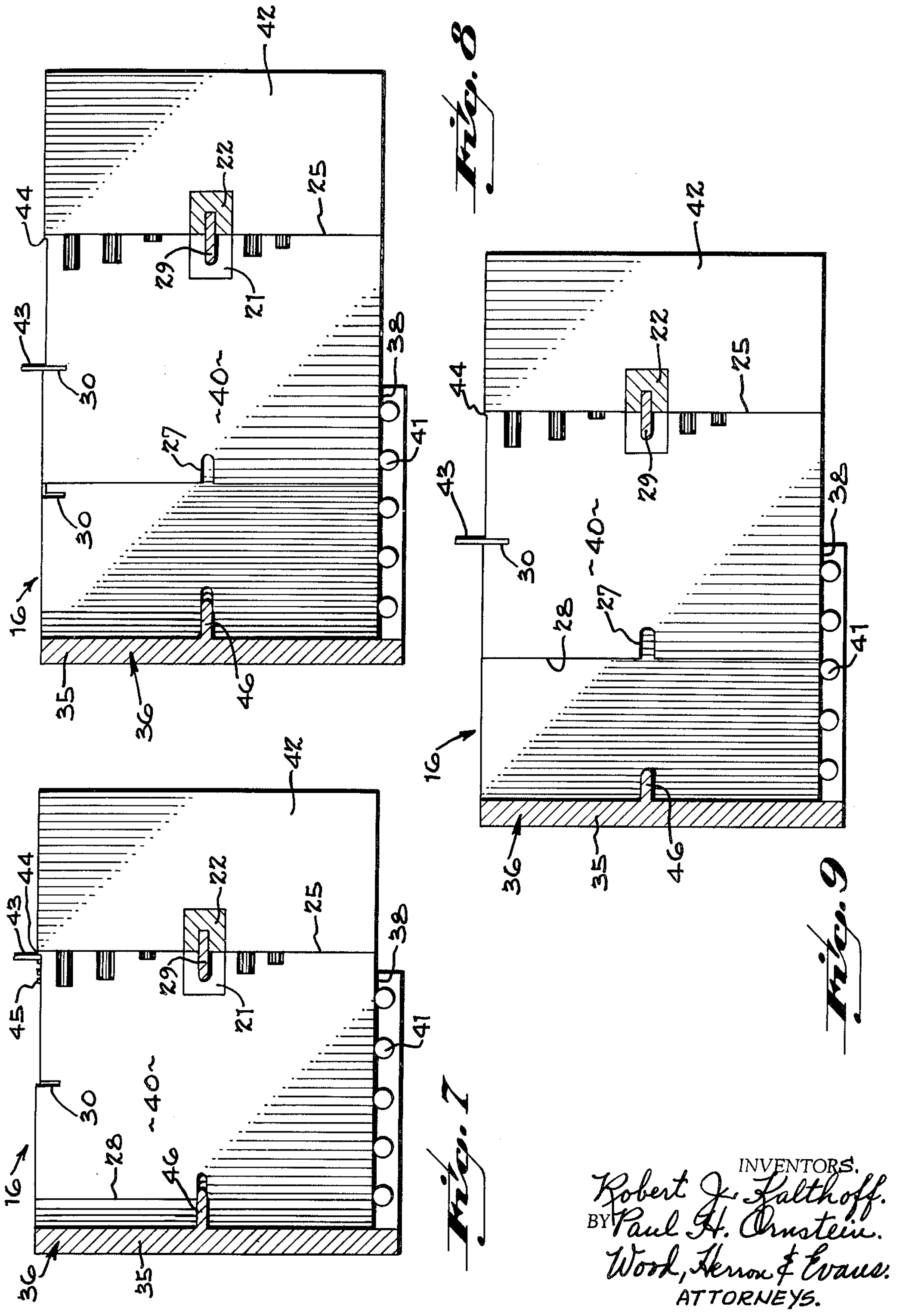
FIGURE 7 is a diagrammatic view showing the restack bar dropped into position behind the tabs of the selected cards.
FIGURE 8 is a diagrammatic view showing the platen retracted to a position in which the restack bar is dropped into the restack slots of the selected cards.
FIGURE 9 is a diagrammatic view showing the platen advanced to return the rejected cards to their original position.

In the next step of the sorting operation, as is shown in FIGURE 7, an abutment member 43 is lowered into position behind upward projections, or tabs 44, of the selected cards 40 and in front of the tabs 45 of the rejected cards.

In the next step of the process the selected cards are withdrawn outwardly under the influence of the magnetic force as the platen is retracted in a direction opposite to the direction in which the rejected cards are shifted. The abutment 43 positively prevents the rejected cards from being shifted outwardly. When the selected cards are withdrawn a sufficient distance, the abutment member 43 drops downwardly into the restack slots 30 of the selected cards.

In the next step of the process, the selected cards and abutment member are advanced toward the rejected cards. However the abutment member engages the front edge 25 of these cards and is thus effective to push all of the rejected cards against rear wall 32. This leaves the rejected cards in their starting position as shown in FIGURE 3.

Figure 10:
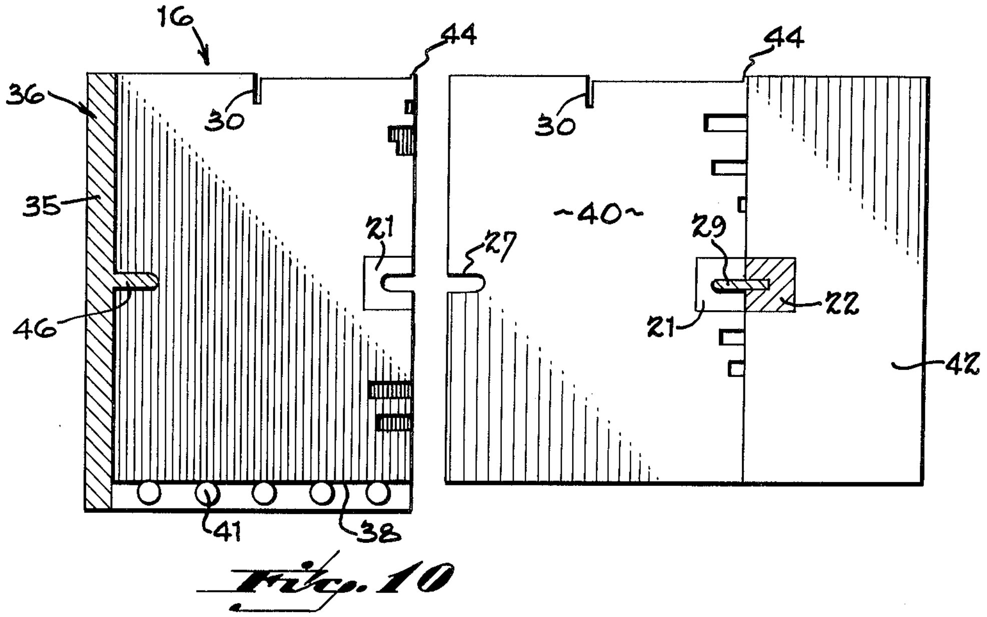
FIGURE 10 is a view showing the selected cards withdrawn to a position in which they can be removed from the machine.

In the final step, the abutment member is withdrawn from the restack slots and the selected cards 40 are withdrawn outwardly under the influence of the magnetic force in a direction opposite to the direction in which the rejected cards were pushed. The rejected cards are not drawn outwardly since their ferro-magnetic implants are spaced too far from the magnet 22 to be attracted by the magnet. As is shown in FIGURE 10, in this step, the selected cards 40 are withdrawn a sufficient distance to completely separate these cards from the rejected cards.

Figure 8A:
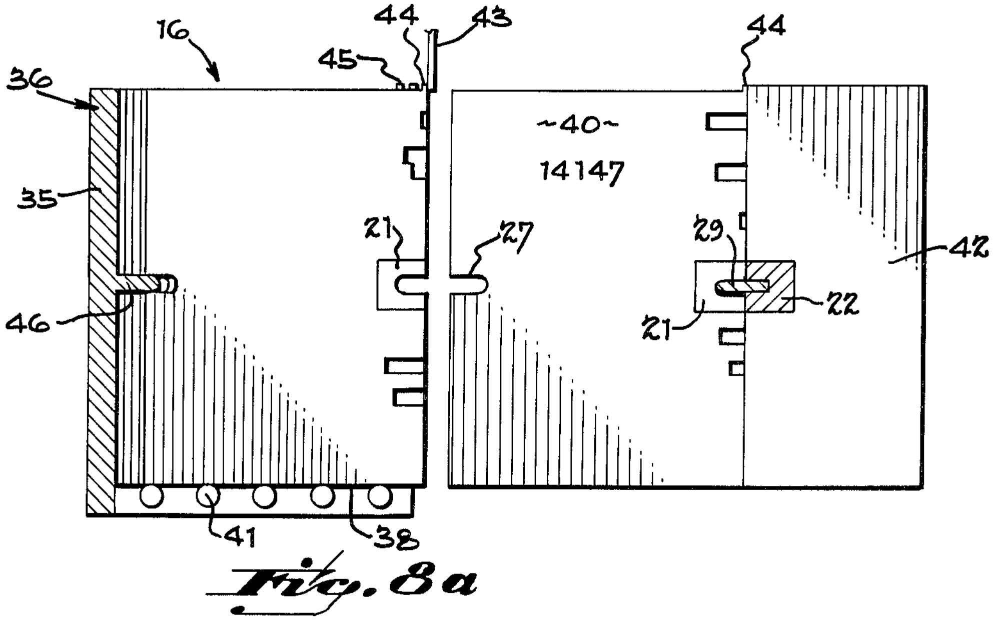
FIGURE 8A is a view showing cards of a slightly modified form withdrawn to a position in which they are removed from the machine.

A slightly modified method of separation is shown in FIGURE 8A. This method is particularly applicable for use with cards not provided with a restack slot 30. In the modified method, the original steps as exemplified in FIGURES 3–7 are exactly the same, i.e., the cards are aligned, are withdrawn to a sorting position under the influence of a magnetic force, and the selected cards are retained in the sorting position while the rejected cards are shifted from the sorting position by the sorting bars. Also, an abutment member 43 is interposed between the projections 44 of the selected cards and the projections 45 of the rejected cards. The difference in the method as shown in FIGURE 8A is that following the step of interposing the abutment member, as shown in FIGURE 7, in the modified method the selected cards 40 are completely withdrawn under the magnetic force as the next step. This complete separation is shown in FIGURE 8A. Thus, in this modified method, there is no preliminary restacking as shown in FIGURE 9. (In the modified method this restacking is accomplished upon the next advancement of the sorting platen which forces the cards against the rear wall 35 as shown in FIGURE 2.) In all other respects the modified method is exactly the same as the sorting method described previously. After the steps of either sorting method the cards can be removed from contact with the platen magnet in any suitable way such as by sweeping an abutment along the magnet to force cards into a stack which drops from the end of the magnet into a suitable receptacle.

As is explained in detail below, in connection with the sorting of cards coded in a coordinate index system, the stack of cards in compartment 36 can subsequently be sorted in a different field by shifting the sorting bars vertically relative to the cards so that the sorting bars are aligned with the notch sites of the new field to be searched. The sorting steps described above are then repeated to sort the cards in the second field.

*Generic sort machine*

As is shown in FIGURE 1, one form of generic sorting apparatus 10 includes a cabinet housing and a plurality of vertically disposed drawers 12–15. Each of these drawers includes a back wall 35 and an inwardly extending aligning flange 46 as is diagrammatically shown in FIGURE 11. The bottom wall 38 preferably includes a plurality of rollers 41 adapted to facilitate outward and inward sliding movement of the cards. The right side wall of the drawers is open so that cards can be withdrawn to the right as shown in FIGURE 11.

Figure 21:
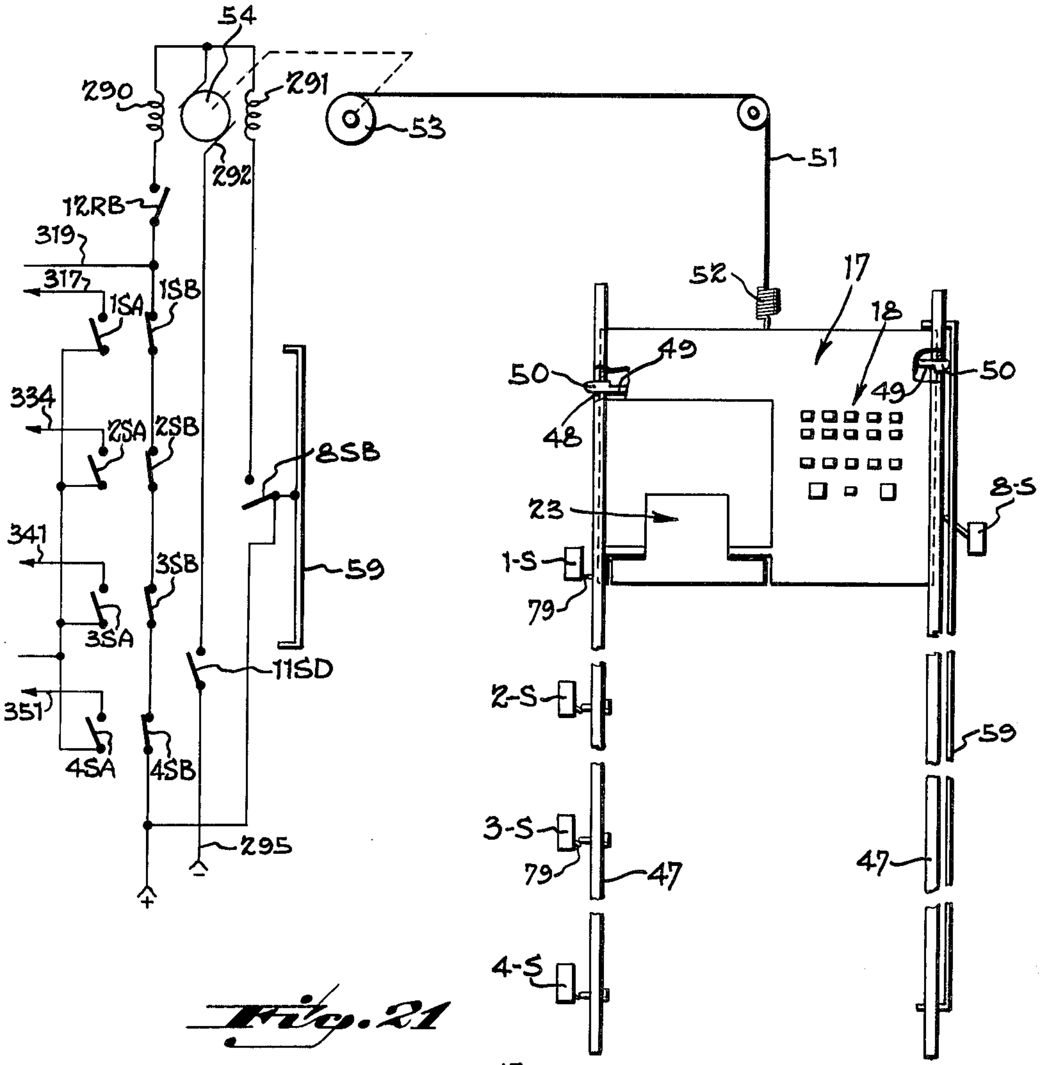
FIGURE 21 is a diagrammatic view showing the physical relationship of the elevator and various limit switches in circuit connection with the elevator motor.
Figure 22:
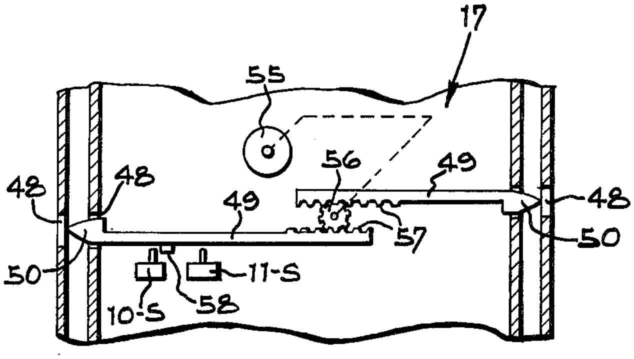
FIGURE 22 is a diagrammatic cross sectional view showing the elevator locking pins and cooperating slots in the elevator guide channels.

The cabinet 10 which supports drawers 12–15 also supports an elevator mechanism 17. This elevator is mounted for vertical movement upon four horizontal guide rails 47 mounted with cabinet 10. Each of the elevator guide rails is provided with four positioning slots 48 adapted to receive locking plungers 50 of the elevator mechanism whereby the elevator mechanism can be locked in accurate vertical alignment with any of the drawers 12–15. Various details of the elevator drive are shown diagrammatically in FIGURES 21 and 22.

As there shown, elevator 17 is supported from a cable 51 by means of a heavy compression spring 52. Cable 51 is helically wound around a drum 53, the drum in turn being interconnected through a suitable gear reduction unit (not shown) to elevator drive motor 54. The elevator 17 carries an actuating rod 59 for tripping a toggle switch 8S. A projection 79 is carried by the frame for actuating drawer level switches 1S, 2S, 3S and 4S.

Two outwardly extendable locking bars 49 are mounted adjacent to the upper portion of elevator frame 17. These locking bars are driven in any suitable manner from a locking motor 55. As shown diagrammatically in FIGURE 22, motor 55 drives a pinion 56, the pinion in turn being in engagement with rack sections 57—57 formed on locking bars 49. One locking bar 49 also carries a projection 58 adapted to actuate "out" limit switch 10S and "in" limit switch 11S.

Elevator 17 also carries sorting platen 20 and card collecting mechanism 23. The details of construction of the sorting platen are best shown in FIGURES 12–14, 25, 26 and 40. As is there shown, sorting platen 20 comprises a frame 61. Frame 61 includes an open wall 62 through which the sorting bars are projected. The sorting platen also carries an elongated magnet 22. This magnet extends horizontally parallel to the sorting bars and terminates flush with the front wall of the platen. A non-magnetic card aligning member 29 in the form of a thin strip extends outwardly from between the arms of the magnet. Magnet 22 can be formed of a strong permanent magnetic material, such as alnico, or may be in the form of a ferro-magnetic strip magnetized by a suitable electric magnet (not shown). It is to be understood that magnet 22 is rigidly mounted upon frame 61 and is located at a height so that when the frame is aligned with one of the drawers 12–15, member 29 is positioned to enter the slots 26 in the cards 16.

Platen frame 61 is slidably mounted for in and out movement along elevator 17 so that the platen moves toward and away from cards disposed in the drawers. More particularly, platen 20 is slidably supported in any suitable manner upon transversely aligned rails 63—63. The drive for shifting the platen relative to the elevator is diagrammatically shown in FIGURES 23–25 in which the platen is indicated by dot-dash lines 60.

Figures 23, 24, 25:
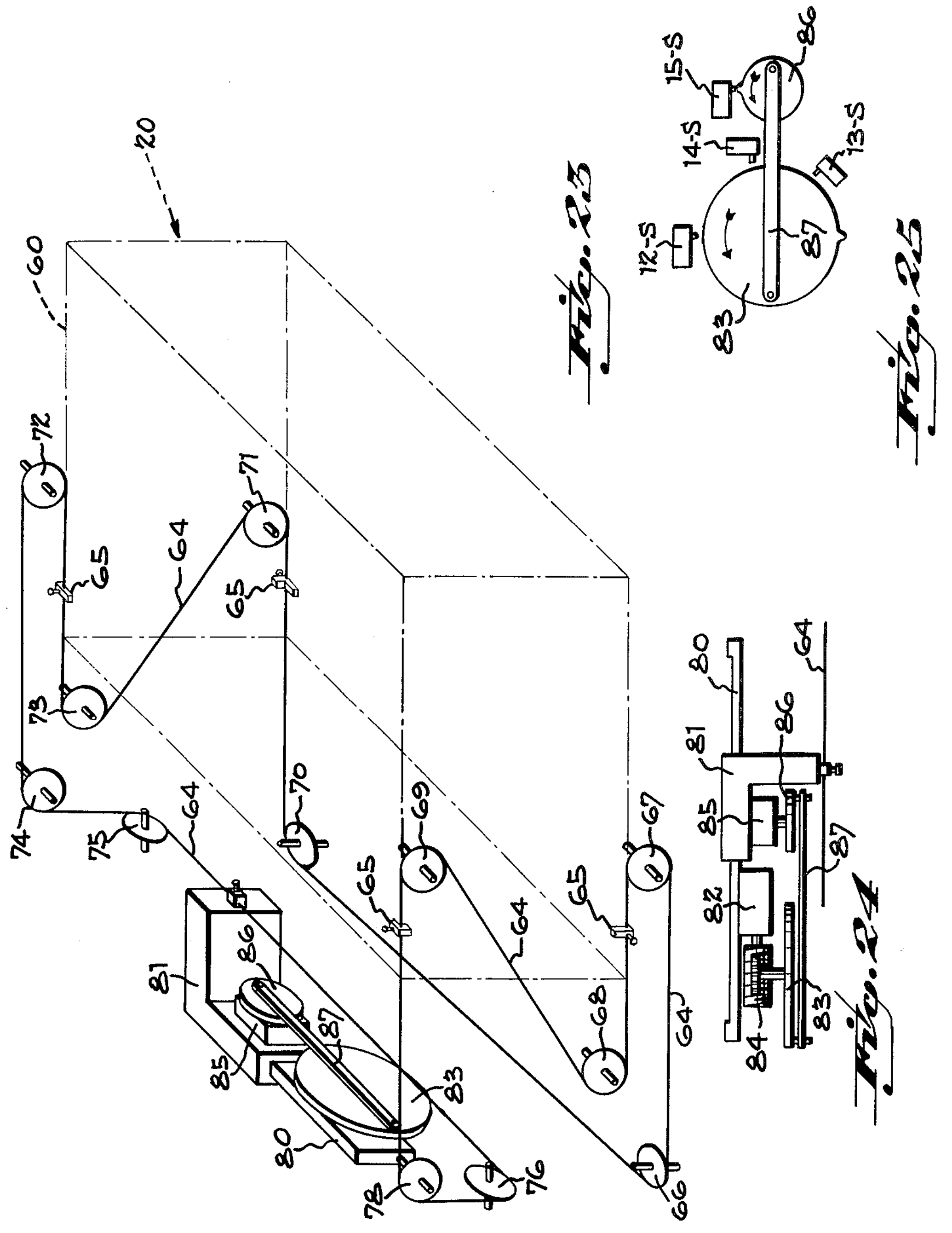
FIGURE 23 is a diagrammatic perspective view of a platen drive mechanism.
FIGURE 24 is a semi-diagrammatic view of the platen drive motors.
FIGURE 25 is a semi-diagrammatic elevational view of the platen drive motors showing the relative location of various limit switches.

More particularly, as is shown in FIGURE 23, the platen is joined to a drive cable 64 by means of four clamping brackets 65. Each of the clamping brackets is welded or otherwise secured to the platen frame 61 and is joined to cable 64 in any suitable manner, such as by means of set screws. Drive cable 64 is wound around a plurality of pulleys 66 to 76. These pulleys are mounted upon various portions of the elevator frame 77. Additionally, cable 64 passes over a pulley 78 mounted upon guide bar 80, guide bar 80 in turn being supported upon elevator frame 77. Guide bar 80 slidably supports a bracket 81, the bracket being provided with a suitable opening for receiving bar 80. A primary platen drive motor 82 is mounted upon guide bar 80 and is effective to drive a disc 83 through gears 84.

A secondary platen drive motor 85 is mounted upon sliding bracket 81. This motor drives disc 86 through a suitable gear reduction (not shown). Discs 83 and 86 are interconnected by means of a tie rod 87 which is loosely pinned to each of the discs. As a result of this interconnection, primary motor 82 is effective to shift bracket 81 along bar 80 and hence to drive cable 64 so as to shift platen frame 61 in and out relative to the card drawers.

Specifically, when primary motor 82 rotates disc 83, tie rod 87 applies a force to disc 86 which is in turn transmitted to bracket 81 and causes that bracket to move along guide bar 80. This results in corresponding movements of cable 64 and platen frame 61. Secondary motor 85 is likewise effective to shift bracket 81 and drive cable 64; for when motor 85 is driven to rotate disc 86, disc 83 remains stationary due to the inherent friction in the gear reduction between that disc and motor 82. Consequently, the interconnection of tie rod 87 and disc 83 functions as a stationary reaction point and rotation of disc 86 results in sliding movement of bracket 81 with attendant movement of cable 64 and platen frame 61.

As best shown in FIGURE 25 disc 83 carries a finger adapted to actuate limit switches 12S, 13S and 14S upon rotation of the disc. These switches are oriented so that switch 12S is actuated when the platen 20 is in its retracted position. Switch 13S is actuated when the platen 20 has advanced to compress the cards against the compartment rear wall 35 and has retracted to the sorting position. Switch 14S is actuated when the platen 20 is retracted to a position where the restack bar enters the restack slots in the cards 16. Another limit switch 15S is positioned to be actuated by a finger formed on disc 86. This switch is oriented so that it is actuated whenever disc 86 is positioned with the attached end of link 87 in its right hand position as viewed in FIGURES 23 and 25.

Figure 26:
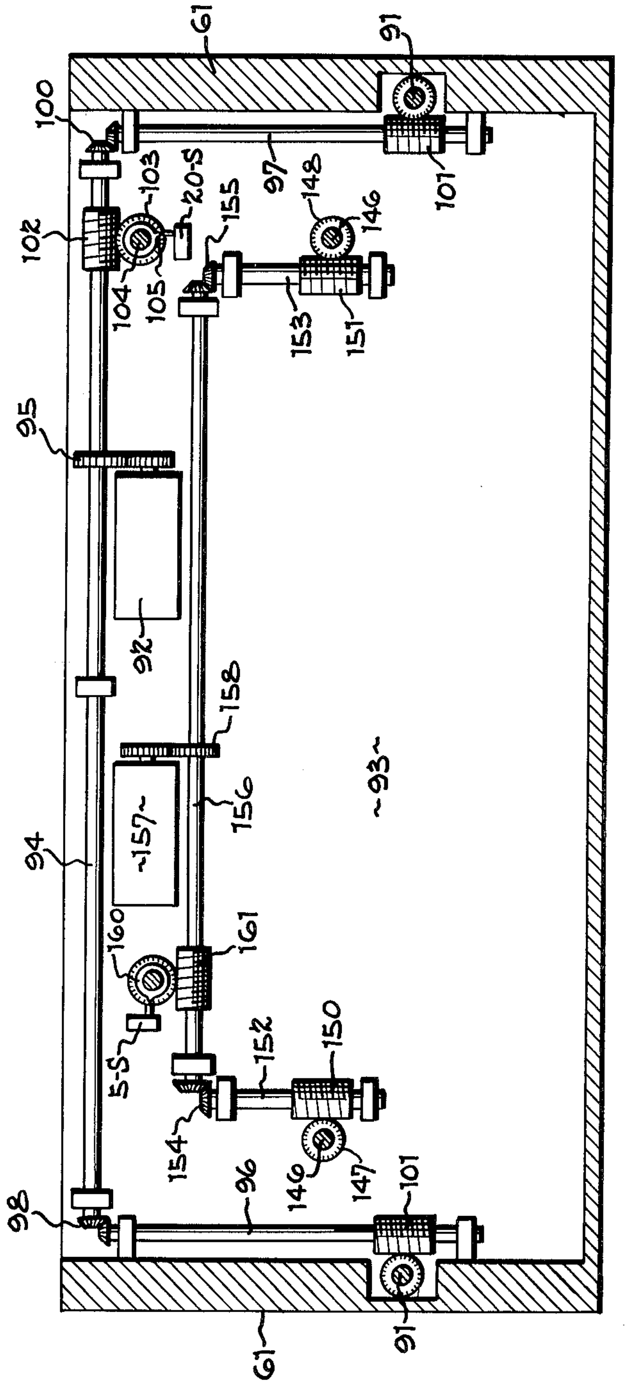
FIGURE 26 is a cross sectional view taken along line 26—26 of FIGURE 12.

In addition to outer frame 61, platen 20 includes an inner, or carrier, frame 88 which is mounted within frame 61 and is vertically shiftable relative thereto. More particularly, inner carrier frame 88 is provided with two endwise bosses 90. These bosses are threaded and engage vertical elevating screws 91. Each of the elevating screws 91 is rotatably journalled in the base 93 of platen frame 61. The elevating screws are driven to raise and lower the carrier frame by means of an elevator motor 92. This elevator motor is also mounted on the base 93 of frame 61 as is shown in FIGURE 26. Elevator motor 92 drives a shaft 94 through gears 95. This shaft in turn drives shafts 96 and 97 through bevel gears 98 and 100.

Each of the shafts 96 and 97 contain a worm gear 101 in driving engagement with elevating screws 91. Shaft 94 also supports a worm gear 102 which drives a gear 103, the gear being affixed to a shaft 104 which carries a cam finger 105 adapted to trip the actuating finger of switch 20S.

Carrier frame 88 includes vertical end walls 106 and a vertical rear wall 107. The front wall of the carrier frame is open. However, two slotted support members 108 are mounted inwardly of each side wall 106 adjacent to the front portion of the platen carrier. Each of the support members 108 includes a plurality of horizontal slots 110. Each of these slots is adapted to slidably receive one of the selector bars. Portions of the support members between the slots in effect form a plurality of shelves adapted to support the selector bars in vertically spaced parallel alignment.

Figure 13:
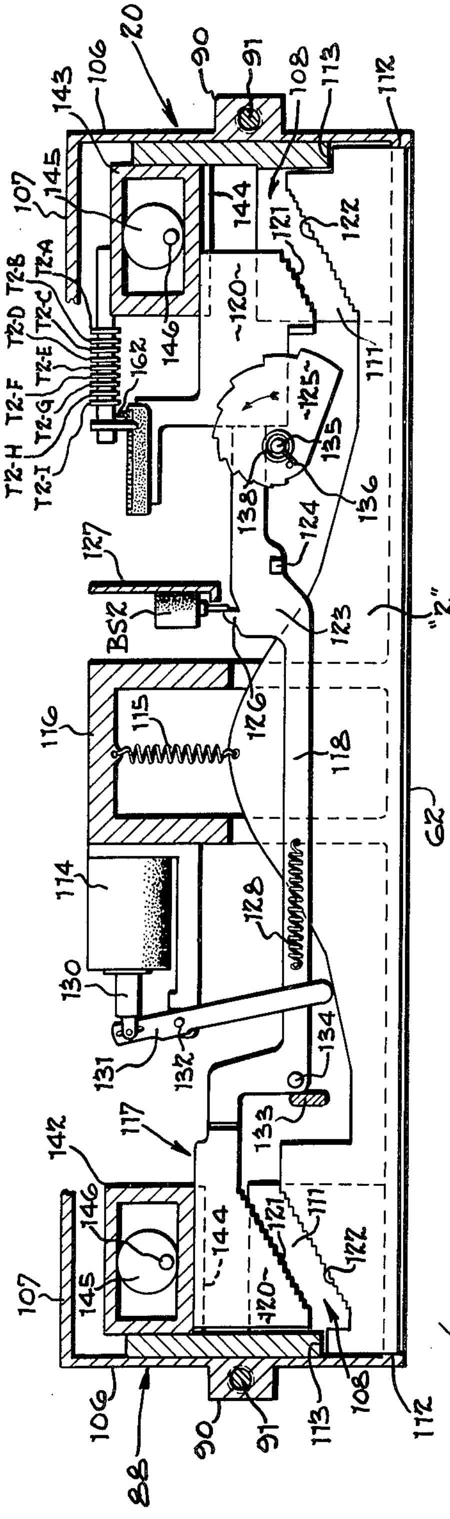
FIGURE 13 is a cross sectional view taken along line 13–13 of FIGURE 12.
Figure 12:
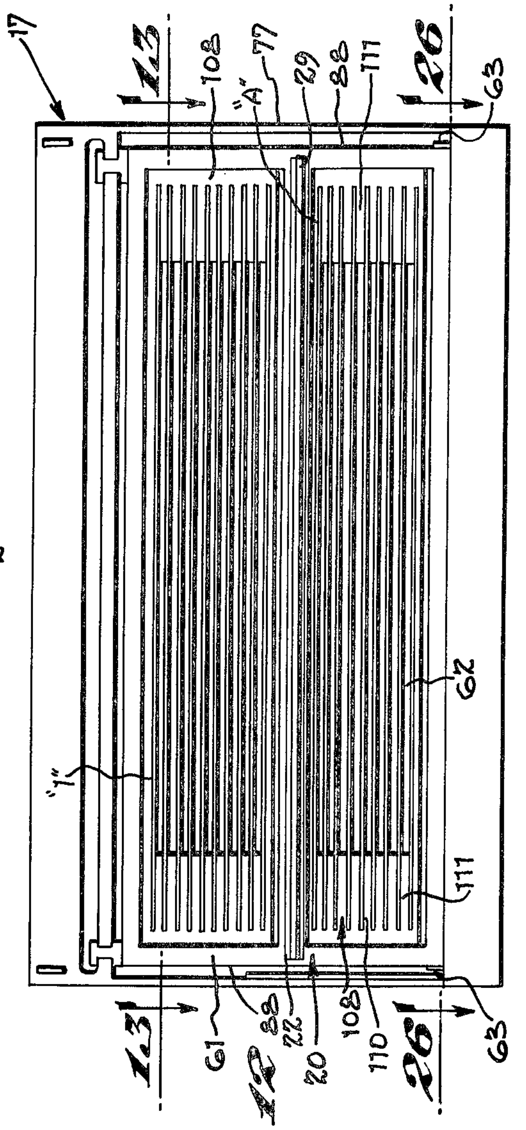
FIGURE 12 is an elevational view looking from the cards toward the sorting platen and elevator.
Figure 14:
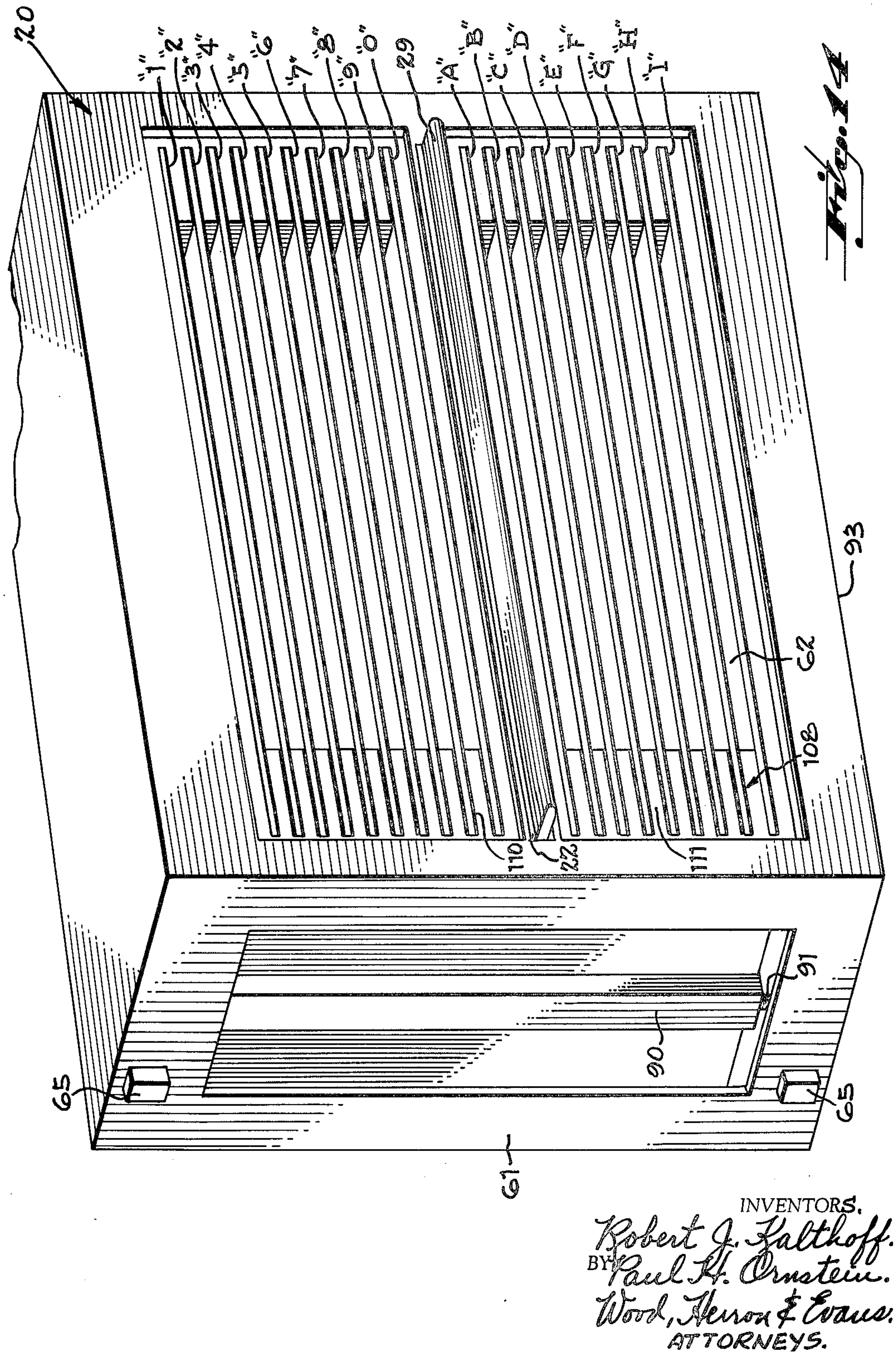
FIGURE 14 is a perspective view of the sorting platen.

More particularly, in the specific embodiment shown in FIGURES 12–14, nineteen selector bars are provided. The ten uppermost bars constitute the ten primary digit bars corresponding to the digits 1, 2, 3, 4, 5, 6, 7, 8, 9 and 0. The nine lowermost bars comprise the transfer digit bars designated A, B, C, D, E, F, G, H and I. The details of construction of the sorting bars are best shown in FIGURE 13. It is to be understood that each of the primary digit selector bars and each of the transfer selector bars is identical with the single bar shown except that, as is explained below, only one bar reset solenoid 114 is provided for all of the bars.

More specifically, each of the sorting bars is slidably supported intermediate two adjacent shelves 111 of support members 108. The bars are held in sideways alignment by guide surfaces 112 and rearward movement of the bars is limited by abutments 113. The bars are spring urged into a retracted position by means of a tension spring 115 which is connected to the center portion of the bar and upstanding wall 116 of carrier frame 88.

The bars are advanced in incremental distances by means of bar advancing mechanism 117. More particularly, the bar positioning mechanism, as is best shown in FIGURES 13 and 14, comprises a laterally shiftable intermediate pusher bar 118. Each end of pusher bar 118 is provided with a stepped plate portion 120. The depth of each of the steps 121 of the pusher plate corresponds to an incremental notch depth in card 16. Each of the stepped portions 120 of the pusher bar 118 slidably engages two adjacent shelf portions 111 of a support member 108 and is adapted to cooperatively engage one of the rearwardly facing stepped portions 122 of the adjacent sorting bar. It is to be understood that the dimensions of the individual steps 121 on the portions 120 of the pusher bar and the steps on portions 122 of the sorting bars are substantially the same so that these steps interengage when the pusher bar is forced against the sorting bar.

Figure 40:
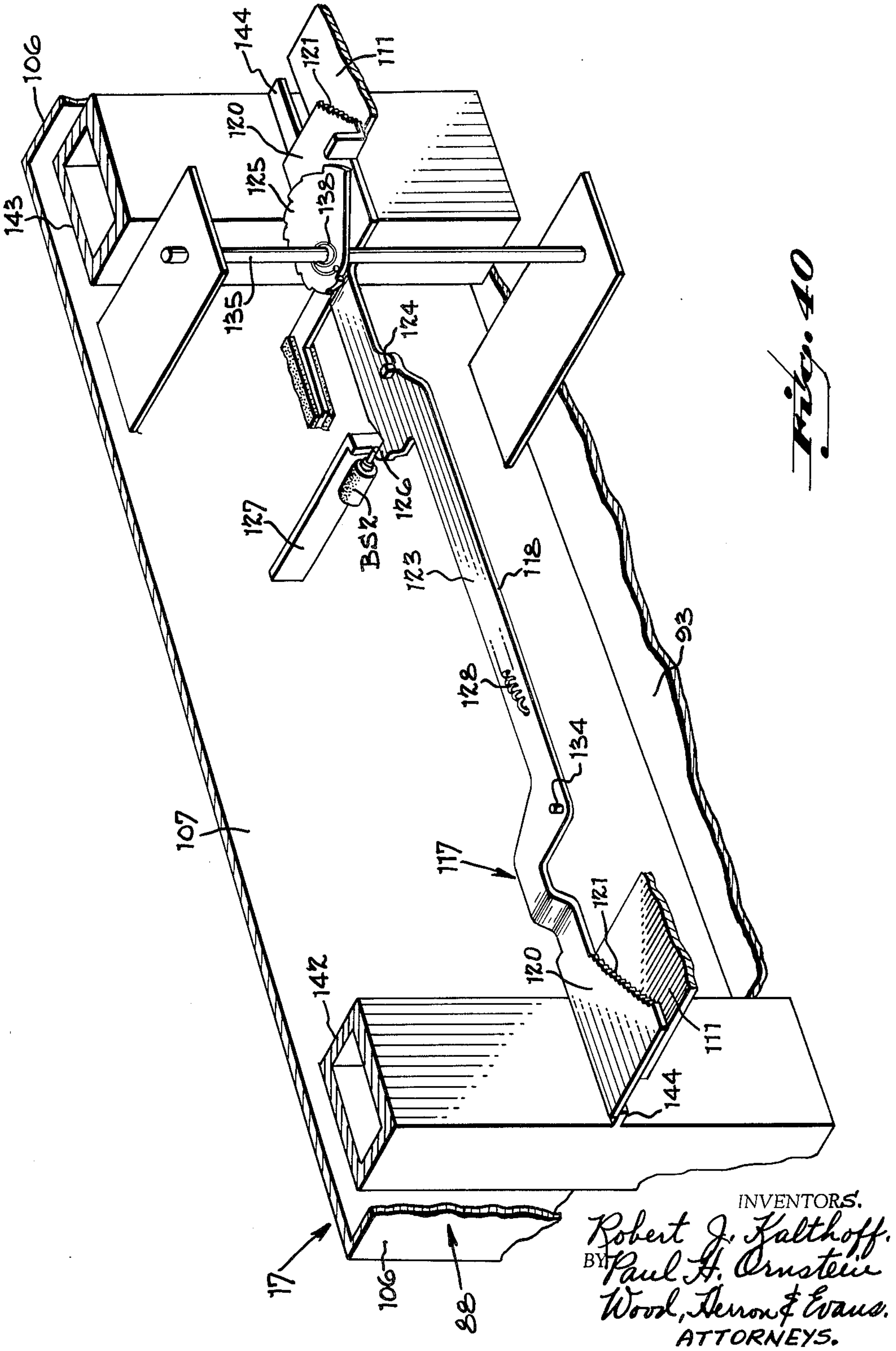
FIGURE 40 is a semi-diagrammatic perspective view of a selector bar positioning mechanism.

As is best shown in FIGURE 40, the center portion of each of the pusher bars 118 is raised slightly to clear the center portion of the adjacent sorting bar. This raised center section 123 of each of the pusher bars is provided with an upwardly extending abutment 124 adapted to engage digit place cam 125. This section of the bar also includes an outwardly extending abutment shoulder 126 adapted to engage the stop finger of one of the bar release solenoids BS0, BS1, BS2 . . . BS9, BSA, BSB . . . BSI (it being understood that BS1 is associated with sort bar "1," BS2 is associated with sort bar "2," BSA is associated with digit transfer bar "A" and so forth). The bar release solenoids BS1 etc. are mounted on a stationary vertical support plate 127 forming part of carrier frame 88. The pusher bars 118 are normally spring urged into engagement with the fingers of the bar release solenoids, i.e., to the right in FIGURE 13, by means of tension springs 128. Each of the tension springs is secured to the center section 116 of a pusher bar and to the adjacent sorting bar. The pusher bars are adapted to be returned to their left-handed position by means of reset solenoid 114. This solenoid is mounted upon wall 116 and includes an armature 130 connected to a link 131.

Link 131 is rigidly secured to a vertical reset shaft 132 so that when link 131 is rotated it in turn rotates shaft 132. Link 131 has its free end disposed over pusher bar 118 and positioned for engagement with a lug 134 carried by the bar. Similar links are rigidly secured to shaft 132 and disposed for engagement with a lug carried by each of the other pusher bars 118. Consequently, when solenoid 114 is energized, link 131 is shifted in a clockwise direction as shown in FIGURE 13. This pivots shaft 132 in a clockwise direction so that all of the secondary links connected to the shaft are also pivoted in a clockwise direction. When shaft 132 is pivoted, and then links are pivoted they engage lugs 134 and each of the pusher bars is returned against the force of spring 128 to its left-hand position as shown in FIGURE 13, movement of the bars to the left being limited by means of a stop 133 mounted upon carrier frame 88. The bars are then held in this position by the engagement of the release solenoid fingers with abutment shoulders 126.

Figure 15:
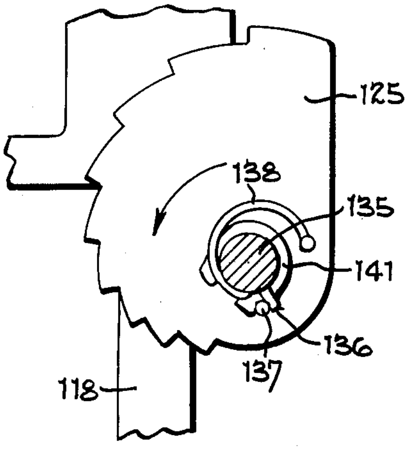
FIGURE 15 is an enlarged top view of the digit place cam.
Figure 16:
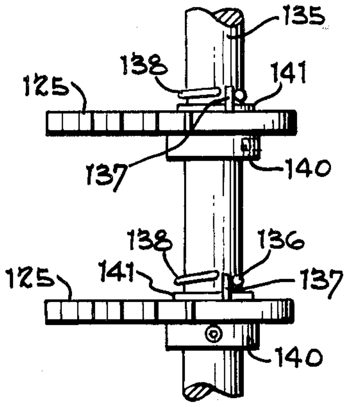
FIGURE 16 is an enlarged fragmentary side elevational view showing the mounting of the digit place cams upon their shaft.

The sorting bar positioning mechanism 117 further comprises a digit place cam 125 associated with each of the pusher bars 118. The details of construction of the digit place cam 125 are best shown in FIGURES 13, 15 and 16. As there shown, the digit place cam includes one arcuate segment corresponding to each of the notch depths in the card (in this basic embodiment, ten depths). As is explained in detail below, the arcuate segment located at the shortest radius corresponds to the first code digit or the deepest notch depth, while the arcuate segment of the next shortest radius corresponds to the second digit, or second deepest notch depth and so forth. Each of the digit place cams 125 is rotatably mounted upon digit place cam shaft 135.

The details of the cam mountings are best shown in FIGURE 15. As there shown, shaft 135 is provided with a radial finger 136 disposed above each digit place cam 125. This abutment finger is normally engaged by an upwardly extending pin 137 carried by digit place cam 125, each digit place cam 125 being normally spring urged in a counterclockwise direction as shown in FIGURE 15 by means of a spiral spring 138 which is secured to the cam and to shaft 135. The digit place cams are held in vertical alignment on shaft 135 in any suitable manner, such as by means of collars 140 secured to the shaft and rotatably supporting the digit place cams and spring clips 141 disposed in notches formed in shaft 135 above each of the cams 125. As is explained below the position of each digit place cam controls the transverse position of the associated pusher plate 118 which in turn controls the amount of projection of the associated sorting bar when the pusher plate is forced against the sorting bar.

The mechanism for advancing the pusher plates outwardly against the sorting bars includes two vertically extending hollow members 142 and 143. These hollow members are slidably mounted for horizontal in and out movement relative to carrier frame 88. Each of the hollow members 142 and 143 also includes a plurality of spaced flanges, or shelves 144 adapted to slidably support the end portions of pusher bars 118. An eccentric cam member 145 is mounted interiorly of each of the hollow members 142 and 143. These cams are rigidly secured to cam drive shafts 146.

As is shown in FIGURE 26, cam shafts 146 are rotatably journalled in base 93 and respectively carry gears 147 and 148. These gears are respectively adapted to be driven by worms 150 and 151 mounted upon shafts 152 and 153. Shafts 152 and 153 are in turn driven through bevel gears 154 and 155 from a drive shaft 156. This drive shaft is connected to cam drive motor 157 through gears 158. A switch actuating cam 160 is driven from shaft 156 through gears 161. This cam is effective to trip the switch 5S at the end of each complete revolution of cam shafts 146.

To understand the basic operation of the bar pushing mechanism, assume that the digit place cam 125 associated with the "2" selector bar of FIGURE 13 is rotated four steps so that the fourth segment of the cam is aligned with stop 124. When bar release solenoid BS2 is energized to disengage the finger of that solenoid from stop 126, pusher bar 118 is shifted to the right under the influence of spring 128 until abutment 124 engages the fourth segment of the digit place cam 125. Subsequently, cam shafts 146 are rotated which rotates cams 145 and forces hollow members 143 against the rear edges of pusher bars 118. This in turn forces the pusher bars against the selector bars and causes the selector bars to be projected forwardly from the platen.

It is apparent from FIGURE 13 that if cam 125 had been advanced only three places, pusher bar 118 would have advanced one step further to the right before abutment 124 engaged the cam. Consequently, there would have been less lost motion between pusher bar 118 and the sorting bar when the pusher bar was forced forwardly upon rotation of cams 145. Thus, in this latter event, the sorting bar would have been advanced one additional increment of distance from the platen. On the other hand, if cam 125 had been advanced one step further to bring the fifth arcuate segment into alignment with abutment 124, bar 118 could not have moved as far to the right (by one step) and accordingly there would have been more lost motion between pusher plate 118 and the selector bar when the pusher bar was advanced under the action of cams 145. In this situation the selector bar would have been advanced one increment of distance less outwardly from the platen.

In addition to the elements described above, each pusher bar has associated therewith the movable contact blade 162 of a transfer, or alternate bar, selector switch. These switches are labelled T1, T2, T3, . . . T0 and TA, TB, TC, . . . TH in accordance with their associated selector bars. Each of these transfer switches includes nine spaced contacts designated T1–A, T1–B, T1–C . . . T1–I . . . TA–A, TA–B, TA–C . . . TA–I, etc. Each of the spaced contacts of the transfer switches is disposed so that the T1–A contact is engaged when the pusher bar 118 is advanced to its farthest position so that the sort bar is advanced its maximum amount, i.e., to the first digit position. (Thus if this digit is repeated it will be transferred to the "A" transfer bar.) Similarly, the T1–B contact is engaged when the sorting bar is advanced to its second digit position (so that if the digit is repeated it will be transferred to the "B" transfer bar), etc.

Figure 27:
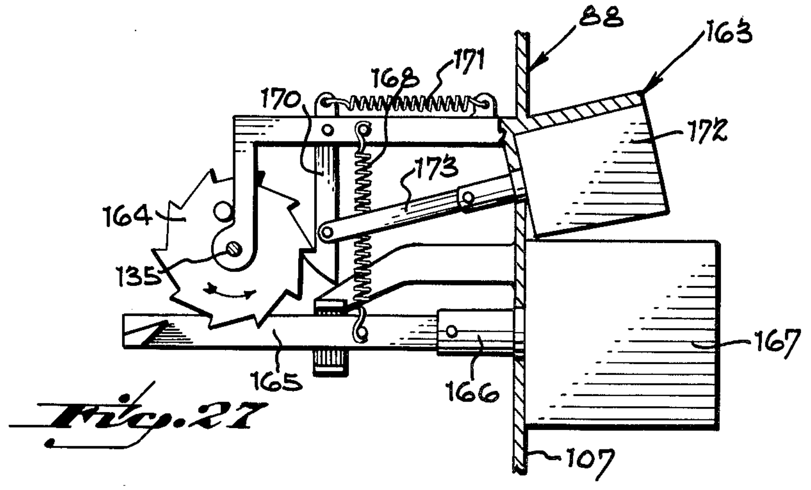
FIGURE 27 is a semi-diagrammatic side view of a digit place cam drive assembly.
Figure 28:
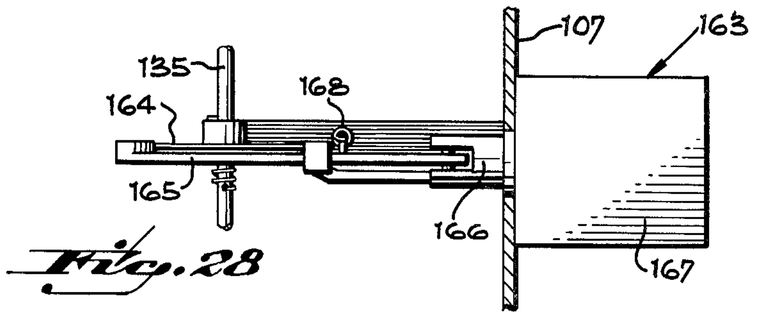
FIGURE 28 is a top view of the assembly shown in FIGURE 27.
Figure 29:
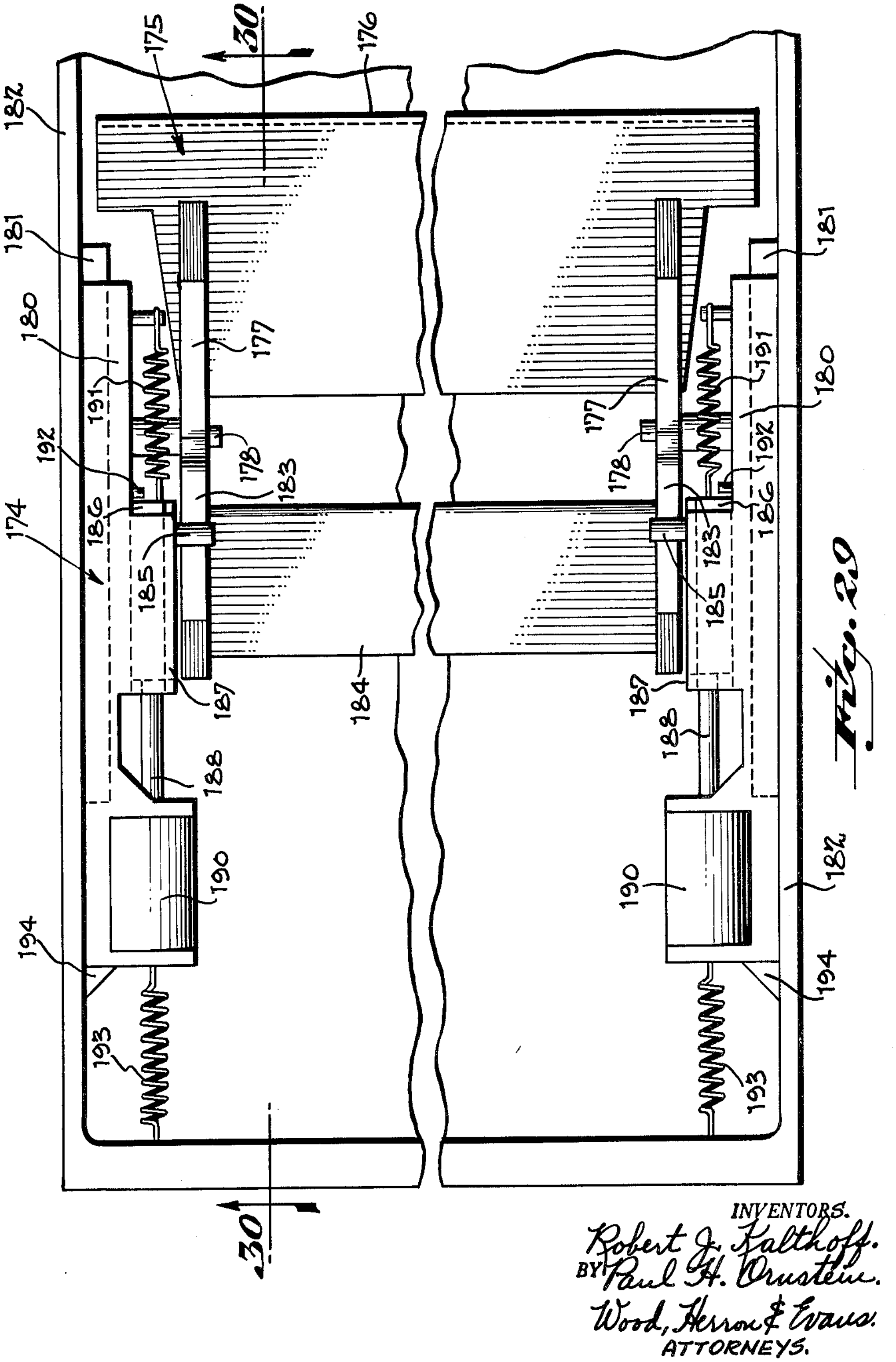
FIGURE 29 is a top plan view of the restack bar assembly.
Figure 30:
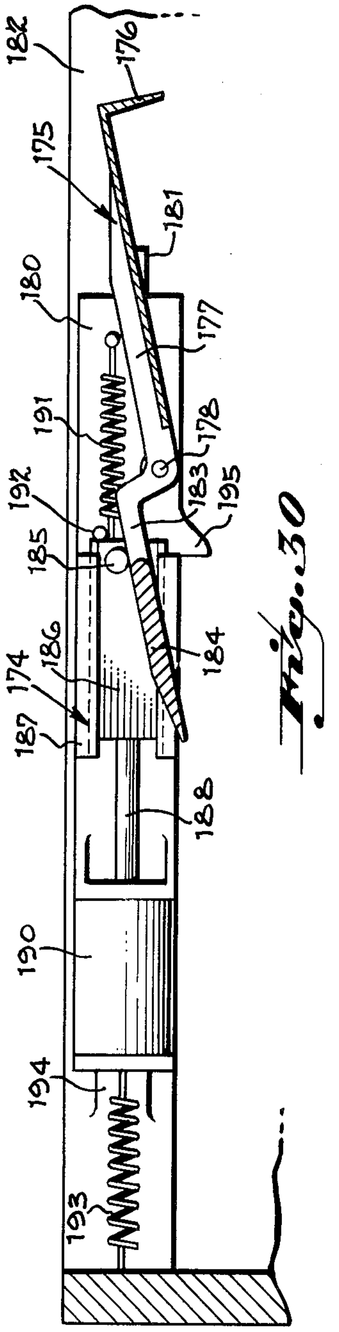
FIGURE 30 is a cross sectional view taken along line 30—30 of FIGURE 29 showing the restack bar in its raised position.
Figure 31:
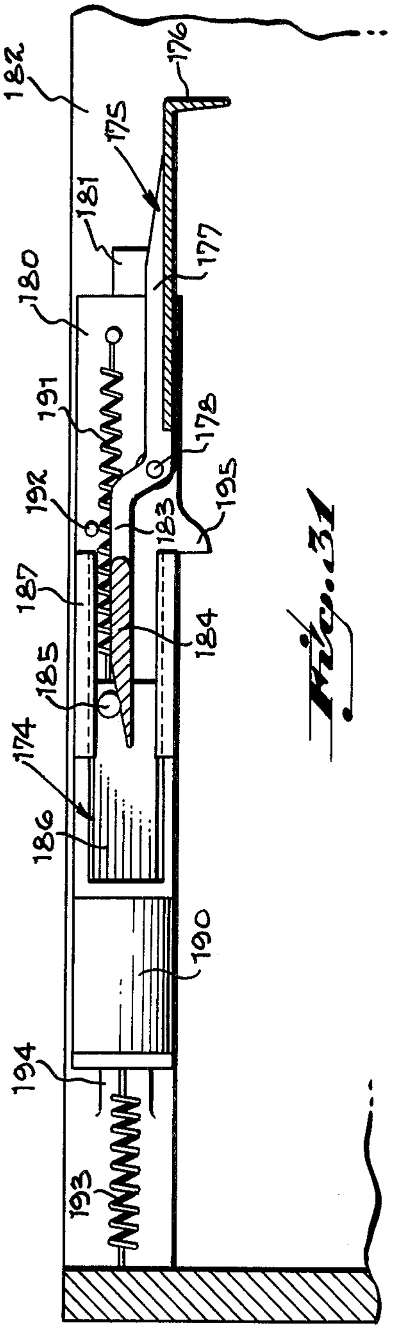
FIGURE 31 is a view similar to FIGURE 30 showing the restack bar in its lowered position.
Figure 32:
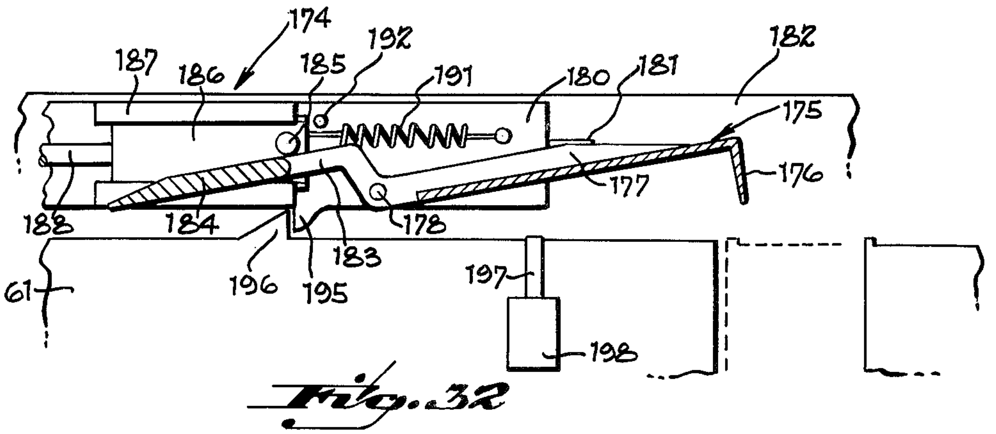
FIGURE 32 is a cross sectional semi-diagrammatic view showing the restack bar in relationship to the sorting position of the cards and their withdrawal position.
Figure 33:
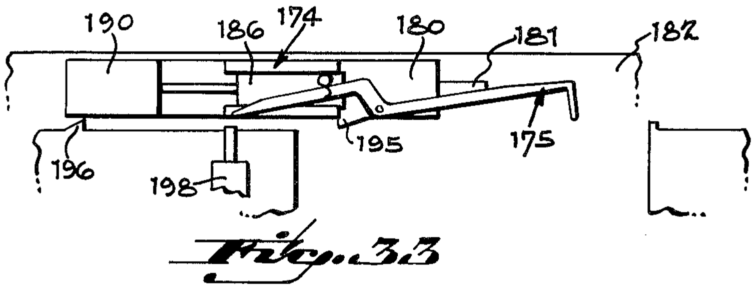
FIGURE 33 is a semi-diagrammatic view similar to FIGURE 32 showing the restack bars at the start of the sorting cycle.
Figure 34:
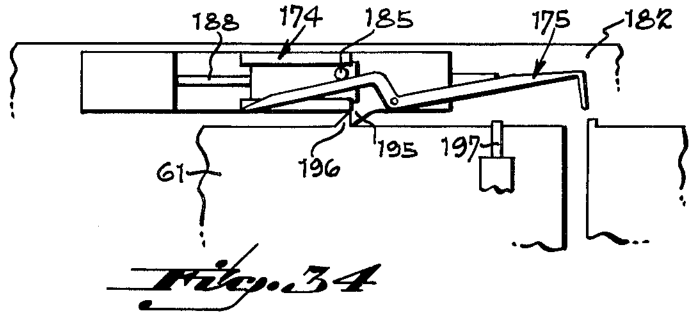
FIGURE 34 is a semi-diagrammatic view similar to FIGURE 32 showing the restack bar as the platen is advanced toward the cards prior to withdrawing the cards to their sorting position.

The digit place cam drive shaft 135 is driven by a stepper unit 163, the details of which are shown in FIGURES 27 and 28. This unit is mounted at the upper portion of the rear wall of the carrier frame 83. As there shown, stepper unit 163 includes a ratchet wheel 164 mounted upon shaft 135. This wheel is adapted to be driven in a counterclockwise direction by means of a drive pawl 165 reciprocated by the armature 166 of advance drive solenoid 167. Ratchet 165 is spring urged upwardly into engagement with wheel 164 by means of spring 168. A second, hold pawl 170 is disposed for engagement with ratchet wheel 164, the hold pawl being spring urged into engagement with the wheel by means of a spring 171. Hold pawl 170 is adapted to be retracted during the resetting operation by reset solenoid 172 which is connected to the pawl through a link 173.

The sorting platen also has associated therewith a restack bar assembly 174. The details of this assembly are best shown in FIGURES 29–32 and an operating cycle of this assembly is shown in FIGURES 33–39. As there shown, one preferred form of restack bar assembly comprises an elongated restack bar 175 which extends substantially the same length as the platen. This restack bar includes a downwardly extending flange 176 of a width narrower than the restack slots 30 in card 16.

The restack bar is carried by two spaced arms 177. These arms are secured to the top of the restack bar in any suitable manner, such as by welding, and are pivotally mounted on stub shafts 178. Stub shafts 178 are carried by slide blocks 180 slidably mounted upon guide rails 181 extending inwardly from side members 182 of elevator frame 77. Arms 177 include rearward extensions 183 which carry a counter-weight 184. This counter-weight does not overbalance the weight of the restack bar so that that bar normally tends to pivot arms 177 downwardly, i.e., in a clockwise direction in FIGURES 30–39. Downward pivotal movement of the restack bar is normally prevented by pins 185 extending laterally outwardly from sliding plates 186, these plates being mounted for reciprocating movement along guide strips 187 of slide blocks 180. Slide plates 186 are connected to armatures 188 of restack bar elevating solenoids 190. One of these solenoids is mounted upon each of the slide blocks 180.

The armatures of solenoids 190 and slide plates 186 are normally extended outwardly (to the right of FIGURE 30) by means of a tension spring 191 which is secured to slide blocks 180 and plates 186. Outward movement of the slide plate is limited by stop 192 carried by blocks 180. Slide blocks 180 are normally urged to a retracted position, i.e., toward the rear wall of the elevator mechanism by means of tension springs 193. Rearward movement of blocks 180 is limited by stops 194 carried by frame members 182.

Slide blocks 180 are further provided with downwardly extending stop shoulders 195 adapted for engagement with upwardly extending shoulders 196 carried by main platen frame 61. These stop shoulders 195 formed on plates 180 are also adapted for engagement with plungers 197 of restack bar hold solenoids 198. The operation of the restack bar assemblies is described in detail below.

The remaining major component carried by the elevator 17 is the card collecting mechanism 23. This mechanism is shown diagrammatically in FIGURE 41. As is there shown, the card collecting mechanism includes a card collector plate 201. This plate includes a downwardly extending arm 202 which carries a transverse flange 203. The ends of the transverse flanges are grooved as at 204 to slidably engage longitudinal guides 205 carried by an extension 206 of the floor of the main elevator frame. It is to be understood that the travel of the card collecting plate is slightly in excess of the length of the platen. Card collector plate 201 is disposed adjacent to the platen in its retracted, or outward, position and includes a groove 207 formed in one edge thereof adapted to receive the member 29 carried by the platen. Thus, when card collector plate 201 is shifted longitudinally along the platen, it engages cards magnetically retained by magnet 22 and pushes those cards forwardly until they drop from the end of the platen magnet into a tray, or basket, 208. Basket 208 includes an upwardly extending front wall 210, a bottom wall 211, side walls 212 and 213. Each of the side walls is provided with an outwardly extending flange 214 at its upper end. These flanges 214 are slidably received in channels 215 formed on elevator floor extension 206.

Figures 42, 43:
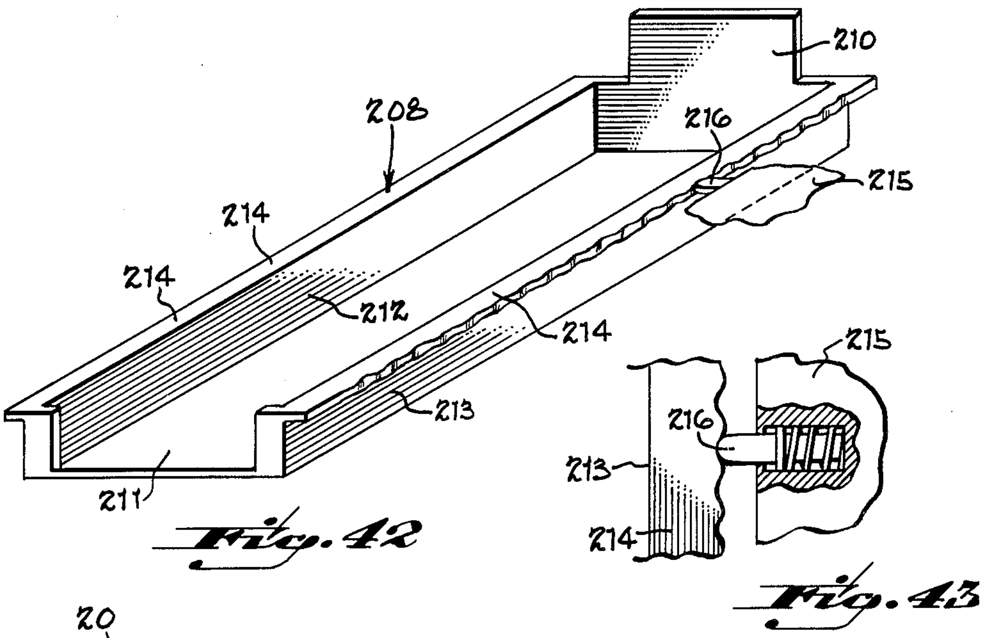
FIGURE 42 is a perspective view of the card collector trays.
FIGURE 43 is an enlarged top plan view partially broken away to show details of the card tray retaining detent.
Figure 44:
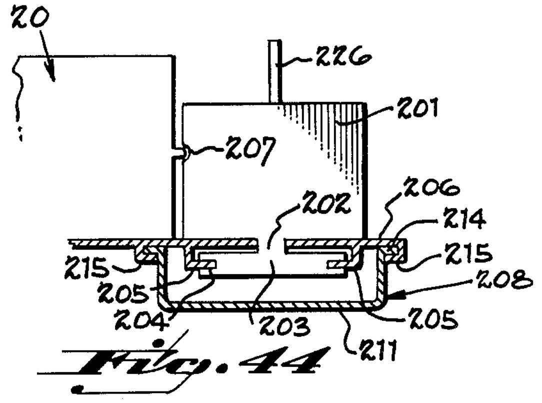
FIGURE 44 is a cross sectional view through the card collector basket and pusher track.
Figure 45:
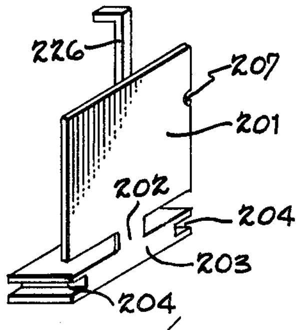
FIGURE 45 is a perspective view of the card collector pusher plate.

As is best shown in FIGURES 42 and 43, at least one of the flanges 214 is preferably serrated and is engaged by a detent 216 mounted in channel 215. This detent is effective to yieldably retain the basket in its inner position and yet is effective to permit the basket to be pushed outwardly when a stack of cards is collected by pusher plate 201 and is forced against end wall 210 in the manner shown in FIGURE 46.

The drive means for reciprocating card collector plate 201 includes a card collector motor 217. The shaft of this motor is effective to rotate a vertical drive shaft 218 through suitable gearing. Drive shaft 218 carries sprockets 220 and 221 at its upper and lower ends respectively.

A first drive chain 222 is driven by sprocket 220. This drive chain also passes around sprockets 223, 224 and 225. Sprockets 223, 224 and 225 are mounted upon the elevator frame. Chain 222 is secured in any suitable manner to an upwardly extending angle arm 226 carried by collector plate 201. This angle arm 226 is also effective to engage a switch actuating rod 227 effective to trip toggle switch 9S when the collector plate reaches the forward and rearward limits of movement. A second limit switch 7S is disposed to be actuated by flange 203 of card platen 201 when the card platen reaches its retracted position.

Sprocket 221 is a double sprocket and is effective to drive chains 228 and 229. Chain 228 is trained over sprockets 230, 231 and 232. Sprockets 230, 231 and 232 are mounted upon the elevator frame. Chain 228 is secured in any suitable manner to flange 203 of support plate 201. Similarly, chain 229 is trained around a second portion of sprocket 230 and sprockets 233 and 234. Sprockets 233 and 234 are mounted upon the elevator frame. Chain 229 is also secured to flange 203 of collector plate 201.

The electrical control circuit for controlling operation of the generic sorting apparatus is shown in FIGURES 17–20. Before describing the circuitry in detail, it is considered advisable to describe the symbols assigned to switches and relays. The various limit and other switches are designated by the symbols 1S, 2S, 3S, etc. The contacts of each of these switches are denoted by the switch symbol followed by a letter indicating the particular contact involved. Thus, the contacts of switch 1S are labelled 1SA, 1SB and 1SC. The contacts of switch 2S are labelled 2SA, 2SB, 2SC and so forth. The relays are similarly labelled 11R, 12R, etc., while the contacts associated with the relays are denoted by the relay symbol followed by a letter. Thus for example, 13RA, 13RB, and 13RC are contacts of relay 13R.

Figure 17:
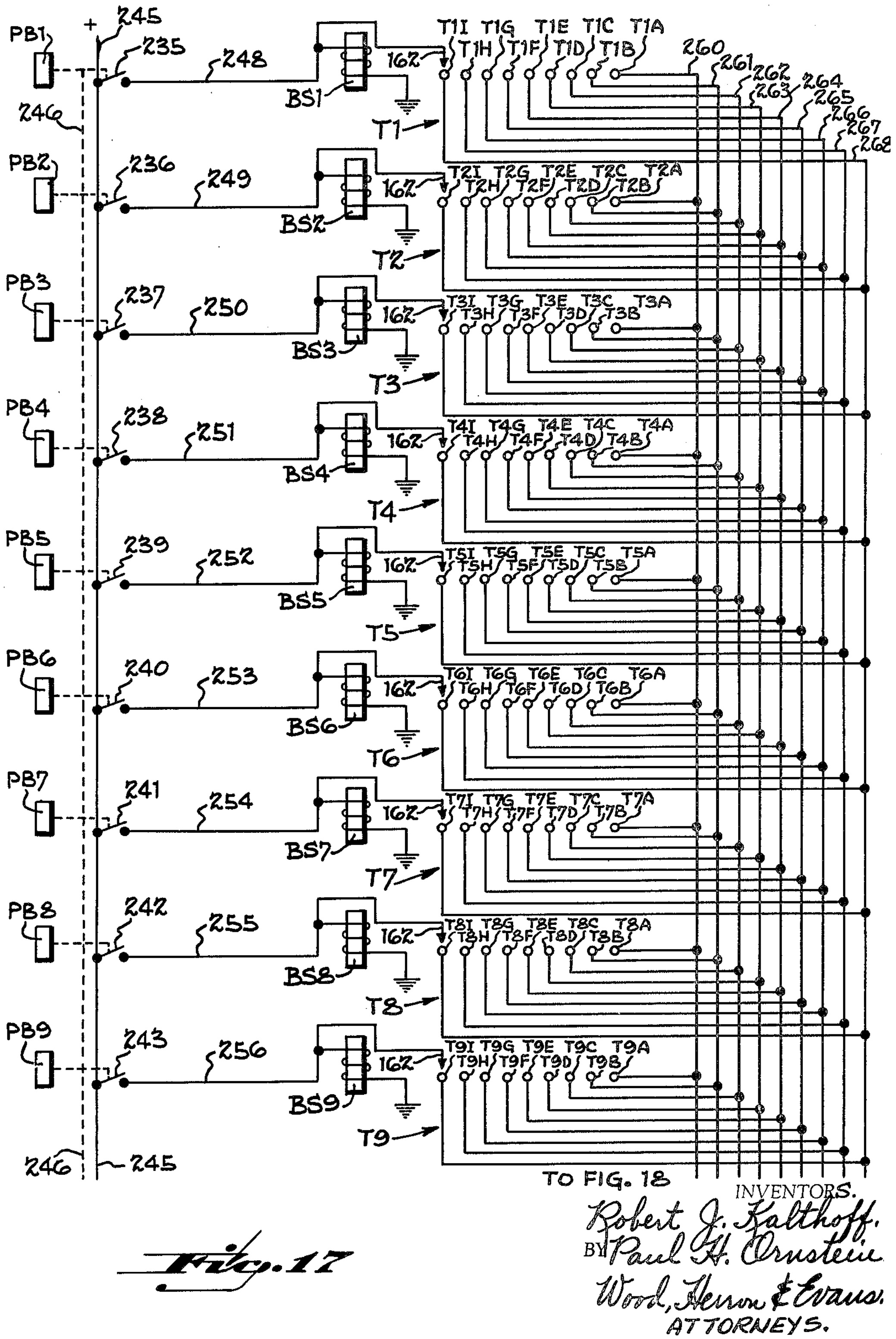
FIGURE 17 is a schematic circuit diagram showing a portion of the electrical selector bar positioning control circuit including manually operated selector keys and the digit bar release magnets.
Figure 18:
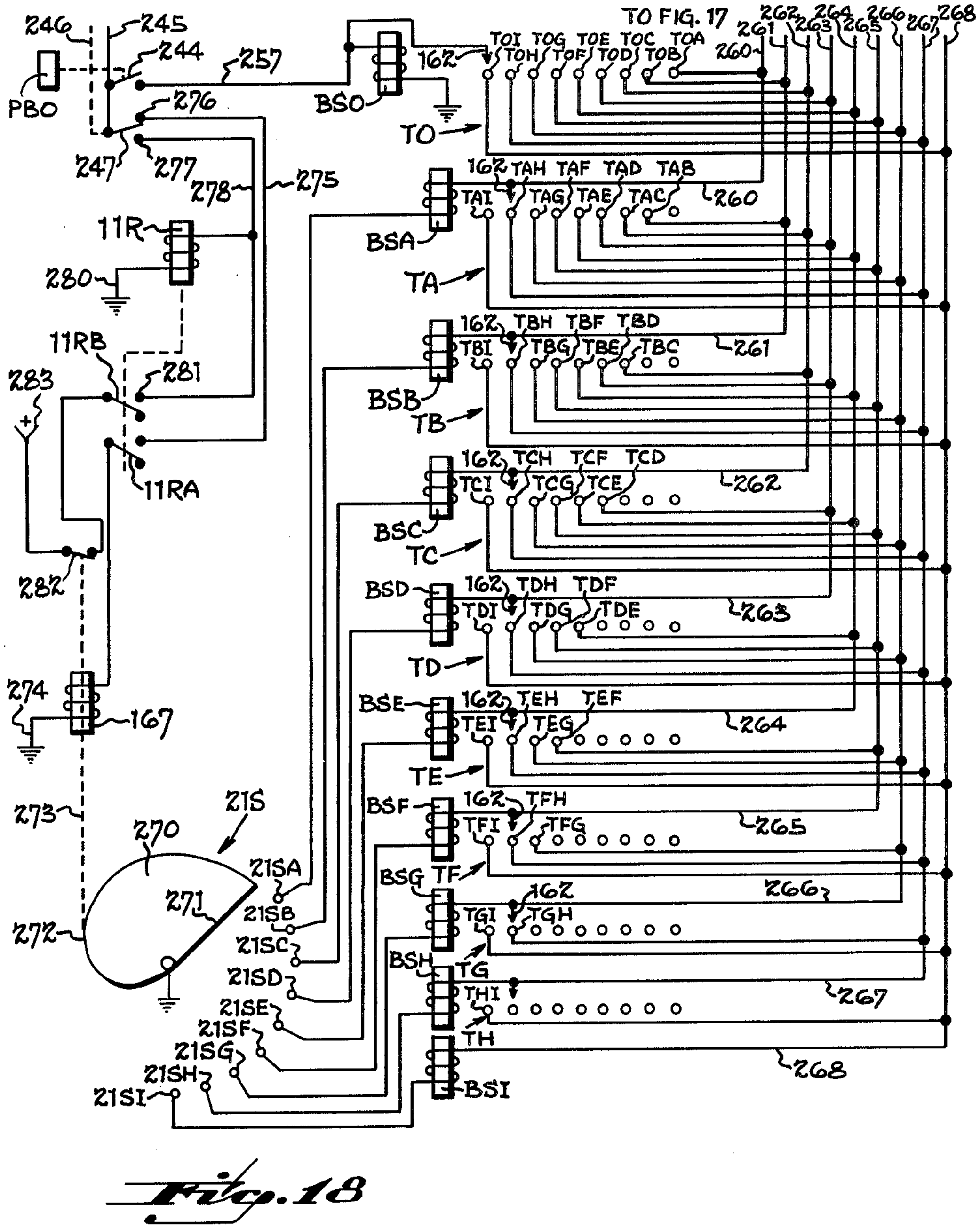
FIGURE 18 is a circuit diagrammatic view showing a portion of the bar positioning circuit including the transfer bar contacts and release magnets.

As shown in FIGURES 17 and 18, ten push buttons PB1, PB2 . . . PB0 are provided for respectively controlling the coding of the code number digits 1, 2, 3 . . . 0. Each of the push buttons operates single pole, double throw switches 235–244, each of these switches being connected to power line 245 which is joined to a suitable source of positive D.C. potential. As indicated by dotted line 246, each of the push buttons PB1–PB0 when depressed is also effective to actuate a switch 247. This switch is a single pole, double throw switch having a movable contact connected to power line 245. Each of the push button actuated switches 235–244 is connected to the corresponding bar release solenoids BS1, BS2 . . . BS0 through lines 248–257 respectively. By way of example switch 235 actuated by the "1" push button PB1 is connected through line 248 to bar release solenoid BS1 associated with the 1 selector bar. The opposite leads of each of the bar release solenoids is grounded. Each of the leads 248–257 is also connected to a movable contact 162 of the associated transfer switch T1, T2, T3 . . . T0.

As was explained previously, the stationary contacts of the transfer switches T1, T2 . . . T0 and TA, TB . . . TI are physically disposed relative to the movable contact plate 162 so that a different stationary contact is engaged for each position of the digit place cam and hence for each increment of advancement of the associated sort bar. More specifically, considering the "1" transfer switch, the stationary contact T1A is engaged when the "1" sort bar is advanced to the deepest depth (corresponding to the first digit of a number). Thus, if this digit is repeated, it would, in accordance with the coding scheme described above, be transferred to the "A" transfer digit bar. The T2–A, T3–A . . . T0–A stationary contacts are similarly engaged when their associated selector bars are advanced the maximum incremental distance, i.e., corresponding to the deepest notch depth.

Each of the T1–A, T2–A . . . T0–A contacts are connected to a lead 260. Lead 260 is in turn connected to the "A" bar release solenoid BSA and to the movable contact 162 of the "A" transfer switch TA. The opposite lead of the "A" bar transfer solenoid BSA is connected to the 21SA contact of sector switch 21S.

In a similar manner the T1–B, T2–B, T3–B . . . T0–B and TA–B contacts are joined to a lead 261. This lead is in turn connected to the bar release solenoid BSB associated with the "B" transfer bar and to the movable contact 162 of the "B" transfer switch TB. The opposite lead of the "B" transfer bar release solenoid BSB is connected to the 21SB contact of sector switch 21S. The T1–C, T2–C . . . T0–C and TA–C and TB–C stationary contacts are joined to lead 262. This lead is in turn connected to movable contact 162 of the "C" transfer switch TC and to the bar release solenoid BSC. The opposite lead of this solenoid is connected to contact 21SC of sector swicth 21S.

The T1–D, T2–D . . . T0–D, TA–D, TB–D and TC–D stationary contacts are joined to a lead 263. This lead is in turn connected to movable contact 162 of the "D" transfer switch TD and one lead of the bar release solenoid associated with the "D" transfer bar BSD. The bar release solenoid BSD is also connected to contact 21SD of sector switch 21S.

Contacts T1–E, T2–E . . . T0–E and contacts TA–E, TB–E . . . TE–E are joined to conductor 264. This conductor is connected to movable contact 162 of the "E" transfer switch TE and one lead of bar release solenoid BSE. The opposite lead of this bar release solenoid is joined to contact 21SE of sector switch 21S.

Stationary contacts T1–F . . . T0–F and contacts TA–F, TB–F . . . TE–F are joined to lead 265. This lead is in turn connected to the movable contact 162 of "F" transfer switch TF and to the "F" bar release solenoid BSF. The opposite lead of this solenoid is joined to contact 21SF of sector switch 21S.

Contacts T1–G, T2–G . . . T0–G and contacts TA–G, TB–G . . . TF–G are connected to a line 266. This line is joined to movable contact 162 of "G" transfer switch TG and to the "G" bar release solenoid BSG. A second lead of this solenoid is joined to contact 21SG of sector switch 21S.

Stationary contacts T1–H, T2–H . . . T0–H and contacts TA–H, TB–H . . . TG–H are interconnected with lead 267. This lead is in turn joined to movable contact 162 of the "H" transfer switch TH and to one lead of bar release solenoid BSH. The second lead of solenoid BSH is joined to contact 21SH of sector switch 21S.

In a like manner the remaining stationary contacts T1–I, T2–I . . . T0–I and TA–I, TB–I . . . TH–I are joined to lead 268. This lead is in turn connected to one lead of the "I" transfer bar release solenoid BSI. This solenoid is also joined to contact 21SI of sector switch 21S.

Sector switch 21S includes an arcuate rotatable conductive plate 270 effective to sweep over contacts 21SA–21SI. The peripheral extent of plate 270 is such that when the leading edge 271 of the plate has advanced to engage contact 21SI the trailing edge 272 of the plate engages contact 21SA. As is indicated by dotted line 273, conductive sector 270 is rotated in step-wise fashion through a mechanical interconnection with cam drive solenoid 167.

One terminal of cam drive solenoid 167 is grounded as at 274. The opposite terminal of this solenoid is joined to one movable contact 11RA of hold-in relay 11R. A stationary contact associated with this movable contact is joined through lead 275 to a stationary contact 276 of switch 247. Switch 247 is a double-throw switch and includes a normally open contact 277 joined to lead 278. This lead is connected to the coil of relay 11R, the opposite lead of the coil being grounded as at 280. Lead 278 is also joined to a stationary contact 281 adapted to be engaged by movable contact 11RB of relay 11R. Contact 11RB is in series electrical connection with a contact 282 of cam drive solenoid 167. This contact in turn is joined to a source of positive potential as is shown at 283.

Figure 19:
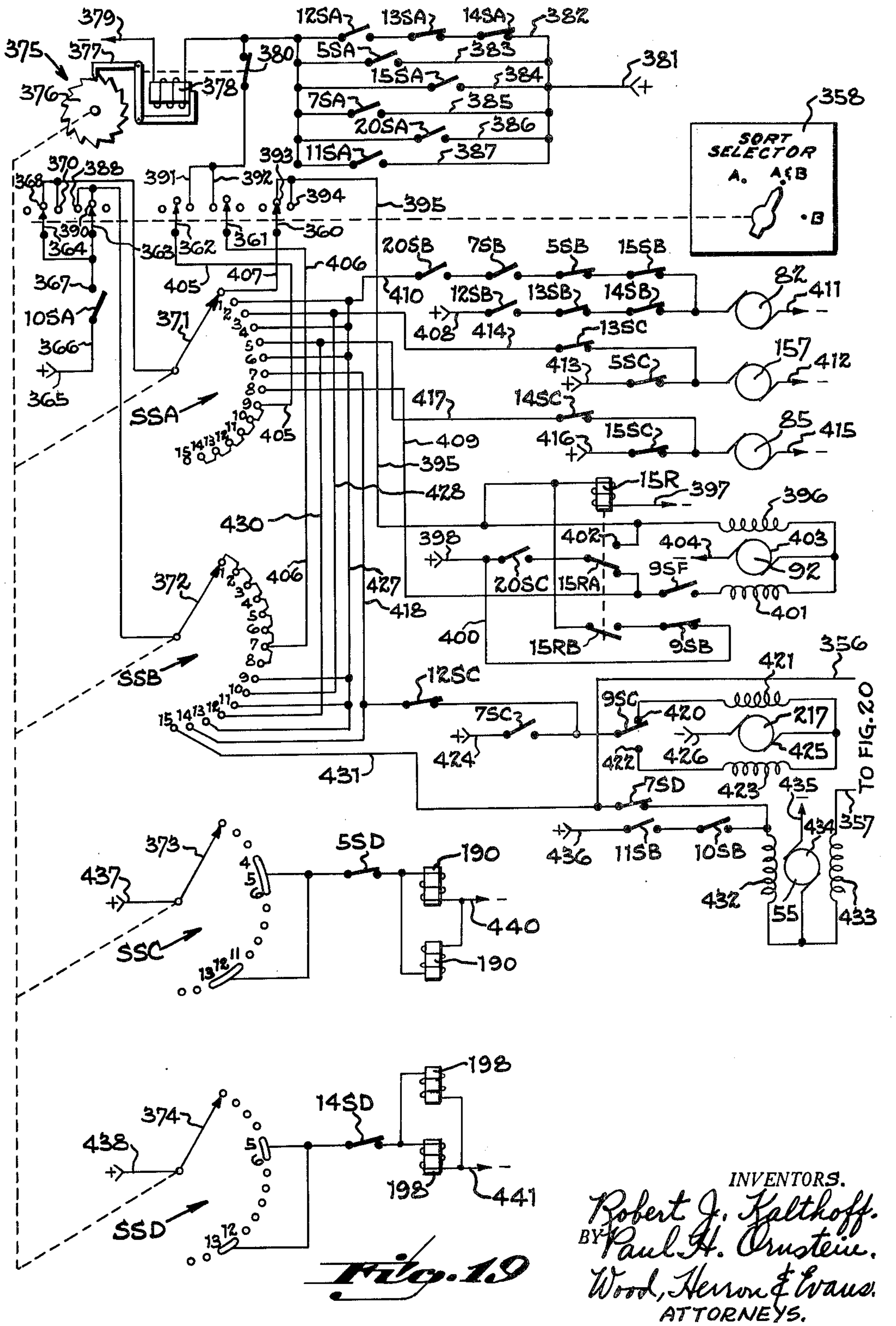
FIGURE 19 is a diagrammatic circiut view of a portion of the generic sorting control circiut including the stepping switches and various platen drive motors.
Figure 20:
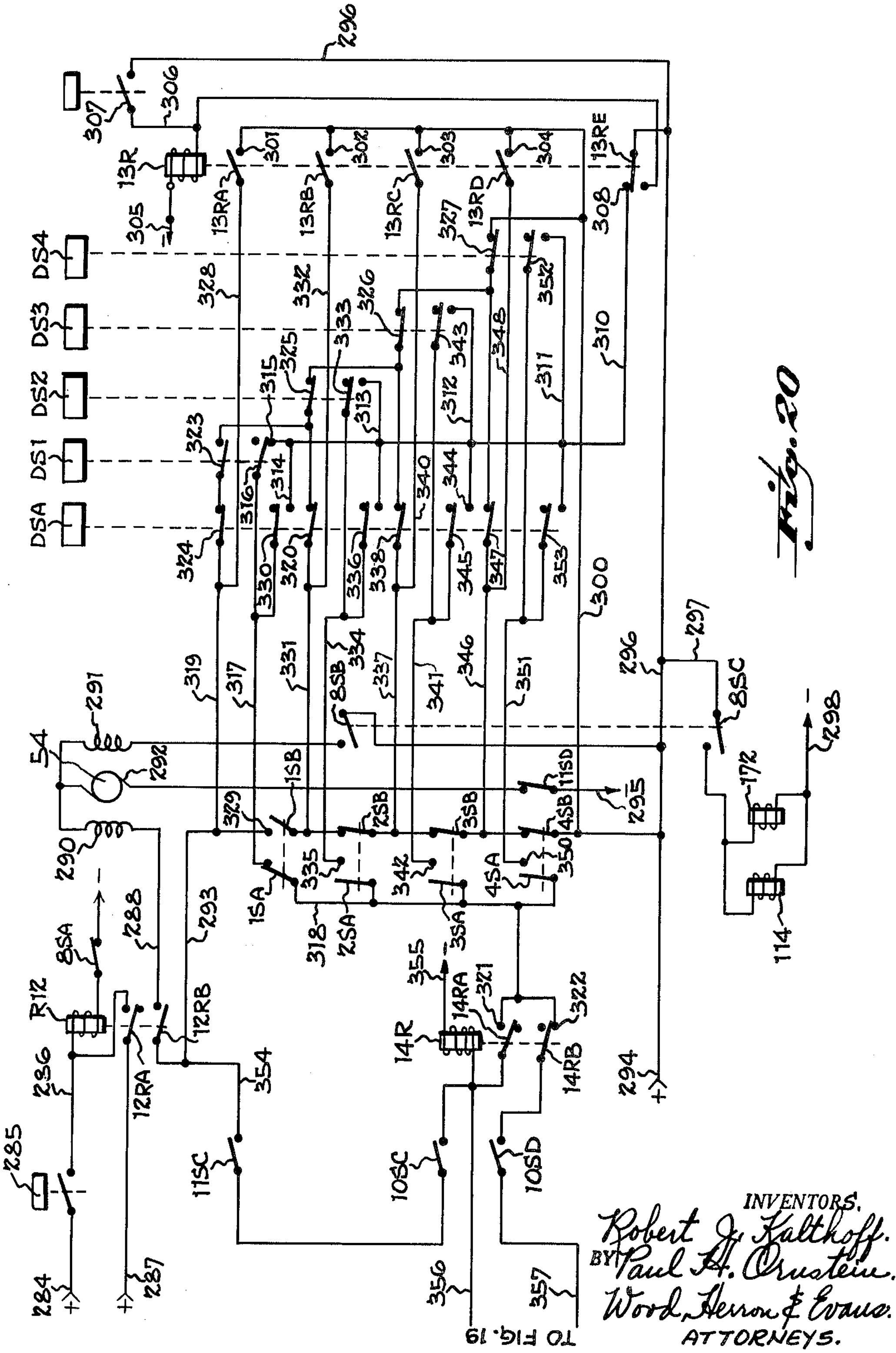
FIGURES 20 is a circuit diagrammatic view showing another portion of the generic sorting control circuit including the elevator drive motor, drawer selector sorting buttons and elevator limit switches.

The remaining portions of the control circuit are shown in FIGURES 19 and 20. As is shown in FIGURE 20, a positive power supply source 284 is connected to a start button 285. This switch is connected to lead 286 which is in turn joined to the coil of relay R12, the opposite lead of this relay coil being grounded through normally closed contact 8SA of toggle switch 8S. Relay R12 includes a hold-in contact 12RA connected to a positive potential source as at 287. Relay R12 has a second contact 12RB adapted to engage a stationary contact joined to line 288. This line is connected in series with one field winding 290 of elevator motor 54. Field winding 290 of elevator motor 54 is connected to a second field winding 291 of this motor and to the motor armature 292. Movable contact arm 12RB is joined to a line 293. This line is connected to a positive power source indicated at 294 through series connected contacts 1SB, 2SB, 3SB and 4SB associated with elevator levelling switches 1S, 2S, 3S and 4S respectively. The second brush of armature 292 is connected to a negative line as indicated at 295 through contact 11SD of switch 11S. Motor winding 291 is also joined to a power line 296, which is connected to power source 294, through contact 8SB of switch 8S. A third contact 8SC of this switch is placed in a lead 297 which interconnects power line 296 with the parallel combination of the bar reset solenoid 114 and the digit cam reset solenoid 172. The opposite leads of these solenoids are connected to a negative line as indicated at 298.

A conductor 300 is joined to power line 294 and is connected to stationary contacts 301, 302, 303 and 304 respectively associated with movable contacts 13RA, 13RB, 13RC and 13RD of relay 13R. The coil of relay 13R is connected to a negative line as indicated at 305 and to a lead 306 connected to a movable contact of clear and reset switch 307. This is a manually operated switch having a stationary contact connected to power line 296. Relay 13R is also provided with a hold-in contact 13RE effective to join the relay coil to power line 296.

Relay contact 13RE is a double-throw contact and in the deenergized condition of relay 13R engages a stationary contact 308. This contact is in turn joined to a conductor 310 which is tied to leads 311, 312, 313 and 314. Conductor 310 is also joined to stationary contact 315 of the first drawer sort button DS1. One movable contact 316 actuated by drawer sort button DS1 is connected to lead 317 which is in turn joined through normally closed contact 1SA of switch 1S and lead 318 to stationary contacts 321 and 322 associated with movable contact arms 14RA and 14RB of relay 14R. A second contact 323 of drawer sort button DS1 is connected to lead 293 through a contact 324 of "all" drawer sort button DSA and lead 319. Lead 319 is also connected to contact 329 associated with movable contact 1SB. Contact 323 is also connected through series connected contact 325 of second drawer sort button DS2, contact 326 of third drawer sort button DS3, and contact 327 of fourth drawer sort button DS4 and lead 309 to power line 296.

Contacts 323 and 324 are adapted to be bypassed by a lead 328 joined to movable contact 13RA of relay 13R. Contact 315 is similarly bridged by contact 330 of "all" drawer push button DSA. A lead 331 is joined to the juncture of contacts 1SB and 2SB. This lead is also joined to a lead 332 connected to movable contact 13RB of relay 13R. Lead 331 is also joined through contact 320 of push button switch DSA to contact 325. Lead 313 is connected to a terminal of contact 333 of drawer selector switch DS2. This contact is in turn joined to lead 334 which is joined to contact 335 which cooperates with movable contact 2SA. A second section of lead 313 is joined to lead 334 through contact 336 of drawer selector push button DSA.

Lead 337 is taken from the juncture of switch contacts 2SB and 3SB. This lead is joined to the series combination of contacts 338 of drawer sort button DSA and contact 326 of drawer sort button DS3. A bypass lead 340 is connected to lead 337 and to contact 13RC of relay 13R. A lead 341 is joined to a contact 342 of switch 3SA and to a movable contact 343 of drawer select button DS3. This movable contact is adapted to be shifted into engagement with a stationary contact joined to line 312. Line 312 is also joined to a second stationary contact 344 which is adapted to be joined to lead 341 through movable contact arm 345 associated with drawer selector button DSA.

Lead 346 is joined to contact 327 of drawer selector button DS4 through contact 347 of drawer selector button DSA. Lead 346 is also joined through a second lead 348 to contact 13RD of relay 13R. A stationary contact 350 associated with movable contact 4SA is joined to a lead 351, this lead in turn being connected to lead 311 through movable contact 352 actuated by drawer selector button DS4. Lead 311 is also connected to lead 351 through movable contact 353 connected to drawer selector push button DSA.

Movable relay contact 12RB is also connected to a lead 354 containing contact 11SC of switch 11S and contact 10SC of switch 10S. These series connected contacts are in turn joined to movable contact 14RB of relay 14R. One terminal of the coil of relay 14R is connected to a negative line as at 355, while the other lead of the relay coil is connected to line 356. Movable contact 14RB of this relay is connected to line 357 through switch contact 10SD of switch 10S.

As is shown in FIGURE 19, sort selector switch 358 includes a movable actuator adapted to be set at either an "A" sort, a "B" sort or an "A and B" sort. ("A" represents one field on cards 16, while "B" represents a second field.) This actuator is mechanically interconnected to a plurality of three position switch arms 360, 361, 362, 363 and 364. A positive potential is applied to switch arms 363 and 364 from a power source indicated at 365 through lead 366 containing switch contact 10SA, contact arms 363 and 364 being connected to the stationary contact 367 associated with this contact arm.

It is to be understood that each of the movable contact arms 360–364 engages the left-hand stationary terminal when the sort selector knob is set at "A," the middle stationary terminal when the sort selector knob is set at "A" and "B," and the right-hand terminal when the sort selector knob is set at "B." The middle contact 368 of switch 364 is tied to the end contact 370 of that switch and to the movable contact arm 371 of stepping switch SSA. It is to be understood that movable contact arm 371 of stepping switch SSA, movable contact arm 372 of stepping switch SSB, movable contact arm 373 of stepping switch SSC and movable contact arm 374 of stepping switch SSD are stepped in unison past the stationary contacts of these stepping switches by means of a stepping switch drive unit 375.

This stepping switch drive unit, as shown diagrammatically in FIGURE 19, includes a ratchet wheel 376 mechanically interconnected to each of the movable switching stepping contact arms 371–374. A pawl 377 is effective to advance ratchet 376 step-by-step each time that the stepping switch coil 378 is energized and deenergized. It is to be noted that a self-stepping contact 380 is mechanically interconnected with pawl 377. Coil 378 of the stepping switch drive unit is connected to a negative line as at 379 and is adapted to be connected to a positive power source indicated at 381 through any of six parallel conductive lines 382, 383, 384, 385, 386 and 387.

Line 382 contains series connected contacts 12SA, 13SA, and 14SA. Line 383 contains contact 5SA. Line 384 contains relay contact 15SA, while line 385 contains relay contact 7SA and line 386 contains relay contact 20SA. Line 387 contains contact 11SA. The left and center contacts 388 and 390 of switch 363 are connected together and are joined to movable contact arm 372 of stepping switch SSB. The right-hand contact 391 of switch 362 is connected to self stepping contact 380. Contact 380 is also joined to left-hand contact 392 associated with switch 361. The center and right-hand contacts 393 and 394 of switch 360 are joined to a lead 395 which is in turn connected to one field winding 396 of platen elevator motor 92 and to the coil of hold-in relay contact 15R, the other lead of this coil being connected to a negative line as at 397. A positive connection to relay coil 15R is also made from a power source indicated at 398 through lead 400 and series connected contacts 9SB and 15RB. Power source 398 is also connected through series connected contacts 20SC, 15RA and 9SF to a second winding 401 of platen elevator 92. This winding is also joined to contact SSA–8 through lead 409. A second stationary contact 402 associated with movable contact 15RA is connected to winding 396 through lead 395. The motor armature 403 of motor 92 is connected to the juncture of windings 396 and 401 and to a negative line as indicated at 404.

Movable contact arm 362 is joined to a conductor 405 which is in turn connected to contacts SSA–1 and SSA–9 of stepping switch SSA. Contact SSA–9 is also tied to contacts SSA–10, SSA–11, SSA–12, SSA–13 and SSA–14 of this stepping switch. Movable switch contact 361 is joined to lead 406 which is in turn connected to contact SB–7 of stepping switch SSB. Contact SSB–7 is in turn tied to contacts SSB–1, SSB–2, SSB–3, SSB–4, SSB–5, SSB–6 and SSB–8. Contact SSA–1 is joined through lead 407 to movable contact 360.

Primary platen drive motor 82 is connected to a positive power source 408 through series connected contacts 12SB, 13SB and 14SB. This same terminal of motor 82 is connected to stepping relay contact SSA–2 through lead 410 and series connected contacts 20SB, 7SB, 5SB and 15SB. The second terminal of motor 82 is connected to a negative line as indicated at 411.

One terminal of sort bar cam motor 157 is connected to a negative line indicated at 412 and is connected to a positive power source indicated at 413 through contact 5SC. A parallel connection to the positive terminal of motor 157 is made through lead 414 and contact 13SC to stepping switch contact SSA–3.

Secondary platen drive motor 85 is connected to a negative line as indicated at 415 and is connected to a positive power source as indicated at 416 through contact 15SC. A second connection is made to the positive terminal of this motor through lead 417 and contact 14SC. Lead 417 is also joined to stepping switch contact SSA–5.

Stepping switch contact SSA–7 is connected through lead 418 to stepping switch contact SSB–14 and through contact 12SC and 9SC to the field windings of card collector motor 217. Specifically, stationary contact 420 associated with movable contact arm 9SC is joined to field winding 421, while stationary contact 422 is joined to field winding 423. Another connection to movable contact 9SC is made to positive power source 424 through contact 7SC. The armature 425 of motor 217 is connected to a negative line as indicated at 426 and is connected to the juncture of field windings 421 and 423.

Contact SSA–2 of stepping switch SSA is tied to contacts SSA–4 and SSA–6 of the same stepping switch and is joined through lead 427 to contacts SSB–9, SSB–11 and SSB–13 of stepping switch SSB.

Contact SSA–3 is similarly joined through lead 428 to contact SSB–10. Contact SSA–5 is joined through lead 430 to stepping switch contact SSB–12.

Stepping switch contact SSB–15 is connected to lead 431. This lead is in turn joined to lead 356 and is connected through contact 7SD to winding 432 of lock bar positioning motor 55. A second winding 433 of motor 55 is joined to lead 357. One side of the motor armature 434 is connected to the juncture of windings 432 and 433, while the other side is grounded at 435. Winding 432 is also adapted to be connected to a positive source 436 through contacts 11SB and 10SB.

Movable contacts 373 and 374 of stepping switch SSC and SSD are respectively connected to positive power sources indicated at 473 and 438 respectively. Only contacts SSC–4, SSC–5, SSC–6, SSC–11, SSC–12 and SSC–13 are active on the SSC stepping switch. These contacts are all tied together and are joined to the positive terminal of restack solenoids 190 through contact 5SD. Similarly, only contacts SSD–5, SSD–6, SSD–12 and SSD–13 are active on the SSD stepping switch. These contacts are tied together and are connected to the positive terminal of restack bar solenoids 198 through switch 3SD. The negative terminals of solenoids 190 and 198 are connected to negative lines as indicated at 440 and 441 respectively.

*Operation of generic sort control apparatus*

As an example of the use of the generic sort control apparatus, assume that a researcher is studying the behavior of dielectric fluids in a high electrostatic field. The researcher refers to his code book or classification manual and looks under the heading of "Dielectric Fluids" until he finds a pertinent subheading e.g., "Effect of Electrostatic Field on." Assume that this title is assigned the code number 3253344908. (A card bearing this code is shown in FIGURE 24.) Since there is a possibility that other articles dealing primarily with electrostatic fields may also deal with the effects of fields on dielectric liquids, the researcher should search both the primary coding field "A" and the second coding field "B."

Figure 77:
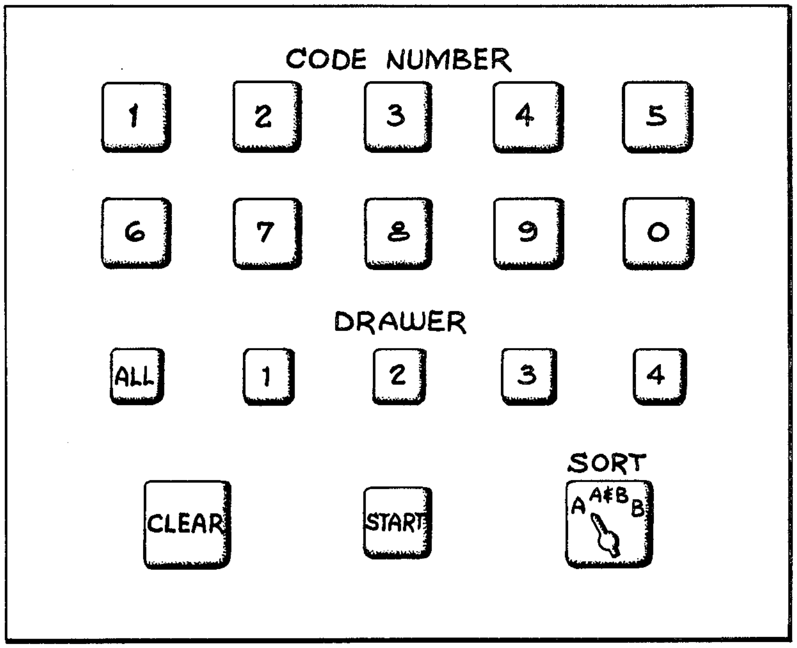
FIGURE 77 is an elevational view of a control panel for a machine adapted to sort in a generic system.
Figure 78:
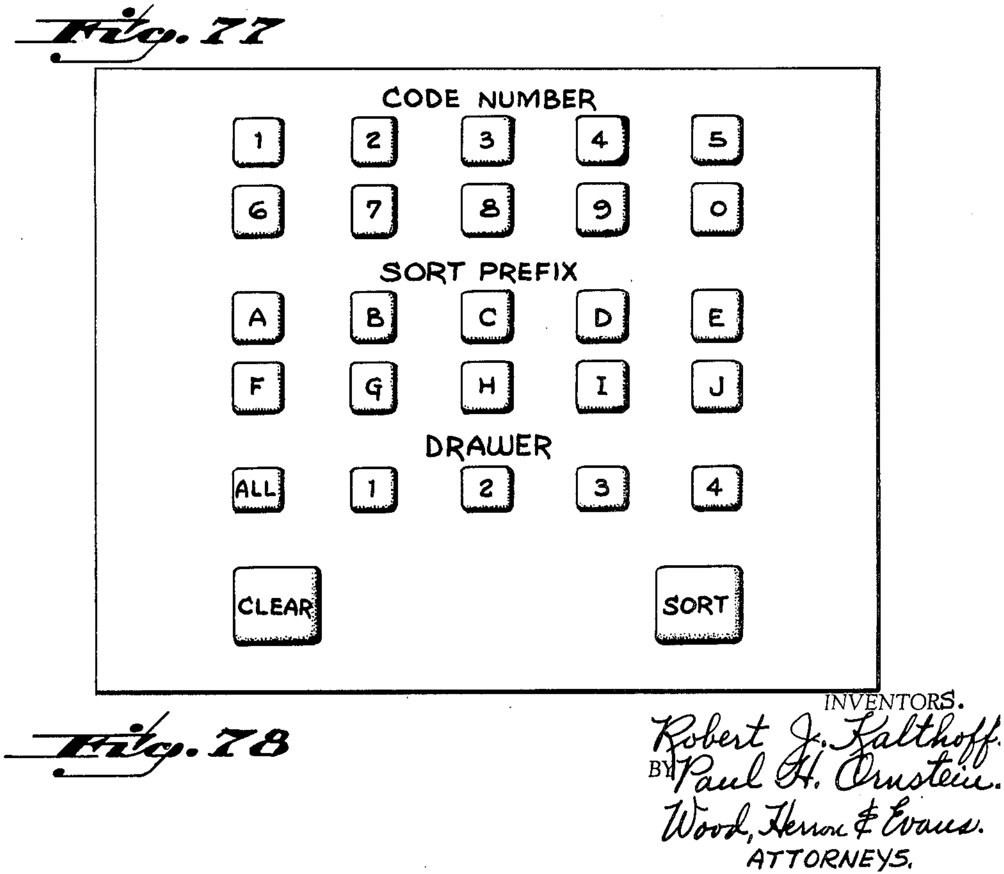
FIGURE 78 is an elevational view of a control panel for a machine adapted to sort in a coordinate system.

The operator would as a first step program the machine with the code number by actuating the code number push buttons PB1 . . . PB0 (FIGURES 77 and 17). The first button pushed would be PB3. When this button is depressed, it closes contact 237 and energizes the relay coil of bar release solenoid BS3. When the bar release solenoid BS3 is released, its plunger is withdrawn and disengaged from shoulder 126 of pusher bar 118. The pusher bar is thus shifted to the right under the influence of spring 128. At this point the digit place cam 125 is disposed so that the arcuate segment of shortest radius is aligned with projection 124. Thus, pusher bar 118 advances to the right until shoulder 124 strikes the peripheral section of shortest radius of the digit place cam. With the pusher bar in this position its movable contact 162 of transfer switch T3 is disposed in engagement with contact T3A.

When push button PB3 is depressed, it also closes contact 247 completing a circuit to the coil of relay 11R. When relay contact 11RB pulls in, it holds relay 11R energized. Since contact 282 is normally closed, when push button PB3 is released, 11RA remains held in. At this time a circuit is completed from the positive power source through line 245, switch contact 276 and relay contact 11RA to the cam drive solenoid 167. This cam drive solenoid advances the digit placed cam shaft 135 by one increment. All of the digit place cams 125 advance with shaft 135 except the digit place cam associated with the "3" sorting bar, which has been locked in place by its engagement with the associated bar 118.

However, when cam drive solenoid 167 is energized, it opens contact 282 which in turn deenergizes relay 11R. (Push button PB3 has been released as indicated above.) At the same time sector 271 of sector switch 21S is advanced into contact with stationary contact 21SA.

The operator then depresses push button PB2 (corresponding to the second digit of the code number). This in turn closes contact 236 and energizes bar release solenoid BS2. When the armature of this solenoid is retracted from engagement with the associated shoulder 126 of the adjacent pusher bar 118, the pusher bar moves to the right under the influence of its spring 128 until it engages the peripheral portion of the second shortest radius of its digit place cam 125. When push button PB2 is depressed, it also closes switch contact 247. This contact energizes relay 11R pulling in hold in contact 11RB. When push button PB2 is released, the cam drive solenoid 167 is energized from line 275 through relay contact 11RA. This cam drive solenoid steps the digit place drive cam unit one step and in turn drives shaft 135 one increment of rotation. At the same time the cam drive solenoid drives the sector 270 of sector switch 21S into engagement with stationary contact 21SB. Also when solenoid 167 is energized, it opens normally closed contact 282 to de-energize relay 11R. Since the push bar 118 associated with the "2" selector bar is advanced only to its second position, movable contact 162 of transfer switch T2 stops an engagement with stationary contact T2B.

When the third digit is programmed in the machine by depressing push button PB5, the same sequence of operation occurs so that the pusher bar 118 associated with the "5" selector bar is advanced until it engages the third peripheral section on cam 125. The digit place cam associated with this bar is thus locked in place and the cam drive shaft 135 is subsequently stepped one more increment of rotation.

The fourth digit of the code number is a repeated three. When the operator again presses push button PB3, switch 237 is closed energizing bar release solenoid BS3. However, when this solenoid is actuated, it performs no mechanical function, since shoulder 126 of the pusher bar 118 associated with the bar release solenoid BS3 has already advanced into engagement with its associated digit place cam 125. Since the movable contact 162 of the three transfer switch TR3 has been locked into engagement with stationary contact T3A, a circuit is completed from closed contact 237 through line 260 to the bar release solenoid associated with the A transfer bar, solenoid BSA. It is to be noted that the return lead of solenoid BSA is connected to the contact 21SA of sector switch 21S. A connection to ground is completed from this contact through section 270.

At the same time that PB3 closed switch 237 it also closed switch 247 energizing relay 11R, closing its associated contacts 11RA and 11RB. When the push button PB3 was released, opening switches 237 and 247, cam drive solenoid 167 was energized to step cam shaft 165 and also to advance the sector 270 of sector switch 21S.

Since the digit place cam 125 associated with the "A" selector bar is positioned so that its peripheral portion of the fourth shortest radius abuts the lug 124 formed on the pusher rod 118 associated with the "A" selector bar, the "A" pusher bar 118 is advanced to the right under the influence of spring 128 until it reaches its fourth position from the right, the movable contact 162 of the A transfer switch i.e. transfer switch TA, advances until it is in engagement with the stationary contact TAD.

When the operator programs the next digit, which is another 3, he again presses push button PB3. In other words the operator has no concern whatsoever as to whether a digit is repeated or in fact how many times it may be repeated. He merely presses the correct digit push buttons in their proper sequence and the machine automatically takes care of any digit transfers. When the operator presses push button PB3 for the third time, it again closes contact 237 and energizes bar release solenoid BS3. However, the energization of bar release solenoid BS3 has no effect since the shoulder 126 of the associated pusher bar 118 has already advanced beyond the position in which it is retained by the bar release solenoid.

At the same time, however, a circuit is completed through movable contact 162 of transfer switch T3 to contact T3A. This contact is connected to a lead 260 which energizes the bar release solenoid BSA. The second lead of this solenoid being grounded through stationary contact 21SA and grounded sector 270 of sector switch 21S. Again, however, the energization of the bar release solenoid BSA has no effect since the hold bar 118 associated with that solenoid has advanced to a position beyond engagement with the armature of the bar release solenoid.

It will be recalled that when the bar release solenoid was locked in place by its engagement with its associated digit place cam 125, stationary contact of the TA transfer switch was disposed in engagement with stationary contact TAD. Thus, when power is applied to line 260 on the closure of switch 237, that signal is also transferred through contact 162 of the TA transfer switch to contact TAD. This contact is in turn connected to line 63. When this line is energized, it completes a circuit to the bar release solenoid BSD, since the second lead of this solenoid is grounded through contact 21SD, which is then engaged by sector 270 of sector switch 21S.

When push button PB3 is actuated for the third time, it also closes switch 270, pulling in relay 11R. When the push button PB3 is released, a circuit is completed to the cam drive solenoid 167 through contact 11RA. The cam drive solenoid is thus advanced one additional increment bringing sector switch 270 into contact with stationary contact 21SE. The remaining code numbers are programmed into the machine by serially pressing the push buttons PB4, PB4 again, PB9, PB0 and PB08. These push buttons result in the positioning of the pusher bars respectively associated with the "4," "F," "9," "0," and "8" selector bars in the same general manner described above.

Since it is desired to assort both the A and B fields, sort selector switch 358 is shifted to the A and B position shown in FIGURE 19. Also assume that it is desired to search all drawers. Consequently the DSA button is depressed. After the code numbers have been programmed into the machine, the operator is ready to start the sort and consequently depresses the start button to 285. This closes the associated contact and energizes relay R12. When relay R12 is energized, it pulls in its own hold-in contact 12RA. It is to be noted that contact 87A in series with relay R12 is a normally closed contact. When relay contact 12RB is closed, it completes a circuit from power source 294 through normally closed contacts 4SB, 3SB, 2SB and 1SB to "down" winding 290 of elevator motor 54, armature 292 being grounded through contact 11SD. The elevator is then driven downwardly by this motor until its abutment finger 59 actuates switch 1S opening that contact 1SB to deenergize winding 290.

When switch 1S is actuated, contact 1SA which is normally open is closed. This completes a circuit through normaly closed contact 13RE of relay 13R, contact 330 of push button DSA and switch contact 1SA to lead 318. This lead is connected to contacts 321 and 322 associated with relay 14R. Contact 322 is normally closed and when a potenital is applied to the lead 318, a circuit is completed through closed contact 14RB and normally closed contact 10SD to lead 357. This energizes "out" winding 433 of lock-up motor 55. When this motor is energized, the two bars 49 are shifted outwardly until plungers 50 enter the slots 48 in the rails 47. When the bars are fully advanced, they open "out" limit switch 10S. This opens contact 10SD and deenergizes "out" winding 433 of motor 55.

It is to be understood that with selector switch 358 in the A and B position the contacts 364, 363, 362, 361 and 360 engage their associated center taps as shown in FIGURE 19. When the switch 10S is actuated normally opened contact 10SA is closed. This completes a circuit through contact 363 to movable contact wiper 371 of stepping switch SSA. This contact wiper is, at the beginning of the cycle, in engagement with stationary contact SSA1. Consequently, a circuit is established through this stationary contact and contact arm 360 to the coil of relay 15R and to the "down" winding 396 of sorting bar elevator motor 92. The sorting bar elevator motor then rotates the bar elevator screws 91 to lower the carrier frame 88 of the sorting platen downwardly until the selector bars are in alignment with the notches of the B field in cards 16. When relay 15R is energized, it pulls in contact 15RA. This completes a second circuit to downwinding 396 from power source 398 through contact 20SC of switch 20S. This contact is normally open but is closed as soon as motor 92 rotates from its home position. Motor 92 continues to lower the sorting bar carrier frame 88 until one revolution is made of the cam finger 105 which actuates switch 20S. At the completion of this one revolution the switch 20S is opened to de-energize the sorting bar elevator motor 92.

When switch 20S is initially actuated, upon rotation of motor 92 contact 20SA was closed to complete a circuit from power source 381 to stepping magnet 378 and the stepping switch drive unit 375. This steps ratchet wheel 376 one position and advances the movable contact arms 371, 372 and 373 and 374 of stepping switches SSA, SSB and SSC and SSD into engagement with contacts SSA2, SSB2, SSC2 and SSD2 respectively. When movable contact 371 of stepping switch SSA is brought into engagement with contact SSA–2, it completes a circuit through contact 20SB (which is closed after the sorting bar driven motor 92 has driven the sorting bar carrier frame downwardly into the B sort position) normally closed contact 7SB, normally closed contact 5SB, and normally closed contact 15SB to primary platen driven motor 82.

Primary platen drive motor 82 then drives the platen inwardly toward the cards. As soon as primary platen drive motor 82 starts to rotate, the projection on disc 83 becomes disengaged from switch 12S, normally open switch contact 12SB closes to complete a holding circuit to motor 82. As soon as switch 12S is actuated, it closes normally open contact 12SA to complete a circuit from power source 381 to stepping magnet 378. This magnet advances the movable contact arms 371, 372, 373 and 374 one position into engagement with contacts SSA–3, SSB–3, SSC–3 and SSD–3 respectively.

When primary platen drive motor has advanced the platen in to compress the cards against the rear wall of the compartment and subsequently to withdraw the cards to the sorting position, switch 13S is actuated. This opens contact 13SB de-energizing primary platen drive motor 82. At the same time, when switch 13S is actuated it closes contact 13SC to complete a circuit to the sort bar cam drive motor 157. When this motor is driven, shafts 146 and eccentric cams 145 are rotated. These cams force vertical hollow members 142 and 143 against the ends of pusher bars 118. These pusher bars are in turn forced into engagement with the stepped portions 122 disposed at the ends of their associated sorting bars. The sorting bars are thus projected outwardly from the platen and selectively reject all cards not having the code number 3253344908 notched on their sorting edges in the B field. The nonrejected cards are retained in engagement with the platen because of the attraction of the magnet 22 with the ferro-magnetic implants provided on each of the cards.

When the cam drive motor 157 is energized, it actuates switch 5S closing contact 5SB to establish a conductive path from power source 413 to motor 157. At the same time, contact 5SA is closed to complete a circuit from power source 381 to stepper 378 of switch drive unit 375. This advances movable contacts 371, 372, 373 and 374 into engagement with contact SSA–4, contact SSB–4, contact SSC–4 and contact SSD–4 respectively. As soon as motor 157 has rotated the drive cams 145 one complete revolution so that the bars have advanced their maximum distance and have retracted to their home position, contact 5SC is opened to de-energize motor 157.

Figure 35:
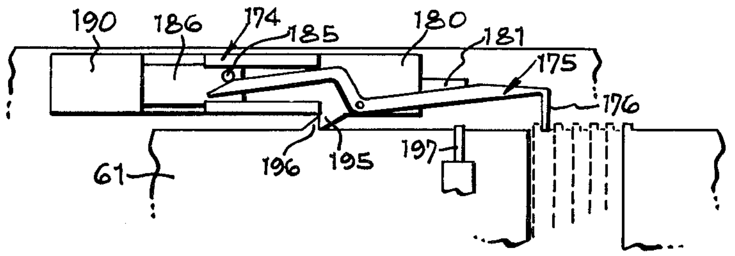
FIGURE 35 is a semi-diagrammatic view similar to FIGURE 32 showing the sorting bar in its lowered position following the initial card separation.
Figure 36:
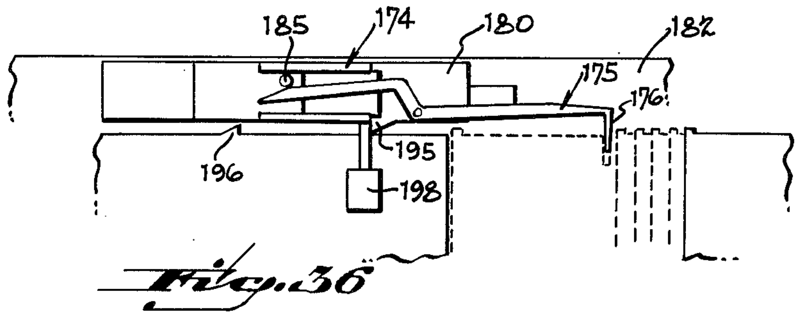
FIGURE 36 is a semi-diagrammatic view similar to FIGURE 32 showing the restack bar entering the restack slot of the selected cards.

At the same time, contact 5SB is closed to re-energize primary platen drive motor 82. As soon as motor 82 starts to withdraw the platen from the sorting position, a circuit is completed to restack elevating solenoids 190 through contact 5SD. It is to be understood that the restack bar 175 drops behind the tabs 32 of the selected cards and in front the tabs 32 of the rejected cards prior to the time that motor 82 is effective to retract the platen from its sorting position. This action of the restack bar is best shown in diagrammatic views 33–39. When solenoids 190 are energized, they retract plates 186 and pins 185 allowing the bar 175 to drop as shown in FIGURE 35. Further rotation of motor 82 functions to retract the platen to a position in which the restack bars 175, which slide along edge portions 31 of the cards, are disposed above restack slots 30 in the cards 16. As the sorting platen is withdrawn beyond the sorting position, normally open contact 13SB is closed to complete a holding circuit to motor 82. At the same time, normally open contact 13SA is closed to complete a circuit from power source 381 to stepping switch 378. This causes contacts 371, 372, 373 and 374 to be advanced one position into engagement with contacts SSA–5, SSB–5, SSC–5 and SSD–5 respectively. When the platen is retracted to the position shown in FIGURE 36 with the restack bar inserted in the restack slots 30, switch 14S is actuated to open contacts 14SB de-energizing motor 82. At the same time contact 14SB closes energizing restack hold magnet solenoids 198. This projects the restack solenoid armature S197 into engagement with the shoulder S195 formed on the slide bar 180 of the restack bar assembly.

Figure 37:
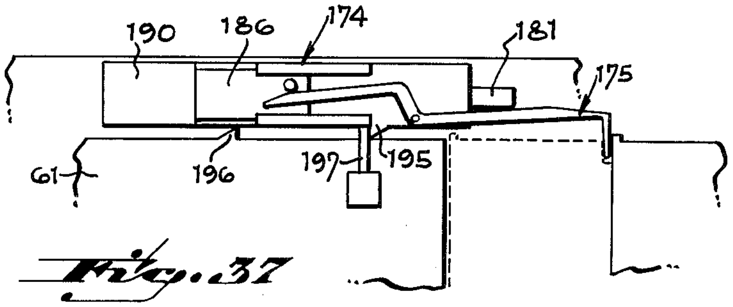
FIGURE 37 is a semi-diagrammatic view similar to FIGURE 32 showing the manner in which the restack bar is effective to return the rejected cards to their position against the rear wall of the storage compartment.

At the same ime contact 14SC closes completing a circuit to secondary platen drive motor 85. As soon as motor 85 starts to rotate, contact 15SC closes completing a hold-in circuit to the motor from power source 416. Contemporaneously, contact 15SA completes a circuit from power source 381 to stepping switch magnet 378. This causes stepping switch drive 375 to advance contacts 371, 372 and 373 and 374 into engagement with contacts SSA–6, SSB–6 SSC–6 and SSD–6 respectively. When motor 85 is actuated, the platen is advanced inwardly (as shown in FIGURE 37) until the rejected cards are forced by the restack bar against the rear wall of the card compartment. As motor 85 continues to rotate, the platen is retracted to its position before motor 85 was energized. As soon as the platen is returned to this position, i.e., when motor 85 has driven disc 86 through one complete revolution, contact 15SC is opened to de-energize motor 85. Subsequently, when contact 15SB is closed, motor 82 is re-energized to start the complete withdrawal of the selected cards.

Figure 38:
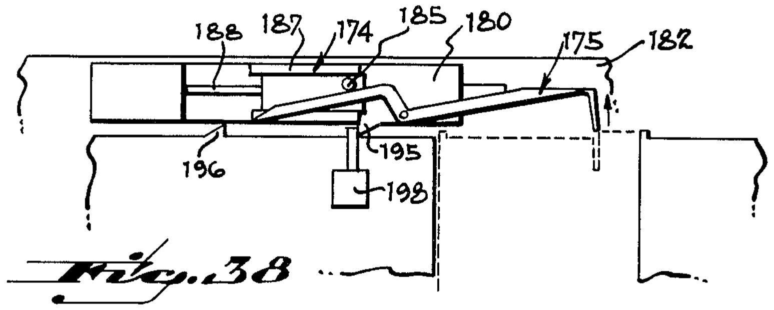
FIGURE 38 is a semi-diagrammatic view similar to FIGURE 32 showing the restack bar being withdrawn from the restack slots of the selected cards as these cards are withdrawn under the influence of the platen magnet.
Figure 39:
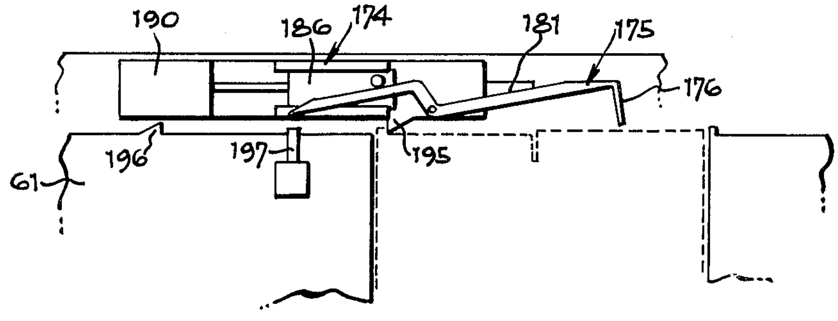
FIGURE 39 is a semi-diagrammatic view similar to FIGURE 32 showing the restack bar raised above the selected cards as these cards are in their completely withdrawn position.

At the same time, contact 15SA is closed to complete a circuit to stepping switch magnet 378 which causes movable contacts 371, 372, 373 and 374 to be advanced into engagement with stationary contacts SSA–7, SSB–7, SSC–7 and SSD–7 respectively. This results in the de-energization of solenoids 190 and 198. The restack bar is raised when solenoids 190 are de-energized allowing plates 180 to be shifted forwardly under the influence of springs 191 (FIGURE 38). When motor 82 has completely retracted the platen to effect a complete disengagement of the selected cards, switch 12S is actuated opening contact 12SB to de-energize motor 82. At the same time contact 12SC is closed to energize the card collector drive motor 217 through contact 9SC which is in series with the "advance" winding 421 of the card collector motor. When the card collector motor leaves its rear position, switch 7S is actuated. This establishes a hold-in circuit to winding 421 through contact 7SC. At the same time contact 7SA is closed to complete a circuit to stepping magnet 378 of drive unit 375. This steps contacts 371, 372, 373 and 374 into engagement with stationary contacts SSA–8, SSB–8, SSC–8 and SSD–8 respectively.

Figure 46:
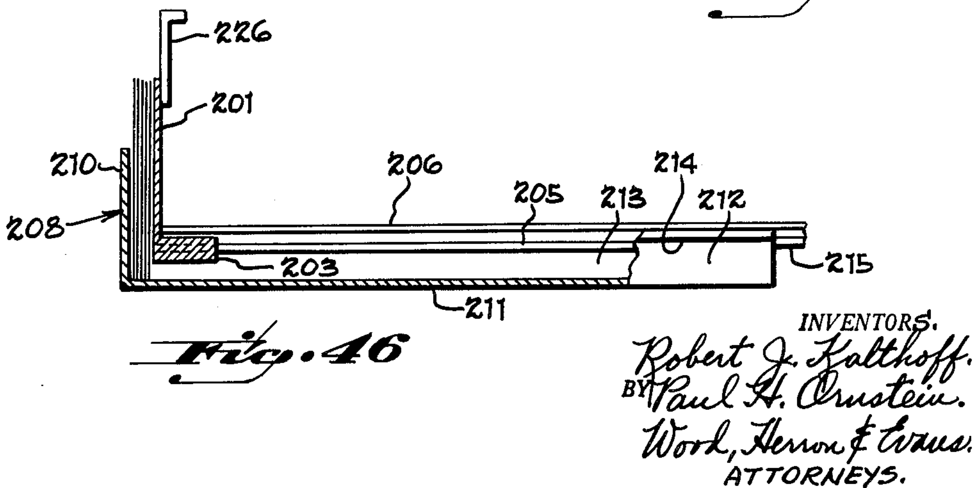
FIGURE 46 is a longitudinal cross sectional view through the elevator tray and pusher plate guide.

When the card collector plate is advanced, it sweeps all of the selected cards from contact with the platen magnet. These cards are dropped into the tray 208 as is shown in FIGURE 46. At the forward extreme position of the card collecting plate 201, limit switch 9S is actuated to bring contact 9SC into engagement with stationary contact 422. This completes a circuit to the "retract" winding 423 of motor 217. Thus, the card collecting drive is reversed and plate 201 is returned to its rear, or retracted position. When the card collecting plate reaches its retracted position, switch 7S is actuated to open contact 7SC de-energizing motor 217. At the same time, switch 9S is returned to its open position as is shown in FIGURE 19.

When switch 9S is actuated, a circuit is completed to the "up" winding 401 of the sorting bar elevator motor 92 through contact 9SF, the sorting bar elevating motor rotates the elevating screws 91 to raise carrier frame 88 until the sorting bars are aligned with the notch sites of the A field in card 16. Also when the 9S switch was actuated, contact 9SB opens, opening the hold-in circuit to relay 15R and dropping out that relay. This also establishes a holding circuit from power source 398, relay contact 20SC, relay contact 15RA to winding 401 of the sorting bar elevator motor 92. When motor 92 starts to rotate, switch 20S is actuated closing contact 20SA to complete a circuit to stepping magnet 378. This causes switch drive 375 to advance contacts 371, 372 and 373 and 374 into engagement with contacts SSA–9, SSB–9, SSC–9 and SSD–9 respectively. As soon as motor 92 has completed its cycle, switch 20S is again actuated. This closes contact 20SB and starts to advance the platen toward the cards in the drawer. The exact sequence of operation as described above is then repeated and a sort is made in the A field. At the conclusion of the sort in the A field, stepping switches SSA, SSB, SSC and SSD respectively have their movable contacts 371 . . . 374 in engagement with contacts SSA–14, SSB–14, SSC–14 and SSD–14.

When at the conclusion of the "B" sorting cycle the card collecting mechanism has advanced card collecting plate 201 and has retracted the card collecting plate to its retracted position, switch 7S is actuated closing contact 7SB to energize the "in" winding 432 of lock-up motor 55. This retracts the locking plungers 50 from engagement with the slots in the elevator guide rails. Contact 7SA when closed completes a circuit to stepping switch coil 378 advancing contact arms 371–374 into engagement with contacts SSA–15, SSB–15, SSC–15 and SSD–15. When the lock bars leave their outermost position, contact 10SB is closed. This contact in conjunction with normally closed contact 11SB completes a hold-in circuit to winding 432. When the bars have been completely retracted, "in" limit switch 11SB is actuated opening the circuit to winding 432. When switch 10S was actuated, it opened contact 10SA de-energizing the power supply to the various platen motors. However, when movable contact 372 of stepping switch SSB is in engagement with SSB–15, a circuit is completed to the relay 14R and contact 14RA is closed to complete a holding circuit to that relay. When relay 14R is energized, it also is effective to open contact 14RB de-energizing the "out" winding 433 of motor 55 so that when out limit switch 10SD closes, it will have no effect. When switch 11S is subsequently actuated, contact 11SA is closed to energize stepping magnet 378 to advance the movable contacts 371–374 of stepping switches SSA, SSB, SSC and SSD back to their starting positions in respective engagement with contacts SSA–1, SSB–1, SSC–1, and SSD–1.

When contact 11SC closes, it completes a by-pass circuit around switch 1SB to energize elevator motor "down" winding 290 causing the elevator to be driven downwardly into alignment with the second drawer. When the elevator leaves its aligned position with drawer 1, it actuates switch 1SA, opening contact 1SA to drop out relay 14R. That conditions the circuit for operation when the elevator reaches the second level at which time it actuates the switch 2S. At this time, levelling switch 2SB opens, de-energizing elevator motor 54. At the same time contact 2SA is closed and the sort cycle is repeated for the second drawer in the same manner that it was carried out for the first drawer. This same sequence of operation is continued for the third and fourth drawers.

At the conclusion of the sort of the fourth drawer, elevator motor 54 is again energized to drive the elevator downwardly. At this point reversing switch 8S is actuated, causing "up" winding 291 to be energized through contact 8SB causing motor 54 to be driven in the opposite direction to bring the elevator back to its uppermost position. When switch 8S is actuated, contact 8SC completes a circuit to the bar reset solenoid 114 and the digit place cam reset solenoid 172. This retracts the pusher bars 118 to their left-hand position and returns the shaft 135 to a position in which all of the digit place cams have their arcuate segments of shortest radius disposed for engagement with abutments 124 of the pusher bars 118. Also, when switch 8S is actuated, contact 8SA is opened to de-energize relay coil 12R. When relay 12R is energized, contact 12RB is shifted to open the circuit to the "down" winding to the elevator motor 54. Consequently, when the elevator arrives at the uppermost position of its travel, and switch 8S is again actuated, the motor remains deenergized and the elevator stays at its uppermost position and is not driven downwardly.

If it is desired to sort the cards coded only in the B field, the machine is programmed with the numbers in the manner explained above. Switch 358 is set on the B setting (its right-hand position in FIGURE 19). This causes switch arms 360, 361, 362, 363 and 364 to be shifted into engagement with their right-hand contacts. After the code number has been programmed, start button 285 is depressed. The elevator is shifted into alignment with the first drawer and locking motor 55 forces locking plungers 50 outwardly until they actuate "out" limit switch 10S in the manner described above.

The sort bar elevator motor 92, cam motor 157, primary and secondary platen motors 82 and 85 and card collector motor 217 are then sequentially actuated in the manner described above. When the card collector motor has advanced the card collector plate to sweep all of the cards from contact with the platen magnet, and has retracted plate 201 to its rearward position, switches 7S and 9S are actuated. At this time contacts 371, 372, 373 and 374 are respectively in engagement with contacts SSA–8, SSB–8, SSC–8 and SSD–8. When switch 9S is actuated, a circuit is completed to "up" winding 401 of sorting bar elevator motor 92. The sorting bar elevator motor raises the carrier frame 88 until the sorting bars are aligned with the uppermost field, or "A" notch sites. Motor 92 is driven through a hold-in circuit from power source 398 as is described above.

When the motor 92 starts to rotate, it actuates switch 20S closing contact 20SA to complete a circuit to stepper coil 378. This coil advances contacts 371, 372, 373 and 374 into engagement with contacts SSA–9, SSB–9, SSC–9 and SSD–9 respectively. When contact 371 engages contact SSA–9, a circuit is completed from power source 375 through contacts 10SA and 364, contact wiper 371, lead 405, contact 362 and lead 391 to interrupter contact 380 and through this contact to stepper coil 378. When stepper coil 378 is energized, it steps contacts 371, 372, 373 and 374 into respective engagement with contacts SSA–10, SSB–10, SSC–10 and SSD–10. At the same time, interrupter contact 380 is momentarily opened and then closed. Magnet 378 is reenergized to step switch 371–374 one more contact. This continues until each of the stepping switch arms 371–374 is stepped around to engagement with contacts SSA–15, SSB–15, SSC–15 and SSD–15. None of the motors are actuated during this stepping operation. When the stepping switch contacts reach the "15" contact position, the locking bar motor 55 is energized to withdraw the locking bar plungers from engagement with the openings in the elevator rails. The elevator is then driven downwardly to the next drawer and the sorting cycle repeated in the manner described above.

Assume that it is desired to make only an A sort. In this case, the code numbers are initially coded in the manner previously explained. Switch 358 is set on the B setting, i.e. the left-hand setting in FIGURE 19. When the switch is thus positioned, movable contacts 360, 361, 362, 363 and 364 are shifted into engagement with their left-hand contacts.

When start button 258 is depressed to start the sorting operation, the elevator is brought into alignment with the first drawer and the locking plungers are advanced as explained above. When the locking plungers trip the outer limit switch 10S, contact 10SA is closed to complete a circuit through movable contact 372 to stationary contact SSB–1. This stationary contact is in turn joined through lead 406, movable contact 361, lead 392 and interrupter contact 380 to coil 378 of stepper switch unit 375.

When this coil is energized, each of the stepping switch movable contacts 371–374 is stepped to the second contact, i.e., contacts SSA–2, SSB–2, SSC–2 and SSD–2 respectively. At the same time, interrupter contact 380 is momentarily opened and then closed. Stepper coil 378 is alternately energized and deenergized to automatically step the contact arms of switches SSA, SSB, SSC and SSD to contacts SSA8, SSB8, SSC8 and SSD8 respectively. Since the switch SSA is deenergized, none of the motors 82, 85, 92, 157 or 217 is energized. The sorting bars are already aligned with the notches of the A field, this step having been accomplished as the last step of the preceding sort. When, in the next step, the stepping switch contacts are automatically stepped to their ninth position through the circuit completed from contact SSB–8 and interrupter contact 380 to stepping coil 378, contact 372 engages contact SSB–9. As a consequence, the main platen motor 82 is energized to advance the platen toward the cards. From this point, a sort is made in the A field in the same manner as the sort in the A field previously described as part of the "A" and "B" sort.

Assume that it is desired only to search the first drawer. In that event the DS1 push button is depressed (the drawer buttons in FIGURE 20 are shown in this condition). Subsequently, when start button 285 is depressed, relay R12 is energized. This completes a circuit through normally closed contacts 1SB, 2SB, 3SB, and 4SB and contact 12RB to the winding 290 of the motor 54. This motor is rotated to drive elevator motor 54 in a "down" direction until levelling switch 1S is actuated. Upon actuation of switch 1S, contact 1SB is open and contact 1SA is closed. A circuit is thus completed to contact 1SA from power source 294 through normally closed relay contact 13RE and contact 316. Power is thus applied through contact 1SA to contacts 321 and 322. This initiates the sort cycle of drawer "1" as was explained above.

At the conclusion of the sorting of drawer "1," contact 11SC is closed to complete a circuit through normally closed contact 10SC, relay contact 14RA, contact 1SA, contact 33, and relay contact 13RE to reenergize "down" winding 290. Once the motor has left the first drawer, switch 1SB closes and switch 1SA opens. The motor then remains energized through contact 1SB. When switch 2S is actuated to open contact 2SB and close contact 2SA, the circuit to 2SA is open both at contact 336 associated with the "all" push button DSA and contact 333 associated with the "2" push button DS2. Consequently, no power is applied through contact 2SA to initiate a sorting operation.

Also, swiches 2SB, 3SB, and 4SB are by-passed so that power is continuously applied from source 294 through lead 300, normally closed contacts 327, 326, 325 and 320 and switch contact 1SB to "down" winding 290. The motor thus continues to drive the elevator downwardly through the third and fourth drawer levels, the actuation of switches 3S and 4S being ineffective to start a sorting cycle. When the elevator reaches its lower limit, reverse switch 8S is actuated causing "up" winding 291 to be energized through contact 8SB. The elevator motor is then returned to its uppermost position in the manner explained previously.

*Card coded in coordinate system*

Figure 47:
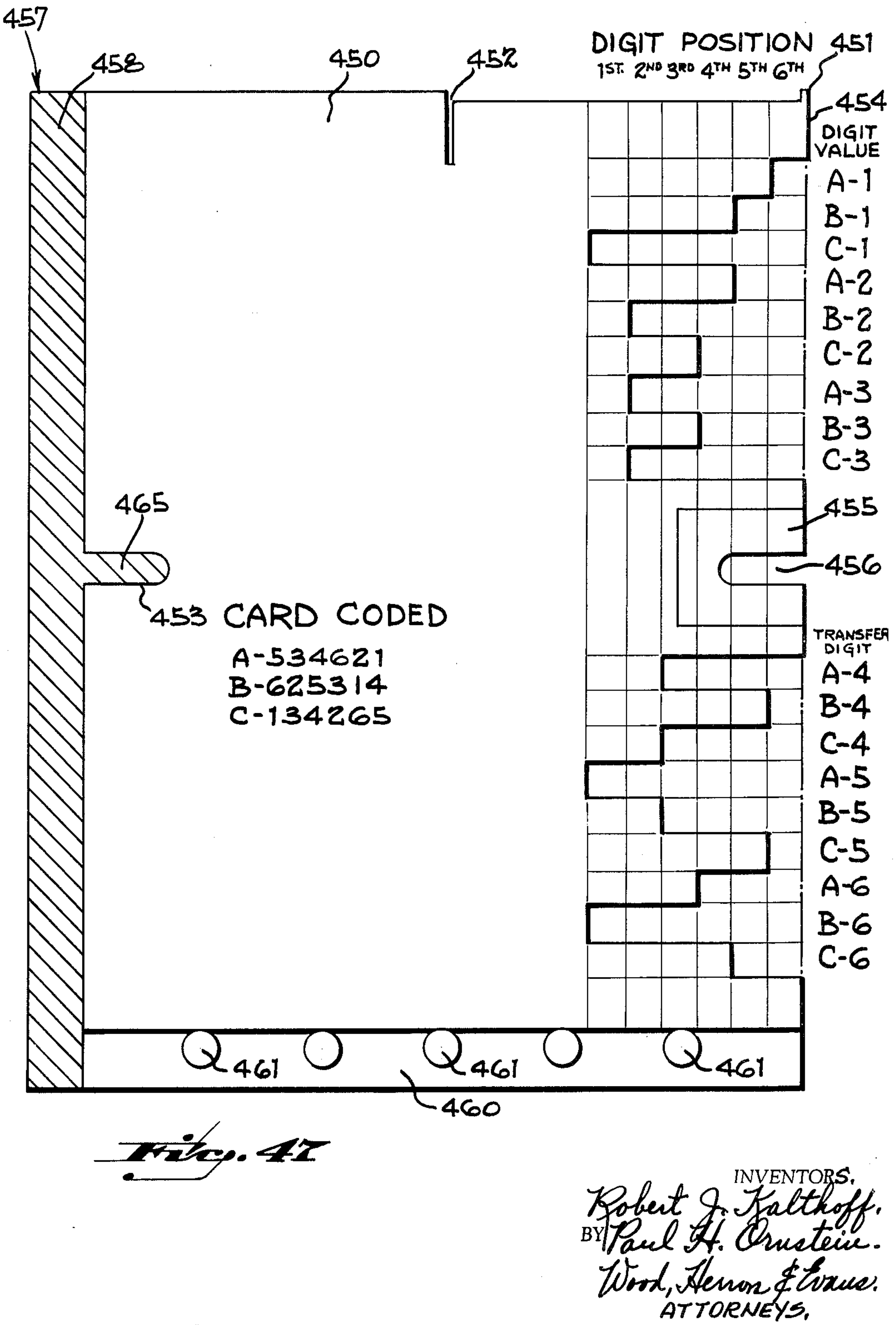
FIGURE 47 is a diagrammatic view showing a card coded in the coordinate system placed in the storage compartment.

One card 450 coded in the coordinate, or descriptor, system is shown in FIGURE 47. It is to be understood that cards 450 are generally like the cards 16 described above. That is, cards 450 are generally rectangular and include a tab 451, a restack slot 452, an aligning slot 453, a sorting edge 454, and a ferromagnetic implant 455 having a slot 456. The flat surfaces of card 450 are adapted to carry printed abstracts, micro-images or any other suitable form of information.

The principal difference, between card 450 and the record card 16 is that card 450 is not coded in a hierarchical system, but rather is coded in a descriptor or coordinate coding system in which individual descriptors of the information carried by the card are coded along sorting edge 454. It is contemplated that in actual practice a card, such as card 450, can be coded with up to ten descriptors. It is to be expressly understood that the showing of FIGURE 47 is purely diagrammatic with the size of the notches being greatly enlarged for clarity. Also to further simplify the disclosure, only three descriptors are shown on the card and these descriptors utilize only six digits instead of the eight contemplated.

In order to provide a maximum number of sorting fields and hence possible descriptors along sorting edge 454, a factorial coding system, rather than a decimal coding system, is employed in coordinate coding. In the specific card shown in FIGURE 47, the code numbers are six digit code numbers utilizing the digits 1, 2, 3, 4, 5 and 6. The various permutations of these six digits are used to provide the code numbers for the descriptors. In this system, no digit is repeated. Hence, the need for transfer notch sites to accommodate repeated digits is eliminated.

The basic method of notching the cards to code the numbers, however, is retained. That is, the notch sites still correspond to digit value, while the notch depth relates to digit position. For example, consider the A field in card 450. This field comprises a plurality of spaced notch sites along the card corresponding to the digit values 1, 2, 3, 4, 5 and 6. These notch sites are labelled A–1, A–2, A–3 . . . A–6 in FIGURE 47. As was explained above, each of the notch sites is notched to an incremental depth in accordance with the position of the digit in the code number. Thus, in the specific card shown, the deepest notch in the A field is made in the notch site A–5. This indicates that the first digit of the A code number is "5." The second deepest notch in the A field is made in the notch site A–3. Thus, the second digit is "3." The third deepest notch in the A field is made in the notch site A–4. Thus, the third digit is "4." The fourth deepest notch is made in the A–6 notch site. Consequently, the fourth digit is "6." Similarly, the next deepest notch is made in the A–2 notch site so that the fifth digit of the code number is "2." The shallowest notch in the A field is made in the A–1 notch site so that the last digit is "1." Thus, the complete code number is 534621.

In a similar manner, the B field is coded with the number 625314 and the C field is coded with the number 134265. It is to be noted that the notch sites in the B and C fields are interposed between the corresponding notch sites of the A field and the corresponding notch sites of each of the three fields are disposed in the same position relative to the remaining notch sites of the respective fields. Thus, the B–1 notch site is disposed beneath and adjacent to the A–1 notch site, the B–2 notch site is disposed beneath and adjacent to the A–2 notch site and so forth. Simialrly, the C–1 notch site is disposed beneath and adjacent to the B–1 notch site, the C–2 notch site is disposed beneath and adjacent to the B–2 notch site and so forth. As explained below, this facilitates searching all fields with a single set of sorting bars which are shiftable along the sorting edges of the cards into alignment with the various fields of the cards.

As an example of the manner in which the coordinate type code might be employed, assume that the card shown in FIGURE 47 contains a micro-zerographic image of an article dealing with a method of treating whiplash injuries using a prosthetic appliance effective to hold the injured person's neck in hyperextension. Three descriptors of that article could be coded on the card as follows: the A code number 534621 may correspond to the descriptor "treatment," the B code number 625314 may correspond to the descriptor "whiplash," while the code number in the C field 134265 may correspond to the descriptor "hyperextension."

*Method of retrieval of coordinate system*

The method of retrieving cards of the type shown in FIGURE 47 is diagrammatically shown in FIGURES 48–55. As there shown, assume that it desired to retrieve cards coded with the same coding as the cards shown in FIGURE 47, i.e., cards coded A534621, B625314 and C134265. In accordance with the present method, a stack of cards, including cards bearing the desired coding, is stored in random order in a compartment 457.

This compartment includes a rear abutment such as wall 458 adapted to engage the rear edges of the cards and a bottom wall 460 which may be provided with a plurality of rollers, such as rollers 461, to facilitate outward withdrawal of the cards. In order to facilitate an understanding of the sorting method, one particular card 462, coded in the desired way, is shown as the front card in the compartment. It is to be understood, however, that the present method is effective to withdraw any cards bearing the selected code disposed in any position with the compartment.

Figures 48, 49, 50, 51:
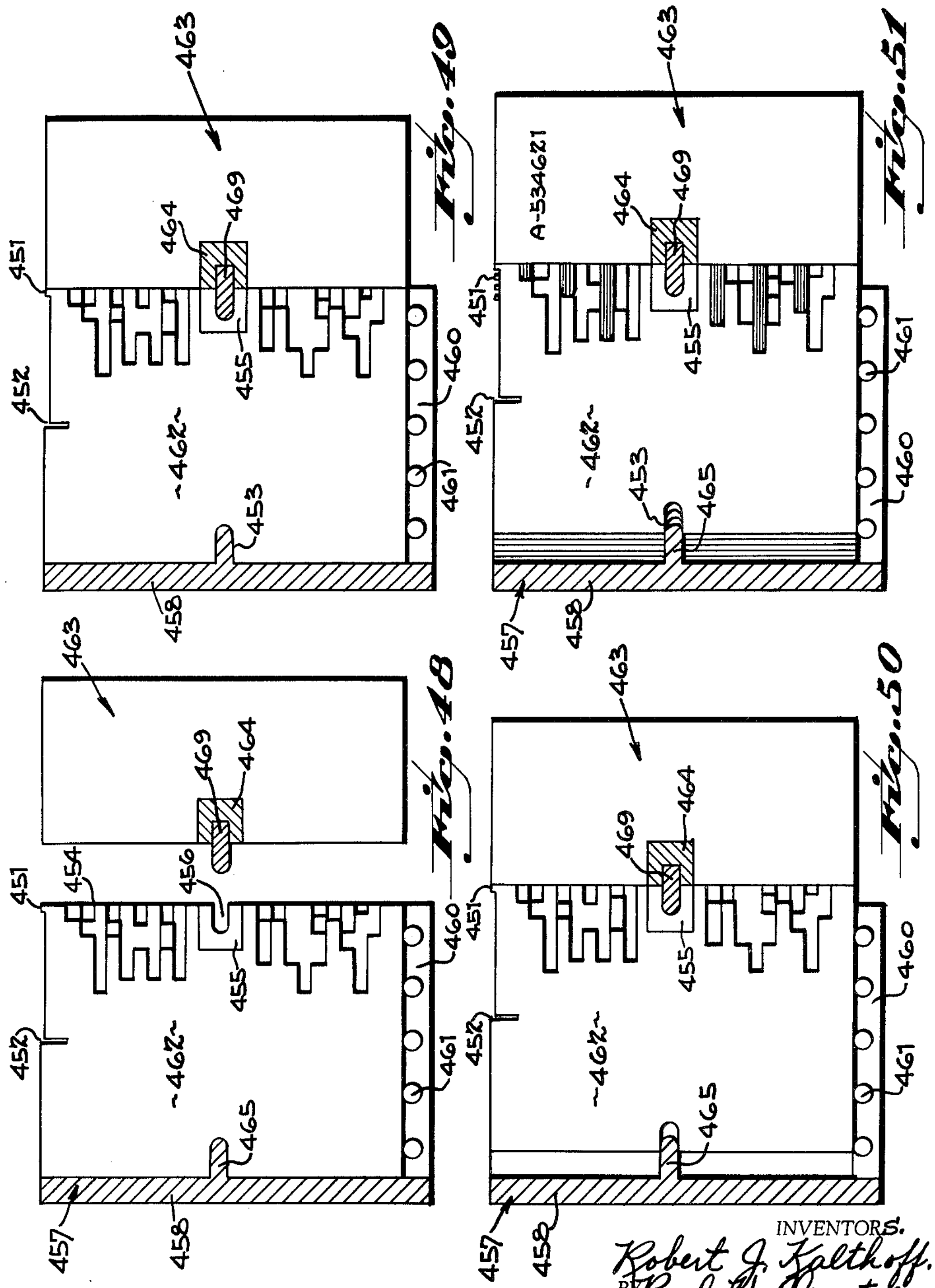
FIGURE 48 is a diagrammatic view of the sorting platen and cards at the beginning of a coordinate sort.
FIGURE 49 is a diagrammatic view similar to FIGURE 48 showing the sorting platen advanced into contact with the cards.
FIGURE 50 is a view showing the sorting platen and cards withdrawn to the sorting position.
FIGURE 51 is a diagrammatic view with the bars extended to sort the "A" field.

In the initial step of the sorting method, the cards are disposed against the rear wall of the drawer as is shown in FIGURE 48. A sorting platen 463, which carries an elongated magnetic element 464 and a thin positioning member 469 disposed to enter the slots 456 of ferro-magnetic implants 455, is initially spaced from the cards. In the first step of the sorting method, as is shown in FIGURE 48, the sorting platen 463 is advanced against the cards. This aligns the cards and brings them into engagement with the magnetic element carried by the platen. In the next step of the sorting operation, all of the cards are withdrawn in unison to a sorting position as is shown in FIGURE 50.

The bars carried by the sorting platen are disposed at elevations corresponding to the A notch sites. Next, the bars are extended from the platen at varying incremental distances in accordance with the desired A code number. Thus, as is shown in FIGURE 51, the "5" card sorting bar is projected six incremental distances, the "3" sorting bar is projected five incremental distances, the "4" sorting bar is projected four incremental distances, the "6" sorting bar is projected three incremental distances, the "2" sorting bar is projected two incremental distances and the "1" sorting bar is projected one incremental distance. When these sorting bars are projected outwardly from the platen, they are effective to reject or shift away from the sorting position all cards not coded in the A field with the code number 534621. All cards bearing this code number in the A field are retained in the sorting position under the influence of magnet 464.

Figures 52, 53, 54, 55:
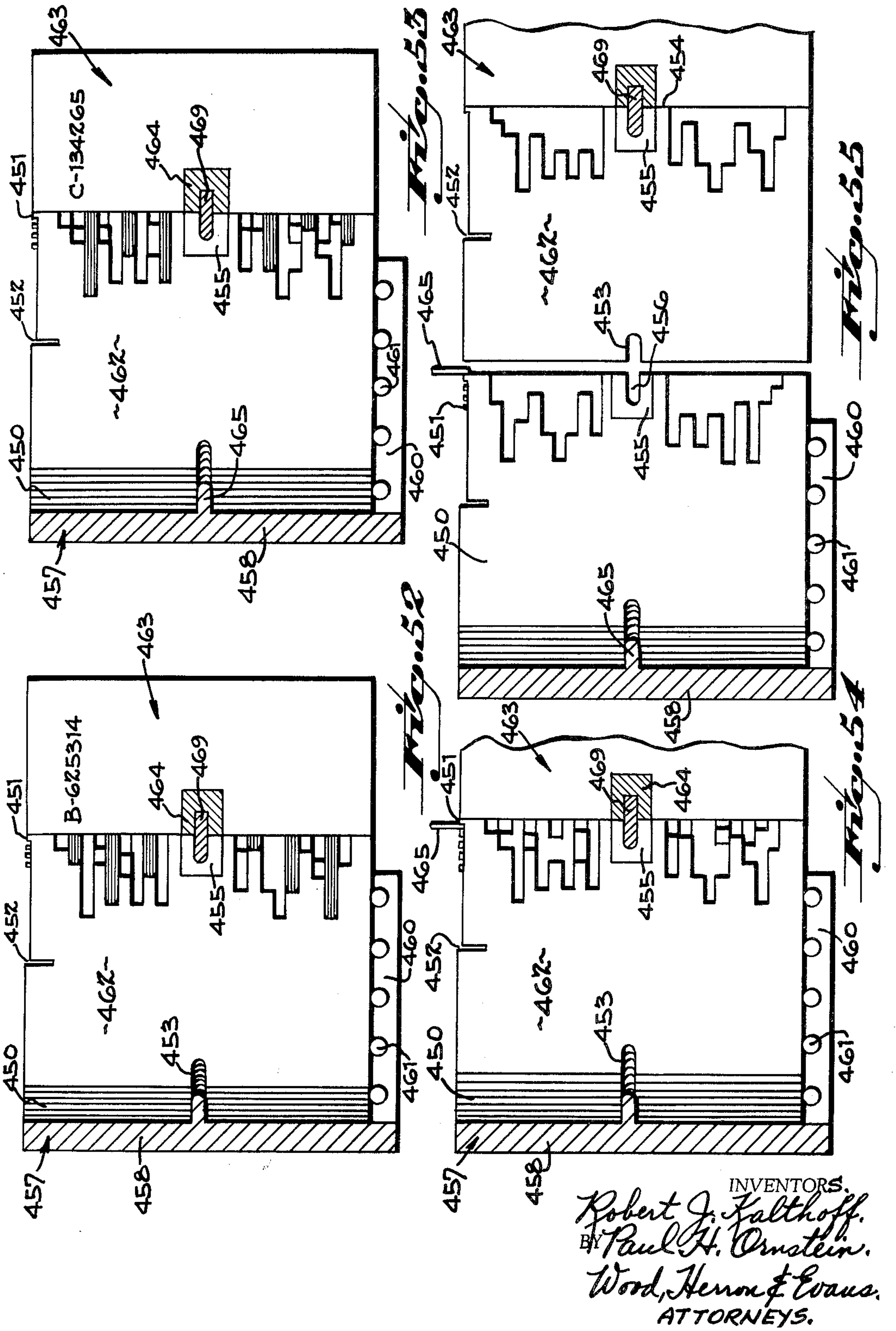
FIGURE 52 is a diagrammatic view showing the second sorting operation with the bars extended into the "B" field.
FIGURE 53 is a diagrammatic view showing the bars extended into the "C" field.
FIGURE 54 is a diagrammatic view showing the abutment bar positioned behind the selected card tabs at the conclusion of the three sorting operations.
FIGURE 55 is a diagrammatic view showing the selected cards completely withdrawn from the rejected cards.

In the next step of the operation, as is shown in FIGURE 52 the sorting bars are retracted toward the platen, free of engagement with the cards and the sorting bars are aligned with the notch sites of the B field (preferably the same sorting bars used to sort the A field are shifted vertically a distance equal to the width of one notch site to bring the bars into alignment with the notch sites of the B field. Alternatively, however, it is contemplated that a completely different, independent set of bars can be utilized to sort the B field.) As is shown in FIGURE 52, the bars aligned with the notch sites of the B field are advanced in accordance with the desired B code number.

In the specific embodiment shown, the "6" bar is advanced six units, the "2" bar is advanced five units, the "5" bar is advanced four units, the "3" bar is advanced three units, the "1" bar is advanced two units and the "4" bar is advanced one unit. When these bars are advanced, they are effective to reject from the previously nonrejected cards, cards not coded with the desired B code number. The cards so coded are retained in the sorting position under the influence of magnet 464. The cards remaining in the sorting position at the conclusion of the B sort are thus cards which have both the desired A code number and the desired B code number.

In the next step of the sorting operation, the sorting bars are again retracted toward the platen free of engagement with the cards, are aligned with the C notch sites and are advanced in accordance with the C code number 134265. Specifically, the "1" bar is advanced six units, the "3" bar is advanced five units, the "4" bar is advanced four units, the "2" bar is advanced three units, the "6" bar is advanced two units and the "5" bar is advanced one unit. When these bars are advanced, as shown in FIGURE 53, they reject, or shift from the sorting position, all cards not coded with this number in the C field. The cards then remaining in the sorting position at the conclusion of the C sort, as is shown in FIGURE 53, are those cards which bear the desired code in each of the A, B and C fields. In accordance with the example given above, these would be the cards relating to the treatment of whiplash injuries by hyperextension.

The selected cards are then withdrawn from the sorting position by either of the methods previously explained. Thus, as is shown in FIGURE 54, an abutment member 465 is inserted between the tabs 451 of the selected cards and the tabs of the rejected cards. Thereafter, the selected cards are withdrawn outwardly under the influence of the magnetic force applied by magnet 464, while the rejected cards are prevented from moving by abutment 465. It will, of course, be appreciated that prior to the final separation shown in FIGURE 55, the rejected cards may be restacked, as is shown in FIGURES 8 and 9, if desired. After the selected cards are completely withdrawn to the position shown in FIGURE 55, they are separated from the magnet by a pusher plate in the manner described above in connection with the generic sorting operation.

*Coordinate sort machine*

The apparatus for sorting cards coded in a coordinate coding system is basically like the apparatus utilized for sorting cards indexed in the generic coding system described in detail above. There are, however, certain differences in the platen construction and in the control circuit for actuating the platen, elevator, sorting bars and other components.

Many parts of the coordinate sorting machine, such as the cabinet, are identical with the corresponding parts of the generic sorting machine. Where a full understanding of the construction of the coordinate machine can be understood, a second drawing of these duplicated parts has been omitted. However, for purposes of clarity many of the electrical components have been incorporated in the new diagrams even though they are duplicates of previously described components. The circuit components which are duplicates of those in the generic sorting machine are identified by the same number as the corresponding part in the generic machine, except that the reference numeral is preceded by an "X." Thus, the drawer levelling switch 2S in the generic machine has a counterpart switch X2S in the coordinate machine.

In overall construction, the coordinate sorting apparatus is similar to that shown in FIGURE 1. That is, the coordinate sorting apparatus comprises a cabinet supporting a plurality of vertically superposed drawers. Each of the drawers is adapted to hold a plurality of randomly stacked cards. Each of the drawers is generally like the compartment shown in FIGURE 47 and includes a rear wall 458, an open top and an open front wall. Rear wall 458 also includes an inwardly extending horizontal flange 465 adapted to engage the aligning slots 453 provided in the rear edges of cards 450. The bottom wall 460 of each of the drawers is provided with a plurality of rollers, rotatable rods 461, or the like, for supporting the stack of cards for sliding movement in and out of the drawer relative to rear wall 458.

Figure 65:
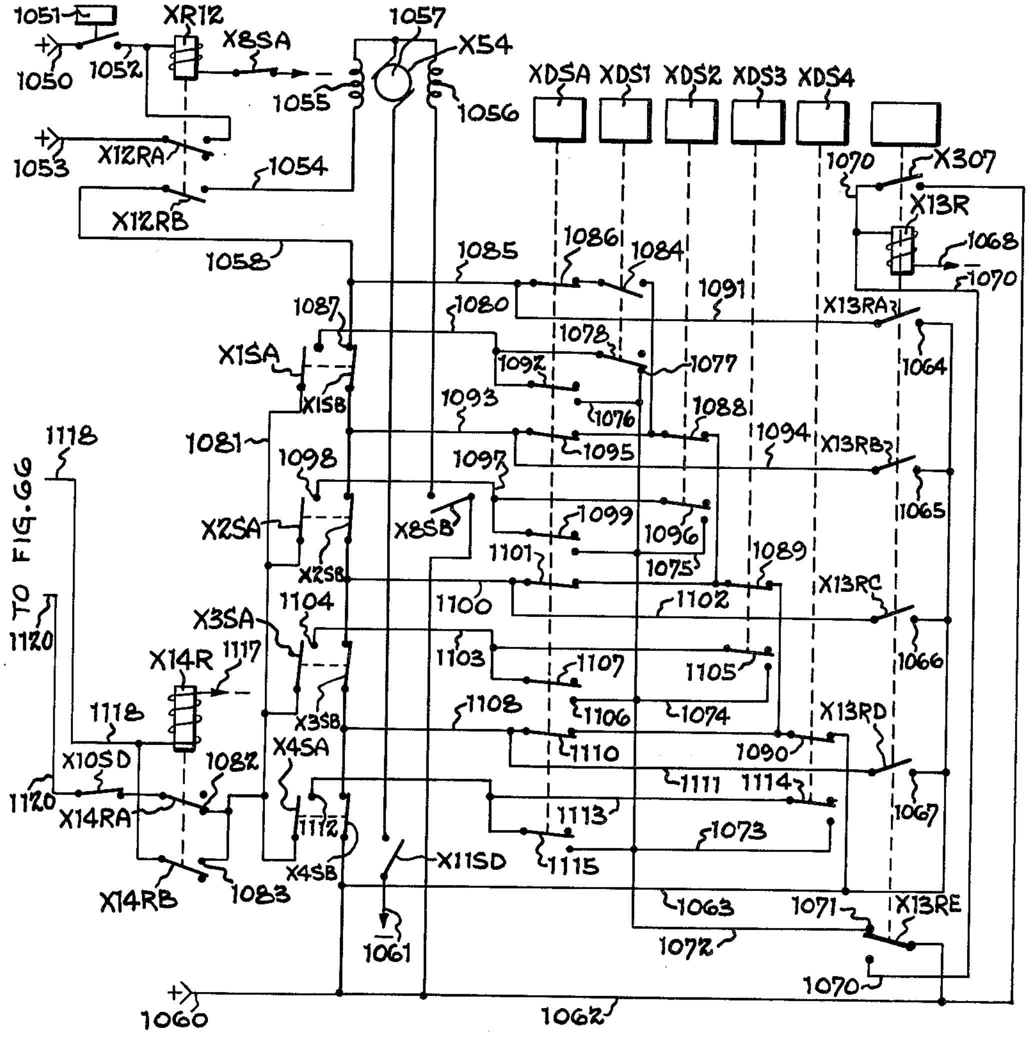
FIGURE 65 is a diagrammatic circuit view of a portion of the coordinate sort control circuit showing the main elevator motor and drawer selector buttons.
Figure 66:
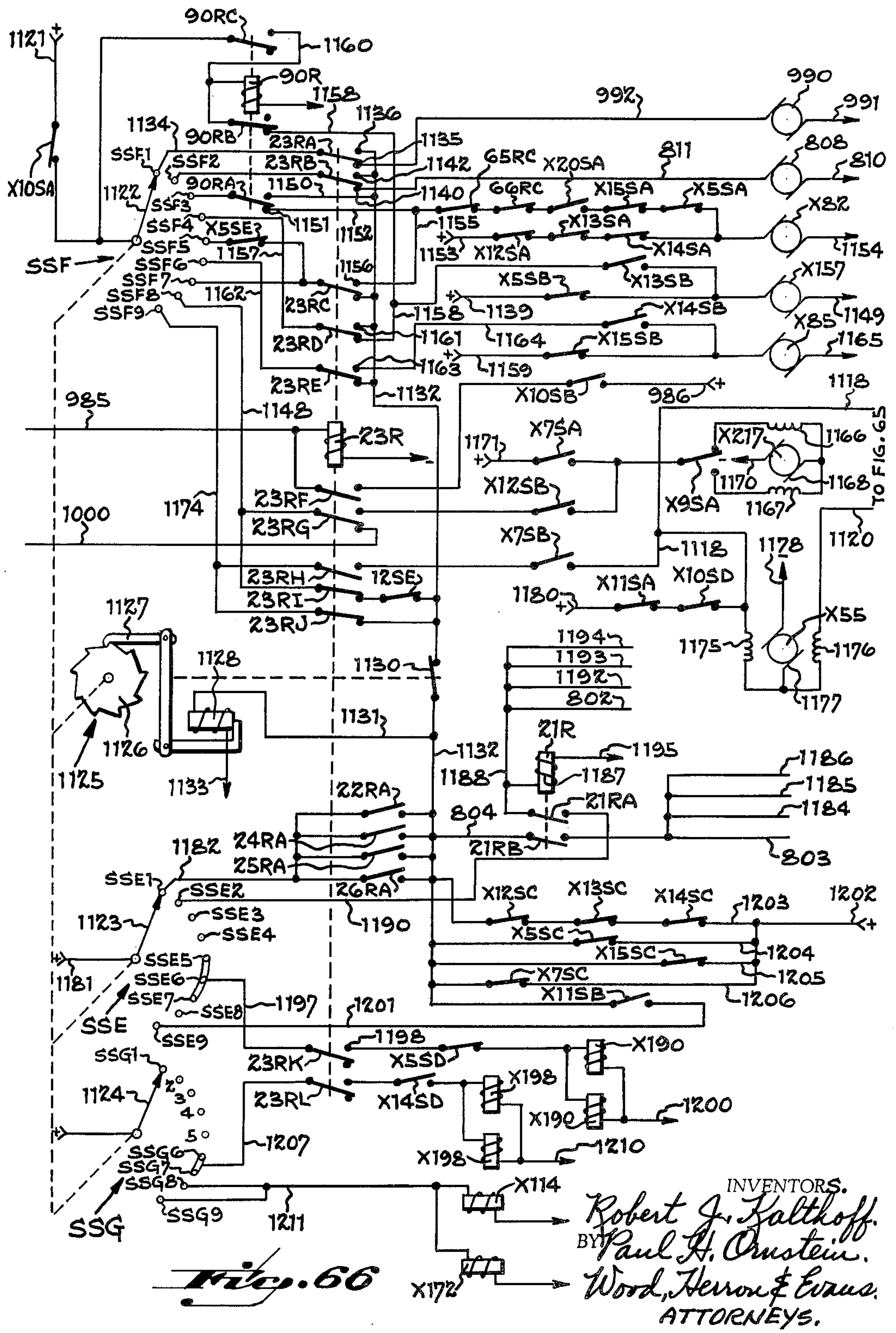
FIGURE 66 is a circuit diagrammatic view of another portion of the coordinate sort control circuit showing the various platen driving motors and stepping switches.

The cabinet also supports an elevator mechanism identical with elevator mechanism 17. Thus, the elevator mechanism of the coordinate sort machine is mounted for vertical movement relative to vertical guide rails which are provided with slots adapted to receive locking plungers adapted to be projected outwardly from the elevator mechanism. The elevator is raised and lowered by main elevator motor X54 (FIGURE 65). The locking bars are adapted to be advanced and retracted by means of a motor X55 (FIGURE 66). The locking fingers have associated therewith an "out" limit switch X10S and an "in" limit switch X11S corresponding to limit switches 10S and 11S of FIGURE 22. The elevator also carries card sorting platen 463 and a card collecting mechanism (not shown) identical with the card collecting mechanism 23.

As is shown in FIGURES 57–64, sorting platen 463 comprises an outer frame 467. This frame includes an open front wall 468 through which a plurality of sorting bars are projected. The sorting platen also carries an elongated magnet 464. This magnet is rigidly affixed to frame 467 and extends in a horizontal plane parallel to the sorting bars. As in the case of the generic sorting apparatus, magnet 464 can either be formed of a strong permanent magnet material or can be formed of ferromagnetic material having a suitable electric magnetizing coil associated therewith. Member 469 is disposed at such a height that it is positioned to enter the slots 456 formed in the ferro-magnetic implants 455. Platen 463 is mounted upon the elevator for in and out movement relative to the card receiving drawers. Suitable guide means (not shown) are provided for guiding the platen during its in and out movements. The platen 463 is provided with attaching brackets 470 adapted for securance to a drive cable, corresponding to the drive cable 64 shown in FIGURE 23.

In the coordinate sorting machine the platen is adapted ot be driven by a primary platen drive motor X82 and a secondary platen drive motor X85 interconnected with each other and with the platen drive cable in the manner shown in FIGURES 23 and 24. Each of the motors X82 and X85 has associated therewith a plurality of limit switches.

Specifically, primary platen drive motor X82 has associated therewith limit switches X12S, X13S and X14S. Switch X12S is adapted to be actuated when the platen 463 is in its retracted position. Switch X13S is actuated after the platen is advanced to compress the cards against rear compartment wall 458 and is subsequently retracted to the sorting position. Switch X14S is actuated when the platen is retracted beyond the sort position to a position where the restack bar enters the restack slots 452 in cards 450. Similiarly, secondary platen drive motor X85 has associated therewith a limit switch X15S adapted to be actuated when the secondary motor has oriented its associated drive disc (corresponding to disc 86) so that that disc and its connecting link (similar to link 87) are positioned so that rotation of motor X85 will cause advancement of the platen.

Figure 58:
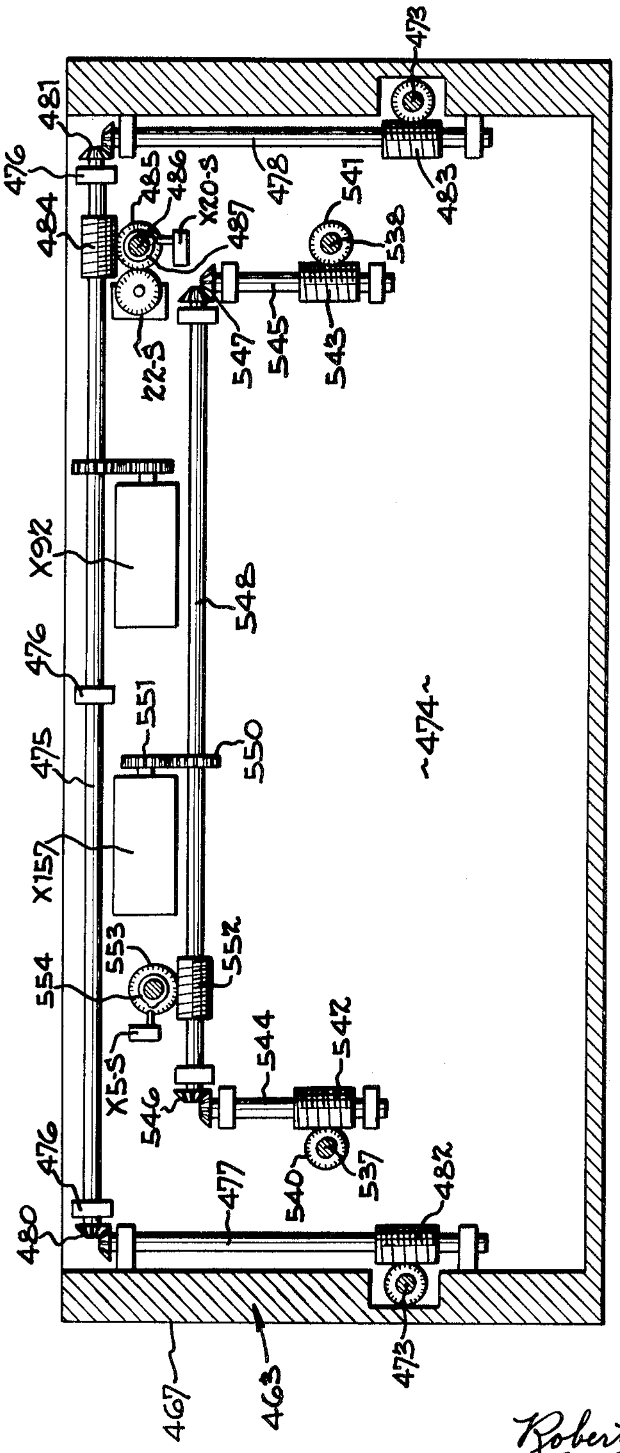
FIGURE 58 is a cross sectional view taken along line 58—58 of FIGURE 57.

Platen 463 includes in addition to outer frame 467 an inner frame 471 mounted within main outer frame 467. Inner, or carrier frame, 471 is mounted for vertical movement within the outer frame. Specifically, inner frame 471 is provided with two endwise bosses 472. Each of these bosses is provided with a vertical threaded opening adapted to receive an elevating screw 473. Elevating screws 473 are rotatably journalled in the bottom wall 474 of platen frame 467. Power for rotating the elevator screws to raise and lower frame 471 is provided by bar elevator motor X92. This bar elevator motor is mounted upon base 474 of outer platen frame 467 as is shown in FIGURE 58.

Bar elevator motor X92 drives a shaft 475 which is rotatably journalled in journal brackets 476. Shaft 475 in turn drives transverse shafts 477 and 478 through bevel gears 480 and 481 respectively. Each of the transverse shafts 477 and 478 carries a worm 482 and 483 in driving engagement with one of the elevating screws 473.

Another worm 484 is mounted upon shaft 475. This worm drives a gear 485 which is rigidly mounted upon a stub shaft 486. Shaft 486 carries a cam 487 having a finger thereon adapted to trip switch X20S. Another switch 22S includes a movable contact driven from gear 485.

Inner frame 471 includes vertical end walls 488 and 489 and a vertical rear wall 490. The front wall of the carrier frame 471 is provided with a plurality of parallel horizontal slots 492 adapted to receive the selector bars. In the embodiment shown in FIGURE 57, ten sorting bars are provided corresponding to the digits 1, 2, 3, 4, 5, 6, 7, 8, 9 and 0. It will, of course, be understood that either a smaller or larger number of sorting bars can be provided depending upon the number of digits to be used in the coding system.

The details of construction of the sorting bars are best shown in FIGURES 59–64. It is to be understood that each of the selector bars is identical with the "1" selector bar shown in FIGURE 59 except, as is explained below, only one reset solenoid X114 is provided for all the sorting bars.

Figure 59:
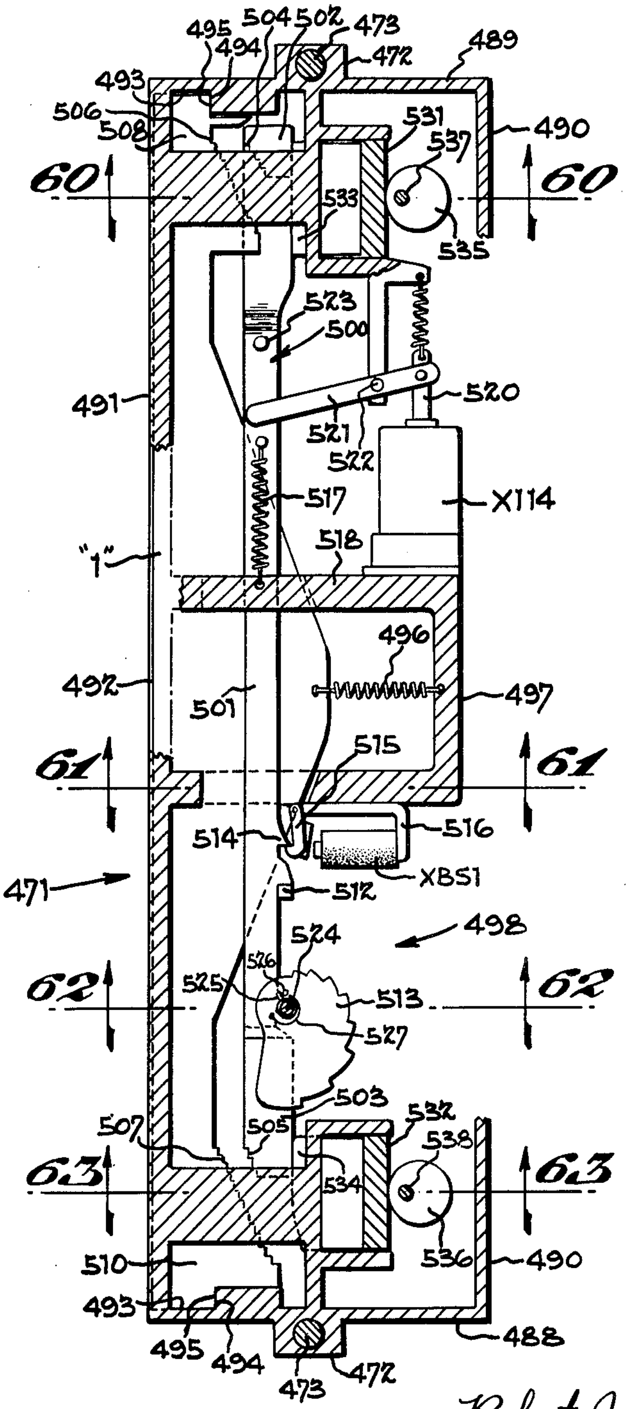
FIGURE 59 is a cross sectional view taken along line 59—59 of FIGURE 57.

As is shown in FIGURE 59, each of the sorting bars is slidably supported in one of the slots 492 provided in front wall 491 of inner frame 471. Each of the sorting bars is held in sideways alignment by inner guide surfaces 493 provided on end walls 488 of inner frame 471. Rearward movement of the sort bars is limited by the engagement of shoulders 494 of the end walls with shoulders 495 formed on the sorting bars. Each of the sorting bars is spring urged into a retracted position with shoulders 495 in engagement with shoulders 494 by means of tension springs 496 which are connected to the center section of the sorting bars and to an upstanding wall portion 497 of the carrier frame.

The sorting bars are adapted to be advanced various increments of distance by means of a bar advancing mechanism indicated generally at 498. This bar positioning mechanism includes a laterally shiftable pusher bar 500 associated with each of the sorting bars. Each end of pusher bar 500 is offset downwardly from the center section 501 of the pusher bar and carries a stepped section 502 and 503. The depths of each of the steps 504 and 505 of the pusher bar corresponds to one of the depths of notch steps 506 and 507 formed on the rear edges of the endwise portions 508 and 510 of the sorting bars. Each of the steps 505 and 504 also preferably corresponds to the depth of one of the increments of notch depth in cards 450.

Figure 60:
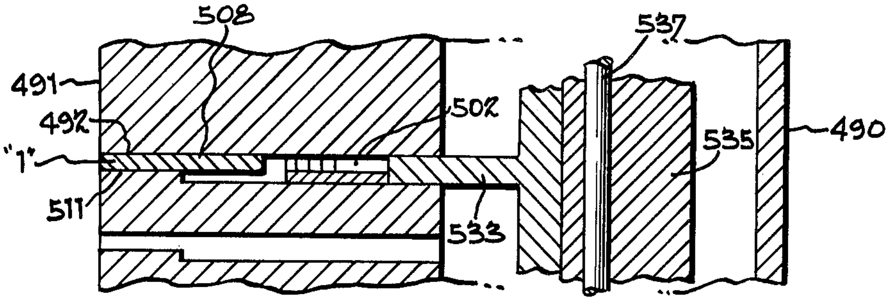
FIGURE 60 is a cross sectional view taken along line 60—60 of FIGURE 59.
Figure 61:
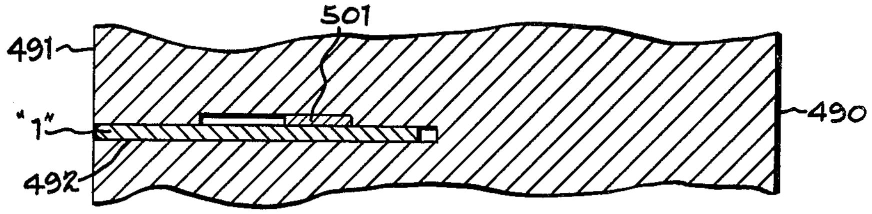
FIGURE 61 is a cross sectional view taken along line 61—61 of FIGURE 59.

More particularly, as is shown in FIGURE 60, stepped portion 502 of the pusher bar extends upwardly above the adjacent portion of the bar and engages the upper wall of slot 492 while the remaining portion of the bar engages the lower portion of the slot. Step portion 502 is thus disposed at the same height as the step portion 508 of the sorting bar which is held against the upper edge of the slot by means of a shoulder portion 511 formed at the forward edge of the slot.

The center section 501 of the pusher bar rides in the upper portion of the slot 492 above the center section of the sorting bar. At the opposite end of the sorting bar, as is shown in FIGURE 59, the stepped end portion 510 of the sorting bar and the stepped end portion 503 of the pusher bar are held in alignment within a narrow portion of slot 492.

As is best shown in FIGURE 59, the raised center section 501 of the pusher bar carries an upwardly extending abutment 512 adapted to engage digit place cam 513. This center section of the bar also includes an abutment shoulder 514 adapted to engage the stop finger 515 associated with one of the bar release solenoids XBS0, XBS1, XBS2 . . . XBS9 (it being understood that XBS1 is associated with sort bar "1," XBS2 is associated with sort bar "2" and so forth). Each of the bar release solenoids XBS1 etc. is mounted on a stationary support bracket 516 which is in turn secured to frame wall 497. Each of the pusher bars 500 is spring urged into engagement with the finger 515 of the bar release solenoid, i.e., to the right in FIGURE 59, by means of a tension spring 517. Each of these tension springs is secured to the center portion 501 of the pusher bar and to the adjacent wall section 518 of inner frame 471. The pusher bars are adapted to be returned to their left-hand position by means of reset solenoid X114. This solenoid is mounted upon wall 518 and includes an armature 520 connected to link 521.

Link 521 is rigidly secured to a vertical reset shaft 522 so that when link 521 is rotated, reset shaft 522 also turns. Link 521 has its free end disposed over pusher bar 500 adjacent to an upwardly extending abutment lug 523 carried by the pusher bar. Similar links are rigidly secured to the shaft 522 and are disposed for engagement with a lug carried by each of the other pusher bars 500. Consequently, when reset solenoid X114 is energized, link 521 is rotatably pivoted in a clockwise direction as viewed in FIGURE 59. This causes shaft 522 to rotate in a clockwise direction, carrying with it all of the secondary links connected to the shaft. When shaft 522 is thus pivoted, and in turn causes pivotal motion of the links 521, the links engage lugs 523 to force each of the pusher bars against the force of spring 517 to its left-hand position as viewed in FIGURE 59. Once the bars have returned to their retracted position, they are held in this position by the engagement of the release solenoid fingers 515 with abutment shoulders 514 formed on the pusher bars.

Figure 62:
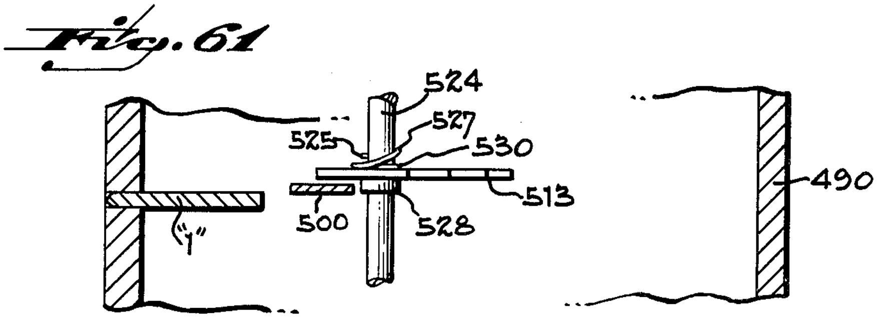
FIGURE 62 is a cross sectional view taken along line 62—62 of FIGURE 59.
Figure 63:
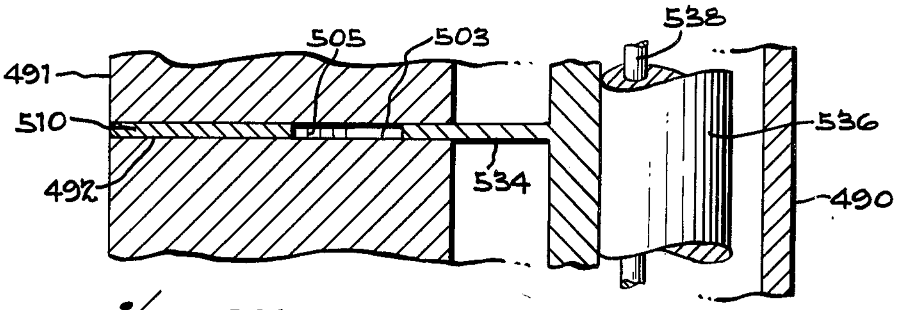
FIGURE 63 is a cross sectional view taken along line 63—63 of FIGURE 59.
Figure 64:
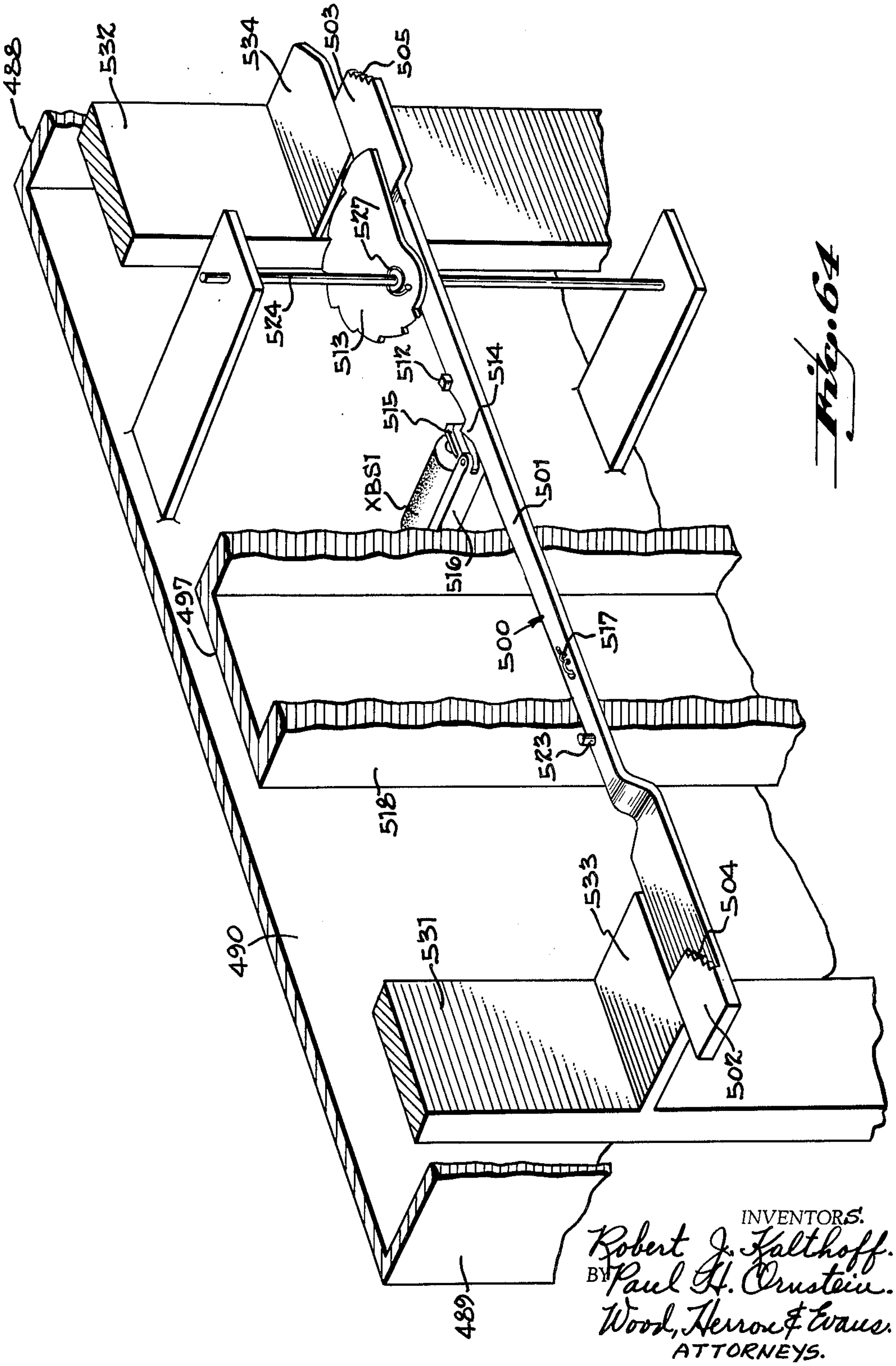
FIGURE 64 is a perspective view of a portion of the digit bar positioning mechanism of the sorting platen shown in FIGURE 57.

The sorting bar positioning mechanism 498 further comprises a digit place cam 513 associated with each of the pusher bars 500. The details of construction of the digit place cams are best shown in FIGURES 59 and 62. It is to be understood that except for the number of steps on the peripheral portion of these cams, they are identical with the cams shown in FIGURES 15 and 16. As shown in FIGURE 59, the digit place cam includes one arcuate segment corresponding to each of the notch depths in the card 450 in this embodiment eight depths. The arcuate segment located at the shortest radius corresponds to the first digit position or the deepest notch depth, while the arcuate segment located at the second shortest radius corresponds to the second code digit position or the second deepest notch depth, etc.

Each of the digit place cams 513 is rotatably mounted upon digit place cam shaft 524. The details of this mounting are best shown in FIGURES 59 and 62. As there shown, digit place cam shaft 524 is provided with a radial finger 525 disposed above each digit place cam 513. This radial finger is normally engaged by an upwardly extending pin 526 carried by digit place cam 513. Each digit place cam 513 is normally spring urged in a counterclockwise direction, as viewed in FIGURE 59, by means of a spiral spring 527 which is secured to the cam and to digit place cam shaft 524. The digit place cams are held in vertical position on shaft 524 in any suitable manner, such as by means of collars 528, secured to the shaft and rotatably supporting the digit place cams, and spring clips 530 disposed in grooves formed in shaft 524 immediately above each of the digit place cams. Each digit place cam is effective to control the transverse position of the associated pusher bar 500. This in turn controls the amount of projection of the associated sort bar when the pusher plate is pushed against the sorting bar. The mechanism for advancing the pusher plates outwardly against the sorting bars includes two vertically extending plates 531 and 532. Each of the plates 531 and 532 is provided with a plurality of vertically spaced flanges 533 and 534 disposed to enter slots 492 and engage the rear edges of the pusher rods 500. Each of the plates 531 and 532 is mounted for horizontal in and out movement relative to carrier frame 471. Inward movement of these members is caused by eccentric cam members 535 and 536 mounted on vertical cam shafts 537 and 538.

As is shown in FIGURE 58, each of the cam shafts 537 and 538 is rotatably journalled in the bottom wall 474 of the outer platen frame. Each of the vertical shafts 537 and 538 carries gears 540 and 541 which mesh with worms 542 and 543 mounted upon shafts 544 and 545. Shafts 544 and 545 are in turn driven by gears 546 and 547 mounted upon drive shaft 548. Main drive shaft 548 carries a gear 550 which meshes with an output gear 551 connected to cam drive motor X157. Shaft 548 also carries a worm 552 meshing with a gear 553 effective to drive cam 554 for actuating limit switch X5S. The sort bar positioning mechanism of this embodiment functions in essentially the same way as the corresponding mechanism of the generic sort apparatus previously described.

Figure 70:
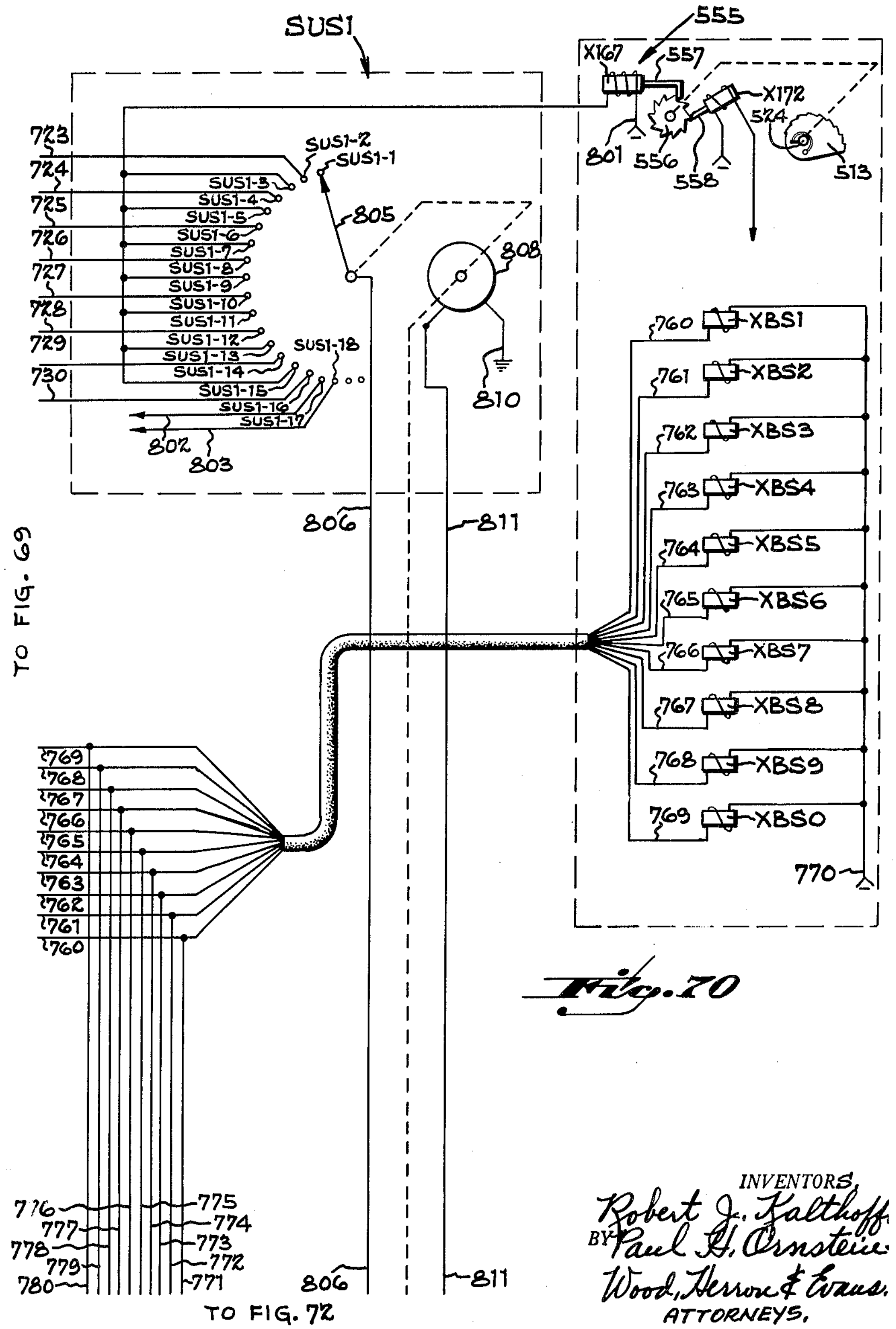
FIGURE 70 is a schematic circuit diagram of another portion of the selector bar positioning circuit showing details of the set-up scan switch.

The digit place cam shaft 524 is driven by a stepper unit 555. This unit is shown diagrammatically in FIGURE 70. It is to be understood that the physical arrangement of the unit is identical with the stepper unit shown in FIGURES 27 and 28. Stepper unit 555 is mounted upon the inner carrier frame at the upper portion thereof and includes a ratchet wheel 556 mounted upon digit place cam shaft 524. This ratchet wheel is adapted to be driven in a counterclockwise direction by means of a drive pawl 557 reciprocated by the armature of advance drive solenoid X167. A second hold pawl 558 is disposed for engagement with ratchet wheel 556. The hold pawl is spring urged into engagement with the wheel (by means not shown) and is adapted to be retracted during the resetting operation by reset solenoid X172, the armature of which is connected to the pawl in any suitable manner.

The sorting platen of the coordinate sorting machine also has associated therewith a restack bar assembly. This restack bar assembly is identical with restack bar assembly 174, the details of which are shown in FIGURES 29–39. This restack bar assembly includes two restack bar elevating solenoids X190 effective to control the elevation of the restack bars and two restack bar hold solenoids X198. These solenoids control operation of the restack bar in the same manner as the corresponding solenoids in the generic sorting device.

Figure 41:
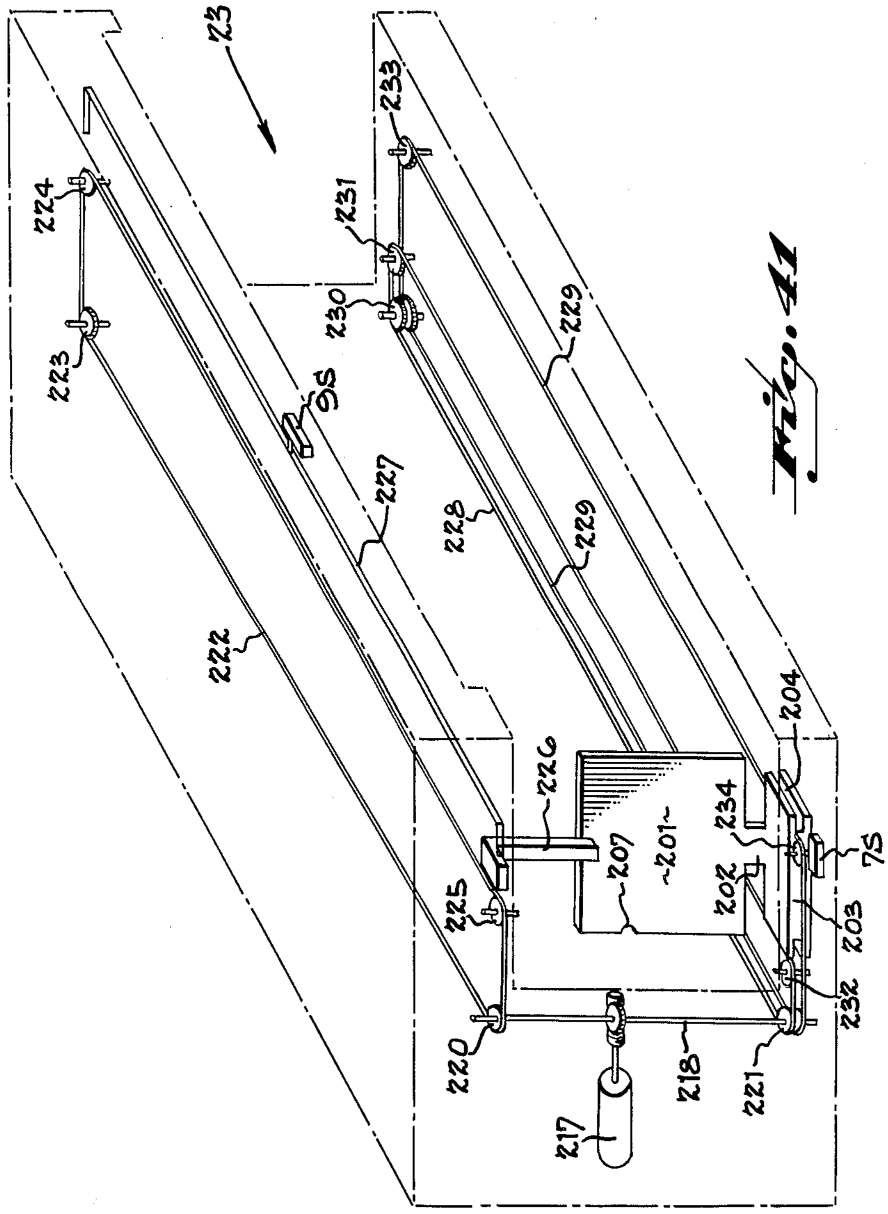
FIGURE 41 is a diagrammatic perspective view of the card collector mechanism.

In the coordinate sorting machine the elevator also carries a card collecting mechanism identical with card collecting mechanism 23 shown diagrammatically in FIGURE 41. Essentially, this mechanism includes a card collector plate which is mounted for length-wise movement of the platen in close proximity to the face of the platen and magnet 464. The card collector plate is reciprocated by means of a drive including card collector motor X217. A toggle switch X9S is interconnected with the card collecting plate in such a manner that the switch is tripped at both the forward and rearward extremes of travel of the collector plate. In addition, a limit switch X7S is positioned to engage and be actuated by a portion of the collector plate when the collector plate reaches its rearmost position.

Figure 56:
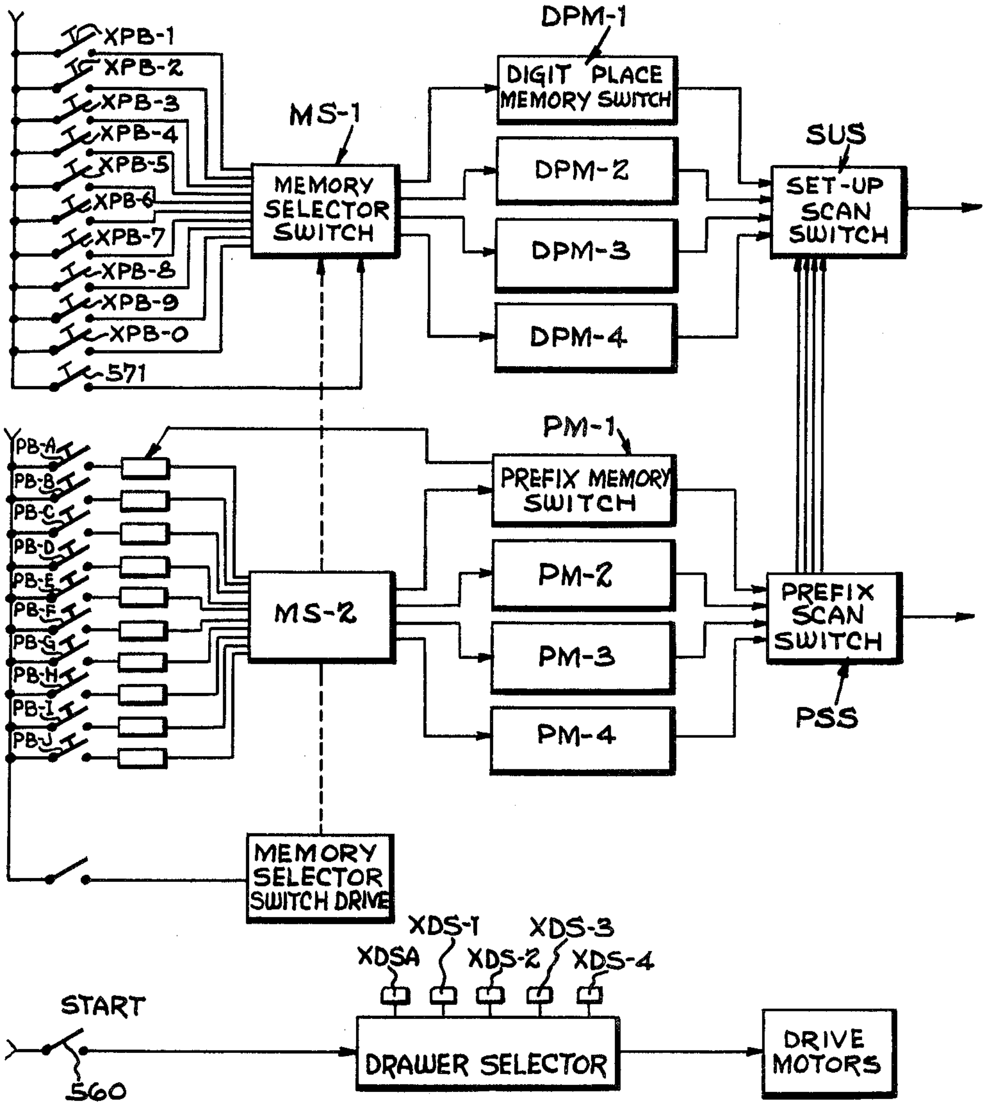
FIGURE 56 is a block diagram of the control circuit utilized to sort cards coded in the coordinate system.
Figure 57:
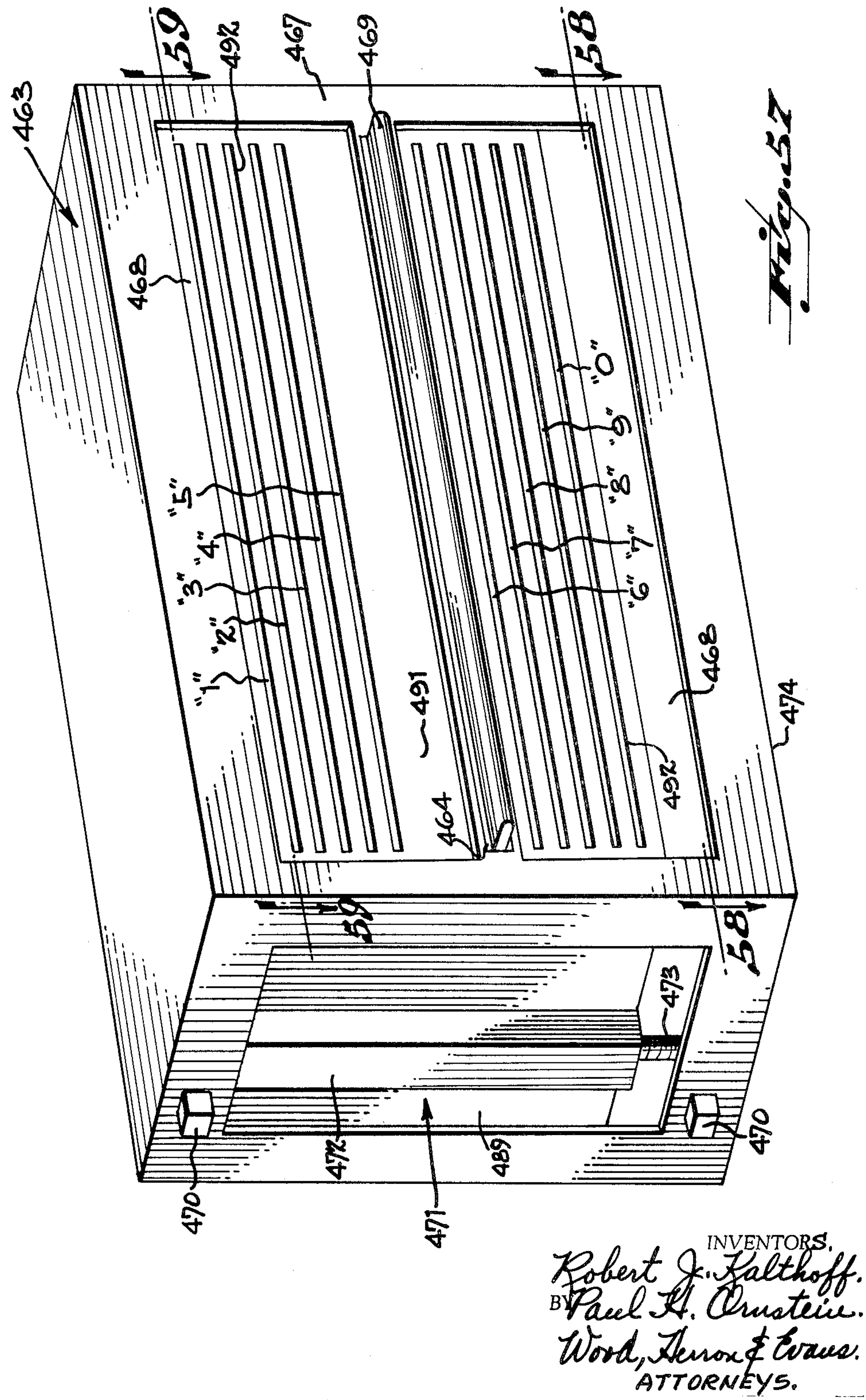
FIGURE 57 is a perspective view of a sorting platen particularly adapted for use in sorting cards indexed in a coordinate system.

The general organization of the electrical circuit for controlling operation of the coordinate sorting machine is shown in FIGURE 56. As there shown, a number of push buttons XPB–1, XPB–2, XPB–3 . . . XPB–0 are provided for programming the desired code numbers. A second group of push buttons PB–A, PB–B, PB–C . . . PB–J are provided for programming in the prefix letter (sorting field designator) associated with each code number. A memory selector switch designated MS–1 receives the input of each of the code number buttons, while a memory selector switch designated MS–2 receives the input signals from the prefix letter buttons XPB–1, XPB–2, etc. The function of memory selector switch MS–1 is to direct the code number signals to one of a plurality of digit place memory units designated DPM–1, DPM–2, DPM–3 and DPM–4.

Each of the digit place memory units DPM–1–DPM–4 is an electromechanical storage unit effective to store information concerning the digit value and digit order of the digits of the code number in the fields, to be searched. Digit memory unit DPM–1 stores information for the first field to be searched. Digit memory unit DPM–2 stores the same information concerning the code number to be searched in the second field. The digit place memory units DPM–3 and DPM–4 store the same information relative to the code numbers to be searched in the third and fourth fields.

The function of the prefix memory unit PM–1 is to store the identity of the first field to be searched, i.e., the "A" field, "B" field, etc. Similarly, prefix memory unit PM–2 stores the code information relating to the second field to be searched; and prefix memory units PM–3 and PM–4 store information relating to the code designations of the third and fourth fields to be searched respectively.

The function of the memory selector switch drive is to advance memory selector switches MS–1 and MS–2 in unison so that after information has been stored in the first digit memory place storage unit DPM–1 and prefix memory unit, PM–1 the memory selector switches are advanced to direct the next set of input signals to the second digit place memory switch DPM–2 and second prefix memory switch PM–2 for storage. Similarly, after the information has been stored in these units, the memory selector switch drive again advances memory selector switches MS–1 and MS–2 so that the next information is stored in the third digit place memory unit DPM–3 and the third prefix memory unit PM–3.

The digit place memory switches DPM–1, DPM–2, DPM–3 and DPM–4 are in turn connected to a set-up scan switch unit SUS. This unit is effective to sequentially retrieve the signals stored in the digit place memory switch units and cause these signals to be utilized to energize the proper bar release solenoids and the digit place cam drive motor on the sorting bar platen to position the sorting bars in accordance with the code numbers stored in the digit place memory units.

In a similar manner the signals stored in the prefix memory units PM–1, PM–2, PM–3 and PM–4 are sensed by a prefix scan unit PSS. This unit in turn causes these storage signals to be utilized to control the operation of a sort bar height positioning drive. This drive is effecttive to position the sorting bars at the correct elevation so that they sort the fields which correspond to the signals stored in the prefix memory units PM–1, PM–2, PM–3 and PM–4.

In addition to these units, there is a drawer selector circuit operated by the drawer push buttons XDS–A, XDS–1, XDS–2, XDS–3 and XDS–4 and a start button switch 560. This control circuit in general controls the operation of the various drive motors such as the main elevator X54, locking bar advancing motor X55, and the like.

Figure 68:
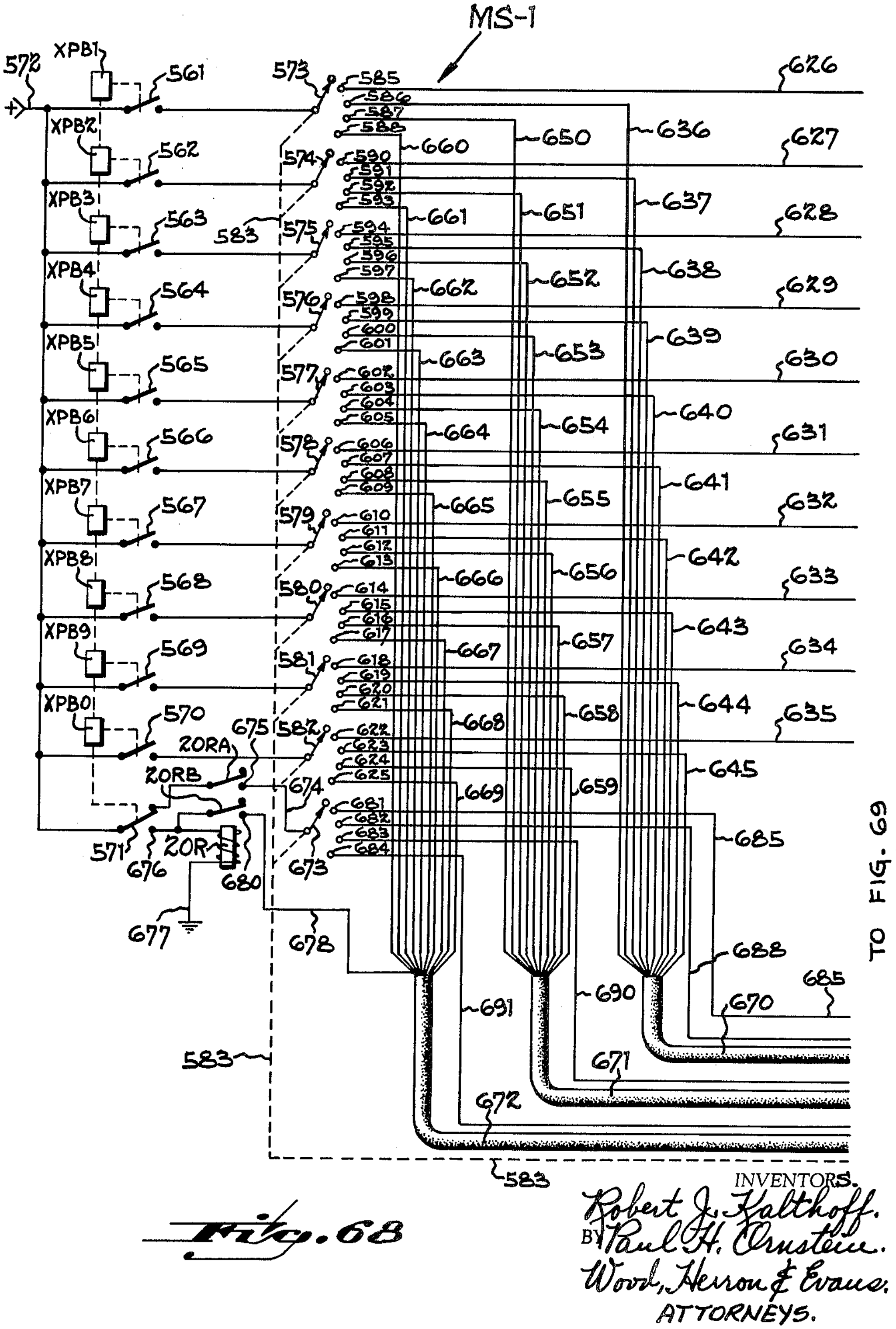
FIGURE 68 is a schematic circuit diagram of a portion of the selector bar positioning circuit showing the code number input buttons.

More particularly, the code number input portion of the control circuit is shown in FIGURE 68. As there shown, a plurality of push buttons XPB1, VPB2 . . . XPB0 representing the digtts 1, 2 . . . 0 respectively are each mechanically interconnected to switches 561–570. Each of the push buttons is also mechanically interconnected to a common switch 571. The movable contacts of each of the switches are connected in parallel to a source of positive potential indicated at 572. The stationary contacts of each of the switches 561–570 are respectively connected to one of the movable contacts 573–582 associated with different levels of the memory selector unit MS–1.

Figure 73:
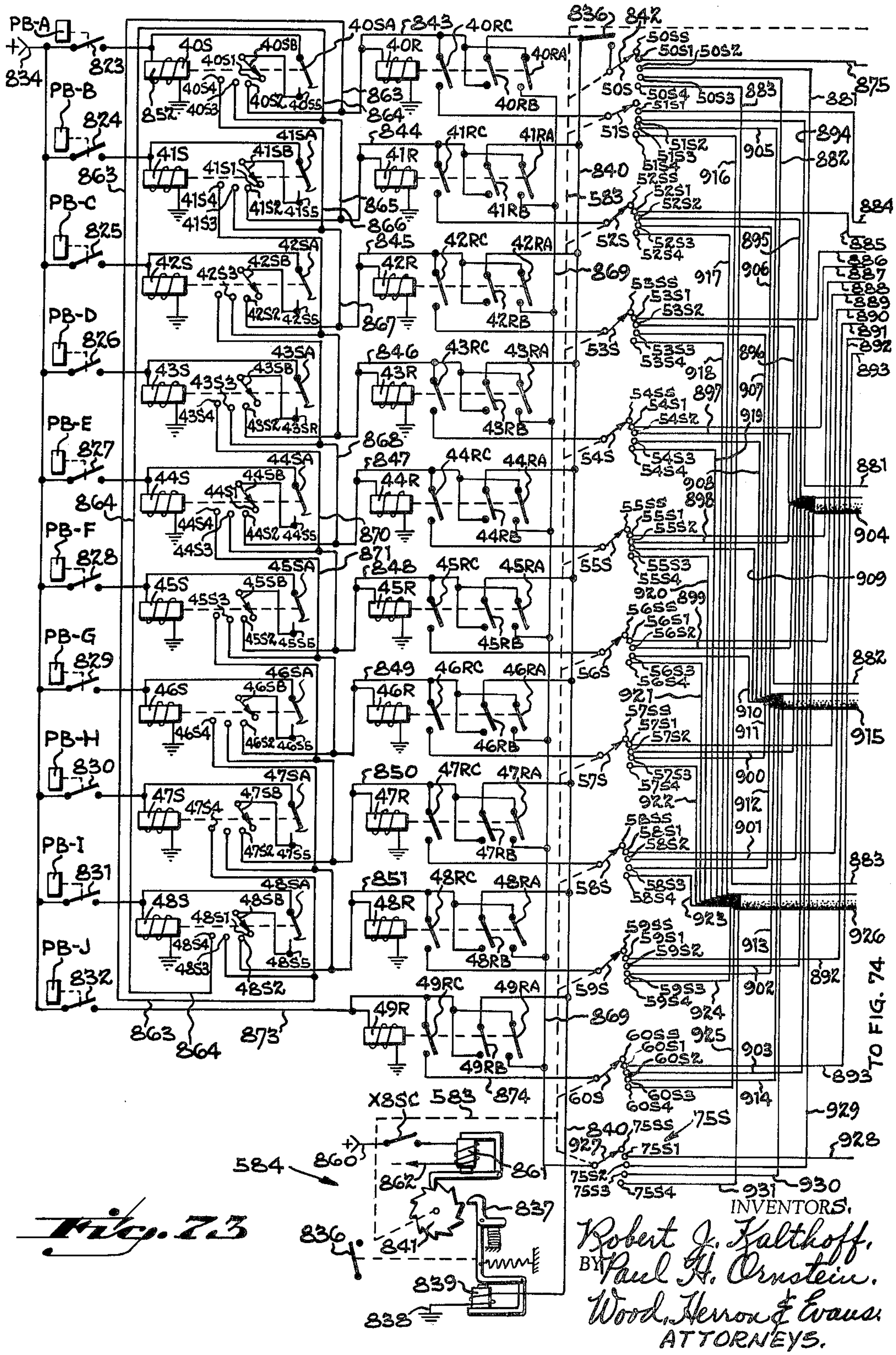
FIGURE 73 is a diagrammatic circuit view of the prefix letter input and prefix letter input memory selector circuit.

As indicated by dotted line 583, these movable contacts are shifted step-wise in unison by the memory selector switch drive unit 584 (FIGURE 73). Each of the ten contact levels of memory switch unit MS–1 includes one dead contact and four live contacts adapted to cooperate with one of the movable contacts 573–582. Specifically, live contacts 585–588 are associated with movable contact 573, contacts 590–593 are associated with movable contact 574, contacts 594–597 are associated with movable contact 575, contacts 598–601 are associated with movable contact 576, stationary contacts 602–605, contacts 609–609, contacts 610–113, contacts 614–617, contacts 618–621 and contacts 622–625 are respectively associated with movable contacts 577–582.

Figure 69:
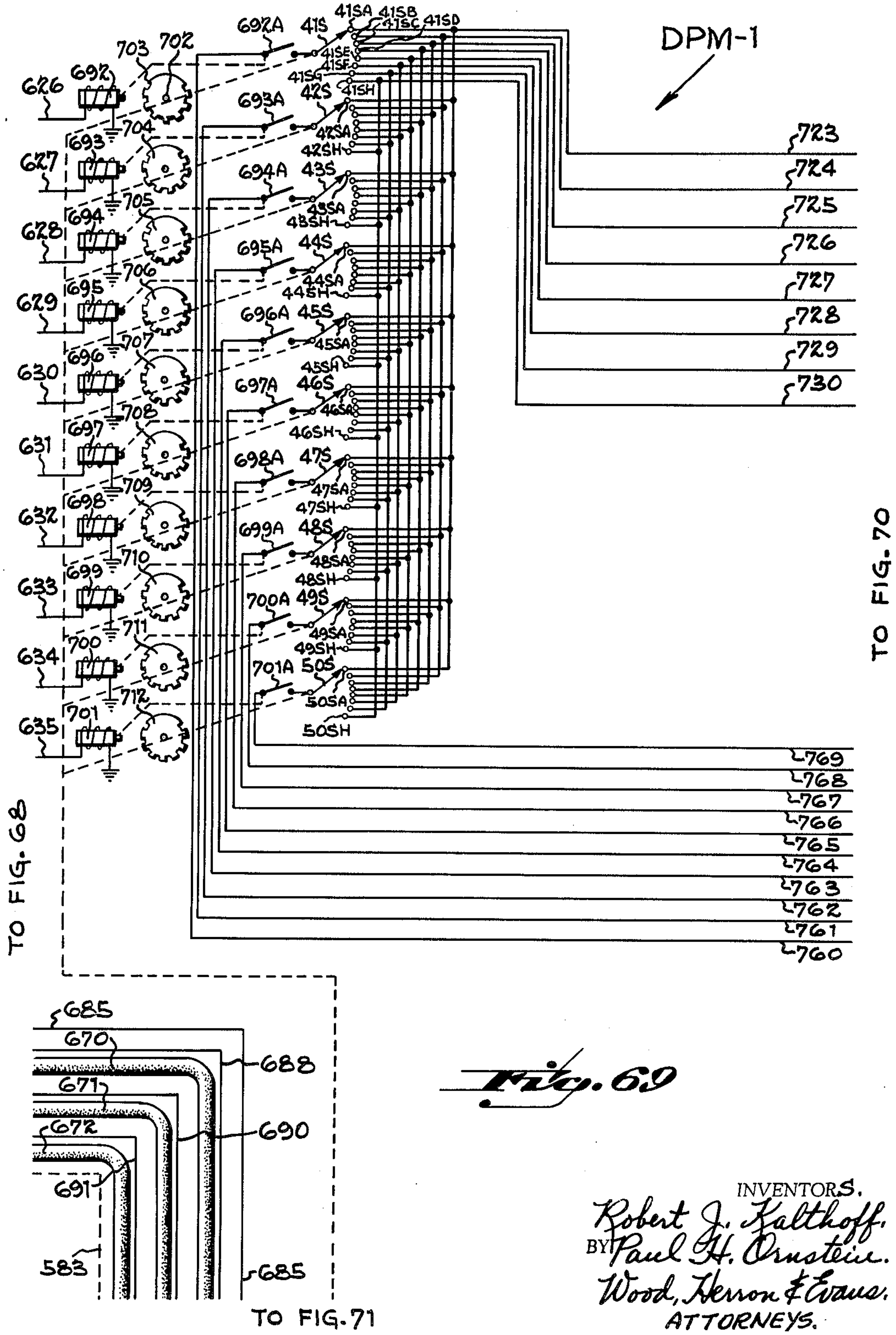
FIGURE 69 is a schematic circuit diagram of the sort bar positioning circuit showing details of a digit place memory unit.

The first contact of each of the contact levels of memory switch unit MS–1, i.e., contacts 585, 590 594, 598, 602, 606, 610, 614, 618 and 622 are connected through leads 626–635 to the digit place memory unit DPM–1 (FIGURE 69). The second contacts of each contact level, i.e., contacts 586, 591, 595, 599, 603, 607, 611, 615 619 and 623 are similarly connected through leads 636–645 to digit place memory unit DPM–2. It is to be understood that each of the four digit place units DPM–1, DPM–2, DPM–3, and DPM–4 is identical with digit place memory unit DPM–1 shown in FIGURE 69. The third contacts of each of the contact levels, i.e., contacts 587, 592, 596, 600, 604, 608, 612, 616, 620 and 624 are joined through leads 650–659 to the third digit place memory unit DPM–3. The fourth set of stationary contacts of each contact level, i.e., contacts 588, 593, 597, 601, 605, 609, 613, 617, 621 and 625 are respectively connected through leads 660–669 to the fourth digit place memory switch unit DPM–4. In order to simplify the drawings, leads 636–645 are shown as being grouped in a cable 670, while the leads 650–659 are shown as being grouped in a cable 671 and the leads 660–669 are shown as being grouped in a cable 672.

Figure 71:
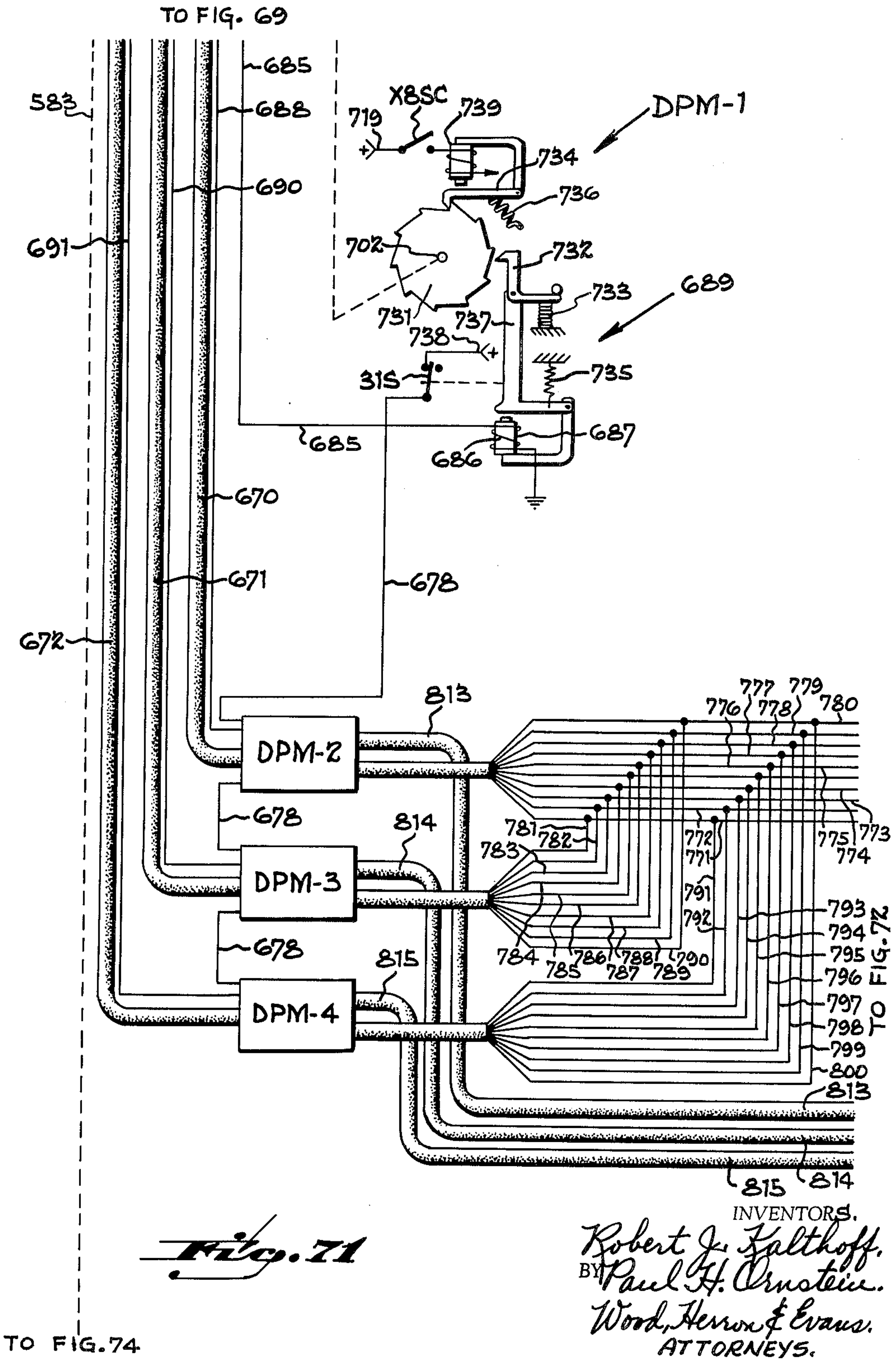
FIGURE 71 is a schematic circuit diagram of a portion of the sort bar positioning circuit showing the interconnections of the various digit place memory circuits.
Figure 72:
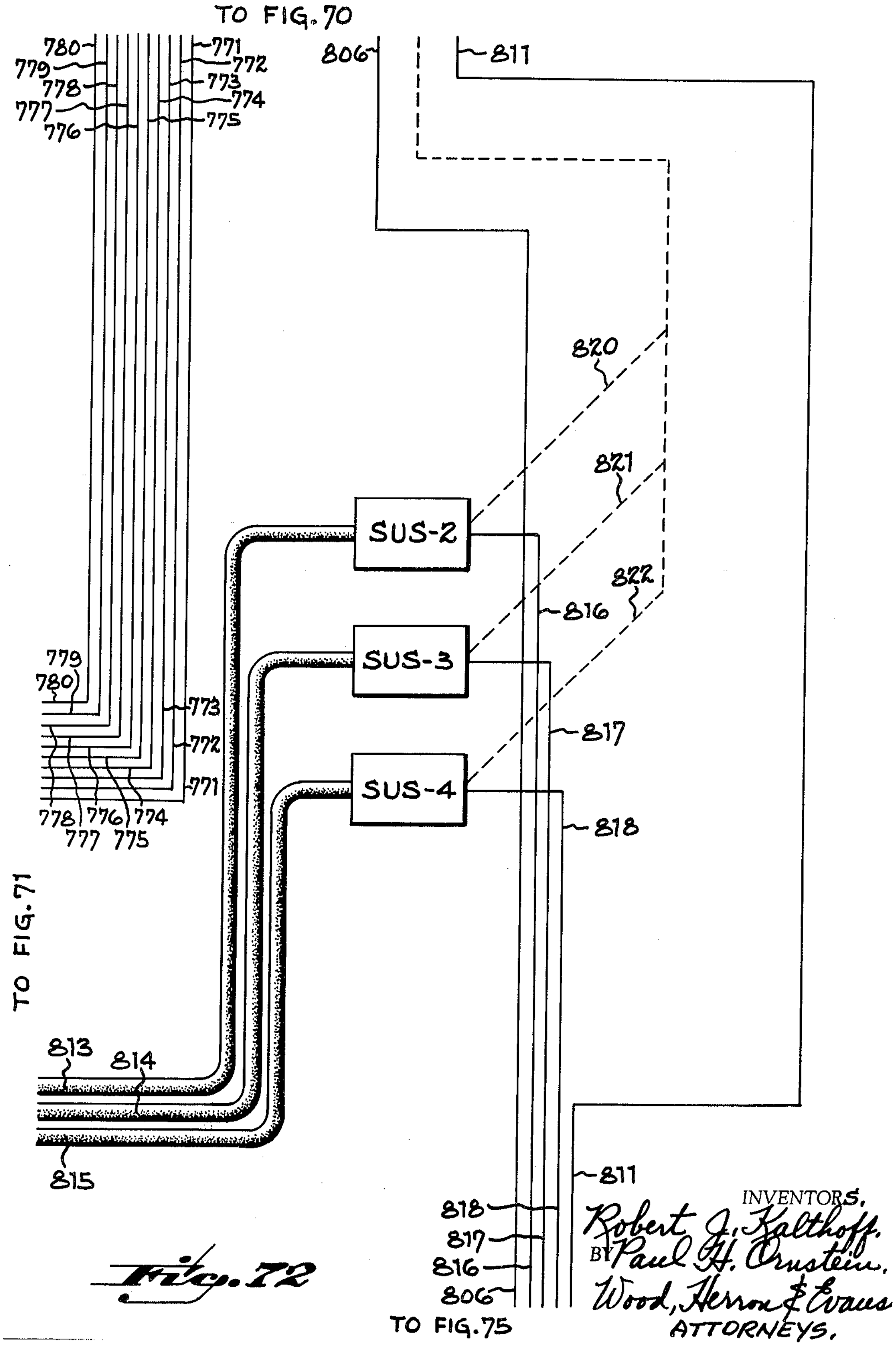
FIGURE 72 is a schematic circuit diagram of a portion of the selector bar positioning circuit showing the relation of the various set-up scan switches.

Memory selector unit MS–1 also has an eleventh level associated therewith having a movable contact 673. This contact is also driven from memory selector switch drive unit 584. Contact 673 is connected to a lead 674 which is in turn joined to a stationary contact 675 of relay 20R. One movable contact 20RA of this relay is adapted to engage contact 675. This movable contact is joined to power line 572 through switch 571. Switch 571 is a single pole, double throw switch having a second stationary contact 676 connected to the coil of relay 20R, the opposite lead of the coil being grounded as at 677. Contact 676 is also joined to movable relay contact 20RB adapted to engage a stationary contact joined to a line 678. Line 678 is a line which contains series connected contacts located in each of the four digit place memory units. The circuitry involved in this line can best be understood from FIGURE 80. As there shown, line 678 runs from stationary contact 680 associated with the relay 20R to a switch 34S located in digit place memory unit DPM–4. This switch is connected with a similar switch 33S associated with digit place memory unit DPM–3. Switch 33S is in turn connected to switch 32S associated with digit memory unit DPM–2. Switch 32S is in turn connected in series with switch 31S in digit place memory unit DPM–1, switch 31S being connected to potential source 738. The relationship of switch 31S to the digit place memory unit drive is shown in FIGURE 71. It is to be understood that the switches 32S–34S are similarly constructed.

The level of the memory selector unit MS–1 containing movable contact 673 also has four stationary contacts 681–684. The first of these contacts is joined through lead 685 to the coil 686 of step magnet 687 of the stepping switch associated with the stepper 689 of the digit place memory unit DPM–1. The second, third and fourth contacts of the level of memory selector switch MS–1, i.e., contacts 682, 683 and 684 are similarly connected through leads 688, 690 and 691 to the coils of the stepping magnets associated with switches 32S, 33S and 34S in each of the other digit place memory units DPM–2, DPM–3 and DPM–4 respectively.

Figure 67:
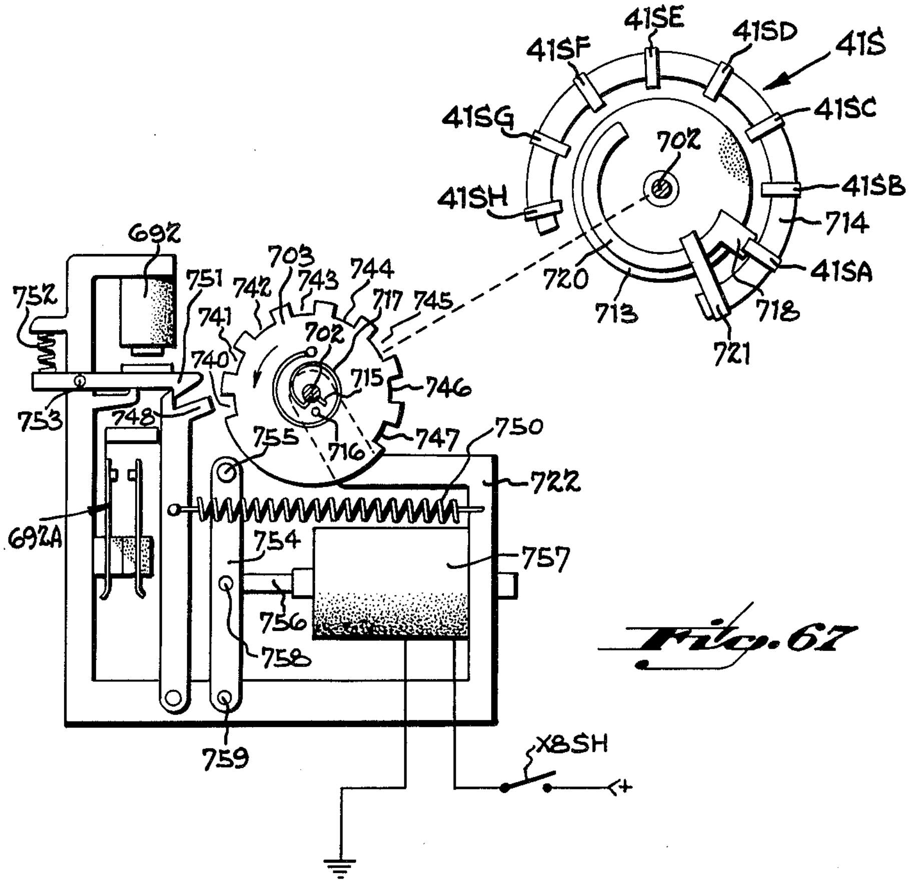
FIGURE 67 is a diagrammatic view of digit place memory switch unit.

Each of the leads 626–635 connected to the first contacts of the various levels of stepping switch MS–1 are respectively connected to the coils of lock-in solenoids 692–701 of the digit place memory switch. The details of this switch are best seen in FIGURES 67, 69 and 71. Essentially, switch DPM–1 includes a vertical shaft 702. Shaft 702 carries ten levels of contact wafers each having its associated cam. The cams are numbered 703–712 in FIGURE 69. The ten contact wafers and their respective associated stationary contact rings are labeled 41S, 42S, 43S . . . 50S in FIGURE 69.

FIGURE 67 shows in semi-diagrammatic form the top contact wafer 713 and its associated stationary contact carrying ring 714. It is to be understood that each of the other contact wafers, contact rings and locking cams is constructed and interconnected in this same manner. Cam 703 is loosely mounted upon shaft 702. The shaft is provided with a radially extending pin 715 disposed for abutment with an upright lug 716 formed on the cam 703. A spiral spring 717 is secured to both the shaft and lug and is effective to urge the cam in a counterclockwise direction, as viewed in FIGURE 67, to maintain lug 716 in contact with pin 715. Switch wafer 713 is formed of an insulating material which is mechanically secured to cam 703 for rotation therewith. Wafer 713 carries a movable contact 718 which is joined to a conductive commutator ring 720. A stationary brush 721 engages the ring, making an electrical connection thereto.

Contact ring 714 is stationary and is mounted in any suitable way upon switch frame 722. The contact ring is formed of an insulating material and carries eight stationary contacts 41SA, 41SB, 41SC . . . 41SH. (The stationary contacts of the ring associated with switch 42S are similarly identified 42SA, 42SB . . . 42SH.) In a like manner, stationary contacts of 43S are identified as 43SA, 43SB . . . 43SH, the contacts of 44S are identified 44SA, 44SB . . . 44SH, the contacts of 45S are identified 45SA, 45SB . . . 45SH, the contacts of 46S are identified 46SA, 46SB . . . 46SH, the contacts of 47S are identified 47SA, 47SB . . . 47SH, the contacts of 48S are identified 48SA, 48SB . . . 48SH, the contacts of 49S are identified 49SA, 49SB . . . 49SH and the contacts of switch 50S are identified 50SA, 50SB . . . 50SH. All of the A contacts of the respectives switches are joined together and are connected to lead 723. In a similar manner, the B contacts are joined together and are connected to lead 724, the C contacts are joined together and to lead 725, the D contacts are joined together and to lead 726, the E contacts are joined together and to lead 727, the F contacts are joined together and to lead 728, the G contacts are joined together and to lead 729 and the H contacts are joined together and to lead 730.

Shaft 702 is rotated in step-by-step advancement by the digit place memory stepper drive 689 shown in FIGURE 71. As there shown, that unit comprises a toothed ratchet wheel 731 mounted upon shaft 702. This ratchet wheel is adapted to be engaged by a drive pawl 732 which is spring urged into engagement with wheel 731 by compression spring 733. Pawl 732 is reciprocated to advance wheel 731 one step at a time by means of stepping solenoid 686. The armature 737 of this magnet is pivotally joined to pawl 732 and is spring urged as by means of spring 735 to a position spaced from the magnetic coil 686. However, when the coil is energized, the pawl is attracted toward the armature to advance the ratchet wheel one space. Ratchet wheel 731 is also engaged by a hold pawl 734 which is normally spring urged into engagement with the wheel as by means of a spring 736. The pawl is adapted to be withdrawn from engagement with the wheel, however, by means of reset solenoid 739. The coil of reset solenoid 739 is connected to a positive power source 719 through contact X8SC.

As shown in FIGURE 67, cam 703 is provided with eight radial slots 740–747. Each of these slots is adapted to receive a locking pawl 748. This pawl is spring urged by spring 750 toward cam 703. However, the pawl is normally held out of engagement with the cam by means of a finger 751, the finger being spring urged into engagement with the pawl as by means of spring 752. However, when solenoid 692 is energized, finger 751 pivots about pin 753 and becomes disengaged from pawl 748 so that that pawl pivots toward the cam and enters one of the slots 740–747. Thereafter, as shaft 702 is advanced, the radial pin 715 merely walks away from lug 716 and cam 703 remains locked in position. Cam 703 is adapted to be reset by means of a reset bar 754 carrying a pin 755 adapted to engage pawl 748 and force that pawl outwardly from engagement with cam 703 (counterclockwise in FIGURE 67). Reset bar 754 is pivoted as at 759 upon frame 722. The bar is linked to armature 756 of reset solenoid 757. It is to be understood that a reset bar similar to reset bar 754 is mounted adjacent to the locking pawl associated with each of the cams 704–712. Bars 754 are linked for movement in unison together in any suitable way such as by means of an elongated vertical pin 758 in engagement with bar 754 and each of the othe reset bars of the unit.

The function of the digit place memory switch is to store information concerning the digit position associated with each of the digit values. More particularly, when the first digit of a code number is energized, the digit place memory switch is in the position shown in FIGURE 67. Assuming that the first digit is "1," magnet 692 is energized permitting pawl 748 to drop into notch 740. Thus, movable contact 718 engages stationary contact 41SA. Every time that another digit code button is pressed, shaft 702 is stepped one place by drive unit 689. Thus, if "1" had been the third digit place, cam 703 would have been stepped around to a point where pawl 748 entered notch 742. At this point stationary contact 718 would engage contact 41SC. Once the cam 703 has been locked in place it remains in place, holding wiper contact 718 in position until the end of the sorting operation.

The movable contact 718 of switch 41S is connected to lead 760 through contact 692A adapted to be closed upon energization of solenoid 692 and release of pawl 748 (when pawl 748 is shifted to the right it forces the left-hand contact in FIGURE 67 into engagement with the right-hand contact). In a similar manner the movable contacts of switches 42S–50S are joined to leads 761–769 through contacts 693A, 694A . . . 701A.

Each of the leads 760–769 is respectively connected to one of the bar release solenoids XBS1, XBS2, XBS3 . . . XBS0. These bar release solenoids are respectively asment of the platen in close proximity to the face of the platen and magnet 464. The card collector plate is reciprocated by means of a drive including card collector motor X217. A toggle switch X9S is interconnected with the card collecting plate in such a manner that the switch is tripped at both the forward and rearward extremes of travel of the collector plate. In addition, a limit switch X7S is positioned to engage and be actuated by a portion of the collector plate when the collector plate reaches its rearmost position.

The general organization of the electrical circuit for controlling operation of the coordinate sorting machine is shown in FIGURE 56. As there shown, a number of push buttons XPB-1, XPB-2, XPB-3 . . . XPB-0 are provided for programming the desired code numbers. A second group of push buttons PB-A, PB-B, PB-C . . . PB-J are provided for programming in the prefix letter (sorting field designator) associated with each code number. A memory selector switch designated MS-1 receives the input of each of the code number buttons, while a memory selector switch designated MS-2 receives the input signals from the prefix letter buttons XPB-1, XPB-2, etc. The function of memory selector switch MS-1 is to direct the code number signals to one of a plurality of digit place memory units designated DPM-1, DPM-2, DPM-3 and DPM-4.

Each of the digit place memory units DPM-1-DPM-4 is an electromechanical storage unit effective to store information concerning the digit value and digit order of the digits of the code number in the fields, to be searched. Digit memory unit DPM-1 stores information for the first field to be searched. Digit memory unit DPM-2 stores the same information concerning the code number to be searched in the second field. The digit place memory units DPM-3 and DPM-4 store the same information relative to the code numbers to be searched in the third and fourth fields.

The function of the prefix memory unit PM-1 is to store the identity of the first field to be searched, i.e., the "A" field, "B" field, etc. Similarly, prefix memory unit PM-2 stores the code information relating to the second field to be searched; and prefix memory units PM-3 and PM-4 store information relating to the code designations of the third and fourth fields to be searched respectively.

The function of the memory selector switch drive is to advance memory selector switches MS-1 and MS-2 in unison so that after information has been stored in the first digit memory place storage unit DPM-1 and prefix memory unit, PM-1 the memory selector switches are advanced to direct the next set of input signals to the second digit place memory switch DPM-2 and second prefix memory switch PM-2 for storage. Similarly, after the information has been stored in these units, the memory selector switch drive again advances memory selector switches MS-1 and MS-2 so that the next information is stored in the third digit place memory unit DPM-3 and the third prefix memory unit PM-3.

The digit place memory switches DPM-1, DPM-2, DPM-3 and DPM-4 are in turn connected to a set-up scan switch unit SUS. This unit is effective to sequentially retrieve the signals stored in the digit place memory switch units and cause these signals to be utilized to energize the proper bar release solenoids and the digit place cam drive motor on the sorting bar platen to position the sorting bars in accordance with the code numbers stored in the digit place memory units.

In a similar manner the signals stored in the prefix memory units PM-1, PM-2, PM-3 and PM-4 are sensed by a prefix scan unit PSS. This unit in turn causes these storage signals to be utilized to control the operation of a sort bar height positioning drive. This drive is effective to position the sorting bars at the correct elevation so that they sort the fields which correspond to the signals stored in the prefix memory units PM-1, PM-2, PM-3 and PM-4.

In addition to these units, there is a drawer selector circuit operated by the drawer push buttons XDS-A, XDS-1, XDS-2, XDS-3 and XDS-4 and a start button switch 560. This control circuit in general controls the operation of the various drive motors such as the main elevator X54, locking bar advancing motor X55, and the like.

More particularly, the code number input portion of the control circuit is shown in FIGURE 68. As there shown, a plurality of push buttons XPB1, VPB2 . . . XPB0 representing the digtts 1, 2 . . . 0 respectively are each mechanically interconnected to switches 561-570. Each of the push buttons is also mechanically interconnected to a common switch 571. The movable contacts of each of the switches are connected in parallel to a source of positive potential indicated at 572. The stationary contacts of each of the switches 561-570 are respectively connected to one of the movable contacts 573-582 associated with different levels of the memory selector unit MS-1.

As indicated by dotted line 583, these movable contacts are shifted step-wise in unison by the memory selector switch drive unit 584 (FIGURE 73). Each of the ten contact levels of memory switch unit MS-1 includes one dead contact and four live contacts adapted to cooperate with one of the movable contacts 573-582. Specifically, live contacts 585-588 are associated with movable contact 573, contacts 590-593 are associated with movable contact 574, contacts 594-597 are associated with movable contact 575, contacts 598-601 are associated with movable contact 576, stationary contacts 602-605, contacts 609-609, contacts 610-113, contacts 614-617, contacts 618-621 and contacts 622-625 are respectively associated with movable contacts 577-582.

The first contact of each of the contact levels of memory switch unit MS-1, i.e., contacts 585, 590 594, 598, 602, 606, 610, 614, 618 and 622 are connected through leads 626-635 to the digit place memory unit DPM-1 (FIGURE 69). The second contacts of each contact level, i.e., contacts 586, 591, 595, 599, 603, 607, 611, 615 619 and 623 are similarly connected through leads 636-645 to digit place memory unit DPM-2. It is to be understood that each of the four digit place units DPM-1, DPM-2, DPM-3, and DPM-4 is identical with digit place memory unit DPM-1 shown in FIGURE 69. The third contacts of each of the contact levels, i.e., contacts 587, 592, 596, 600, 604, 608, 612, 616, 620 and 624 are joined through leads 650-659 to the third digit place memory unit DPM-3. The fourth set of stationary contacts of each contact level, i.e., contacts 588, 593, 597, 601, 605, 609, 613, 617, 621 and 625 are respectively connected through leads 660-669 to the fourth digit place memory switch unit DPM-4. In order to simplify the drawings, leads 636-645 are shown as being grouped in a cable 670, while the leads 650-659 are shown as being grouped in a cable 671 and the leads 660-669 are shown as being grouped in a cable 672.

Memory selector unit MS-1 also has an eleventh level associated therewith having a movable contact 673. This contact is also driven from memory selector switch drive unit 584. Contact 673 is connected to a lead 674 which is in turn joined to a stationary contact 675 of relay 20R. One movable contact 20RA of this relay is adapted to engage contact 675. This movable contact is joined to power line 572 through switch 571. Switch 571 is a single pole, double throw switch having a second stationary contact 676 connected to the coil of relay 20R, the opposite lead of the coil being grounded as at 677. Contact 676 is also joined to movable relay contact 20RB adapted to engage a stationary contact joined to a line 678. Line 678 is a line which contains series connected contacts located in each of the four digit place memory units. The circuitry involved in this line can best be understood from FIGURE 80. As there shown, line 678 runs from stationary contact 680 associated with the relay 20R to a switch 34S located in digit place memory unit DPM–4. This switch is connected with a similar switch 33S associated with digit place memory unit DPM–3. Switch 33S is in turn connected to switch 32S associated with digit memory unit DPM–2. Switch 32S is in turn connected in series with switch 31S in digit place memory unit DPM–1, switch 31S being connected to potential source 738. The relationship of switch 31S to the digit place memory unit drive is shown in FIGURE 71. It is to be understood that the switches 32S–34S are similarly constructed.

The level of the memory selector unit MS–1 containing movable contact 673 also has four stationary contacts 681–684. The first of these contacts is joined through lead 685 to the coil 686 of step magnet 687 of the stepping switch associated with the stepper 689 of the digit place memory unit DPM–1. The second, third and fourth contacts of the level of memory selector switch MS–1, i.e., contacts 682, 683 and 684 are similarly connected through leads 688, 690 and 691 to the coils of the stepping magnets associated with switches 32S, 33S and 34S in each of the other digit place memory units DPM–2, DPM–3 and DPM–4 respectively.

Each of the leads 626–635 connected to the first contacts of the various levels of stepping switch MS–1 are respectively connected to the coils of lock-in solenoids 692–701 of the digit place memory switch. The details of this switch are best seen in FIGURES 67, 69 and 71. Essentially, switch DPM–1 includes a vertical shaft 702. Shaft 702 carries ten levels of contact wafers each having its associated cam. The cams are numbered 703–712 in FIGURE 69. The ten contact wafers and their respective associated stationary contact rings are labeled 41S, 42S, 43S . . . 50S in FIGURE 69.

FIGURE 67 shows in semi-diagrammatic form the top contact wafer 713 and its associated stationary contact carrying ring 714. It is to be understood that each of the other contact wafers, contact rings and locking cams is constructed and interconnected in this same manner. Cam 703 is loosely mounted upon shaft 702. The shaft is provided with a radially extending pin 715 disposed for abutment with an upright lug 716 formed on the cam 703. A spiral spring 717 is secured to both the shaft and lug and is effective to urge the cam in a counterclockwise direction, as viewed in FIGURE 67, to maintain lug 716 in contact with pin 715. Switch wafer 713 is formed of an insulating material which is mechanically secured to cam 703 for rotation therewith. Wafer 713 carries a movable contact 718 which is joined to a conductive commutator ring 720. A stationary brush 721 engages the ring, making an electrical connection thereto.

Contact ring 714 is stationary and is mounted in any suitable way upon switch frame 722. The contact ring is formed of an insulating material and carries eight stationary contacts 41SA, 41SB, 41SC . . . 41SH. (The stationary contacts of the ring associated with switch 42S are similarly identified 42SA, 42SB . . . 42SH.) In a like manner, stationary contacts of 43S are identified as 43SA, 43SB . . . 43SH, the contacts of 44S are identified 44SA, 44SB . . . 44SH, the contacts of 45S are identified 45SA, 45SB . . . 45SH, the contacts of 46S are identified 46SA, 46SB . . . 46SH, the contacts of 47S are identified 47SA, 47SB . . . 47SH, the contacts of 48S are identified 48SA, 48SB . . . 48SH, the contacts of 49S are identified 49SA, 49SB . . . 49SH and the contacts of switch 50S are identified 50SA, 50SB . . . 50SH. All of the A contacts of the respectives switches are joined together and are connected to lead 723. In a similar manner, the B contacts are joined together and are connected to lead 724, the C contacts are joined together and to lead 725, the D contacts are joined together and to lead 726, the E contacts are joined together and to lead 727, the F contacts are joined together and to lead 728, the G contacts are joined together and to lead 729 and the H contacts are joined together and to lead 730.

Shaft 702 is rotated in step-by-step advancement by the digit place memory stepper drive 689 shown in FIGURE 71. As there shown, that unit comprises a toothed ratchet wheel 731 mounted upon shaft 702. This ratchet wheel is adapted to be engaged by a drive pawl 732 which is spring urged into engagement with wheel 731 by compression spring 733. Pawl 732 is reciprocated to advance wheel 731 one step at a time by means of stepping solenoid 686. The armature 737 of this magnet is pivotally joined to pawl 732 and is spring urged as by means of spring 735 to a position spaced from the magnetic coil 686. However, when the coil is energized, the pawl is attracted toward the armature to advance the ratchet wheel one space. Ratchet wheel 731 is also engaged by a hold pawl 734 which is normally spring urged into engagement with the wheel as by means of a spring 736. The pawl is adapted to be withdrawn from engagement with the wheel, however, by means of reset solenoid 739. The coil of reset solenoid 739 is connected to a positive power source 719 through contact X8SC.

As shown in FIGURE 67, cam 703 is provided with eight radial slots 740–747. Each of these slots is adapted to receive a locking pawl 748. This pawl is spring urged by spring 750 toward cam 703. However, the pawl is normally held out of engagement with the cam by means of a finger 751, the finger being spring urged into engagement with the pawl as by means of spring 752. However, when solenoid 692 is energized, finger 751 pivots about pin 753 and becomes disengaged from pawl 748 so that that pawl pivots toward the cam and enters one of the slots 740–747. Thereafter, as shaft 702 is advanced, the radial pin 715 merely walks away from lug 716 and cam 703 remains locked in position. Cam 703 is adapted to be reset by means of a reset bar 754 carrying a pin 755 adapted to engage pawl 748 and force that pawl outwardly from engagement with cam 703 (counterclockwise in FIGURE 67). Reset bar 754 is pivoted as at 759 upon frame 722. The bar is linked to armature 756 of reset solenoid 757. It is to be understood that a reset bar similar to reset bar 754 is mounted adjacent to the locking pawl associated with each of the cams 704–712. Bars 754 are linked for movement in unison together in any suitable way such as by means of an elongated vertical pin 758 in engagement with bar 754 and each of the othe reset bars of the unit.

The function of the digit place memory switch is to store information concerning the digit position associated with each of the digit values. More particularly, when the first digit of a code number is energized, the digit place memory switch is in the position shown in FIGURE 67. Assuming that the first digit is "1," magnet 692 is energized permitting pawl 748 to drop into notch 740. Thus, movable contact 718 engages stationary contact 41SA. Every time that another digit code button is pressed, shaft 702 is stepped one place by drive unit 689. Thus, if "1" had been the third digit place, cam 703 would have been stepped around to a point where pawl 748 entered notch 742. At this point stationary contact 718 would engage contact 41SC. Once the cam 703 has been locked in place it remains in place, holding wiper contact 718 in position until the end of the sorting operation.

The movable contact 718 of switch 41S is connected to lead 760 through contact 692A adapted to be closed upon energization of solenoid 692 and release of pawl 748 (when pawl 748 is shifted to the right it forces the left-hand contact in FIGURE 67 into engagement with the right-hand contact). In a similar manner the movable contacts of switches 42S–50S are joined to leads 761–769 through contacts 693A, 694A . . . 701A.

Each of the leads 760–769 is respectively connected to one of the bar release solenoids XBS1, XBS2, XBS3 . . . XBS0. These bar release solenoids are respectively associated with each of the 1, 2, 3 . . . 0 sorting bar position devices. The second terminal of each of these bar release solenoids is grounded as at 770. Each of the bar release solenoids XBS1, XBS2 . . . XBS0 is also connected through leads 771–780 and leads 781–790 and leads 791–800 to the movable contacts of the digit place memory switches DPM–2, DPM–3 and DPM–4.

Leads 723, 724, 725 . . . 730 connected to the stationary contacts of the digit place memory unit DPM–1 are respectively connected to contacts SUS1–2, SUS1–4, SUS1–6, SUS1–8, SUS1–10, SUS1–12, SUS1–14, and SUS1–16 of set-up scan switch SUS1. Contacts SUS1–3, SUS1–5, SUS1–7, SUS1–9, SUS1–11, SUS1–13, and SUS1–15 are tied together and are connected to the advance coil X167 of the digit place cam drive 555, the other lead of coil X167 being grounded as at 801. Stationary contact SUS1–17 of set-up scan switch SUS1 is connected through a conductor 802 to a relay 21R. Contact SUS1–18 is connected to lead 803 which is joined through contact 21RB, lead 804 and contact 22RA to contact SSE–1 of stepping switch SSE. Stepping switch SUS1 includes a movable contact arm 805 connected to a lead 806 and through that lead and contact 22RB of relay 22R to movable contact 807 of switch 35S of prefix memory unit PM–1. The movable contact 805 of set-up scan switch SUS1 is advanced setp-by-step by a drive motor 808. This motor is shown as a continuous motor although it could be a stepper drive unit if desired. Scan switch drive motor 808 contains one terminal that is grounded as at 810 and a second terminal connected to lead 811. Lead 811 is connected through contact 23RB to contact SSF–2 of step switch SSF.

Each of the other digit place memory units DPM–2, DPM–3 and DPM–4 has associated therewith a set-up scan switch SUS2, SUS3 and SUS4. Ten leads corresponding to leads 723–730 interconnect each of the digit place memory units with its associated set-up scan switch. The ten leads between DPM–2 and set-up scan switch SUS2 are shown diagrammatically as constituting a cable 813. Similarly, cables 814 and 815 interconnect DPM–3 with SUS3 and DPM–4 with SUS4. Also leads 816, 817 and 818 are interconnected to movable contacts (corresponding to movable contact 805) in each of the set-up scan switches. These movable contacts are driven by set-up scan motor 808 as indicated by dotted lines 820, 821 and 822. Lead 816 is connected through contacts 24RB of relay 24R to a movable contact in prefix memory unit PM–2 corresponding to contact 807 of switch 35S in PM–1. Leads 817 and 818 are connected to similar movable contacts in prefix memory units PM–3 and PM–4 through contacts 25RB and 26RB of relays 25R and 26R respectively.

The prefix letter input to the coordinate sorting machine is obtained from a plurality of code push buttons PB–A, PB–B . . . PB–J (FIGURE 73). These push buttons are mechanically interconnected to contacts 823–832 respectively. Contacts 823–832 are interconnected to a positive power source indicated at 834. These contacts are also interconnected to the magnet coils of stepping switches 40S, 41S . . . 48S. The opposite leads of each of these magnet coils are grounded. Each of the push button contacts 823–832 is also connected to a contact 40SA, 41SA . . . 48SA.

As shown in FIGURE 73, memory selector switch drive 75S includes a stepping magnet 839 associated with a drive pawl 837. The magnet is grounded as at 838 and is connected to a lead 840.

Each of the relay coils of relays 40R–48R is respectively connected to one of the leads 843–851. Lead 843 is in turn connected to stationary contact 40S2 of stepping switch 40S. Similarly, lead 844 is connected to stationary contact 41S2 of stepping switch 41S. Lead 845 is connected to contact 42S2 of stepping switch 42S. In a like manner, leads 846–851 are respectively connected to stationary contacts 43S2–48S2. Each of the leads 843–851 is also connected to movable contacts 40RA, 41RA . . . 48RA and to a terminal associated with contact arm 40RM, 41RB . . . 48RB of the relays 41R, 42R . . . 48R. Contacts 40RB, 41RB . . . 48RB and contacts 49RB are interconnected to lead 840 which is in turn joined through contact 836 to movable contact 842 of stepping switch 50S. Contact 836 is mechanically interconnected to pawl 837 of drive unit 584 as indicated by dotted lines 583. Stepping switch contact 836 is mechanically driven from ratchet wheel 841 of the digit place memory selector switch drive 584. This stepping switch drive unit also is effective to drive the movable contact arms of switches 50S, 51S, 52S . . . 60S.

Figure 79:
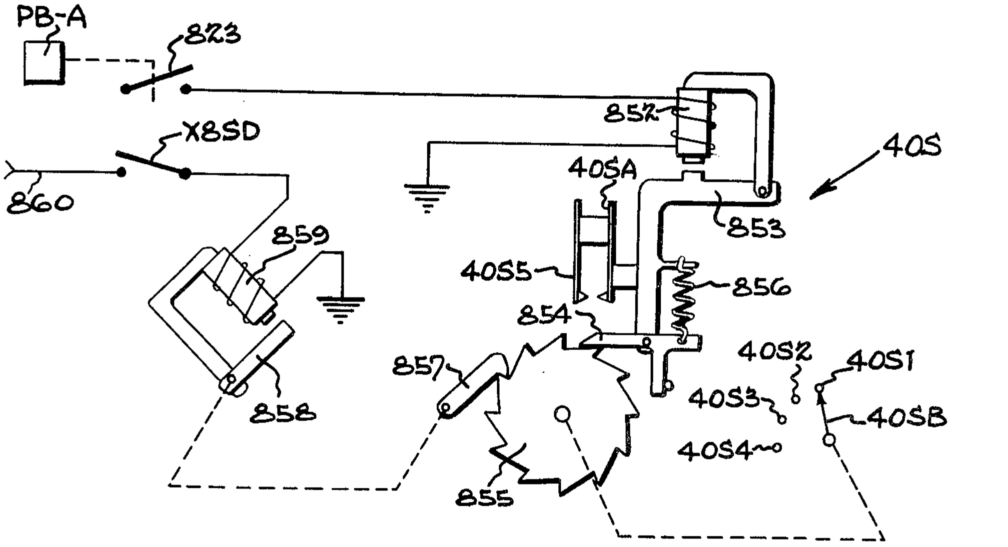
FIGURE 79 is a diagrammatic view of a prefix letter input switch relay.

Each of the movable contact arms 40SA, 41SA . . . 48SA of switches 40S, 41S . . . 48S is adapted to engage a contact 40S5, 41S5, 42S5 . . . 48S5. These last named contacts are in turn respectively connected to movable contact arms 40SB, 41SB . . . 48SB of stepping switches 40S–48S. The details of construction of the stepping switches 40S–48S are best shown in FIGURE 79. This figure shows stepping switch 40S. However, it is to be understood that each of the other stepping switches 41S–48S is identical to switch 40S.

The magnet 852 of stepping switch 40SA has associated therewith a pivotally mounted armature 853 linked to a driving pawl 854 adapted to engage a ratchet wheel 855, the pawl being spring urged into the ratchet wheel by means of a spring 856. Whenever magnet 852 is engaged, the pawl advances one step in a counterclockwise direction. Ratchet wheel 855 is mechanically interconnected to switch 40SB. This switch arm is stepped by wheel 855 into engagement with stationary contacts 40S1, 40S2 . . . 40S4. The armature 853 of magnet 852 is energized to bring contact arm 40SA into engagement with stationary contact 40S5. A hold pawl 857 is also disposed for engagement with ratchet wheel 855. This hold pawl is adapted to be retracted by armature 858 associated with a reset magnet 859. The reset magnets 859 of each of the stepping switches 40S . . . 49S are connected in parallel to a source of positive potential indicated at 860 through a contact X8SD of switch 8S. Potential source 860 is also connected to a reset magnet 861 of memory selector drive 584 through another contact 8SC of limit switch 8S. The other lead of this magnet is connected to a negative line at at 862.

Contact 40S1 of stepping switch 40S is a dead contact. Contact 40S2 is joined to lead 843 and to lead 863 which is also connected to contact 48S3 and 47S4. Stationary contact 40S3 is connected to a lead 864 which is in turn joined to contact 48S4. Contact 40S3 is also joined to contact 41S2 through lead 865. Contact 40S4 is joined through lead 866 to contact 41S3 and through leads 867 and 845 to contact 42S2. In a similar manner, contact 41S3 is joined to contact 42S2, while contact 41S4 is joined to 42S3 and 43S2. This same pattern of interconnecting contacts is utilized for each of the switches 40S–48S. Thus, considering switch 44S, for example, the movable contact 44SA is joined to push button contact 827. The stationary contact 44S5 is joined to the movable contact arm 44SB; stationary contact 44S1 is dead. Stationary contact 44S2 is joined to lead 847 and the coil of the associated relay 44R. Stationary contact 44S2 is also tied through lead 868 to the "3" contact of the preceding switch, i.e., contact 43S3 and to the "4" contact of the next preceding switch, i.e., contact 42S4.

Stationary contact 44S3 is connected through lead 870 to the "4" contact of the preceding switch 43S4. The "3" contact of switch 44S3 is also joined to the "2" contact of the succeeding switch, i.e., contact 45S2. Contact 44S4 is joined to lead 871 to the "3" contact of the succeeding switch, i.e., contact 45S3 and the "2" contact of the next succeeding switch, i.e., contact 46S2.

In essence, then, the "1" contact of each stepping switch 40S–48S is dead, the "2" contact is connected to the magnet of the associated hold relay, to the "3" contact of the preceding switch, and the "4" contact of the next preceding switch. The "3" contact of a given switch is connected to the "4" contact of the preceding switch and to the "2" contact of the succeeding switch. The "4" contact of a given switch is conected to the "3" contact of the succeeding switch and the "2" contact of the next succeeding switch.

Contact 832 associated with the push button PB–J is not connected to a stepping switch. Rather, this contact is connected through lead 873 directly to the coil of hold relay 49R. Lead 873 is also joined to contacts 49RC and 49RA of relay 49R. Contact 49RC is adapted to be joined through a stationary contact and lead 874 to the movable contact arm of stepping switch 60S. Contact 48RC is similarly adapted to be joined to the movable contact of stepping switch 59S. A stationary contact associated with 49RA is joined to lead 869. Relay 40R includes contact 40RC joined to contact 40RA. Contact 40RC is connected to lead 843 and is adapted to be connected to the movable contact of stepping switch 51S. Similarly, each of the relays 41R–48R includes a contact 41RC–48RC interconnected to movable contacts 41RA–48RA and adapted to be connected to the movable arms of stepping switches 42S–59S respectively. Each of the contacts 41RA–48RA has an associated stationary contact connected to lead 869.

Switch 50S includes five contacts, a dead contact 50SS and live contacts 50S1, 50S2, 50S3 and 50S4. Contact 50S1 is connected through lead 875 to contact 50RB of relay 50R. Contact 50RA of this relay is joined to a positive power source indicated at 876 and to a lead 928 connected to contacts 75S1 of stepping switch 75S. Contact 50RB in turn is placed in series with a contact 877 connected to advance magnet 878 of prefix memory drive unit PM–1. The other lead to this magnet is grounded as at 880.

Contact 50S2 is joined to a lead 881. This lead is connected to a relay contact in prefix memory unit PM–2 corresponding to contact 50RB in prefix memory unit PM–1. Similarly, contacts 50S3 and 50S4 are respectively joined through leads 882 and 883 to relay contacts in prefix memory units PM–3 and PM–4 corresponding to relay contact 50RB. Contact 51S1 is joined to lead 884. This lead is in turn joined to stationary contact 61S1 of stepping switch 61S. Similarly, contacts 52S1, 53S1 . . . 60S1 are interconnected through leads 885–893 to contacts 61S2, 61S3 . . . 61S10 of stepping switch 61S.

Figure 74:
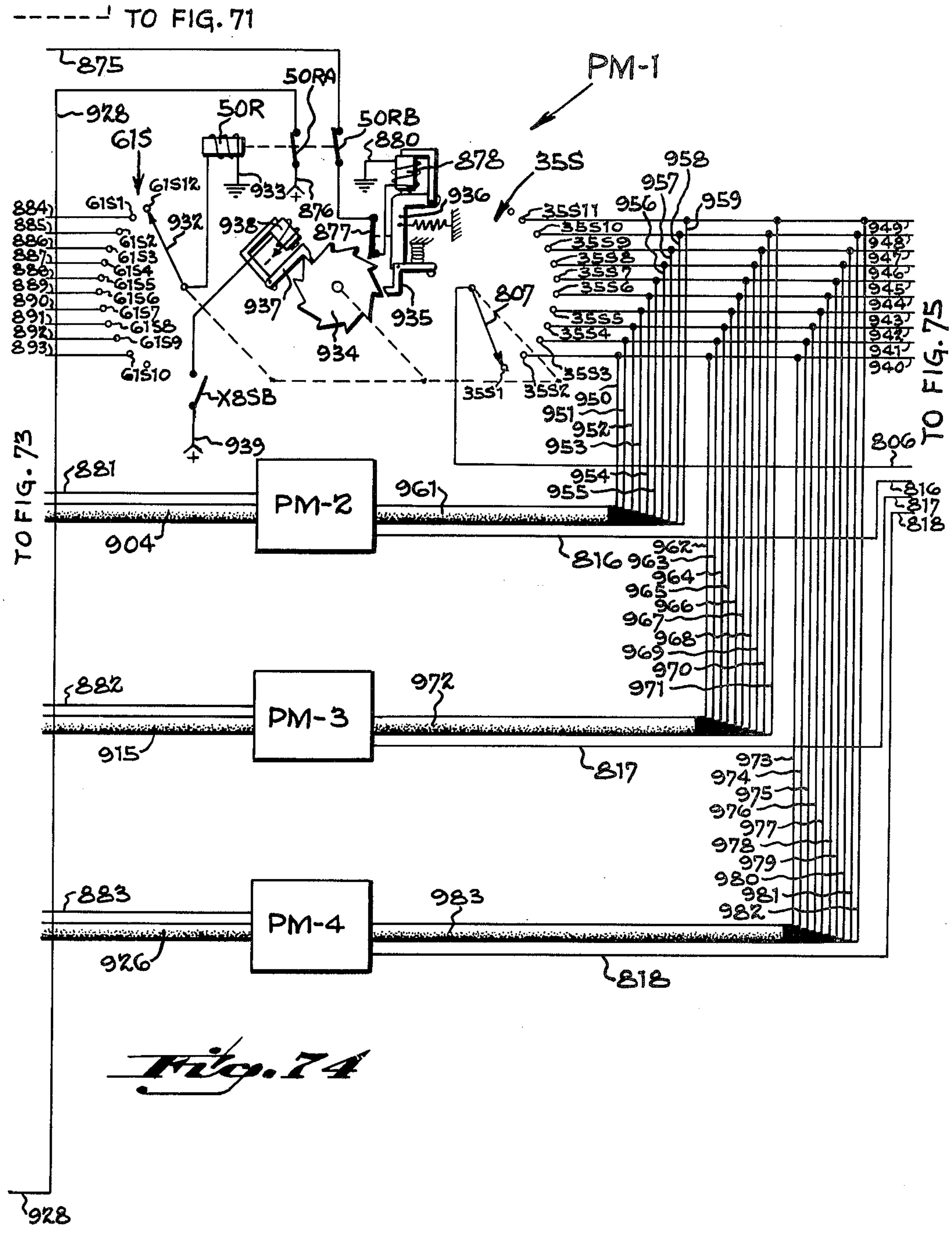
FIGURE 74 is a schematic circuit diagram showing prefix memory units.

In a similar manner, contacts 51S2, 52S2 . . . 60S2 are joined through leads 894, 895 . . . 903 to corresponding stepping switch contacts of a stepping switch provided in prefix memory unit PM–2. For purposes of simplification, these leads are gathered together in cable 904 of FIGURES 73 and 74. In a similar manner, contacts 51S3, 52S3 . . . 60S3 are joined through leads 905–914 (cable 915) to stepping switch contacts of a stepping switch in prefix memory unit PM–3 similar to stepping switch 61S.

Contacts 51S4, 52S4, 53S4 . . . 60S4 are likewise joined through leads 916, 917 . . . 925 (cable 926) to stepping switch contacts of a switch unit in PM–4 corresponding to the contacts of stepping switch 61S.

Another stepping switch 75S is mechanically interconnected to memory selector stepping switch drive 584. Stepping switch 75S includes a movable contact 927 interconnected to lead 869. The stepping switch 75S also includes a dead contact 75S5 and live contacts 75S1, 75S2, 75S3 and 75S4. Contact 75S1 is joined through lead 928 and contact 50RA to power source 876. Contact 75S2 is connected through lead 929 (through cable 904) to a similar relay contact and power source in prefix memory unit PM–2. Contacts 75S3 and 75S4 are likewise connected through leads 930 and 931 and cables 915 and 926 to corresponding relay contacts and potential source associated with memory units PM–3 and PM–4.

Stepping switch 61S of prefix memory unit PM–1 includes a movable contact arm 932 which is connected in series with the coil of relay 50R, the other lead of this coil being grounded as at 933. Arm 932 is advanced in step-by-step movement by means of a ratchet wheel 934 engaged by pawl 935 connected to the armature 936 associated with advance magnet 878. This armature also is mechanically interconnected to switch 877. Ratchet wheel 934 is further engaged by a hold pawl 937 associated with a release magnet 938. Release magnet 938 is adapted to be energized from a source of power indicated at 939 through contact X8SB of limit switch 8S. Ratchet wheel 934 is also interconnected to rotate contact arm 807 of stepping switch 35S.

Figure 75:
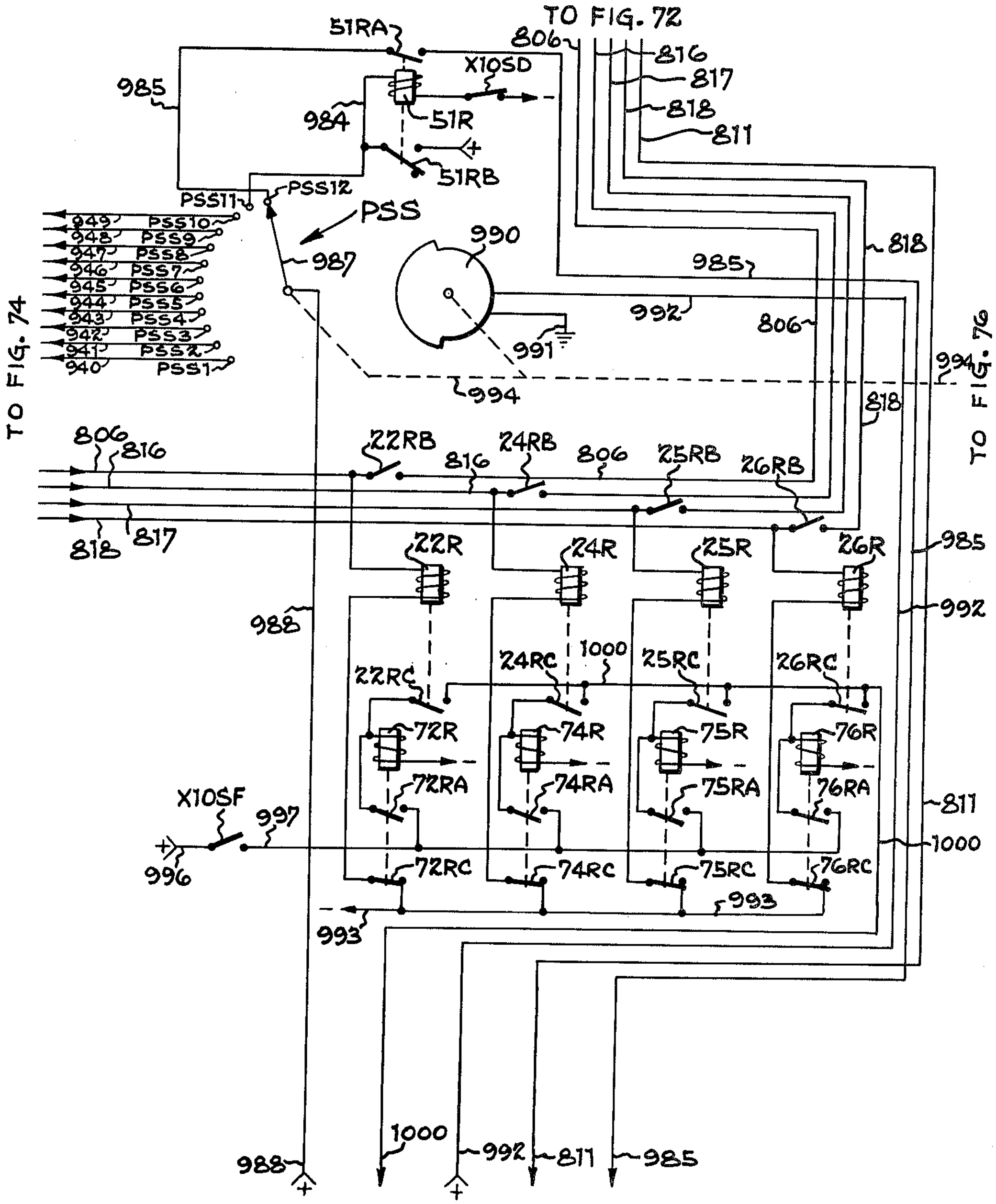
FIGURE 75 is a schematic circuit diagram showing the prefix scan switches.

Stepping switch 35S includes a dead contact 35S1 engaged by movable contact arm 807 in the reset position of the switch (a similar dead contact 61S2 is provided on stepping switch 61S). Contacts 35S2, 35S3 . . . 35S11 are respectively connected to leads 940–949. These leads are in turn respectively connected to stationary contacts PSS1, PSS2 . . . PSS10 of prefix scan switch PSS (FIGURE 75). In a similar manner, leads 950–959 (cable 961) interconnect the output contacts of a stepping switch in the prefix memory unit PM–2 corresponding to stepping switch 35S to leads 940–949 and contacts PSS1–PSS10. Ten other leads 962–971 (cable 972) similarly interconnect the contacts of a stepping switch in prefix memory unit PM–3 corresponding to stepping switch 35S to leads 940–949. Another group of ten leads 973–982 (cable 983) similarly interconnect the contacts of a stepping switch similar to 35S in prefix memory unit PM–4 in leads 940–949.

Prefix scan switch PSS also includes a contact PSS11 connected to lead 984. This lead is joined to a coil of relay 51R, the other lead of the relay coil being connected to a negative line through normally open contact X10SD. Another contact PSS12 is joined through lead 985 which contains relay contact 51RA to the coil of relay 23R (FIGURE 66). This lead is also joined through a hold-in contact 23RF of relay 23R and contact X10SB to a source of power indicated at 986.

Prefix scan switch PSS includes a movable contact arm 987 which is joined to a positive power source as indicated at 988. This contact arm is rotated by means of prefix scan switch motor 990. One power lead 991 of this motor is grounded while a second lead 992 is connected to a stationary contact associated with movable relay contact 23RA of relay 23R (FIGURE 66). This drive motor 990 is also mechanically interconnected, as indicated by dotted line 994, to the movable contact 995 of elevator height control switch 62S.

Several additional circuit components are shown in FIGURE 75. As there shown, relay 22R includes a coil connected to line 806. This relay coil is joined through the contact 72RC of relay to ground line 993. Relay coil 24R is joined to lead 816 and is connected through contact 74RC to ground line 993. Relay coil 25R is connected across lead 817 and ground line 993 through relay contact 75RC. Relay coil 26R is connected across lead 818 and ground line 993 through relay contact 76RC. A positive source of power indicated at 996 is connected through contact X10SF to power line 997. Line 997 is connected to contact 72RA, 74RA, 75RA and 76RA. Each of these contacts is a hold-in contact connected to the coil of its associated relay 72R, 74R, 75R and 76R respectively. The opposite lead of each of these relay coils is grounded. Each of the relay coils 72R, 74R, 75R and 76R is also connected through contacts 22RC, 24RC, 25RC and 26RC to a lead 1000. This lead is connected to relay contact 23RG.

Figure 76:
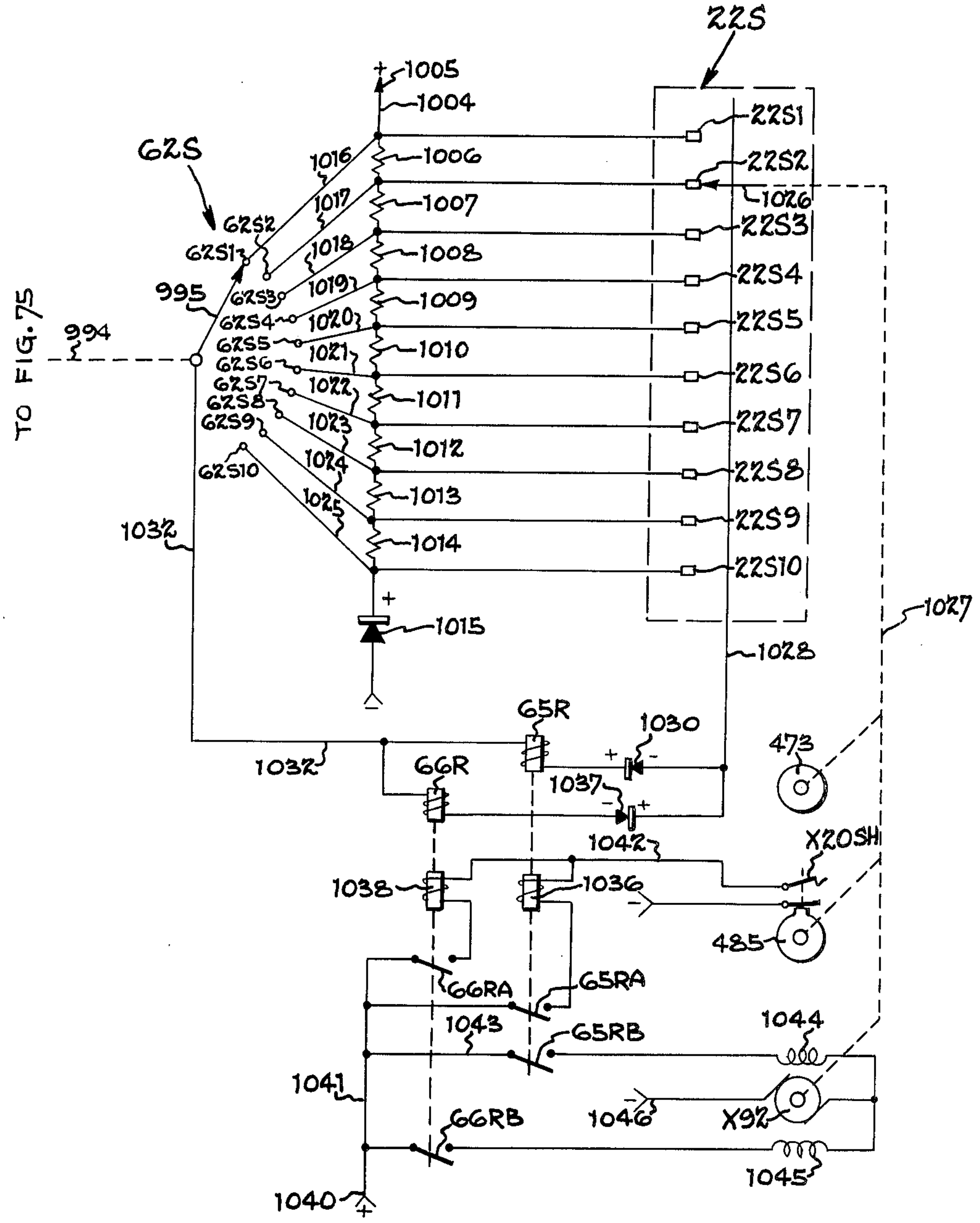
FIGURE 76 is a schematic circuit diagram showing the sort bar elevating height control.

Bar elevator control switch 62S (FIGURE 76), includes a plurality of contacts 62S1, 62S2 . . . 62S10. These contacts are connected to a voltage divider circuit including a lead 1004 connected to a positive power source indicated at 1005 and a plurality of series connected resistors 1006–1014. Resistor 1014 is grounded through a rectifier 1015. Contact 62S1 is connected through a lead 1016 to lead 1004. Contact 62S2 is connected through lead 1017 to the junctures of resistors 1006 and 1007. Contacts 62S3, 62S4 . . . 62S9 are similarly connected through leads 1018, 1019 . . . 1024 and are respectively interconnected to the junctures of resistors 1007 and 1008, resistors 1008 and 1009, resistors 1009 and 1010, resistors 1010 and 1011, resistors 1011 and 1012, resistors 1012 and 1013, and resistors 1013 and 1014. Contact 62S10 is joined through lead 1025 to the juncture of resistor 1014 and the rectifier 1015. Leads 1016, 1017 . . . 1025 are respectively connected to contacts 22S1, 22S2 . . . 22S10 of bar elevator level switch 22S. This unit also includes a movable contact 1026 which is driven in synchronism with the bar elevator screws 473 through take-off gear 485, this connection being indicated by dotted lines 1027 in FIGURE 76.

Movable contact 1026 is in electrical connection with a lead 1028. This lead is in turn joined through a rectifier 1030, the coil of "up" relay 65R, and lead 1032 to movable contact arm 995 of switch 62S. Relay coil 65R includes contacts 65RA and 65RB together with a hold-in winding 1036.

Lead 1028 is also joined through a rectifier 1037 to the coil of the "down" relay 66R, the opposite lead of this relay also being connected to lead 1032. Down relay 66R includes a hold-in winding 1038 and contacts 66RA and 66RB. A positive power source indicated at 1040 is connected through lead 1041 to contact 66RA which is in turn joined to hold-in coil 1038. This coil is connected to ground through lead 1042 and contact X20SH. In a similar manner lead 1041 is joined through a contact 65RA to hold-in coil 1038. The opposite lead of this winding is connected to lead 1042. Another lead 1043 is connected to power line 1041. This lead is connected through relay contact 65RB to winding 1044 of sort bar elevator motor X92. A second winding 1045 of this motor is connected to lead 1041 through relay contact 66RB. The armature of motor X92 is connected to the juncture of windings 1044 and 1045 and is connected to a negative lead as at 1046.

The drawer selector portion of the coordinate sort control circuit is shown in FIGURE 65. As there shown, five drawer selector buttons XDSA for selecting "all" drawers XDS1, XDS2 . . . XDS4 for selecting drawers 1, 2, 3 and 4 respectively are provided.

As is shown in FIGURES 65, a positive power supply source 1050 is connected to a start button 1051. This switch is connected to lead 1052 which is in turn joined to the coil of relay XR12, the opposite lead of this relay coil being grounded through normally closed contact X8SA of toggle switch X8S. Relay XR12 includes a hold-in contact X12RA connected to a positive potential source as at 1053. Relay XR12 has a second contact X12RB adapted to engage a stationary contact joined to line 1054. This line is connected in series with one field winding 1055 of elevator motor X54. Field winding 1055 of elevator motor X54 is connected to a second field winding 1056 of this motor and to the motor armature 1057. Movable contact arm X12RB is joined to a line 1058. This line is connected to a positive power source indicated at 1060 through series connected contacts X1SB, X2SB, X3SB and X4SB associated with elevator levelling switches X1S, X2S, X3S and X4S respectively. The second brush of armature 1057 is connected to a negative line as indicated at 1061. Winding 1056 is also joined to a power line 1062 which is connected to power source 1060, through contact X8SB of switch X8S.

A conductor 1063 is joined to power line 1062 and is connected to stationary contacts 1064, 1065, 1066 and 1067 respectively associated with movable contacts X13RA, X13RB, X13RC and X13RD of relay X13R. The coil of relay X13R is connected to a negative line as indicated at 1068 and to a lead 1070 connected to a movable contact of clear and reset switch X307. This is a manually operated switch having a stationary contact connected to power line 1062. Relay X13R is also provided with a hold-in contact X13RE effective to join the relay coil to power line 1062.

Relay contact X13RE is a double-throw contact and in the deenergized condition of relay X13R engages a stationary contact 1071. This contact is in turn joined to a conductor 1072 which is tied to leads 1073, 1074, 1075 and 1076. Conductor 1072 is also joined to stationary contact 1077 of the first drawer sort button XDS1. One movable contact 1078 actuated by drawer sort button XDS1 is connected to lead 1080 which is in turn joined through normally opened contact X1SA of switch X1S and lead 1081 to stationary contacts 1082 and 1083 associated with movable contact arms X14RA and X14RB of relay X14R. A second contact 1084 of drawer sort button XDS1 is connected to lead 1085 through a contact 1086 of "all" drawer sort button XDSA. Lead 1085 is also connected to contact 1087 associated with movable contact X1SB. Contact 1084 is also connected through series connected contact 1088 of second drawer sort button XDS2, contact 1089 of third drawer sort button XDS3, and contact 1090 of fourth drawer sort button XDS4 and lead 1063 to power line 1062.

Contacts 1084 and 1086 are adapted to be bypassed by a lead 1091 joined to movable contact X13RA of relay X13R. Contact 1078 is similarly bridged by contact 1092 of "all" drawer push button XDSA. A lead 1093 is joined to the juncture of contacts X1SB and X2SB. This lead is also joined to a lead 1094 connected to movable contact X13RB of relay X13R. Lead 1093 is also joined through contact 1095 of push button switch XDSA to contact 1088. Lead 1075 is connected to a terminal of contact 1096 of drawer selector switch XDS2. This contact is in turn joined to lead 1097 which is joined to contact 1098 which cooperates with movable contact X2SA. A second section of lead 1075 is joined to lead 1097 through contact 1099 of drawer selector push button XDSA.

Lead 1100 is taken from the juncture of switch contacts X2SB and X3SB. This lead is joined to the series combination of contacts 1101 of drawer sort button XDSA and contact 1089 of drawer sort button XDS3. A bypass lead 1102 is connected to lead 1100 and to contact X13RC of relay X13R. A lead 1103 is joined to a contact 1104 of switch X3SA and to a movable contact 1105 of drawer select button XDS3. This movable contact is adapted to be shifted into engagement with a stationary contact joined to line 1074. Line 1074 is also joined to a second stationary contact 1106 which is adapted to be joined to lead 1103 through movable contact arm 1107 associated with drawer selector button XDSA.

Lead 1109 is joined to contact 1090 of drawer selector button XDS4 through contact 1110 of drawer selector button XDSA. Lead 1108 is also joined through a second lead 1111 to contact X13RD of relay X13R. A stationary contact 1112 associated with movable contact X4SA is joined to a lead 1113, this lead in turn being connected to lead 1073 through movable contact 1114 actuated by drawer selector button XDS4. Lead 1073 is also connected to lead 1113 through movable contact 1115 connected to drawer selector push button XDSA.

One terminal of the coil relay X14R is grounded as at 1117. A second terminal of this relay is connected to lead 1118. A movable contact X14RB of relay X14R is also joined to lead 1118. The second movable contact X14RA of relay X14R is connected to lead 1120 through contact X10SD of limit switch X10S.

As is shown in FIGURE 66 a positive power source 1121 is connected through relay contact X10SA to movable contact wiper 1122 of the stepper switch SSF. Movable contact arm 1122 is stepped in unison with movable contact arm 1123 of stepping switch SSE and movable contact arm 1124 of stepping switch SSG by means of a stepping drive unit 1125.

This drive unit, as shown diagrammatically in FIGURE 66, includes a ratchet wheel 1126, mechanically connected to each of the stepping switch contact arms 1122, 1123 and 1124. A drive pawl 1127 is effective to advance ratchet wheel 1126 step by step each time the stepping switch coil 1128 is energized and de-energized. It is to be noted that a self-stepping contact 1130 is mechanically interconnected with pawl 1127. Coil 1128 of the stepping switch drive unit is connected through lead 1131 to line 1132. A second terminal of this coil is grounded as at 1133.

Contact SSF1 of stepping switch SSF is joined through lead 1134 to movable contact 23RA of relay 23R. This is a double throw contact adapted to engage stationary contact 1135 which is joined through lead 992 to prefix scan motor 990. Movable contact 23RA is also adapted to be connected to line 1132 through stationary contact 1136.

Contact SSF2 is joined to movable contact 23RB of relay 23R. This movable contact is a double-throw contact and is adapted to engage stationary contact 1140 which is connected through line 811 to motor 808 in the setup scan switch drive. Movable contact 23RB is also adapted to be connected to line 1132 through stationary contact 1142.

Contact SSF–3 is connected through a contact 90RA of relay 90R and lead 1150 to line 1132. Contact 90RA is a double-throw contact and is also adapted to engage a stationary contact 1151 joined to lead 1152. Lead 1152 is connected to main platen motor X82 through series connected contacts 65RC, 66RC, X20SA, X15SA and X5SA. A second connection is made to motor X82 from power source 1153 through series connected contacts X12SA, X13SA and X14SA. A second terminal of motor X82 is connected to a negative line as at 1154. Lead 1152 is also joined through a lead 1155 to a stationary contact 1156 associated with contact 23RC of relay 23R.

Contact SSF–4 is connected to a lead 1157. This lead is joined to movable contact 23RD of relay 23R. In the de-energized condition of this relay, relay contact 23RD is joined through lead 1158 and normally closed contact 90RB to the coil of relay 90R. Lead 1158 is also joined to cam drive motor X157 through contact X13SB. A hold-in circuit to this motor is completed from power source 1139 through contact X5SB. A second terminal of motor X157 is grounded as at 1149. The coil of relay 90R is also joined through lead 1160, normally open hold-in contact 90RC and contact X10SA to power source 1121. Contact 23RD is also adapted to be joined through stationary contact 1161 to line 1132.

Contact SSF–5 is joined to contact X5SE and through that contact is tied to lead SSF–7 and to movable contact 23RC. Contact SSF–6 is joined to lead 1162 which lead is in turn connected to contact 23RE. Contact 23RE is a double-throw contact which is joined in the de-energized condition of relay 23R to line 1132. Contact 23RE is also adapted to engage stationary contact 1163 which is joined through lead 1164 and contact X14SB to one terminal of secondary platen motor X85. The other terminal of this motor is grounded as at 1165. A hold-in circuit to motor X85 is completed from power source 1159 through contact X15SB.

Contact SSF–8 is joined to a conductor 1148, this conductor in turn being tied to movable relay contact 23RG. One stationary contact associated with relay contact 23RG is joined to lead 1000. A second stationary contact associated with movable contact 23RG is joined through contact X1SB and contact X9SA to winding 1166 of card collector motor X217. Contact X9SA is a double-throw contact and is also adapted, when actuated, to be connected to winding 1167 of motor X217. Windings 1166 and 1167 are tied together and are joined to an armature 1168, the other side of the armature being grounded as at 1170. A hold-in circuit to motor X217 is provided from a power source 1171 through contact X7SA. Conductor 1148 is also joined to movable contact 23RI. This contact is placed in series connection with contact 12SE which is in turn joined through a stationary contact to line 1132.

Contact SSF–9 is joined to a lead 1174. This lead is in turn tied to movable contacts 23RH and 23RJ. A stationary contact associated with normally open contact 23RH is joined through contact X7SB to lead 1118. Lead 1118 is also tied to series connected windings 1175 and 1176 of lock-up motor X55. Winding 1176 of this motor is in turn joined to lead 1120. Armature 1177 of motor X55 is connected to the juncture of windings 1175 and 1176 and is grounded as at 1178. A hold-in connection to motor X55 is made from power source 1180 through contacts X11SA and X10SD.

Movable contact 1123 of stepping switch SSE is joined to a positive power source 1181. Contact SSE–1 is joined to a lead 1182. This lead is connected to the parallel combination of contacts 22RA, 24RA, 25RA and 26RA, the stationary terminals of each of these contacts in turn being joined to line 1132 and to lead 804. Lead 804 is connected to movable contact 21RB and through that contact to lead 803. Lead 803 is joined to contact SUS1–18 of set-up scan switch SUS–1. Parallel connections are made through leads 1184, 1185 and 1186 to the contacts SUS2–18, SUS3–18 and SUS4–18 respectively. (These contacts are not shown. It is to be understood that they are on switches identical with switch SUS–1.) Relay 21R includes a coil 1187 joined to a lead 1188. Lead 1188 is adapted to be connected through relay coil 24RA and lead 1190 to contact SSE–2. Lead 1188 is also joined to lead 802. This lead is in turn tied to contact SUS1–17 of set-up scan switch SUS–1. Lead 802 is connected in parallel with leads 1192, 1193, and 1194. These leads are in turn respectively joined to contacts SUS2–17, SUS3–17 and SUS4–17. A second terminal of relay 21R is grounded as at 1195.

Contacts SSE–3, SSE–4 and SSE–8 are dead contacts. Contact SSE–5, SSE–6 and SSE–7 are tied together and are joined to a lead 1197 which is connected to contact 23RK. This contacts cooperates with a stationary contact 1198 which is joined through contact X5SD to parallel connected restack bar solenoids X190, a second terminal of these solenoids being grounded as at 1200.

Contact SSE–9 is joined to a lead 1201. This lead is connected through contact X11SB to line 1132. Line 1132 is also adapted to be connected to a power source 1202 through four parallel connected lines 1203, 1204, 1205 and 1206. Lead 1203 contains series connected contacts X12SC, X13SC and X14SC. Line 1204 contains contact X5SC. Line 1205 contains contact X15SC; and line 1206 contains contact X7SC.

Contacts SSG–1, SSG–2, SSG–3, SSG–4 and SSG–5 are dead contacts. Contacts SSG–6 and SSG–7 are tied together and to a lead 1207. This lead is adapted to be connected through contact 23RL and contact X14SD to restack bar solenoid coils X198. The second lead of these solenoid coils is grounded as at 1210.

Contacts SSG–8 and SSG–9 are joined to lead 1211. This lead is in turn joined to parallel connected reset solenoid X114 associated with the sort bar pusher bars 118 and reset solenoid X172, associated with the digit place cam drive. The opposite lead of each of these solenoids is grounded.

*Operation of coordinate sort machine*

In order to understand the operation of the coordinate sorting machine, assume that a user was interested in retrieving all cards related to the shear strength of corrugated plastic material. As a first step the user would examine his code book. Assume that the three key words were "shear," "corrugated" and "plastic." Upon examining his code book the user notes that "shear" is coded in the "A" field and bears the code number A75623109. The descriptor "plastic" is found in the C field and bears the code number C64782310. The descriptor "corrugated" is coded in the H field and bears the code number H32179658.

In order to program the machine to sort cards to obtain all cards having these three descriptors in common, the user would proceed as follows: as a first step, the user would push the A prefix button PB–A. When this prefix button is depressed, it closes contact 823 and energizes coil 852 of stepping switch 40S. At the same time, a potential is applied to contact 40SA of the stepping switch 40S, this contact is drawn into engagement with contact 40SA5, consequently, when the stepping switch advances movable contact 40SB into engagement with contact 40S2, a potential is applied to hold relay 40R. Relay 40R has a hold-in contact 40RA. This contact is energized from potential source 876 (FIGURE 74) through contact 50RA, lead 928, contact 75S1 of stepping switch 75S, the movable contact arm 927 of this switch, and lead 869. It is to be understood that stepper switch 75S includes movable contact arm 927 which is mechanically interconnected to ratchet wheel 841. The advance solenoid 839 of this relay is energized through relay contact 40RB when relay 40R is energized, thereby causing contact 927 to step from 75S5 to 75S1.

At the same time, contact 836 is closed and the stepping switch coil 878 of the prefix memory drive is energized from power source 876 through normally closed relay contact 50RB, contact 50S1, contact 842, contact 836, contacts 40RB, 40RA, lead 869, contact 75S1 line 928, contact 50RA. When coil 878 is energized, it causes movable contact arm 926 of stepping switch 61S to be stepped into contact with stationary contact 61S1. At the same time, movable contact arm 807 of stepping switch 35S is stepped into contact with stationary contact 35S2. When contact 932 is brought into engagement with stationary contact 61S1, the relay of coil 50R is energized. This opens contact 50RB and breaks the circuit to stepping switch coil 878. It also opens relay contact 50RA, de-energizing the hold circuit of relay 40R.

The operator having coded the prefix letter "A" then punches the number button XPB7 corresponding to the first number of the digit code "7." When push button PB7 is closed, it closes contact 567. This in turn applies a potential to the movable contact 579 of stepping switch MS–1. This potential is in turn applied through lead 632 to the locking solenoid 698 of digit place memory unit DPM–1. When this solenoid is energized its armature enters a slot in cam 709 locking movable contact 47S in engagement with stationary contact 47SA. At the same time, contact 698A is closed causing a circuit to the movable contact of stepping switch 47S. As a consequence, a circuit is completed from bar release solenoid BS7 through lead 766, switch 47S and lead 723 to contact SUS1–2 of set-up scan switch SUS1.

Figure 80:
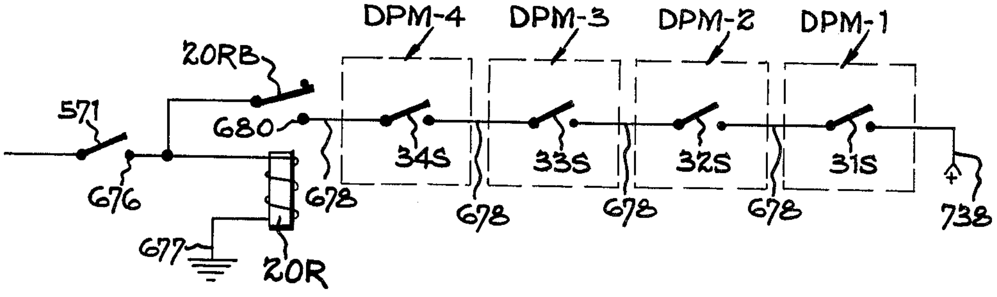
FIGURE 80 is a schematic circuit diagram showing the interconnection of contacts in the digit place memory units.

At the same time that push button XPB7 is depressed, switch 571 is actuated to complete a circuit to the coil of relay 20R. A signal is also applied through contact 20RB to a lead 678. As is shown in FIGURE 80, this lead contains the series connected contacts 34S in DPM–4, 33S in DPM–3, 32S in DPM–2 and contact 31S in DPM–1. This completes a hold circuit to relay 20R from positive power source 738. When push button XPB7 is released, contact 571 is returned to its original position in series with relay contact 20RA. This completes a circuit through lead 674, movable contact 673, stationary contact 681 and lead 685 to advance solenoid 686 of drive unit 689. This drive unit is effective to step all of the cams 703–712 one increment except for cam 708 which is locked in place by the armature of solenoid 697. At the same time that coil 686 is energized, contact 31S is opened which interrupts the hold circuit to relay 20R.

The next digit input is "5." When the XPB5 push button is pressed the same sequence of events occurs. Specifically, when the XPB5 push button is depressed, switch 565 is closed. This in turn applies a potential to the movable contact 577 of stepping switch MS–1. As a result, a potential is applied through lead 630 to the locking solenoid 696 of digit place memory unit DPM–1. When solenoid 696 is energized, the armature associated with the solenoid enters a slot in cam 707 locking movable contact 45S in engagement with stationary contact 45SB. At the same time, contact 696A is closed to complete a circuit to the movable contact of stepping switch 45S. As a consequence, a circuit is completed to bar release solenoid XBS5 through lead 764, switch 45S and lead 724 to contact SUS1–4 of set-up scan switch SUS–1.

When push button XPB5 is depressed, switch 571 is also actuated to complete a circuit to the coil of relay 20R. A potential is also applied through contact 20RB to lead 678 to complete a hold circuit to relay 20R from power source 738. When push button XPB5 is released, contact 571 is returned to its original position to complete a circuit through lead 674, movable contact 673, stationary contact 681 and lead 685 to the advance solenoid 686 of drive unit 689. This drive unit is effective to step all of the cams 703–712 one increment except cam 708 which was previously locked in place and cam 707 which was locked in place in the present step. At the same time that coil 686 is energized, contact 31S is opened de-energizing relay 20R.

The remaining digits of the A code number, i.e., digits 6, 2, 3, 1, 0 and 9 are sequentially programmed by depressing in turn push buttons XPB6, XPB2, XPB3, XPB1, XPB0 and XPB9. The "6" digit is stored in switch level 47S, the movable contact of which is locked in engagement with stationary contact 47SC. This completes a circuit between bar release solenoid XBS6 and contact SUS1–6 of set-up scan switch SUS–1.

The "2" digit is stored in switch level unit 42S and the movable contact of that switch is locked in engagement with contact 42SD. This completes a circuit between the bar release solenoid XBS2 and set-up scan switch contact SUS1–8.

The "3" digit is stored in switch level 43S, the movable contact of which is locked in engagement with contact 43S3. This completes a circuit from bar release solenoid XBS3 to set-up scan switch contact SUS1–10.

The "1" digit is stored in stepping switch level 41S. The movable contact of this switch is locked in engagement with stationary contact 41SF and completes a circuit from set-up scan switch contact SUS1–12 to bar release solenoid XBS1.

The "0" digit is stored in switch 50S, the movable contact of which is locked in engagement with stationary contact 50SG. This completes a circuit from set-up scan switch contact SUS1–14 to bar release solenoid XBS0.

The last digit, "9," is stored in switch level 49S, the movable contact of which is locked in engagement with stationary contact 49SH. This completes a circuit from bar release solenoid XBS9 to set-up scan switch contact SUS1–16.

The next code to be punched is C64783210. The user next punches the C prefix button PB–C. When the PB–C button is depressed it closes contact 825 and energizes relay 42S. A positive potential is thus applied to contact 42SA of this relay which is brought into engagement with stationary contact 42S5. Thus, a potential is applied to movable contact 40SB which is stepped into engagement with stationary contact 40S2. This completes circuit to the relay coil 42R. Relay 42R then closes contacts 42RA, 42RB and 42RC. Contact 42RB completes a circuit to the stepping switch magnet 839 causing each of the movable contacts of stepping switches 50S, 51S, 52S . . . 60S and 75S to be advanced into engagement with contacts 50S2, 51S2 . . . 60S2 and 75S2.

This same stepping switch drive also advances contacts 573–673 into engagement with contacts 586, 591, 595, 599, 603, 607, 611, 615, 619, 623 and 682 respectively.

At the same time, contact 836 actuated upon the stepping of drive unit 584 closes a circuit to contact 50S2. This completes a circuit through lead 881 to the advance magnet of a stepping switch in prefix memory unit PM–2 corresponding to magnet 878 in unit PM–1. At the same time, a hold-in circuit to relay coil 42R is completed through contact 42RA, through contact 75S2 and through a normally closed contact corresponding to normally closed contact 50RA. The stepping unit in the prefix memory unit PM–2 steps until a movable contact corresponding to movable contact 932 of stepping switch 61S is brought into engagement with the energized contact, in this case the contact corresponding to 61S2 interconnected to lead 896. At the same time, the follower contact arm corresponding to arm 897 is shifted into engagement with the contact corresponding to contact 35S3 in PM–1. As soon as the movable contact arm in PM–2 corresponding to contact arm 932 engages the contact corresponding to 61S3, a relay corresponding to relay 50R is energized. This opens the contact corresponding to contact 50RA opening the circuit to the hold-in relay 42R and to the stepping switch.

After the operator has programmed in the code letter C, he depresses push button XPB6 which is the code button corresponding to the first digit of the C code number. When push button XPB6 is depressed, switch 566 is closed to complete a circuit through lead 641 to a solenoid in digit place memory DPM–2 corresponding to solenoid 697 in DPM–1. This solenoid is effective to lock the contact level in DPM–2 corresponding to 46S in DPM–1 with its movable contact in engagement with the first contact, i.e., the contact corresponding to contact 46SA. This, then, completes a circuit from the second set-up scan switch contact SUS2–2 to the release solenoid XBS6 associated with the "6" sorting bar.

In a similar manner, when the second digit is programmed by depressing XPB4, a circuit is completed from bar release XBS4 to contact SUS2–4. When push button XPBS7 is depressed, a circuit is completed from bar release solenoid XBS7 to contact SUS2–6. The digit "8" is next programmed by depressing push button XPB8 and a circuit is established from contact SUS2–8 to bar reelase solenoid XBS8. When push button XPB3 is depressed to program digit "3," a circuit is established from contact SUS2–10 to bar release solenoid XBS10. Similarly, when the push buttons XPB2, XPB1 and XPB0 are depressed, circuits are respectively established from contact SUS2–12 to bar release solenoid XBS2, from contact SUS2–14 to bar release solenoid XBS1, and from contact SUS2–16 to bar release solenoid XBS0.

The third field to be coded is the "H" field, the "H" field code number being H32179658. To program this number the operator depresses the push button PB–H. When PB–H button is depressed, contact 830 is closed to energize relay 47S. A positive potential is also applied to relay contact 47SA and through that contact to stationary contact 47S5. Since stationary contact 47S5 is connected to movable contact 47SB, a circuit is completed through this contact to the coil of relay 47R. When relay 47R is energized, contacts 47RA, 47RB and 47RC are closed. Contact 47RB completes a circuit to the stepping switch magnet 839 causing each of the switches 50S, 51S . . . 60S and 75S to be stepped one position into engagement with contacts 50S3, 51S3 . . . 60S3 and 75S3. At the same time, contacts 563–573 are advanced into engagement with contacts 587, 592, 600, 604, 608, 612, 616, 620, 624 and 683 respectively.

When relay coil 839 is energized, it also closes contact 836. This completes a circuit through contact 50S3 and lead 882 to the advance magnet of a stepping switch in prefix memory unit PM–3 corresponding to advance magnet 878 in unit PM–1. At the same time, a hold-in circuit is completed through contact 47RA to relay coil 47R. This hold-in circuit includes contact 75S3 and a normally closed contact in PM–3 corresponding to contact 50RA in PM–1. The stepping unit in the prefix memory unit PM–3 steps until a movable contact corresponding to movable contact 932 of stepping switch 61S is brought into engagement with a contact (corresponding to contact 61S8) connected to line 912. At the same time, the follower arm in the prefix unit PM–3 corresponding to arm 807 is shifted into engagement with the contact corresponding to contact 35S8 in PM–1. As soon as the movable contact arm in PM–3 corresponding to contact arm 932 engages the contact corresponding to contact 61S8, a relay corresponding to relay 50R is energized. This opens the contact corresponding to contact 50RA opening the circuit to the hold-in relay 47R and to the stepping switch.

After the operator has depressed the "H" code letter, he then depresses in order the number buttons corresponding to the digits of the "H" code number. These buttons are XPB3, XPB2, XPB1, XPB7, XPB9, XPB6, XPB5 and XPB8. When these push buttons are depressed, they energize their associated hold-in relays and switches and complete circuits through the various levels of memory selector switch MS–1 between the bar release solenoids and the third set-up scan switch SUS3. Specifically, XBS3 is connected to SUS3–2, XBS2 is connected to SUS3–4, XBS1 is connected to SUS3–6, XBS7 is connected to SUS3–8, XBS9 is connected to SUS3–10, XBS6 is connected to SUS3–12, XBS5 is connected to SUS3–14 and XBS8 is connected to SUS3–16.

It is to be understood that while in this particular example the sorting machine is coded with descriptors in three fields, the machine can be coded with descriptors in either one field, two fields, three fields or four fields. The machine will operate in essentially the same manner when programmed to sort in any of these numbers of fields.

At this point, an auxiliary function of the stepping switches 40S–43S will be explained. In the description of a preferred form of coding system given above, it was pointed out that in some types of coding it is desirable to utilize only a portion of the total numbers in a given coding field for the genera within the field. In the specific example being considered, assume that it is desirable to locate all cards comparing the "shear" and tensile strength of plastic corrugated material. It will be recalled that the descriptor of "shear" is coded in the A field as A75623109. Assume that the descriptor of "tensile" is A75623108. On cards in which both a shear and tensile strength are compared, one advantageous coding scheme involves the transfer of the "tensile" code number to the corresponding number in the B field, i.e., B75623108 (this portion of the B field being otherwise unused).

In the example given above, if the operator was desirous of finding only cards which compare the shear and tensile strength, after programming the A code number corresponding to shear, i.e., A75623109, the operator would again depress the A button corresponding to the code number of tensile, i.e., A75623108.

It will be recalled that when PB–A was initially depressed, its associated stepping switch 40S was effective to step movable contact 40SB into engagement with contact 40S2. When push button PB–A is depressed for the second time, movable contact 40SB is stepped one more position into engagement with contact 40S3. Contact 40S3 is connected through lead 475 to relay 41R which is normally energized by the B push button PB–B. Consequently, when the A push button is depressed for the second time, it energizes the prefix memory circuit as though the B prefix button PB–B were the push button depressed.

Similarly, if the A push button is depressed for a third time, stepping switch contact 40SB is stepped into engagement with contact 40S4 with the result that relay 42R is energized. This relay is normally associated with the PB–C contact (C field). Consequently, when the A push button is depressed for the third time, the prefix memory portion of the circuit is actuated in the same manner as if the C push button PB–C had been depressed.

After all of the code numbers have been programmed into the machine, the operator depresses the start button 1051 to complete a circuit to relay XR12, the other lead of this relay being grounded through normally closed contact X8SA. The elevator then proceeds to the first drawer and the elevator locking bars are engaged in the same manner as was described in the operation of the generic machine. As soon as these bars are advanced to actuate "out" limit switch X10S, contact X10SA is closed, applying a potential to movable contact 1122 of stepping switch SSF. This energizes the prefix scan motor 990 through relay contact 23RA.

Motor 990 drives the movable contact arm 987 in a clockwise direction until contact wiper 987 engages energized contact PSS1. This completes a circuit through lead 940, stationary contact 35S2 and movable contact wiper 807 of stepping switch 35S to relay coil 22R. When the coil of relay 22R is energized, it closes contacts 22RA, 22RB and 22RC. When contact 22RB is closed, a circuit is completed through lead 806 to the movable contact 805 of the set-up scan switch SUS1.

At the same time, contact 22RA completes a circuit from the positive power source 1181 through stepping switch SSE line 1182, contact 22RA and line 1132 to drive solenoid 1128. When drive solenoid 1128 is energized, it advances contact arms 1122, 1123, and 1124 of switches SSF, SSE and SSG into engagement with contacts SSF2, SSE2 and SSG2 respectively. This de-energizes motor 990.

When stepping switch wiper 1122 engages stepping switch contact SSF2, it completes a circuit to the set-up scan switch motor 808. This motor in turn rotates contact wiper 805 on all of the set-up scan switches SUS1, SUS2, SUS3 and SUS4. In the A code number "7" is the first digit. As soon as movable contact 805 engages stationary contact SUS1–2, corresponding to the first digit place, a circuit is completed to bar release solenoid XBS7. This frees the pusher bar 500 associated with the "7" sort bar to be shifted to the right until it engages the adjacent digit place cam 513. This cam has not been stepped so that lug 512 engages the arcuate segment of the shortest radius of the digit place cam. Scan switch drive motor 808 continues to advance switch arm 805. Arm 805 next engages contact SUS1–3. At this time a circuit is completed to advance solenoid X167 of the digit place cam drive 555. This drive is effective to rotate cam shaft 521 one increment to advance all of the place cams except cam 513 associated with the "7" which is locked in place by its contact with abutment 512.

Motor 808 continues to rotate and to drive contact 805 arm. The next contact engaged by arm 805 is SUS1–4. Contact SUS1–4 is connected to bar release solenoid XBS5. When this bar release solenoid is energized, its associated pusher bar 500 is released and moves to the right into engagement with the associated digit place cam 513. This cam has been advanced one unit so that the lug 512 of the associated pusher bar engages the segment of second shortest radius and locks the associated cam 513 in place.

As motor 808 continues to drive contact arm 805, arm 805 next engages contact SUS1–5. This again completes a circuit to advance solenoid X157 of the digit place cam drive 555. All of the digit place cams are stepped one position. As motor 808 continues to rotate, arm 805 next engages contact SUS1–6 which is connected to bar release solenoid XBS6. When this solenoid is energized, its associated pusher bar is released and engages the third arcuate step on the adjacent digit place cam 513.

As motor 808 continues to rotate, it alternately releases the pusher bars and advances the digit place cams. Thus, the bar release cam associated with the "2" sort bar is released to engage the fourth step on its digit place cam 513. The pusher bars respectively associated with sort bars "3," "1," "0" and "9" are respectively brought into engagement with the fifth, sixth, seventh and eighth arcuate segments of their associated digit place cams.

At the same time that the sort bar advance mechanism is being conditioned to advance the sort bars in conformity with the programmed code, the sort bars and carrier frame 471 are elevated to the proper position to search the selected field, in this example the A field. More particularly, when motor 990 was rotated to bring contact wiper 987 into engagement with stationary contact PSS1, a follower contact 995 of switch 62S was brought into engagement with contact 62S10.

If contact 1026 is not in engagement with contact 22S10, then a potential is picked off of the voltage divider by contact 1026 and applied through rectifiers 1030 and 1037 to "up" relay 65R or "down" relay 66R. With movable contact 1026 in the position shown in FIGURE 76, a negative potential is sensed by contact 1026 and consequently current flows through "up" relay coil 65R. This energizes "up" winding 1044 of the sorting bar elevator motor X92 through relay contact 65RB.

At the same time, a second, or hold-in, coil of relay 65R is energized through contact 65RA and the X20S switch which is closed as soon as the elevator motor X92 is shifted from its "home" position. Every time the elevator is shifted one level, switch X20H is opened, dropping out the hold-in relay coil so that a new sensing operation must be made through contact 1026 in order to maintain the elevator motor X92 energized.

In the present example, when the carrier frame 471 had been raised one level, contact X26 would only have shifted into engagement with contact 22S3. Consequently, a negative signal would still be sensed and the "up" winding 1044 would be reenergized through relay 65R. This operation would continue until the elevator motor X92 has raised the carrier frame into proper alignment to make an A sort. At this time contact 1026 would engage stationary contact 22S10 and no potential would be sensed by contact 1026 so that both relays 65R and 66R and the "up" and "down" elevator windings would remain de-energized.

When the motor 808 has driven contact wiper 805 to a point where it engages contact SUS1–17, a potential is applied through end 802 to relay 21R (FIGURE 66). This relay pulls in and shifts its contacts 21RA and 21RB. Relay contact 21RB is a hold-in contact since that contact is joined to a source of positive potential 1181 through contact wiper 1123 and stationary contact SSE2. When the motor 808 drives contact wiper 805 to position SUS18, a potential is applied through lead 803 and contact 21RB to stepping switch coil 1128. This causes each of the movable contacts 1122, 1123 and 1124 to be advanced into engagement with stationary contacts SSF3, SSE3 and SSG3. At the same time, the hold circuit to contact 21R is opened, dropping out relay 21R. This also stops further rotation of motor 808 since contact SSF2 is open.

Since both relays 65R and 66R are deenergized, their normally closed contacts 65RC and 66RC are closed. Thus, a circuit is completed through these contacts, contact 90RA; normally closed contacts X20SA, X15SA and X5SA to primary platen drive motor X82.

When main platen drive motor X82 is energized, it advances the platen against the cards and then retracts the platen to the sorting position in the same manner as explained in connection with the generic device. When motor X82 has retracted the platen to the sorting position, limit switch X13S is actuated opening contact X13SA to de-energize the motor X82. When this limit switch is actuated, it closes contact X13SB. As soon as motor X82 starts to rotate, limit switch X12S is actuated to close hold-in contact X12SA. At the same time, contact X12SC closes to complete a circuit to advance coil 1128 advancing the movable contacts 1122, 1123 and 1124 into engagement with contacts SSF4, SSE4 and SSG4. Subsequently, when the motor X82 withdraws the platen to the sorting position closing actuating switch X13S and closing contact X13SB, sorting bar cam motor X157 is energized. This motor drives the eccentric cams to advance the sorting bars to varying depths in accordance with the position of the various pusher bars 500 and then retract the bars. (When motor X157 starts to rotate, it actuates switch 5S to close contacts 5SB and 5SC. Contact 5SC completes a circuit to stepper coil 1128 advancing the movable contact arms 1122, 1123 and 1124 to the fifth position i.e. into engagement with contacts SSF5, SSE5 and SSG5).

At the same time, the coil of relay 90R is energized through normally closed contact 90RB. This closes contact 90RC before contact 90RB opens. Contact 90RC functions as a hold-in contact for the relay 90R. As soon as motor X157 returns to its home position, it again actuates switch X5S to close contact X5SE. This completes a circuit through contact 23RC and line 1132, interrupter contact 1130 to stepper coil 1128 advancing the contact arms 1122, 1123 and 1124, to their sixth position in engagement with SSF6, SSE6 and SSG6. When coil 1128 is energized, interrupter contact 1130 is opened momentarily. When the stepping contacts reach their sixth position, a circuit is completed through normally closed contact 23RE to interrupter contact 1130 and hence to coil 1128. This steps the drive pawl 1127 and the movable contacts 1122, 1123 and 1124 to their seventh position in engagement with contacts SSF7, SSE7 and SSG7. A circuit is then completed from contact SSF7 through contact 23RC and stepper 1130 to magnet 1128. This causes the movable contacts 1122, 1123 and 1124 to be stepped to the eighth position in engagement with contacts SSF8, SSE8 and SSG8.

When arm 1122 engages contact SSF8, a circuit is completed through contact 23RG to line 1000. This completes a circuit through contact 22RC to relay 72R. When relay 72R is energized, its hold-in contact 72RA is closed and contact 72RC is opened. This de-energizes relay coil 22R.

Another circuit is completed from the positive power source connected to movable contact 1124 of switch SSG through contact SSG8 to digit place cam reset solenoid X172 and pusher bar reset solenoid X114. Thus, the pusher bars 500 are retracted and the digit place cams 513 are reset ready to receive a new code number.

In a similar manner, when the contacts reach their eighth position, a circuit is completed from contact SSF8 through contact 23RI and interrupter contact 1130 to energize stepper magnet 1128. The movable contacts are thus stepped to their ninth position in engagement with contacts SSF9, SSE9 and SSG9. In this position, a circuit is completed from SSF9 through normally closed contact 23RJ and interrupter contact 1130 to magnet 1128. This causes the movable contacts to be returned to their original position in engagement with SSF1, SSE1 and SSG1.

When contact arm 1122 returns to engagement with stationary contact SSF–1, prefix scan motor 990 is re-energized. This motor drives movable contact arm 987 until that contact engages the next energized contact which is PSS–3, this contact being energized through prefix memory unit PM–2. When movable contact arm 987 engages energized contact PSS–3, a circuit is completed through leads 942 and 952 to a contact in PM–2 corresponding to contact 35S4 in PM–1. From this contact a circuit is completed through the associated movable switch contact and lead 816 to relay coil 24R.

When this relay is energized, it closes contacts 24RA, 24RB and 24RC. When contact 24RB is closed, a circuit is completed through lead 816 to the movable contact of the second set-up scan switch SUS–2 corresponding to contact 805 of SUS–1. At the same time, relay contact 24RA completes a circuit from power source 1131 to drive solenoid 1128. When drive solenoid 1128 is energized, it advances contact arms 1122, 1123 and 1124 into engagement with contacts SSF–2, SSE–2 and SSG–2. This de-energizes motor 990.

When stepping switch wiper 1122 engages contact SSF–2, a circuit is completed to the set-up scan switch motor 805. This motor in turn rotates wiper 805 on all of the set-up scan switches SUS–1–SUS–4. (Only the wiper in SUS–2 is energized.) As the wiper of set-up scan switch SUS–2 is advanced, it senses the signals stored in digit place memory unit DPM–2. The stepping switch thus alternately causes the bar release solenoids corresponding to these stored signals to be de-energized and the digit place cams advanced in the manner explained above.

At the same time the sort bar positioning mechanism is being conditioned for operation by the set-up scan switch, carrier frame 471 is elevated into alignment with the C field. This is accomplished by follower contact 995 of the prefix scan switch which is brought to rest in engagement with contact 62S8. Since the carrier frame is now disposed at an elevation higher than that required, contact 1026 senses a positive signal and is effective to energize the "down" relay 66R. This in turn effects energization of the sort bar elevator motor X92 which is effective to bring the sorting bar into alignment with the C notch sites in the manner explained above.

When the movable contact of set-up scan switch SUS2 engages contact SUS2–17, relay 21R is energized as explained above. Subsequently, when the movable arm wiper engages SUS2–18, stepping switch coil 1128 is energized advancing contacts 1122, 1123 and 1124 into engagement with contacts SSF–3, SSE–3 and SSG–3. This drops out relay 21R and de-energizes motor 808.

When contact 1122 of switch SSF engages SSF3 a circuit is established through contact 90RA (which was previously shifted) to complete a circuit through line 1132 and interrupter switch 1130 to energize coil 1128. This causes the coil to advance the switch wiper arms 1122, 1123 and 1124 to their fourth position in engagement with contacts SSF4, SSE4 and SSG4. At this time, the motor X157 is energized to advance the platen sorting bars for the second sort.

The operating sequence for the remainder of the cycle is the same as that explained above. After the conclusion of the "C" sort, the stepper switch contacts are again stepped around to engagement with the first contacts, SSF1, SSE1 and SSG1. The same cycle as just described is repeated for the third sort in the H field. Only three fields are coded. Consequently, when the movable contacts 1122, 1123 and 1124 again reach the "1" position in engagement with SSF1, SSE1 and SSG1, motor 990 is again energized.

Motor 990 then advances movable contact 987 until it engages stationary contact PSS11. This energizes relay 51R actuating its hold-in contact 51RB. Upon further advancement, contact 987 reaches position PSS12. This completes a circuit through contact 51RA and line 985 to energize relay 23R (FIGURE 66). When relay 23R is energized, its hold-in contact 23RF is closed to complete a hold-in circuit through contact X10SB.

As soon as relay 23R is energized, a circuit is completed through contact SSF1 and relay contact 23RA to magnet 1128. This advances the stepper switch contact arms 1122, 1123 and 1124 to the second position. At the same time, the actuation of relay 23R de-energizes prefix scan motor 990 by opening the circuit at contact 1135. As soon as contact 1122 reaches position SSF2, a circuit is completed through contact 23RB to stepping solenoid 1128. This advances contact arms 1122, 1123 and 1124 into engagement with contacts SSF3, SSE3 and SSG3. When arm 1122 engages SSF3 a circuit is completed to solenoid 1128 which advances contact arms 1122, 1123 and 1124 into contact with SSF4, SSE4 and SSG4. When contact arm 1122 engages contact SSF4 a circuit is completed to stepper magnet 1128. This magnet advances arms 1122, 1123 and 1124 to the fifth position in engagement with contacts SSF5, SSE5 and SSG5.

A circuit is then completed from SSF5 to primary platen drive motor X82. As soon as motor X82 starts to withdraw the platen from the sorting position a circuit is completed to restack elevating solenoids X190 through contacts 23RK and 5SD. It is to be understood that the restack bar drops in behind the tabs of the selected cards and in front of the tabs of the rejected cards prior to the time that motor X82 is effective to retract the platen any appreciable disance from its sorting position.

Further rotation of motor X82 functions to retract the platen to a position in which the restack bar, which slides along the top edges of the cards, is disposed above restack slots 452 in the cards 450. As the sorting platen is withdrawn beyond the sorting position, normally open contact 13SA is closed to complete a holding circuit to motor X82. At the same time, normally open contact X13SC is closed to complete a circuit from power source 1202 to stepping switch solenoid 1128. This causes contacts 1122, 1123 and 1124 to be advanced one position into engagement with contacts SSF6, SSE6 and SSG6. When the platen is retracted to the position shown in FIGURE 36 with the restack bar inserted in the restack slots, switch X14S is actuated to open contacts X14SA de-energizing motor X82. At the same time contact X14D closes to energize restack hold magnets X198.

At the same time contact X14SB closes completing a circuit to secondary platen drive motor X85. As soon as motor X85 starts to rotate contact X15SB closes, completing a hold-in circuit to the motor. Contemporaneously, contact X15SC completes a circuit from power source 1202 to stepping switch magnet 1128. This causes stepping switch drive 1125 to advance contacts 1122, 1123 and 1124 into engagement with contacts SSF7, SSE7 and SSG7 respectively. A circuit is completed to solenoids X198 from contact SSG6 through contacts 23RL and X14SA. When motor X85 is actuated the platen is advanced inwardly until the rejected cards are forced by the restack bar against the rear wall of the card compartment. As motor X85 continues to rotate, the platen is retracted to its position before motor X85 was energized. As soon as the platen is returned to this position, i.e., when motor X85 has gone through one complete cycle, contact X15SB is opened to de-energize motor X85. Subsequently, when contact X15SA is closed, motor X82 is re-energized to start the complete withdrawal of the selected cards.

At the same time, contact X15SC is closed to complete a circuit to stepping switch magnet 1128 which causes movable contacts 1122, 1123 and 1124 to be advanced into engagement with stationary contacts SSF8, SSE8 and SSG8 respectively. When motor X82 has completely retracted the platen to effect a complete disengagement of the selected cards, switch X12S is actuated opening contact X12SA to de-energize motor X82. At the same time contact X12SB is closed to energize the card collector drive motor X217 through contact X9SA which is in series with the "advance" winding 1166 of the card collector motor. When the card collector motor leaves its rear position, switch X7S is actuated. This establishes a hold-in circuit to winding 1166 through contact X7SA. At the same time contact X7SC is closed to complete a circuit to stepping magnet 1128 of drive unit 1125. This steps contacts 1122, 1123 and 1124 into engagement with stationary contacts SSF9, SSE9 and SSG9 respectively.

When the card collector plate is advanced it sweeps all of the selected cards from contact with the platen magnet. These cards are dropped into the tray as was explained previously. At the forward extreme position of the card collecting plate, limit switch X9S is actuated to bring contact X9SA into engagement with stationary contact 1170. This completes a circuit to the "retract" winding 1167 of motor X217. Thus, the card collecting drive is reversed and the card collecting plate is returned to its rear, or retracted position. When the card collecting plate reaches its retracted position, switch X7S is actuated to open contact X7SA de-energizing motor X217. At the same time, switch X9S is returned to its original position as is shown in FIGURE 66.

When the card collector plate returns to its rearward position it also closes contact XS7B to complete a circuit to retract winding 1175 of lock-up motor X55. This motor thus withdraws the plungers inwardly from engagement with the apertures in the vertical rails. When the plungers are completely withdrawn, "in" limit switch 11SB is closed. This contact completes a circuit to stepping solenoid 1128 and causes switch drive 1125 to advance contacts 1122, 1123 and 1124 into engagement with contacts SSF–1, SSE–1 and SSG–1 respectively. When the motor X55 retracted the plungers, switch X10 was also actuated. The contacts of this switch drop out relay 90R as well as relays 72R–76R and 23R. It also drops out relay 51R. The circuit is then conditioned to sort the next drawer.

If more than one drawer is to be searched the elevator is shifted into alignment with the new drawer as described above. The cycle of operation is then repeated. After the last drawer has been searched the elevator is returned to its uppermost position as described above. During the return of the elevator switch X8S is actuated. This completes a circuit through contact X8SH to the reset solenoid 757 in the digit place memory switches to reset these switches.

From the foregoing disclosure of the general principles of the present invention and the above detailed description of two embodiments, those skilled in the art will readily comprehend the many modifications to which the invention is susceptible. For example, it is contemplated that the sorting bars can be positioned by purely mechanical means if desired. In one extremely simple form of apparatus, each of these bars can be connected through a rack and pinion drive to rotatable knobs provided with dials for indicating the increments of advancement of the sorting bars.

As another example of a contemplated modification, while the digit place memory storage units of the illustrative embodiments shown are of an electro-mechanical construction, these units could also be any suitable form of electrical or electronic storage devices if desired. These and many other changes will readily suggest themselves to those skilled in the art. Accordingly, we desire to be limited only by the scope of the following claims.

Having described our invention, we claim:

1. In apparatus for mechanically separating edge notched cards bearing a predetermined coding from a plurality of different cards, each of said cards having a magnetically responsive portion thereon, the invention which comprises a platen, a plurality of vertically spaced sorting bars carried by said platen, means for selectively extending said bar outwardly from said platen, and a magnet disposed adjacent to said bars for attracting the magnetically responsive portion of said cards.

2. In apparatus for mechanically removing cards bearing a predetermined coding from a plurality of different cards, a movable platen, a plurality of vertically spaced sorting bars carried by said platen, means for selectively extending said bars outwardly from said platen, and means for shifting said platen relative to cards in a direction parallel to the extent of said sorting bars.

3. In apparatus for mechanically removing edge notched cards bearing a predetermined coding from a plurality of different cards, a platen, a plurality of vertically spaced sorting bars carried by said platen, means for selectively extending said bars outwardly from said platen, said bars being effective to shift cards not having the predetermined coding from the selected cards having said coding, means for shifting said platen relative to cards in a direction parallel to the extent of said sorting bars, and means carried by said platen for engaging the separated cards and withdrawing said cards outwardly upon retractive movement of said platen.

4. In apparatus for mechanically separating edge notched cards bearing a predetermined coding from a plurality of different cards, each of said cards having a magnetically responsive portion thereon, the invention which comprises a platen, a plurality of vertically spaced sorting bars carried by said platen, means for selectively extending said bars outwardly from said platen, and means for shifting said platen relative to cards in a direction parallel to the extent of said sorting bars, and a magnet disposed adjacent to said bars for attracting the magnetically responsive portion of said cards.

5. In apparatus for mechanically removing edge notched cards bearing a predetermined coding from a plurality of different cards, each of said cards having a slotted magnetically responsive portion, the improvement which comprises a platen, a plurality of vertically spaced sorting bars carried by said platen, means for selectively extending said bars outwardly from said platen, and means for shifting said platen relative to cards in a direction parallel to the extent of said sorting bars, and an elongated magnetic member carried by said platen, a non-magnetic element extending outwardly from said platen parallel to said sorting bars for reception in the slots formed in magnetically responsive portions of said cards.

6. In apparatus for mechanically removing edge notched cards bearing a predetermined coding from a plurality of different cards, each of said cards having a slotted magnetic portion, the invention which comprises a platen, a plurality of vertically spaced sorting bars carried by said platen, means for selectively extending said bars outwardly from said platen, means for shifting said platen relative to cards in a direction parallel to the extent of said sorting bars, and an elongated magnetic portion carried by said platen, a non-magnetic element extending outwardly from said platen parallel to said sorting bars for reception in the slots formed in magnetically responsive potrions of said cards, said elongated magnetic portion being disposed substantially half-way between the uppermost and lowermost of said sorting bars.

7. In apparatus for mechanically separating edge notched cards bearing a predetermined coding from a plurality of different cards, a platen, a plurality of vertically spaced sorting bars carried by said platen, means for selectively extending said bars outwardly from said platen, and means for vertically shifting said sorting bars relative to said cards.

8. In apparatus for mechanically separating edge notched cards bearing a predetermined coding from a plurality of different cards, a platen, a plurality of vertically spaced sorting bars carried by said platen, means for selectively extending said bars outwardly from said platen, and means for shifting said platen relative to cards in a direction parallel to the extent of said sorting bars, and means for vertically shifting said sorting bars relative to said cards.

9. In apparatus for mechanically separating edge notched cards bearing a predetermined coding from a plurality of different cards, each of said cards having a magnetically responsive portion thereon, the invention which comprises a platen, a plurality of vertically spaced sorting bars carried by said platen, means for extending said sorting bars outwardly, means for shifting said platen relative to said cards in a direction parallel to the extent of said sorting bars, a magnet disposed adjacent to said bars for attracting the magnetically responsive portions of said cards, and a vertically shiftable restack bar engageable with the tabs of non-selected cards and with the restack slot in said cards, and means for shifting said restack bar in synchronism with the movement of said platen toward said pile of cards.

10. In apparatus for mechanically separating edge notched cards bearing a predetermined coding from a plurality of different cards, each of said cards having a magnetically responsive portion thereon and an upwardly tab, the invention which comprises a platen, a plurality of vertically spaced sorting bars carried by said platen, means for selectively shifting said sorting bars outwardly from said platen, a magnet disposed adjacent to said bars for attracting the magnetically responsive portion of said cards, means for shifting said platen toward and away from said cards, and a vertically shiftable stop member engageable with the tabs of said cards to restrain said cards from movement when said platen is shifted.

11. In apparatus for mechanically separating edge notched cards bearing a predetermined coding from a plurality of different cards, each of said cards having a magnetically responsive portion thereon, the invention which comprises a platen, a plurality of vertically spaced sorting bars carried by said platen, first means for selectively extending said bars outwardly from said platen to shift cards having nonconforming notches away from said platen, means for shifting said platen relative to said cards toward and away from said cards, a magnet carried by said platen for cooperative engagement with the magnetically responsive portions of said cards, whereby the cards not rejected by said bars are shifted under the influence of said magnet in accordance with the movements of said platen, and second means for restraining the separated cards from movement with said platen.

12. In apparatus for mechanically separating edge notched cards bearing a predetermined coding from a plurality of different cards, each of said cards having a magnetically responsive portion thereon and an upwardly extending tab, the invention which comprises a platen, a plurality of vertically spaced sorting bars carried by said platen, first means for selectively extending said bars outwardly from said platen to shift cards having nonconforming notches away from said platen, means for shifting said platen relative to said cards toward and away from said cards, a magnet carried by said platen for cooperative engagement with the magnetically responsive portions of said cards, whereby the cards not rejected by said bars are shifted under the influence of said magnet in accordance with the movements of said platen, and second means for restraining the separated cards from movement with said platen, said second means comprising a thin bar and means for vertically shifting said bar into a position in which said bar is disposed behind the tabs of said selected cards and in front of the tabs of said non-selected cards.

13. A card for use in an automatic retrieving apparatus, said card being of generally rectangular outline and having a front edge providing a plurality of notch sites, a ferro-magnetic element carried by said card along the front edge therof, said ferro-magnetic element having an elongated notch formed therein extending perpendicular to said front edge.

14. A record card for use in an automatic retrieving system, said card being of generally rectangular configuration and including a front edge providing a plurality of notch sites, a ferro-magnetic element carried by the front edge of said card, and an elongated slot extending inwardly from the rear edge of said card, said slot extending at right angles to said rear edge and being adapted to receive an elongated projection effective to steady the card against pivotal movement.

15. A record card for use in an automatic data retrieving system, said card being of generally rectangular outline and including a front edge providing a plurality of notch sites, each of said notch sites being adapted to be notched to any of a plurality of depths, a ferromagnetic element mounted adjacent to the front edge of said card and a projection extending outwardly from said card adjacent to the front edge thereof, said projection being of a width less than the depth of the shallowest notch formed in any of said notch sites.

16. A record card for use in an automatic data retrieving system, said card being of generally rectangular outline and including a front edge providing a plurality of notch sites, each of said notch sites being adapted to be notched to any of a plurality of depths, a ferromagnetic element mounted adjacent to the front edge of said card and a projection extending outwardly from said card and having an edge forming an upward continuation of the front edge of said card, said projection being of a width less than the depth of the shallowest notch formed in any of said notch sites.

17. A record card for use in automatic data retrieving apparatus, said card being of generally rectangular outline and including a front edge providing a plurality of notch sites, a magnetic element mounted adjacent to the front face of said card, and a restack slot formed in the top edge thereof, said restack slot extending parallel to said front edge and being adapted to receive a restack bar.

18. A record card for use in automatic data retrieving apparatus, said card being of generally rectangular outline and including a front face providing a plurality of notch sites, a magnetic element mounted adjacent the front face of said card, a narrow projection extending upwardly adjacent to the front edge of said card, and a restack slot formed in a transverse edge thereof, said restack slot being spaced from and extending parallel to said front edge and being adapted to receive a restack bar.

19. A card for use in automatic data retrieving apparatus, said card being of generally rectangular outline and including a front edge providing a plurality of notch sites, a magnetic strip mounted adjacent to the front edge of said card, a narrow projection extending upwardly from the upper edge of said card adjacent to the front edge thereof, a restack slot extending downwardly from the upper edge of said card parallel to the front face thereof, said card including a projecting portion extending upwardly at the rear edge of said restack slot.

20. A record card for use in automatic data retrieving apparatus, said card being of generally rectagular configuration and including a front edge defining a plurality of notch sites, said notch sites being adapted to be notched to differing depths, a ferro-magnetic strip mounted upon said card adjacent to the front edge thereof, said ferro-magnetic strip having a rearwardly extending slot formed therein, a tab extending upwardly from the upper edge of said card adjacent to the front edge thereof, said tab being of a width less than the width of the smallest notch formed in said notch sites, a restack slot formed in the upper edge of said card spaced from said tab.

21. A record card for use in automatic data retrieving apparatus, said card being of generally rectangular configuration and including a front edge defining a plurality of notch sites, said notch sites being adapted to be notched to differing depths, a ferro-magnetic strip mounted upon said card adjacent to the front edge thereof, said ferro-magnetic strip having a rearwardly extending slot formed therein, a tab extending upwardly from the upper edge of said card adjacent to the front edge thereof, said tab being of a width less than the width of the smallest notch formed in said notch sites, a restack slot formed in the upper edge of said card spaced from said tab, the upper edge of said card intermediate said tab and said restack slot being disposed lower than the upper edge of said card adjacent to the rear edge of said restack slot.

22. A record card for use in automatic data retrieving apparatus, said card being of rectangular configuration and including a front edge, said front edge defining a first field comprising a plurality of rearwardly extending notch sites corresponding to a predetermined digital value, each of said notch sites adapted to be notched to a different discrete depth, the depth of said notches corresponding to the positional value of a digit associated with said notch, each of the notch sites of said field being spaced apart vertically from the adjacent notch site of said field, the front edge of said card providing a second field comprising a second plurality of notch sites, one of the notch sites of said second field being interposed between each pair of notch sites of said first field.

23. A record card for use in automatic data retrieving apparatus, said card being of rectangular configuration and including a front edge, said front edge defining a first field comprising a plurality of rearwardly extending notch sites corresponding to a predetermined digital value, each of said notch sites adapted to be notched to a different discrete depth, the depth of said notches corresponding to the positional value of a digit associated with said notch, each of the notch sites of said field being spaced apart from the adjacent notch site of said field along said front edge, the front edge of said card providing a second field comprising a second plurality of notch sites, one of the notch sites of said second field being interposed between each pair of notch sites of said first field, the digital values associated with adjacent pairs of notch sites from said first and second fields being identical.

24. Apparatus for mechanically segregating edge notched data bearing cards indexed in a predetermined manner, said apparatus comprising a drawer having a bottom, two end walls and one side wall, the drawer being effective to support said data bearing cards with their notched edges extending vertically remote from the side wall, a sorting platen, said platen carrying a plurality of vertically spaced sorting bars extendable from said platen, means for selectively extending said bars horizontally outwardly from said platen in the direction of said drawer, whereby said drawers cooperatively engage the notched edges of said cards, and means for reciprocating said platen toward and away from said drawer.

25. Apparatus for mechanically segregating edge notched data bearing cards indexed in a predetermined manner, said apparatus comprising a drawer having a bottom, two end walls and one side wall, a sorting platen, said platen carrying a plurality of vertically spaced sorting bars extendable from said platen, means for selectively extending said bars outwardly from said platen in the direction of said drawer, magnetic means carried by said platen for attracting magnetically responsive portions of said cards, and means for reciprocating said platen toward and away from said drawer.

26. Apparatus for mechanically segregating edge notched data bearing cards indexed in a predetermined manner, said apparatus comprising a drawer having a bottom, two end walls and one side wall, a sorting platen, said platen carrying a plurality of vertically spaced sorting bars extendable from said platen, means for selectively extending said bars outwardly from said platen in the direction of said drawer, and means for reciprocating said platen toward and away from said drawer, and means for shifting said sorting bars vertically relative to said drawer.

27. Card filing apparatus, said card filing apparatus comprising a plurality of vertically superposed drawers, each of said drawers having a bottom, two end walls and one side wall, a sorting platen, said platen carrying a plurality of vertically spaced sorting bars, means for selectively extending said bars outwardly from said platen in the direction of said drawer, means for reciprocating said platen toward and away from said drawer, and an elevator means for selectively aligning said platen with each of said drawers.

28. Apparatus for mechanically segregating edge notched data bearing cards indexed in a predetermined manner, the cards including magnetically responsive portions, said apparatus comprising a drawer having a bottom, two end walls and one side wall, a sorting platen, said platen carrying a plurality of vertically spaced sorting bars extendable from said platen, a magnet carried by said platen adjacent to said sorting bars for engagement with magnetic responsive portions of cards disposed within said drawer, means for selectively extending said bars outwardly from said platen in the direction of said drawer, and means for reciprocating said platen toward and away from said drawer.

29. Apparatus for mechanically segregating edge notched data bearing cards indexed in a predetermined manner, the cards having magnetically responsive portions, said apparatus comprising a drawer having a bottom, two end walls and one side wall, a sorting platen, said platen carrying a plurality of vertically spaced sorting bars extendable from said platen, a magnet carried by said platen adjacent to said sorting bars for engagement with magnetic responsive portions of cards disposed within said drawer, means for selectively extending said bars outwardly from said platen in the direction of said drawer, means for reciprocating said platen toward and away from said drawer, and gathering means for collecting cards adhering to said magnetic means when said platen is disposed in spaced relationship with said drawer.

30. Apparatus for mechanically segregating edge notched data bearing cards indexed in a predetermined manner, said cards having magnetically responsive portions, said apparatus comprising a drawer having a bottom, two end walls and one side wall, a sorting platen, said platen carrying a plurality of vertically spaced sorting bars extendable from said platen, a magnet carried by said platen adjacent to said sorting bars for engagement with magnetic responsive portions of cards disposed within said drawer, means for selectively extending said bars outwardly from said platen in the direction of said drawer, means for reciprocating said platen toward and away from said drawer, and gathering means for collecting cards adhering to said magnetic means when said platen is disposed in spaced relationship with said drawer, said last named means comprising a pusher plate, and means for shifting said pusher plate adjacent to said platen in a direction parallel to the extent of said drawer.

31. In combination with a card compartment, a stack of cards in said compartment, each of said cards being of generally rectangular outline and including a front edge providing a plurality of notching sites, and a magnetically responsive portion adjacent to said front edge, each of said cards further comprising an upwardly extending projection of a lesser width than the depth of the smallest of said notches, and a mechanism to select from said group of stacked cards those cards bearing a predetermined coding, said last named means comprising a platen, a plurality of vertically spaced sorting bars carried by said platen, means for advancing and retracting said sorting bars relative to said platen, means for shifting said platen toward and retracting said platen from said cards, said platen carrying magnetic means effective to cooperate with the magnetically responsive portion of said cards, and means disposed for engagement with said projections for preventing motion of the non-selected cards upon retraction of the platen.

32. In combination with a card compartment, a stack of cards in said compartment, each of said cards being of generally rectangular outline and including a front vertical edge providing a plurality of notching sites, and a magnetically responsive portion adjacent to said front edge, and a mechanism to select from said group of stacked cards those cards bearing a predetermined coding, said last named means comprising a platen, a plurality of vertically spaced sorting bars carried by said platen, means for advancing said sorting bars outwardly relative to said platen, said platen carrying magnetic means effective to cooperate with the magnetically responsive portion of said cards, and means for shifting said platen toward and away from said cards.

33. In combination with a card compartment, a stack of cards in said compartment, each of said cards being of generally rectangular outline and including a front vertical edge providing a plurality of notching sites and a magnetically responsive strip adjacent to said front edge, said strip having a transverse slot formed therein, and a mechanism to select from said group of stacked cards those cards bearing a predetermined coding, said last named means comprising a platen, a plurality of vertically spaced sorting bars carried by said platen, means for advancing said sorting bars outwardly relative to said platen, said platen carrying a magnet disposed adjacent to said sorting bars, a non-magnetic projection disposed for entry into the transverse slots in the magnetically responsive strips on said cards, and means for shifting said platen toward and away from said cards.

34. A method of sorting edge notched cards to separate cards having a predetermined notch pattern from cards having different notch patterns, said method comprising the steps of disposing said cards in a position with the edges of said cards in alignment, selectively rejecting cards not having the predetermined notch pattern by shifting said cards away from cards having the selected notch pattern while preventing movement of said last named cards, thereafter restraining said rejected cards while withdrawing the remaining cards from engagement with said rejected cards in a direction opposite from the direction in which said rejected cards were shifted.

35. A method of sorting edge notched cards to separate cards having a predetermined notch pattern from cards having different notch patterns, said method comprising the steps of bringing said cards into alignment, releasably holding said cards in alignment by applying a magnetic force to said cards, selectively rejecting cards not having the predetermined notch pattern by shifting said cards against said magnetic force, preventing said rejected cards from return movement under the influence of the magnetic force, while effecting complete separation of the selected cards by withdrawing said cards outwardly under the influence of a magnetic force.

36. A method of sorting edge notched cards to separate cards having a predetermined notch pattern from cards having different notch patterns, said method comprising the steps of bringing said cards into alignment, releasably holding said cards in alignment by applying a magnetic force to said cards, selectively rejecting cards not having the predetermined notch pattern by shifting said cards against said magnetic force, inserting a barrier between portions of said rejected cards and the selected cards for preventing said rejected cards from movement under the influence of the magnetic force, while effecting complete separation of the selected cards by withdrawing said cards outwardly under the influence of a magnetic force.

37. A method of sorting edge notched cards to separate cards having a predetermined notch pattern from cards having different notch patterns, said method comprising the steps of bringing said cards into alignment, releasably holding said cards in alignment by applying a magnetic force to said cards, selectively rejecting cards not having the predetermined notch pattern by shifting said cards against said magnetic force, preventing said rejected cards from movement under the influence of the magnetic force by first holding said rejected cards while said selected cards are partially separated from the rejected cards by the magnetic force, and weakening the magnetic force in the area of said rejected cards so that the magnetic force is ineffective to attract said rejected cards, and subsequently effecting complete separation of the selected cards by withdrawing said cards outwardly under the influence of the magnetic force.

38. A method of sorting edge notched cards by making successive sorts to separate cards having each of two predetermined notch patterns from cards having different notch patterns, said method comprising the steps of bringing said cards into alignment, releasably holding said cards in alignment by applying a magnetic force to said cards, selectively rejecting cards not having the first predetermined notch pattern by shifting said cards against said magnetic force while maintaining the selected cards stationary, then rejecting cards not having the second predetermined notch pattern by shifting said rejected cards against the magnetic force, preventing said rejected cards from movement under the influence of the magnetic force, while effecting complete separation of the selected cards by withdrawing said cards outwardly under the influence of a magnetic force.

39. A method of sorting edge notched cards to separate cards having a predetermined notch pattern in each of two fields from cards having different notch patterns, said method comprising the steps of disposing said cards in alignment, selectively rejecting cards not having a predetermined notch pattern in the first of said fields, while restraining the remaining cards in position under the influence of a magnetic force, and subsequently rejecting cards having a predetermined notch pattern in the first field, but not in the second field by shifting cards away from the selected cards having the selected notch pattern in the second field while restraining the last named cards against movement by means of a magnetic field.

40. A method of sorting edge notched cards to separate cards having a predetermined notch pattern in each of two fields from cards having different notch patterns, said method comprising the steps of disposing said cards in alignment, selectively rejecting cards not having a predetermined notch pattern in the first of said fields, while restraining the remaining cards in position under the influence of a magnetic force, and subsequently rejecting cards having a predetermined notch pattern in the first field, but not in the second field by shifting cards away from the selected cards having the selected notch pattern in the second field while restraining the last named cards against movement by means of a magnetic field, and subsequently withdrawing the selected cards from alignment with the rejected cards by pulling said selected cards outwardly in a direction opposite to that in which rejected cards are shifted.

41. A method of sorting edge notched cards to separate cards having a predetermined notch pattern in each of two fields from cards having different notch patterns, said method comprising the steps of disposing said cards in alignment, selectively rejecting cards not having a predetermined notch pattern in the first of said fields, while restraining the remaining cards in position under the influence of a magnetic force, and subsequently rejecting cards having a predetermined notch pattern in the first field, but not in the second field by shifting cards away from the selected cards having the selected notch pattern in the second field while restraining the last named cards against movement by means of a magnetic field, and subsequently withdrawing the selected cards from alignment with the rejected cards by pulling said selected cards outwardly in a direction opposite to that in which rejected cards are shifted, said selected cards being pulled outwardly by means of a magnetic force.

42. A method of sorting edge notched cards to separate cards having a predetermined notch pattern from cards having different patterns, said method comprising the steps of disposing said cards in a position with the edges of said cards in alignment, establishing a projecting pattern corresponding to the desired notch pattern, advancing said projecting pattern toward said notched portions of said cards to selectively reject cards by shifting cards not having the selected notch pattern away from cards having the selected notch pattern, restraining said rejected cards while withdrawing the remaining cards from alignment with said rejected cards in the opposite direction from the direction in which said rejected cards were shifted.

43. A method of coding a card by providing notches along one edge of said card, said method comprising the steps of coding a first field of said card by notching a plurality of spaced notching sites, and subsequently coding a second field of said card by coding a plurality of notched sites intermediate adjacent notch sites of said first field, the notch sites of said first and second fields defining symbols associated with said notches and the depths of said notches indicating positional value of said symbols, the notch sites of said first and second fields being disposed so that notch sites indicating the same symbols in the first and second fields are disposed adjacent to one another.

44. A record card for use in an automatic filing system, said record card being of generally rectangular configuration and including a sorting edge, two transverse edges extending at right angles to said sorting edge, said sorting edge providing a plurality of notch sites of varying depths, a projection extending outwardly from one of said transverse edges, the projection being narrower than the shallowest depth of said notch sites.

45. A record card for use in an automatic filing system, said record card being of generally rectangular configuration and including a sorting edge having a ferromagnetic element secured thereto, two transverse edges extending at right angles to said sorting edge, said sorting edge providing a plurality of notch sites of varying depths, a projection extending outwardly from one of said transverse edges, the projection being narrower than the shallowest depth of said notch sites.

46. A record card for use in connection with automatic data retrieval apparatus, said record card comprising a sorting edge providing a plurality of notch sites, a plurality of notches of varying depths in said notch sites, and a ferro-magnetic element disposed along the sorting edge of said card.

47. A record card for use in an automatic filing system, said record card being of generally rectangular outline and including a sorting edge defining a plurality of notch sites, a plurality of elongated notches of different depths formed in said notch sites, and an elongated slot in said card extending along a line perpendicular to said sorting edge, said elongated slot intersecting one edge of said card.

48. Apparatus for mechanically separating edge notched cards bearing a predetermined coding and a ferro-magnetic element from a plurality of different cards, said apparatus comprising a platen, a plurality of sorting bars carried by said platen, a magnet carried by said platen, means for positioning said platen adjacent to the sorting edge of said cards, said magnet being effective to attract ferro-magnetic portions of said cards, and means for advancing said sorting bars to extend said sorting bars outwardly to force said cards away from said magnet.

49. In apparatus for mechanically separating edge notched cards bearing a predetermined code number from a plurality of different cards, a platen, a plurality of parallel spaced sorting bars carried by said platen, each of said sorting bars corresponding to a digit value, and means for advancing said sorting bars outwardly away from said platen at varying incremental distances in accordance with the position of said digit in the code number.

50. In apparatus for mechanically separating edge notched cards bearing a predetermined coding from a plurality of different cards, a platen, a plurality of parallel spaced sorting bars carried by said platen, each of said sorting bars corresponding to a digit value, a plurality of input elements associated with each of said sorting bars and means for advancing said sorting bars outwardly away from said platen at varying incremental distances in accordance with the sequential order in which said input elements are actuated.

51. In apparatus for mechanically separating edge notched cards bearing a predetermined code number from a plurality of different cards, a platen, a first plurality of parallel spaced sorting bars carried by said platen, each of said sorting bars corresponding to a digit value and a second plurality of transfer sorting bars, a different one of said transfer sorting bars being advanced for each repeated digit value in said code number.

52. In apparatus for mechanically separating edge notched cards bearing a predetermined code number from a plurality of different cards, a platen, a first plurality of parallel spaced sorting bars carried by said platen, each of said sorting bars corresponding to a digit value and a second plurality of transfer sorting bars, a different one of said transfer sorting bars being advanced for each repeated digit value in said code number and means for advancing said transfer bars in accordance with the position of the digits repeated.

53. In apparatus for sorting edge notched data bearing cards indexed in a predetermined manner, the combination of a receptacle having a bottom wall and a rear wall, said rear wall having an inwardly extending horizontal flange, a sorting platen carrying a plurality of spaced sorting bars extendable from said platen, a plurality of cards disposed in said receptacle, each of said cards having a sorting edge facing said platen and a rear edge disposed adjacent to the rear wall of said receptacle, the rear edges of each of said cards having an elongated slot formed therein adapted to receive said flange, each of said cards further having a ferro-magnetic portion disposed adjacent to the forward edge thereof, a magnet carried by said platen for attracting said ferro-magnetic portions, said platen being effective to withdraw said cards outwardly away from the rear wall of said compartment to a sorting position, the flange on said rear wall and the notches in the rear edges of said cards being dimensioned so that a portion of said flange is disposed within said notches when the sorting platen has withdrawn the cards to the sorting position.

54. In apparatus for mechanically separating edge notched cards bearing a predetermined coding from a plurality of different cards, a platen, a plurality of parallel spaced sorting bars carried by said platen, each of said sorting bars corresponding to a digit value, a plurality of input elements associated with each of said selector bars and means for advancing said sorting bars outwardly away from said platen at progressively decreasing distances in accordance with the sequential order in which said input elements are actuated.

55. A method of coding data cards by providing notches along one edge of the card, said method comprising the steps of assigning code numbers to genera in at least two fields of said card, the code numbers assigned to each of said fields comprising only a fraction of the available numbers in said fields, coding a species of a first genus by notching the first field of said card, the code number assigned to said genus in the first field being normally unused in the second field, and coding a second species of the same genus by notching a plurality of notch sites in the second field corresponding to the assigned code number of the second species.

56. A method of sorting edge notched cards in a stack to separate certain cards having a predetermined notch pattern from other cards in the stack having notch patterns other than said predetermined notch pattern, said method comprising the steps of disposing the stack of said cards in a position with the notched edges of said cards in alignment, selectively rejecting cards not having said predetermined notch pattern by shifting the so rejected cards away from said certain cards having the selected notch pattern while preventing movement of said certain cards, thereafter restricting movements of said rejected cards while withdrawing said certain cards from the stack in a direction opposite from the direction in which said rejected cards were shifted.

References Cited by the Examiner

UNITED STATES PATENTS

| | | | |
|---|---|---|---|
| 2,172,737 | 9/39 | Mansel | 209—110.1 |
| 2,294,680 | 9/42 | Maul | 209—110.1 |
| 2,640,647 | 6/53 | Rand. | |
| 2,848,163 | 8/58 | Serrell | 235—61.12 |
| 2,858,073 | 10/58 | Taube | 235—61.12 |

FOREIGN PATENTS

| | | |
|---|---|---|
| 829,953 | 5/38 | France. |
| 54,577 | 10/49 | France. |

ROBERT B. REEVES, *Acting Primary Examiner.*

ROBERT C. RIORDON, CLAUDE A. LEROY, ABRAHAM BERLIN, ERNEST A. FALLER, JR., *Examiners.*